United States Patent [19]
Brice et al.

[11] Patent Number: 5,764,981
[45] Date of Patent: Jun. 9, 1998

[54] SYSTEM FOR BATCH SCHEDULING OF TRAVEL-RELATED TRANSACTIONS AND BATCH TASKS DISTRIBUTION BY PARTITIONING BATCH TASKS AMONG PROCESSING RESOURCES

[75] Inventors: Tony J. Brice, Colleyville; Richard J. Drexel, III, Bedford; Curtis A. Mitchell, Fort Worth, all of Tex.

[73] Assignee: The SABRE Group, Inc., Dallas Fort Worth Airport, Tex.

[21] Appl. No.: 664,330

[22] Filed: Jun. 14, 1996

Related U.S. Application Data

[63] Continuation of Ser. No. 172,046, Dec. 22, 1993, abandoned.

[51] Int. Cl.[6] .......................... G06F 15/20; G06F 15/163
[52] U.S. Cl. .......................... 395/671; 395/206; 395/208; 395/672; 395/675
[58] Field of Search ........................ 395/201, 202, 395/203, 204, 205, 206, 207, 208, 209, 210, 211, 212, 670, 671, 672, 673, 674, 675

[56] References Cited

U.S. PATENT DOCUMENTS

| | | | |
|---|---|---|---|
| 3,622,995 | 11/1971 | Dilks et al. | 340/149 |
| 3,705,384 | 12/1972 | Wahlberg | 340/149 |
| 3,872,448 | 3/1975 | Mitchell, Jr. | 340/172.5 |
| 4,186,438 | 1/1980 | Benson et al. | 364/200 |
| 4,193,114 | 3/1980 | Benini | 364/200 |
| 4,449,186 | 5/1984 | Kelly et al. | 364/407 |
| 4,623,964 | 11/1986 | Getz et al. | 364/401 |
| 4,775,936 | 10/1988 | Jung | 364/407 |
| 4,788,643 | 11/1988 | Trippe et al. | 364/407 |
| 4,794,530 | 12/1988 | Yukiura et al. | 364/407 |
| 4,812,968 | 3/1989 | Poole | 364/200 |
| 4,862,357 | 8/1989 | Ahlstrom et al. | 364/407 |
| 4,922,439 | 5/1990 | Greenblatt | 364/407 |
| 4,958,280 | 9/1990 | Pauly et al. | 364/403 |
| 5,021,953 | 6/1991 | Webber et al. | 364/407 |
| 5,023,832 | 6/1991 | Fulcher, Jr. et al. | 364/900 |
| 5,072,401 | 12/1991 | Sansone et al. | 364/478 |
| 5,138,710 | 8/1992 | Kruesi et al. | 395/575 |
| 5,237,499 | 8/1993 | Garback | 364/407 |
| 5,311,516 | 5/1994 | Kuznicki et al. | 370/94.1 |
| 5,327,419 | 7/1994 | Clark et al. | 370/58.2 |
| 5,414,845 | 5/1995 | Behm et al. | 395/650 |

*Primary Examiner*—Thomas C. Lee
*Assistant Examiner*—Rehana Perveen
*Attorney, Agent, or Firm*—Debbie G. Segers

[57] ABSTRACT

A data management method and architecture that enables users to integrate central reservation system communications with local accounting and reporting functions. More particularly, the present invention comprises a batch scheduling function that automatically executes predetermined batch tasks and distributes the executable load efficiently among available processing resources. The invention provides significant improvements in environments which require access to mass data storage systems such as the central information repositories used in the travel industry.

9 Claims, 7 Drawing Sheets

| Edit a | | | |
|---|---|---|---|
| Batch ID | Batch Name | Edited By | Date Modified |
| DAILY | DAILY REPORTS | (base) | 02/01/93 20:55:47 |
| GGTest | Glenns test batch | Glenn | 05/12/93 09:11:26 |

Batch Name: DAILY

Batch Description: DAILY REPORTS

Clear | Add | Clone | Delete | Modify Batch... | Cancel

Fig.8

SYSTEM FOR BATCH SCHEDULING OF TRAVEL-RELATED TRANSACTIONS AND BATCH TASKS DISTRIBUTION BY PARTITIONING BATCH TASKS AMONG PROCESSING RESOURCES

This application is a continuation of application Ser. No. 08/172,046 filed Dec. 22, 1983 (now abandoned).

TECHNICAL FIELD

The present invention relates generally to a data management method and architecture. In particular the present invention relates to a data management method and architecture allowing user-absent execution of scheduled batch tasks and administration of accounting information in environments that typically involve multiple users requiring access to centrally stored data such as the travel industry.

BACKGROUD OF THE INVENTION

The growth of the airline business from the early 1980's to the 1990's has resulted in the proliferation of travel agencies and other travel information groups that require access to large volumes of data in a "real time" environment. This growth has spurred many technological advancements in central reservation systems (CRS) for the transportation industry and in particular the airline industry. Examples of such systems are the American Airlines Inc.'s SABRE system, System One, Covia and Worldspan.

As the number of travel agencies and other travel providers has grown, the importance of automating their business practices such as accounting and report generation has also increased. Innovations for the back-office business side of travel providers have grown from calculators, adding machines and manual file systems to very sophisticated accounting software packages which are commonly available in the market place today.

Until the present invention, however, there has not been a successful integration of the a "real time" central reservation system with the modern travel provider back-office accounting and reporting packages taking full advantage of distributed personal computer processing capabilities. For example, the central reservation systems have gone from a relatively small number of mainframe computers to vast multiplexed systems not specifically designed for a given backoffice environment. Furthermore, in the past the mainframe computers were almost always connected to "dumb" terminals, i.e. terminals having no independent processing power and incapable of handling any of the accounting and reporting processing.

Beginning in the mid-1980's, the Personal Computer (PC) began replacing the "dumb" terminals, thus making the processing power of the PC available to the travel provider. Until the present invention, however, a method and architecture that could take advantage of the newly available processing power was not available. Most previously developed methods and architectures depended on "dumb" terminals where all the processing takes place in a single computer such as mainframe or minicomputer. The few previous methods and architectures that allowed users to install PC's utilized "dumb" terminal emulation packages to force the PC's to function as "dumb" terminals, again failing to use the available processing power of the PC. Thus, prior methods and architectures did not allow the user to fully utilize the available PC processing power.

Past and present methods and architectures also did not allow the user to realize the full benefits of using PC based applications that access a database, such as a CRS, directly. Instead, prior art products provided some ability to execute a PC "hand-off" function where the user switches between using the "dumb" terminal emulation package to communicate with the CRS and the PC to perform accounting and reporting functions. Should the user require an integration of the CRS communication with the accounting and reporting functions, however, then an intermediate step is required. Personal productivity and efficiency are much less because intermediate steps must be performed.

While back-office systems for the travel provider have existed for several years, including Agency Data Systems' ADS product; Systems One's Max; World Span's World Ledger 4000 and Travel Data Systems' TDS; each of these systems was implemented on an IBM proprietary AS/400 architecture. Therefore, none of the prior art back-office accounting and reporting systems are easily ported to other architectures or used in connection with other vendor's hardware products. In addition, the travel providers have to depend on the developer of each architecture to do the necessary programming to port existing back-office accounting and reporting systems to new architectures as they are developed.

The present invention, however, provides an integrated "real-time" CRS to back-office system that works on any industry supported architecture and is independent of the particular hardware system used. Thus, the present invention allows travel providers to install various hardware devices not offered by the original architectural vendor. Examples of these hardware devices include printers, workstations, DOS based platforms, DOS based network file servers, and similar devices. The openness and flexibility of the present invention permits travel providers to largely solve their own day-to-day operational and information management needs with minimal dependence for additional programming from the original architectural vendor.

Unlike the prior art methods and architectures, the present invention provides a method and architecture that can distribute reporting functions among available processing resources in a network environment though a batch scheduling system. This provides maximum flexibility to the end user, as each user can now allocate computing power to a given reporting task. Furthermore, the user can designate the most appropriate platform to accomplish a specific reporting task. This feature allows a user who works in a mixed platform environment to maximize the efficiency of each individual platform by allocating it to a suitable task.

Moreover, the batch scheduling system of the present invention enables a high on-line throughput of transactions achieved through a client server system architecture. The client server architecture can operate when application functions are separated logically, and indeed, sometimes physically from the database management functions. Thus, a user can work with a client (the frontend) on his workstation and use resources of the server (the back-end) only when data needs to be accessed. Thus, regardless of the platform on which the database is run, e.g., UNIX, OS/2, Novell Netware, the same client applications can be accessed without any changes.

Furthermore, in the present invention either the client or server can be changed independently of the other. For example, one database can be moved from a vendor's UNIX system to another, or to an emerging environment like Microsoft Windows NT, with no additional programming required for the client applications.

The present invention also provides the ability to process multiple tasks simultaneously not only on the database server, but also on individual workstations. As an example, in one of the preferred embodiments of the present invention, applications are run on an IBM OS/2 operating system and users can execute multiple ad hoc queries, multiple formatted reports, print from third-party software programs, and do accounting data entry all at the same time. In the prior art, these tasks either tied up each workstation reducing productivity or required the submission of an individual executable command to a processor on a minicomputer.

Moreover, the batch scheduling system of the present invention has a preprogrammed reporting capability that allows each workstation to access multiple reports. The user can see the status of a report at any time, still executing, executed or already viewed reports via a video terminal. The user can send one or more copies to a printer, or save it as a file. The user may also create customized versions of each preprogrammed report by developing a template. This template defines the users choice of select criteria and sort field preferences.

In addition to the preprogrammed reporting system, the invention has a report generator system that allows a non-programmer end user to create customized and formatted reports. By merely selecting the columns the user wishes to see, a detailed query is automatically formed that can be executed. The user can specify select criteria, sort fields, request aggregate functions, sums, minimums, maximums, averages, and create customized headers and footers. The present invention then allows users to schedule a task to occur automatically at specific dates and times.

Another aspect of the present invention is to provide a batch scheduling system that allows reports to be distributed among the available network resources. Once jobs are scheduled, they are executed on a user defined platform or groups of platforms attached to the network. The user can define the available resources to be allocated to each reporting task, can group resources to work on a given reporting task, and designate the priority of each task, as well as the time and date at which the task will be performed. Unlike the prior art, this aspect of the invention allows for the processing power of each platform on the network to be used to its fullest even when no actual users are present.

The present invention also ties in perfectly with the current trend of most companies to downsize large mainframe and minicomputer systems to smaller network distributed systems. Thus, the present invention provides numerous advantages over prior data management methods and architectures and eliminates many of the deficiencies therein.

SUMMARY OF THE INVENTION

The present invention relates to a new and novel data management method and architecture. In particular, the present invention comprises a centralized host computer having means for mass storage of data and communication means for communicating to one or more central processing units. In one of the preferred embodiments, the centralized host computer is one of several central reservation systems (CRS) such as SABRE System One, Covia, World Span, or any other similar CRS.

In one of the preferred embodiments of the present invention access to all of the various CRS host computers is included. The central host computer or CRS is connected through a communication channel to a client server architecture which receives the data stream from the CRS system and subsequently manipulates the data stream into a predetermined data structure. Typically a UNIX or equivalent based process receives, manipulates, and stores the data stream on the travel provider's back-office platform.

In addition, the client server platform maintains certain accounting and reporting mechanisms. These mechanisms consist primarily of client specific accounting information, programs for organizing the information, database structures which contain the organized information, and programs for communicating with the CRS as well as the travel provider's Local Area Network (LAN) or its equivalent. In addition, the client server platform may contain maintenance utilities such as system backup and diagnostics. The LAN itself is the communication platform for the client and server processes.

In one of the preferred embodiments, the travel provider's platform consists of a LAN which may include any number of attached devices such as mini computers, PC's, dedicated workstations, printers, and similar or equivalent devices. These devices are used for imputing and transmitting data to one or more server processes. The devices are also used by the user to perform "realtime" transactions on the CRS. In addition, these devices are used in connection with the distribution option of the batch scheduling system to process reports as well as other local processing tasks which the client may require. It is at the LAN level that accounting processes such as sales entry, cash functions, accounts receivable, reporting, customer statements, accounts payable, interface, the generation of data files, and customized processes or third-party functions occur.

BRIEF DESCRIPTION OF THE DRAWINGS

For a more complete understanding of the present invention and the advantages thereof, reference is now made to the following description in conjunction with the accompanying drawings in which:

FIG. 8 is a representative screen showing the editing of batch task.

DETAILED DESCRIPTION OF THE EMBODIMENT

Figure 1:
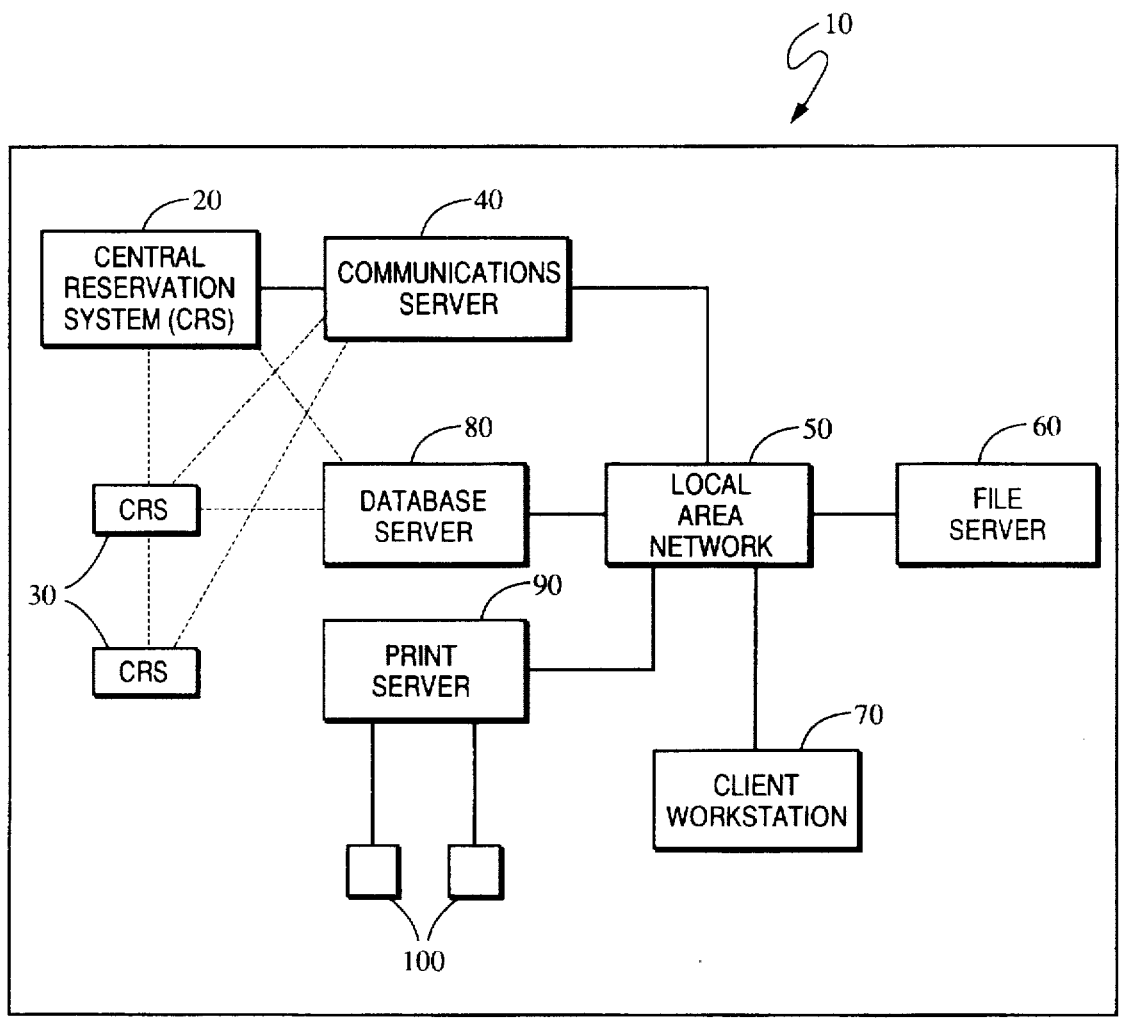
FIG. 1 is a representative diagram of one embodiment of the system architecture of the present invention.

The present invention relates to a data management method and architecture. FIG. 1 shows an overall system architecture 10 comprising of either a single central host computer or central reservation system (CRS) 20 or a plurality of CRS's 30. In one of the preferred embodiments, the CRS 20 or CRS's 30 are the various travel reservation systems or their equivalent. CRS 20 or CRS's 30 connects to a gateway or communications server 40, or its equivalent. In one of the preferred embodiments, the communications server 40 is a 386-based platform or its equivalent with storage and disk capabilities. The communications server 40 is an attached device on a Local Area Network (LAN) 50 such as the IBM Token Ring Netware operating under an IBM OS/2 Presentation Manager operating system. Equivalent network and operating systems may be used. Communication server 40 may contain an RTIC board from IBM or any other similar communications board. The gateway or communications server 40 connects to the LAN 50. Typically the LAN 50 is an IBM Token Ring operating under standard Novell Netware network software utilizing TCP/IP. Connected to the LAN 50 is a network file server 60. In one of the preferred embodiments, the file Server 60 is typically a 386 or equivalent based platform, with disk and storage capabilities operating on a token ring network and LAN workplace IBM OS/2 Presentation Manager software with SQL Server PC Net-Library. The file server 60 may also contain various application software including third-party software and/or customized software.

Additionally, the system architecture 10 contains at least one client workstation 70 for the input and display of data. It should be readily understood that a plurality of client workstations 70 may also be used without departing from the true spirit of the present invention. The client workstation 70 is a 386 or equivalent based platform with or without disk and storage capabilities running on a Token Ring Network under the IBM OS/2 Presentation Manager operating system. This client workstation 70 is used by the travel provider end user to perform many of the routine accounting functions and client report generating functions, including data entry and reservation services. In one of the preferred embodiments of the present invention, it is within a client workstation 70 that the batch scheduling system and message communications processing takes place.

Figure 1A:
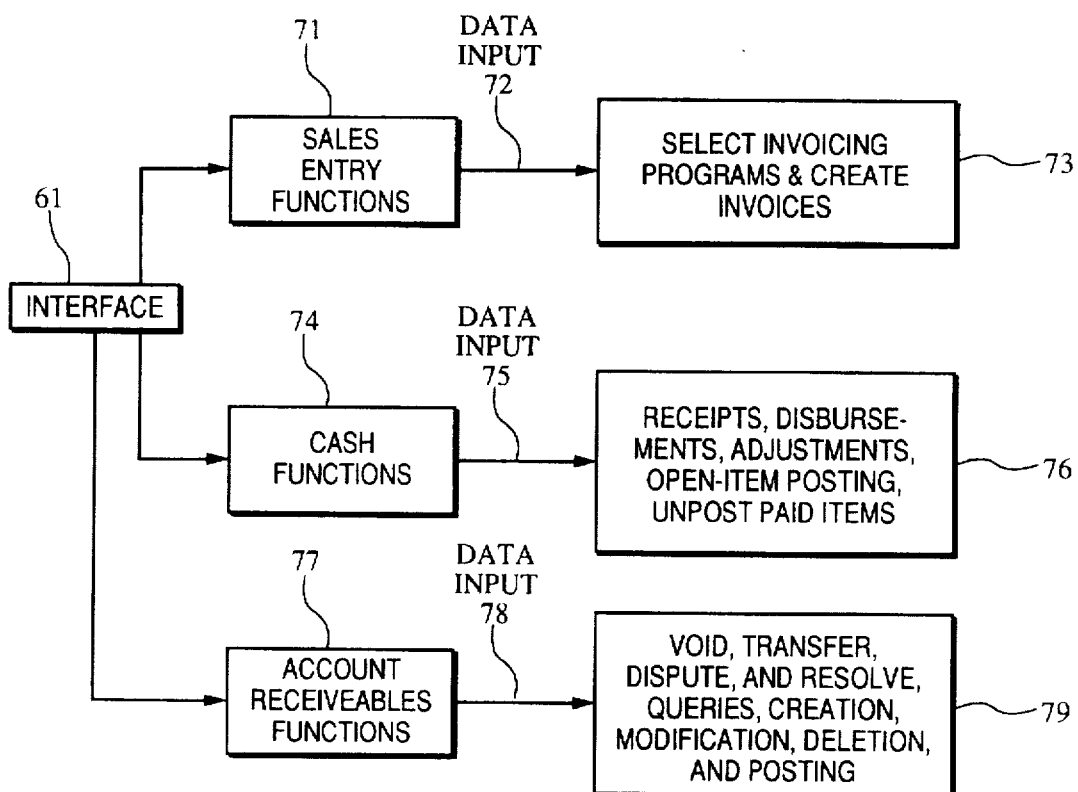
FIG. 1A is a representation of various workstation processes of the present invention.

The client workstation 70 accounting and client report generating functions can be more readily understood with reference to FIG. 1a. Interface 61, which in one of the preferred embodiments is the IBM OS/2 Presentation Manager or a similar or equivalent interface, provides sales entry functions 71 allowing the client a selection of invoicing programs and creation of invoices 73 using data input 72. The client workstation 70 provides cash functions 74 selected from interface 61 and consisting of functions 76 such as receipts, disbursements, adjustments, open item posting, and unpost paid items using data input 75. Client workstation 70 also provides, through interface 61, account receivables functions 77 consisting of functions 79 such as void, transfer, dispute and resolve, queries, as well as creation, modification, deletion and posting a beginning receivable using data input 78.

Figure 1B:
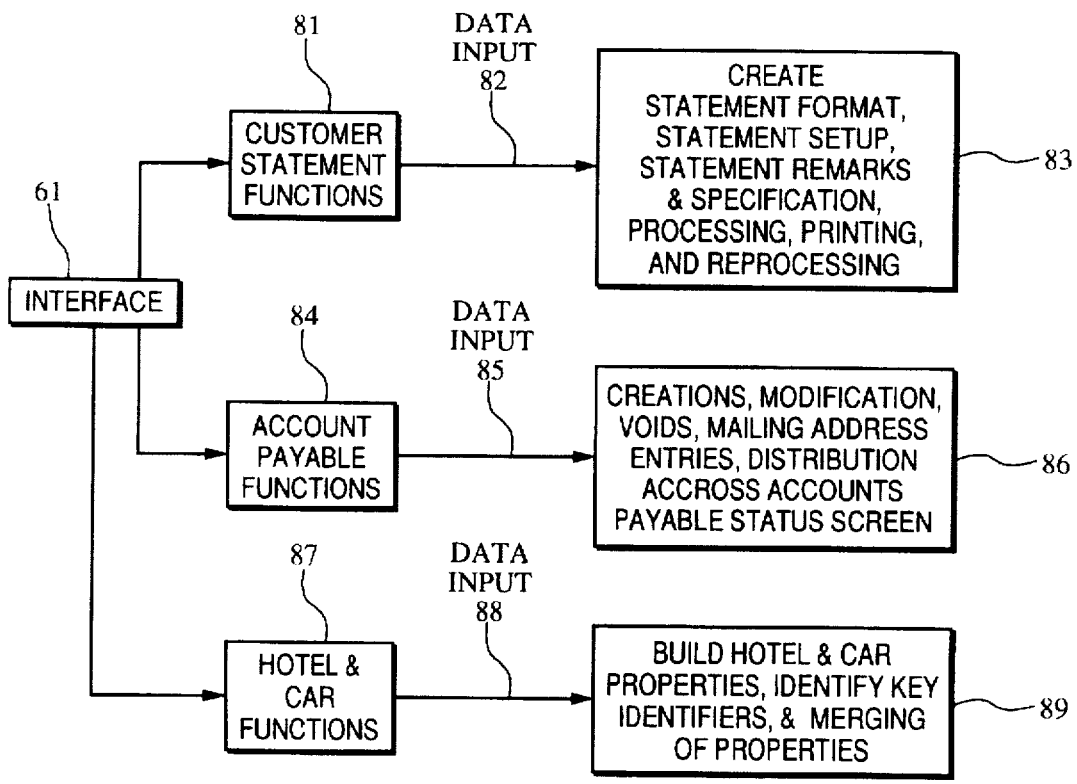
FIG. 1B is a representation of various workstation processes of the present invention.

Referring to FIG. 1b which shows other functions of client workstation 70 reached through interface 61 are customer statement functions 81, which using data input 82, provides functions 83 such as creation of a statement format, statement setup, statement remarks and specification, and processing, printing, and reprocessing of statements. Client workstation 70, through interface 61, also provides accounts payable functions 84, which using data input 85, provides for specific functions 86 such as creation, modification and voids, mailing address entries, distribution across accounts, and a payable status screen. Other functions of the client workstation 70 are hotel and car functions 87 which use data input 88 to provide functions 89 such as building, hotel and car properties, identifying key identifiers, and merging of properties.

Although client workstation 70 functions as herein described and detailed in FIGS. 1a and 1b which are illustrative of the preferred embodiments of the present invention, it must be clearly understood that various other configurations of functions could be utilized that embody the true spirit and scope of the present invention, as described herein.

Attached to the LAN 50 of FIG. 1 is database server 80. In one of the preferred embodiments, the database server 80 is typically a RISC based platform in an UNIX or equivalent operating system in a Token Ring Network with TCP/IP or a 386-based or equivalent platform that has an IBM OS/2 Presentation Manager operating system on the Token Ring with TCP/IP. It is at the database server 80 that the data stream from the CRS 20 or CRS's 30 is parsed, validated, verified, and otherwise manipulated before being accessible on LAN 50.

Typically, a print server 90 is attached to LAN 50, which in one of the preferred embodiments is a 386 based or equivalent platform, with disk capabilities running on the Token Ring Network under the IBM OS/2 Presentation Manager operating system. In addition, print server 90 may have port expansion cards allowing communication to multiple printers 100. Printers 100 are typically Hewlett Packard LaserJet or equivalent type devices capable of printing text and graphics from wordprocessing and reporting applications.

Although system architecture 10 described herein and depicted in FIG. 1 is one of the preferred embodiments, it must clearly be understood that various other configurations, methods and system architectures could be utilized as long as they have the appropriate memory and communication links as those described herein.

Importantly, system architect 10 of the present invention is designed to be highly scalable. It is designed to be utilized in travel companies ranging from relatively small, i.e. less that 2000 ticket transactions per month, up to large global agencies having over 100,000 ticket transactions per month per database server. TABLE 1 contains a general description of examples of the system architecture configurations based on tickets and volumes.

TABLE 1

| Volume of Tickets | | Preferred Hardware Configuration |
|---|---|---|
| <2000 | 1- | Network File Server PC (Intel 486DX2 50 mhz, 20 mb of memory, 400+ mb hard disk storage) |
| | 10 | or less PC workstations (Intel 486SX 25 mhz, 12 mb of memory, 100+ mb hard disk) |
| | 1- | UNIX-based database engine (Single 25 mhz processor, 64 mb of memory, 1.0 gb hard disk storage) |
| <5000 | 1- | Network File Server PC (Intel 486DX2 50 mhz, 20 mb of memory, 400+ mb hard disk storage) |
| | 10 | or less PC workstations (Intel 486SX 25 mhz, 12 mb of memory, 100+ mb hard disk) |
| | 1- | UNIX-based database engine (Single 25 mhz processor, 96 mb of memory, 1.5 gb hard disk storage) |
| <6000 | 2- | Network File Server PC (Intel 486DX2 50 mhz, 20 mb of memory, 400+ mb hard disk storage) |
| | 20 | or less PC workstations (Intel 486SX 25 mhz, 12 mb of memory, 100+ mb hard disk) |
| | 1- | UNIX-based database engine (Dual 33 mhz processors, 96 mb of memory, 1.5 gb hard disk storage) |
| <10,000 and users = | 1- | Network File Server PC (Intel 486DX2 50 mhz, 20 mb of memory, 400+ mb hard disk storage) |

TABLE 1-continued

| Volume of Tickets | | Preferred Hardware Configuration |
|---|---|---|
| <20 | 20 | or less PC workstations (Intel 486SX 25 mhz, 12 mb of memory, 100+ mb hard disk) |
| | 1- | UNIX-based database engine (Dual 33 mhz processors, 128 mb of memory, 2.0 gb hard disk storage) |
| <10,000 and user >20 | 2 | or less Network File Server PC (Intel 486DX2 50 mhz, 20 mb of memory, 400+ mb hard disk storage) |
| | 50 | or less PC workstations (Intel 486SX 25 mhz, 12 mb of memory, 100+ mb hard disk) |
| | 1- | UNIX-based database engine (Dual 33 mhz processors, 128 mb of memory, 3.5 gb hard disk storage) |
| <30,000 | 2 | or less Network File Server PC (Intel 486DX2 50 mhz, 20 mb of memory, 400+ mb hard disk storage) |
| | 50 | or less PC wdrkstations (Intel 486SX 25 mhz, 12 mb of memory, 100+ mb hard disk) |
| | 1- | UNIX-based database engine (Dual 33 mhz processors, 384 mb of memory, 6.0 gb hard disk storage) |
| <50,000 | 4 | or less Network File Server PC (Intel 486DX2 50 mhz, 20 mb of memory, 400+ mb hard disk storage) |
| | 100 | or less PC workstations (Intel 486SX 25 mhz, 12 mb of memory, 100+ mb hard disk) |
| | 1- | UNIX-based database engine (Quad 25 mhz processors, 512 mb of memory, 15+ gb hard disk storage) |
| <100,000 | 6 | or less Network File Server PC (Intel 486DX2 50 mhz, 20 mb of memory, 400+ mb hard disk storage) |
| | 250 | or less PC workstations (Intel 4865X 25 mhz, 12 mb of memory, 100+ mb hard disk) |
| | 1- | UNIX-based database engine (Eight 25 mhz processors, 7686 mb of memory, 18+ gb hard disk storage) |

Figure 2:
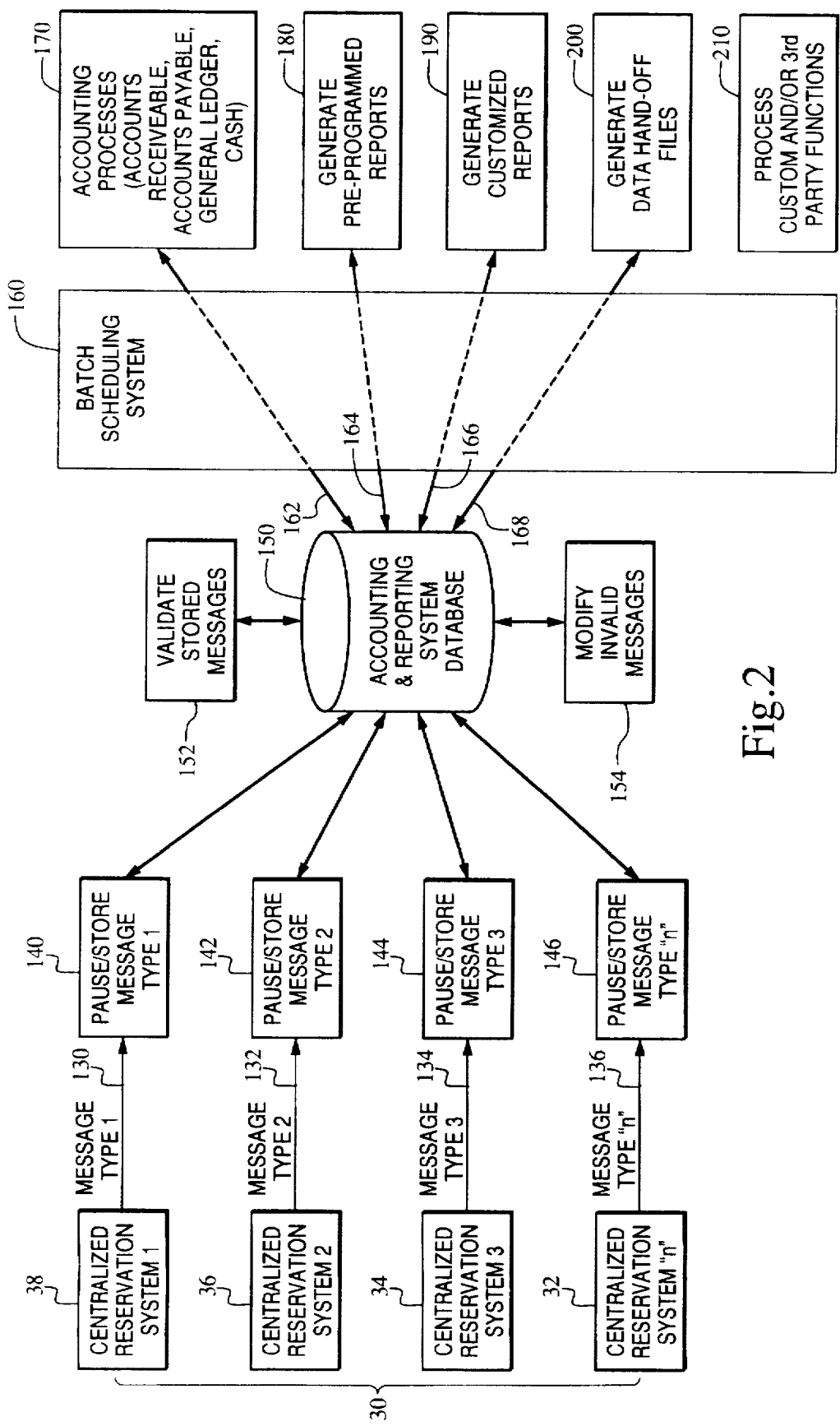
FIG. 2 is a detailed diagram of one embodiment of the system methodology of the present invention.

FIG. 2 is a flow diagram of one embodiment of the architecture of the present invention. FIG. 2 illustrates a plurality of the centralized reservation systems (CRS) 32, 34, 36 and 38 that maintain "real time" databases including present availability, fares, city pairs, bookings, destinations, city guides and other travel related information necessary in the travel industry for booking, purchasing, and ticketing passengers for air travel. Other items of travel included in the CRS 32, 34, 36 and 38 include, among other information, hotel fares, car rental fares, cruise directories, and room availability.

Data from the CRS's 30 is sent via communication links 130, 132, 134 and 136 to database server 80 either directly or through a communications server 40 and LAN 50. At database server 80 the data stream is parsed, validated, and otherwise manipulated according to the message types 140, 142, 144 and 146. The data communication lines 130, 132, 134, 136 connect to the accounting and reporting system database 150 where the message is either validated and stored 152 or modified and rejected 154 as an invalid message.

Again, in one of the preferred embodiments, the accounting and reporting system database 150 typically resides in either a UNIX-based or equivalent platform, or a 386 or equivalent based platform, using an IBM OS/2 Presentation Manager operating system platform capable of interaction with LAN 50.

Also shown in FIG. 2 is batch scheduling system 160 which can be more readily understood with reference to FIG. 3 and the description below. The information in the accounting and reporting database system 150 is communicated through batch scheduling process 160 via communication links 162, 164, 166 and 168 to client workstation 70 where end user functions 170, 180, 190, 200, and 210 are performed. End user functions 170 include typical accounting processes 170 such as accounts receivable, accounts payable, general ledger, cash balances and other typical accounting processes. Utilizing batch scheduling system 160, other end user functions 170 include generating preprogrammed reports 180, generating customized reports 190, generating data hand-off files 200, and processing and customization of third-party functions 210, such as E-Mail, employee personnel records, etc..

Figure 3:
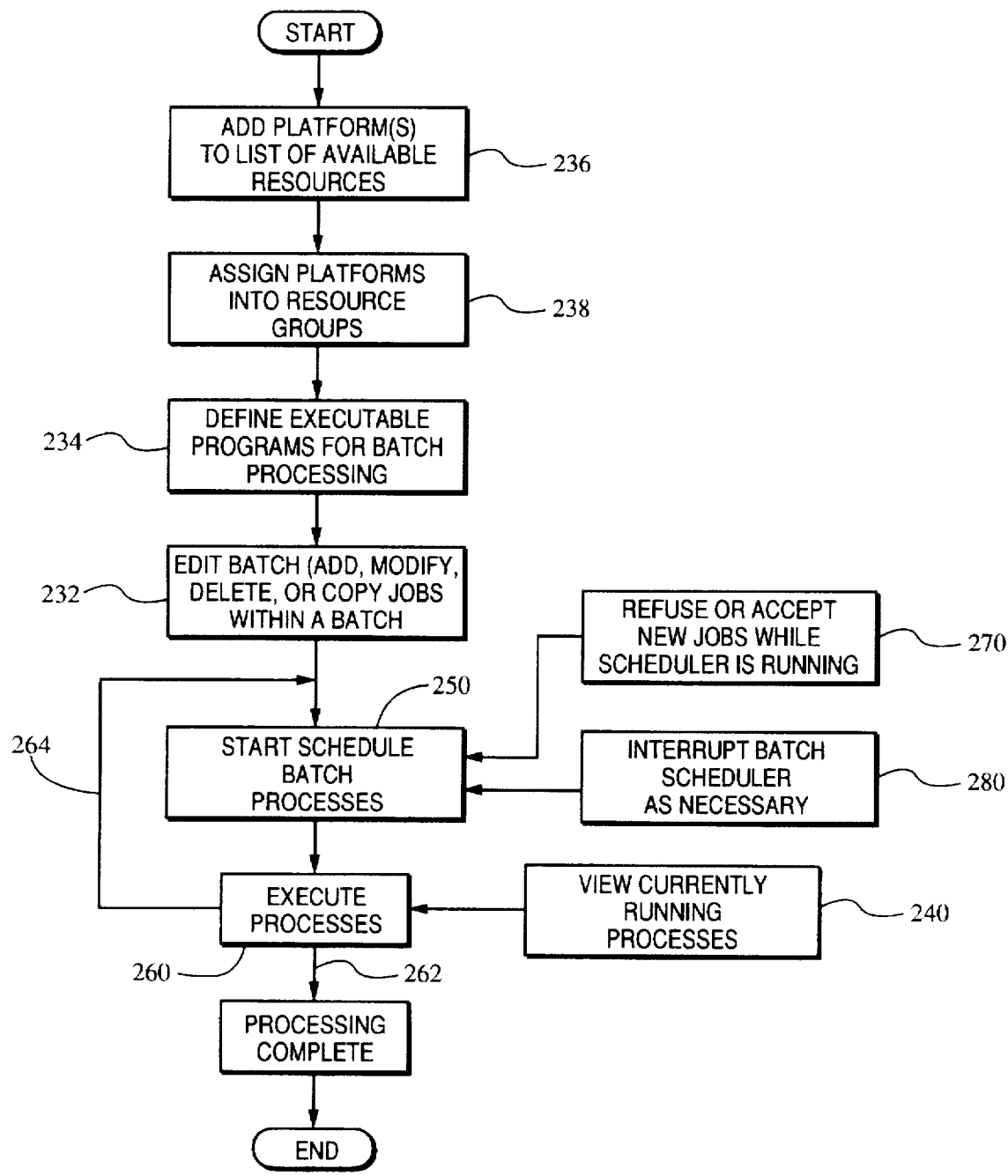
FIG. 3 is a flow chart diagram of the batch scheduling system of the presentation.

Batch scheduling system 160 can be more readily understood with reference to FIG. 3. FIG. 3 is a flow diagram of batch scheduling system 160 of the present invention. The batch scheduling system 160 is controlled by the software that resides on database server 80 and network file server 60 of LAN 50 and communicates and transmits data back and forth between the accounting and reporting system database 150 and client workstation 70 utilized by the end user. A source code listing of the representative operational program of the preferred embodiment of the present invention which is utilized in the memory of the processing unit and that operates batch scheduling 160 system is set forth hereafter in TABLE 2. The source code of batch scheduling system 160 is in computer language "C", but it should be clearly understood that other computer languages and varying structure, sequence aid organization of the source code is contemplated within the scope of the present invention.

TABLE 2

```
/**********************************************************************
*
* Copyright (c) 1990, 1991, 1992, 1993 American Airlines
*
* File:        BAMENU.H
*
* System:      Batch Administration
*
* Description:
*
* History:     David M. Wilson  08/01/90
*              Glenn Grundstrom
*
*
* This program is the CONFIDENTIAL and PROPRIETARY property
* of American Airlines.  Any unauthorized use, reproduction
* or transfer of this program is strictly prohibited.
*
* This is an unpublished work, and is subject to limited distribution
* and restricted disclosure only.  ALL RIGHTS RESERVED.
*
**********************************************************************/ define IDM_BA              10600 define IDM_FILE            IDM_BA + 1
define IDM_EXIT            IDM_BA + 2
#define IDM_VIEW            IDM_BA + 3
#define IDM_VIEWDEFAULT     IDM_BA + 4
#define IDM_VIEWHISTORY     IDM_BA + 5
#define IDM_VIEWALL         IDM_BA + 6
#define IDM_FILTER          IDM_BA + 7
#define IDM_JOBS            IDM_BA + 8
#define IDM_JOBEDIT         IDM_BA + 9
#define IDM_JOBSCHEDULE     IDM_BA + 10
#define IDM_JOBRESCHED      IDM_BA + 11
#define IDM_JOBRUSH         IDM_BA + 12
#define IDM_JOBZOOM         IDM_BA + 13
#define IDM_JOBHOLD         IDM_BA + 14
#define IDM_JOBRESUME       IDM_BA + 15
#define IDM_JOBCANCEL       IDM_BA + 16
#define IDM_ADMIN           IDM_BA + 17
#define IDM_WORKSTATIONS    IDM_BA + 18
#define IDM_GROUPS          IDM_BA + 19
#define IDM_EXECUTE         IDM_BA + 20
#define IDM_SCHEDULER       IDM_BA + 21
#define IDM_REFUSEJOBS      IDM_BA + 22
#define IDM_ACCEPTJOBS      IDM_BA + 23
#define IDM_STARTSCHED      IDM_BA + 24
#define IDM_STOPSCHED       IDM_BA + 25
```

-21-

```
#define IDM_BA_HELP                  IDM_BA + 26
#define IDM_BA_HEL_HFH               IDM_BA + 27
#define IDM_BA_HEL_SC_HELPEXTENDED   IDM_BA + 28
#define IDM_BA_HEL_SC_HELPKEYS       IDM_BA + 29
#define IDM_BA_HEL_SC_HELPINDEX      IDM_BA + 30
#define IDM_BA_HEL_ABOUT             IDM_BA + 31
#define IDM_BA_DBTIME                IDM_BA + 32

/***********************************************************************
*
* Copyright (c) 1990, 1991, 1992, 1993 American Airlines
*
* File:        BAMENURC.H
*
* System:      Batch Administration
*
* Description:
*
* History:     David M. Wilson  08/01/90
*              Glenn Grundstrom
*
*
* This program is the CONFIDENTIAL and PROPRIETARY property
* of American Airlines.  Any unauthorized use, reproduction
* or transfer of this program is strictly prohibited.
*
* This is an unpublished work, and is subject to limited distribution
* and restricted disclosure only.  ALL RIGHTS RESERVED.
*
***********************************************************************/

MENU IDM_BA
    {
        SUBMENU "~Admin",              IDM_ADMIN
            {
                MENUITEM "~Workstations...",        IDM_WORKSTATIONS
                MENUITEM "~Groups...",              IDM_GROUPS
                MENUITEM "~Executables...",         IDM_EXECUTE
                MENUITEM SEPARATOR
                MENUITEM "E~xit\tF3",               SC_CLOSE, MIS_SYSCOMMAND
            }

SUBMENU "~View",               IDM_VIEW
            {
                MENUITEM "~Pending/Running",        IDM_VIEWDEFAULT,, MIA_CHECKED
                MENUITEM "~History",                IDM_VIEWHISTORY
                MENUITEM "~All",                    IDM_VIEWALL
                MENUITEM SEPARATOR
                MENUITEM "~Set Criteria",           IDM_FILTER
            }

SUBMENU "~Batches",            IDM_JOBS
            {
                MENUITEM "Edit a Batch ~List...",   IDM_JOBEDIT
                MENUITEM SEPARATOR
                MENUITEM "Schedule a ~Batch...",    IDM_JOBSCHEDULE
                MENUITEM "~Edit Selected Schedule", IDM_JOBRESCHED
                MENUITEM "R~ush Batch",             IDM_JOBRUSH
                MENUITEM SEPARATOR
                MENUITEM "~Inspect Batch",          IDM_JOBZOOM
                MENUITEM SEPARATOR
                MENUITEM "~Resume Batch",           IDM_JOBRESUME
                MENUITEM "~Stop/Hold Batch",        IDM_JOBHOLD
                MENUITEM SEPARATOR
```

-22-

```
        MENUITEM "Erase B-atch",                    IDM_JOBCANCEL
        }

SUBMENU "-Scheduler",          IDM_SCHEDULER
        {
        MENUITEM "-Refuse New Batches",             IDM_REFUSEJOBS
        MENUITEM "-Accept New Batches",             IDM_ACCEPTJOBS
        MENUITEM SEPARATOR
        MENUITEM "-Start Scheduler",                IDM_STARTSCHED
        MENUITEM "Sto-p Scheduler",                 IDM_STOPSCHED
        }

SUBMENU "-Help",               IDM_BA_HELP
        {
        MENUITEM "-Help for Help...",               IDM_BA_HEL_HFH
        MENUITEM "-Extended Help...",               SC_HELPEXTENDED, MIS_SYSCOMMAND
        MENUITEM "-Keys Help...",                   SC_HELPKEYS, MIS_SYSCOMMAND
        MENUITEM "Help -index...",                  SC_HELPINDEX, MIS_SYSCOMMAND
        MENUITEM SEPARATOR
        MENUITEM "-About...",                       IDM_BA_HEL_ABOUT
        }

MENUITEM "00:00:00", IDM_BA_DBTIME, MIS_BUTTONSEPARATOR MIS_TEXT

}

/******************************************************************
*
* Copyright (c) 1990, 1991, 1992, 1993 American Airlines
*
* File:       BAMENU.H
*
* System:     Batch Administration
*
* Description:
*
* History:    David M. Wilson  08/01/90
*             Glenn Grundstrom
*
*
* This program is the CONFIDENTIAL and PROPRIETARY property
* of American Airlines.  Any unauthorized use, reproduction
* or transfer of this program is strictly prohibited.
*
* This is an unpublished work, and is subject to limited distribution
* and restricted disclosure only.  ALL RIGHTS RESERVED.
*
******************************************************************/ define IDM_BA              10600 define IDM_FILE            IDM_BA + 1
define IDM_EXIT            IDM_BA + 2
#define IDM_VIEW            IDM_BA + 3
#define IDM_VIEWDEFAULT     IDM_BA + 4
#define IDM_VIEWHISTORY     IDM_BA + 5
#define IDM_VIEWALL         IDM_BA + 6
#define IDM_FILTER          IDM_BA + 7
#define IDM_JOBS            IDM_BA + 8
#define IDM_JOBEDIT         IDM_BA + 9
#define IDM_JOBSCHEDULE     IDM_BA + 10
#define IDM_JOBRESCHED      IDM_BA + 11
#define IDM_JOBRUSH         IDM_BA + 12
#define IDM_JOBZOOM         IDM_BA + 13
#define IDM_JOBHOLD         IDM_BA + 14
#define IDM_JOBRESUME       IDM_BA + 15
```

```
#define IDM_JOBCANCEL              IDM_BA + 16
#define IDM_ADMIN                  IDM_BA + 17
#define IDM_WORKSTATIONS           IDM_BA + 18
#define IDM_GROUPS                 IDM_BA + 19
#define IDM_EXECUTE                IDM_BA + 20
#define IDM_SCHEDULER              IDM_BA + 21
#define IDM_REFUSEJOBS             IDM_BA + 22
#define IDM_ACCEPTJOBS             IDM_BA + 23
#define IDM_STARTSCHED             IDM_BA + 24
#define IDM_STOPSCHED              IDM_BA + 25
#define IDM_BA_HELP                IDM_BA + 26
#define IDM_BA_HEL_HFH             IDM_BA + 27
#define IDM_BA_HEL_SC_HELPEXTENDED IDM_BA + 28
#define IDM_BA_HEL_SC_HELPKEYS     IDM_BA + 29
#define IDM_BA_HEL_SC_HELPINDEX    IDM_BA + 30
#define IDM_BA_HEL_ABOUT           IDM_BA + 31
#define IDM_BA_DBTIME              IDM_BA + 32
/************************************************************
*
* Copyright (c) 1990, 1991, 1992, 1993 American Airlines
*
* File:        BAMENURC.H
*
* System:      Batch Administration
*
* Description:
*
* History:     David M. Wilson  08/01/90
*              Glenn Grundstrom
*
*
* This program is the CONFIDENTIAL and PROPRIETARY property
* of American Airlines.  Any unauthorized use, reproduction
* or transfer of this program is strictly prohibited.
*
* This is an unpublished work, and is subject to limited distribution
* and restricted disclosure only.  ALL RIGHTS RESERVED.
*
************************************************************/

MENU IDM_BA
    {
        SUBMENU "~Admin",                IDM_ADMIN
            {
                MENUITEM "~Workstations...",        IDM_WORKSTATIONS
                MENUITEM "~Groups...",              IDM_GROUPS
                MENUITEM "~Executables...",         IDM_EXECUTE
                MENUITEM SEPARATOR
                MENUITEM "E~xit\tF3",               SC_CLOSE, MIS_SYSCOMMAND
            }

SUBMENU "~View",                 IDM_VIEW
            {
                MENUITEM "~Pending/Running",        IDM_VIEWDEFAULT,, MIA_CHECKED
                MENUITEM "~History",                IDM_VIEWHISTORY
                MENUITEM "~All",                    IDM_VIEWALL
                MENUITEM SEPARATOR
                MENUITEM "~Set Criteria",           IDM_FILTER
            }

SUBMENU "~Batches",              IDM_JOBS
            {
                MENUITEM "Edit a Batch ~List...",   IDM_JOBEDIT
                MENUITEM SEPARATOR
```

```
        MENUITEM "Schedule a ~Batch...",        IDM_JOBSCHEDULE
        MENUITEM "-Edit Selected Schedule",     IDM_JOBRESCHED
        MENUITEM "R-ush Batch",                 IDM_JOBRUSH
        MENUITEM SEPARATOR
        MENUITEM "~Inspect Batch",              IDM_JOBZOOM
        MENUITEM SEPARATOR
        MENUITEM "~Resume Batch",               IDM_JOBRESUME
        MENUITEM "~Stop/Hold Batch",            IDM_JOBHOLD
        MENUITEM SEPARATOR
        MENUITEM "Erase B~atch",                IDM_JOBCANCEL
    }

SUBMENU "~Scheduler",          IDM_SCHEDULER
    {
        MENUITEM "~Refuse New Batches",         IDM_REFUSEJOBS
        MENUITEM "~Accept New Batches",         IDM_ACCEPTJOBS
        MENUITEM SEPARATOR
        MENUITEM "~Start Scheduler",            IDM_STARTSCHED
        MENUITEM "Sto-p Scheduler",             IDM_STOPSCHED
    }

SUBMENU "~Help",               IDM_BA_HELP
    {
        MENUITEM "~Help for Help...",           IDM_BA_HEL_HFH
        MENUITEM "~Extended Help...",           SC_HELPEXTENDED, MIS_SYSCOMMAND
        MENUITEM "~Keys Help...",               SC_HELPKEYS, MIS_SYSCOMMAND
        MENUITEM "Help -index...",              SC_HELPINDEX, MIS_SYSCOMMAND
        MENUITEM SEPARATOR
        MENUITEM "~About...",                   IDM_BA_HEL_ABOUT
    }

MENUITEM "00:00:00", IDM_BA_OBTIME, MIS_BUTTONSEPARATOR MIS_TEXT

}
;*********************************************************************
;
; Copyright (c) 1990, 1991, 1992, 1993 American Airlines
;
; File:       BATCH.DEF
;
; System:     Batch Administration
;
; Description:
;
; History:    David M. Wilson  08/01/90
;             Glenn Grundstrom
;
;
; This program is the CONFIDENTIAL and PROPRIETARY property
; of American Airlines. Any unauthorized use, reproduction
; or transfer of this program is strictly prohibited.
;
; This is an unpublished work, and is subject to limited distribution
; and restricted disclosure only. ALL RIGHTS RESERVED.
;
;*********************************************************************

NAME        BATCH  WINDOWAPI
DESCRIPTION    'Batch'
PROTMODE
HEAPSIZE       8000
STACKSIZE      24000
/*********************************************************************
*
* Copyright (c) 1990, 1991, 1992, 1993 American Airlines
```

-25-

```
*
* File:       BATCH.DLG
*
* System:     Batch Administration
*
* Description:
*
* History:    David M. Wilson 08/01/90
*             Glenn Grundstrom
*
*
* This program is the CONFIDENTIAL and PROPRIETARY property
* of American Airlines. Any unauthorized use, reproduction
* or transfer of this program is strictly prohibited.
*
* This is an unpublished work, and is subject to limited distribution
* and restricted disclosure only. ALL RIGHTS RESERVED.
*
***********************************************************************/

DLGINCLUDE 1 "dialog.h"

DLGTEMPLATE IDD_JOBSTEP LOADONCALL MOVEABLE DISCARDABLE
BEGIN
    DIALOG "", IDD_JOBSTEP, 7, 5, 408, 198, FS_NOBYTEALIGN | WS_VISIBLE,
           FCF_SYSMENU | FCF_TITLEBAR
    BEGIN
        CONTROL      "ADSLBHeading", DID_JOBSTEP_HEADING, 5, 176, 395, 15,
                     "ADSLBHeading", WS_VISIBLE
        LISTBOX      DID_JOBSTEP_ADSLIST, 5, 78, 395, 95, LS_OWNERDRAW |
                     LS_HORZSCROLL
        LTEXT        "~Program Name", 0, 5, 68, 71, 8, DT_MNEMONIC
        CONTROL      "", DID_JOBSTEP_COMBO, 8, -3, 128, 70, WC_COMBOBOX,
                     CBS_DROPDOWNLIST | WS_TABSTOP | WS_VISIBLE
        LTEXT        "~Hidden Parameters", 0, 150, 68, 100, 8,
                     DT_MNEMONIC
        ENTRYFIELD   "", DID_JOBSTEP_ARGS2, 155, 57, 150, 8, ES_MARGIN
        LTEXT        "Para~meters", 0, 5, 43, 62, 8, DT_MNEMONIC
        ENTRYFIELD   "", DID_JOBSTEP_ARGS1, 10, 32, 295, 8, ES_MARGIN
        LTEXT        "Restricted:", 0, 330, 58, 65, 8, NOT WS_GROUP
        LTEXT        "", DID_JOBSTEP_RESTRICT1, 340, 47, 65, 8, NOT
                     WS_GROUP
        LTEXT        "", DID_JOBSTEP_RESTRICT2, 340, 36, 65, 8, NOT
                     WS_GROUP
        PUSHBUTTON   "~Clear", DID_JOBSTEP_CLEAR, 5, 5, 45, 13, WS_GROUP
        PUSHBUTTON   "~Append", DID_JOBSTEP_APPEND, 55, 5, 45, 13, NOT
                     WS_TABSTOP
        PUSHBUTTON   "~Insert", DID_JOBSTEP_INSERT, 105, 5, 45, 13, NOT
                     WS_TABSTOP
        PUSHBUTTON   "~Modify", DID_JOBSTEP_UPDATE, 155, 5, 45, 13, NOT
                     WS_TABSTOP
        PUSHBUTTON   "~Delete", DID_JOBSTEP_DELETE, 205, 5, 45, 13, NOT
                     WS_TABSTOP
        PUSHBUTTON   "Pass~words...", DID_JOBSTEP_PASSWORDS, 255, 5, 65,
                     13, NOT WS_TABSTOP
        PUSHBUTTON   "~Cancel", DID_OK, 340, 5, 60, 13
    END
END DLGTEMPLATE IDD_PWDENTER LOADONCALL MOVEABLE DISCARDABLE
BEGIN
    DIALOG "Enter Password", IDD_PWDENTER, 75, 75, 172, 44, FS_NOBYTEALIGN |
           WS_VISIBLE, FCF_SYSMENU | FCF_TITLEBAR
    BEGIN
        ENTRYFIELD   "", DID_PWDENTER_ENT1, 15, 27, 135, 8, NOT
                     ES_AUTOSCROLL | ES_MARGIN | ES_UNREADABLE
```

-26-

```
        DEFPUSHBUTTON    "Commi~t", DID_OK, 15, 4, 46, 13
        PUSHBUTTON       "~Cancel", IDI_MGLASS1, 105, 4, 49, 13
    END
END DLGTEMPLATE IDD_PWDSET LOADONCALL MOVEABLE DISCARDABLE
BEGIN
    DIALOG  "Set Passwords", IDD_PWDSET, 7, 4, 379, 107, FS_NOBYTEALIGN |
            WS_VISIBLE, FCF_SYSMENU | FCF_TITLEBAR
    BEGIN
        GROUPBOX         "Restrict ~modification of batch", 0, 10, 28, 171, 75,
                         DT_MNEMONIC
        LTEXT            "Type password here...", 0, 20, 78, 100, 8, NOT
                         WS_GROUP
        ENTRYFIELD       "", DID_PWDSET_ENT1, 25, 67, 136, 8, NOT
                         ES_AUTOSCROLL | ES_MARGIN | ES_UNREADABLE
        LTEXT            "Retype password here to verify...", 0, 20, 47, 142,
                         8, NOT WS_GROUP
        ENTRYFIELD       "", DID_PWDSET_ENT2, 25, 36, 136, 8, NOT
                         ES_AUTOSCROLL | ES_MARGIN | ES_UNREADABLE
        GROUPBOX         "Restrict ~scheduling of batch", 0, 195, 28, 171, 75,
                         DT_MNEMONIC
        LTEXT            "Type password here...", 0, 205, 78, 100, 8, NOT
                         WS_GROUP
        ENTRYFIELD       "", DID_PWDSET_ENT3, 210, 67, 136, 8, NOT
                         ES_AUTOSCROLL | ES_MARGIN | ES_UNREADABLE
        LTEXT            "Retype password here to verify...", 0, 205, 47, 144,
                         8, NOT WS_GROUP
        ENTRYFIELD       "", DID_PWDSET_ENT4, 210, 36, 136, 8, NOT
                         ES_AUTOSCROLL | ES_MARGIN | ES_UNREADABLE
        DEFPUSHBUTTON    "Commi~t", DID_OK, 9, 7, 173, 13, WS_GROUP | NOT
                         WS_TABSTOP
        PUSHBUTTON       "~Cancel", IDI_MGLASS1, 194, 7, 173, 13
    END
END DLGTEMPLATE IDD_RESUME LOADONCALL MOVEABLE DISCARDABLE
BEGIN
    DIALOG  "BATCH ID: ", IDD_RESUME, 13, 16, 352, 142, FS_NOBYTEALIGN |
            WS_VISIBLE, FCF_SYSMENU | FCF_TITLEBAR
    BEGIN
        ICON             IDI_GOLIGHT, 0, 7, 120, 22, 16, WS_GROUP
        LTEXT            "Last Job Completed:", 0, 41, 128, 99, 8
        LTEXT            "CURRENT_JOB", DID_RESUME_STEPOUT, 150, 128, 20, 8
        LTEXT            "Return Code from Job:", 0, 41, 118, 103, 8
        LTEXT            "RETURN_CODE", DID_RESUME_RETURNCODE, 150, 118, 20,
                         8
        LTEXT            "Next job:", 0, 180, 128, 50, 8
        LTEXT            "NEXTJOB", DID_RESUME_NEXTSTEP, 242, 128, 50, 8
        LTEXT            "Workstation:", 0, 180, 118, 77, 8, NOT WS_GROUP
        LTEXT            "MACHINE", DID_RESUME_MACHINE, 242, 118, 77, 8, NOT
                         WS_GROUP
        CONTROL          "", 0, 8, 114, 336, 2, WC_STATIC, SS_FGNDFRAME |
                         WS_VISIBLE
        CONTROL          "ADSLBHeading", DID_RESUME_HEADING, 8, 98, 336, 15,
                         "ADSLBHeading", WS_GROUP | WS_VISIBLE
        LISTBOX          DID_RESUME_ADSLIST, 8, 24, 336, 72, LS_OWNERDRAW |
                         LS_HORZSCROLL
        AUTOCHECKBOX     "Any Workstation in Group", DID_RESUME_ANYINGROUP,
                         220, 6, 130, 10, WS_GROUP | NOT WS_TABSTOP
        DEFPUSHBUTTON    "GO", DID_OK, 13, 4, 38, 13
        PUSHBUTTON       "Execute Job", DID_RESUME_STEP, 60, 4, 74, 13
        PUSHBUTTON       "Cancel", IDI_MGLASS1, 144, 4, 43, 13
    END
END
```

```
DLGTEMPLATE IDD_ZOOM LOADONCALL MOVEABLE DISCARDABLE
BEGIN
    DIALOG "", IDD_ZOOM, 7, 7, 355, 167, FS_NOBYTEALIGN | WS_VISIBLE,
            FCF_SYSMENU | FCF_TITLEBAR
        BEGIN
            ICON            IDI_MGLASS1, 0, 3, 148, 22, 16
            GROUPBOX        "Status", 0, 8, 74, 52, 74, NOT WS_GROUP
            ICON            IDI_MGLASS1, DID_ZOOM_USERREQ, 23, 114, 22, 16
            ICON            IDI_MGLASS1, DID_ZOOM_STATUS, 23, 89, 22, 16
            GROUPBOX        "", 0, 66, 74, 281, 74, NOT WS_GROUP
            LTEXT           "Current Job:", 0, 74, 134, 97, 8, NOT WS_GROUP
            LTEXT           "JOBNUM", DID_ZOOM_STEPNUM, 175, 134, 160, 8, NOT
                            WS_GROUP
            LTEXT           "Prev Job Result:", 0, 74, 126, 97, 8, NOT WS_GROUP
            LTEXT           "JOBRESULT", DID_ZOOM_STEPRESULT, 175, 126, 160, 8,
                            NOT WS_GROUP
            LTEXT           "Group Name:", 0, 74, 118, 97, 8, NOT WS_GROUP
            LTEXT           "GRPNAME", DID_ZOOM_GRPNAME, 175, 118, 160, 8, NOT
                            WS_GROUP
            LTEXT           "Machine Name:", 0, 74, 110, 97, 8, NOT WS_GROUP
            LTEXT           "MACHINENAME", DID_ZOOM_MACHINENAME, 175, 110, 160,
                            8, NOT WS_GROUP
            LTEXT           "Start Time:", 0, 74, 102, 97, 8, NOT WS_GROUP
            LTEXT           "STARTTIME", DID_ZOOM_STARTTIME, 175, 102, 160, 8,
                            NOT WS_GROUP
            LTEXT           "End Time:", 0, 74, 94, 97, 8, NOT WS_GROUP
            LTEXT           "ENDTIME", DID_ZOOM_ENDTIME, 175, 94, 160, 8, NOT
                            WS_GROUP
            LTEXT           "Next Run Scheduled:", 0, 74, 86, 97, 8, NOT
                            WS_GROUP
            LTEXT           "NEXTRUN", DID_ZOOM_NEXTRUN, 175, 86, 160, 8, NOT
                            WS_GROUP
            LTEXT           "Scheduled By:", 0, 74, 78, 97, 8, NOT WS_GROUP
            LTEXT           "SCHEDBY", DID_ZOOM_SCHEDBY, 175, 78, 160, 8, NOT
                            WS_GROUP
            GROUPBOX        "Recurring ", 0, 8, 4, 339, 70, NOT WS_GROUP
            RTEXT           "Day of the Month:", DID_ZOOM_PMOFFSET, 16, 33, 80,
                            8, NOT WS_GROUP
            LTEXT           "MONTHDAY", DID_ZOOM_MONTHDAY, 102, 33, 53, 8, NOT
                            WS_GROUP
            GROUPBOX        "On Weekdays", 0, 14, 43, 171, 23, NOT WS_GROUP
            LTEXT           "Sun", DID_ZOOM_SUN, 18, 48, 18, 8, NOT WS_GROUP
            LTEXT           "Mon", DID_ZOOM_MON, 42, 48, 20, 8, NOT WS_GROUP
            LTEXT           "Tue", DID_ZOOM_TUE, 68, 48, 17, 8, NOT WS_GROUP
            LTEXT           "Wed", DID_ZOOM_WED, 91, 48, 21, 8, NOT WS_GROUP
            LTEXT           "Thu", DID_ZOOM_THU, 118, 48, 17, 8, NOT WS_GROUP
            LTEXT           "Fri", DID_ZOOM_FRI, 141, 48, 12, 8, NOT WS_GROUP
            LTEXT           "Sat", DID_ZOOM_SAT, 159, 48, 15, 8, NOT WS_GROUP
            GROUPBOX        "On Months", 0, 190, 33, 146, 33, NOT WS_GROUP
            LTEXT           "Jan", DID_ZOOM_JAN, 198, 48, 16, 8, NOT WS_GROUP
            LTEXT           "Feb", DID_ZOOM_FEB, 220, 48, 17, 8, NOT WS_GROUP
            LTEXT           "Mar", DID_ZOOM_MAR, 243, 48, 18, 8, NOT WS_GROUP
            LTEXT           "Apr", DID_ZOOM_APR, 267, 48, 15, 8, NOT WS_GROUP
            LTEXT           "May", DID_ZOOM_MAY, 288, 48, 18, 8, NOT WS_GROUP
            LTEXT           "Jun", DID_ZOOM_JUN, 312, 48, 16, 8, NOT WS_GROUP
            LTEXT           "Jul", DID_ZOOM_JUL, 198, 40, 14, 8, NOT WS_GROUP
            LTEXT           "Aug", DID_ZOOM_AUG, 220, 40, 17, 8, NOT WS_GROUP
            LTEXT           "Sep", DID_ZOOM_SEP, 243, 40, 18, 8, NOT WS_GROUP
            LTEXT           "Oct", DID_ZOOM_OCT, 267, 40, 15, 8, NOT WS_GROUP
            LTEXT           "Nov", DID_ZOOM_NOV, 288, 40, 17, 8, NOT WS_GROUP
            LTEXT           "Dec", DID_ZOOM_DEC, 312, 40, 18, 8, NOT WS_GROUP
            DEFPUSHBUTTON   "Cancel", IDI_MGLASS1, 303, 148, 46, 15
            GROUPBOX        "On Periods", 2231, 14, 10, 246, 22
            LTEXT           "1", DID_ZOOM_1, 21, 15, 12, 8
            LTEXT           "2", DID_ZOOM_2, 39, 15, 12, 8
            LTEXT           "3", DID_ZOOM_3, 57, 15, 12, 8
```

```
            LTEXT          "4", DID_ZOOM_4, 75, 15, 12, 8
            LTEXT          "5", DID_ZOOM_5, 93, 15, 12, 8
            LTEXT          "6", DID_ZOOM_6, 111, 15, 12, 8
            LTEXT          "7", DID_ZOOM_7, 129, 15, 12, 8
            LTEXT          "8", DID_ZOOM_8, 147, 15, 12, 8
            LTEXT          "9", DID_ZOOM_9, 165, 15, 12, 8
            LTEXT          "10", DID_ZOOM_10, 183, 15, 12, 8
            LTEXT          "11", DID_ZOOM_11, 201, 15, 12, 8
            LTEXT          "12", DID_ZOOM_12, 219, 15, 12, 8
            LTEXT          "13", DID_ZOOM_13, 237, 15, 12, 8
        END
END

DLGTEMPLATE IDD_DAYTIMER LOADONCALL MOVEABLE DISCARDABLE
BEGIN
    DIALOG  "Schedule a Batch", IDD_DAYTIMER, 19, 10, 352, 164,
            FS_NOBYTEALIGN | WS_VISIBLE, FCF_SYSMENU | FCF_TITLEBAR
        BEGIN
            ICON           IDI_SCHED1, DID_DAYTIMER_ICON, 10, 142, 22, 16
            LTEXT          "Run This ~BATCH:", 0, 41, 153, 74, 8, DT_MNEMONIC
            CONTROL        "", DID_DAYTIMER_JOBCOMBO, 41, 77, 160, 75,
                           WC_COMBOBOX, CBS_DROPDOWNLIST | WS_TABSTOP |
                           WS_VISIBLE
            LTEXT          "On This ~GROUP:", 0, 217, 153, 72, 8, DT_MNEMONIC
            CONTROL        "", DID_DAYTIMER_GRPCOMBO, 217, 77, 104, 75,
                           WC_COMBOBOX, CBS_DROPDOWNLIST | WS_TABSTOP |
                           WS_VISIBLE
            GROUPBOX       "At This Time and Date", 0, 4, 20, 345, 120, NOT
                           WS_GROUP
            AUTOCHECKBOX   "~ASAP ", DID_DAYTIMER_ASAP, 11, 120, 43, 10
            CONTROL        "", 0, 11, 115, 65, 2, WC_STATIC, SS_FGNDFRAME |
                           WS_VISIBLE
            LTEXT          "~Run Time", DID_DAYTIMER_STARTTEXT, 11, 104, 42, 8,
                           DT_MNEMONIC
            ENTRYFIELD     "", DID_DAYTIMER_STARTHOUR, 13, 92, 12, 8, ES_RIGHT |
                           NOT ES_AUTOSCROLL | ES_MARGIN
            LTEXT          ":", DID_DAYTIMER_STARTCOLON, 28, 92, 4, 8, NOT
                           WS_GROUP
            ENTRYFIELD     "", DID_DAYTIMER_STARTMIN, 34, 92, 12, 8, ES_RIGHT |
                           NOT ES_AUTOSCROLL | ES_MARGIN
            AUTORADIOBUTTON "am", DID_DAYTIMER_AM, 52, 95, 27, 10, WS_GROUP |
                           WS_TABSTOP
            AUTORADIOBUTTON "pm", DID_DAYTIMER_PM, 52, 87, 26, 10
            CONTROL        "", 0, 11, 77, 65, 2, WC_STATIC, SS_FGNDFRAME |
                           WS_VISIBLE
            LTEXT          "R~un Date", DID_DAYTIMER_DATETEXT, 11, 64, 41, 8,
                           DT_MNEMONIC
            CONTROL        "Formatted", DID_DAYTIMER_DATE, 13, 54, 50, 8,
                           "Formatted", WS_TABSTOP | WS_VISIBLE
            PUSHBUTTON     "~Now", PBID_NOW, 19, 30, 40, 14
            CONTROL        "", 0, 80, 23, 2, 109, WC_STATIC, SS_FGNDFRAME |
                           WS_VISIBLE
            LTEXT          "Recurring...", 0, 91, 124, 66, 8, NOT WS_GROUP
            AUTORADIOBUTTON "By Month", RBID_MONTH, 174, 123, 54, 10, WS_GROUP |
                           WS_TABSTOP
            AUTORADIOBUTTON "By Period", RBID_PERIOD, 261, 123, 55, 10,
                           WS_TABSTOP
            GROUPBOX       "~Day", 0, 85, 25, 86, 98, DT_MNEMONIC
            LTEXT          "... of the Week", 0, 94, 107, 63, 8, NOT WS_GROUP
            AUTOCHECKBOX   "Sun", DID_DAYTIMER_SUN, 89, 95, 31, 10
            AUTOCHECKBOX   "Mon", DID_DAYTIMER_MON, 89, 85, 32, 10, NOT
                           WS_TABSTOP
            AUTOCHECKBOX   "Tue", DID_DAYTIMER_TUE, 89, 75, 32, 10, NOT
                           WS_TABSTOP
            AUTOCHECKBOX   "Wed", DID_DAYTIMER_WED, 89, 65, 32, 10, NOT
                           WS_TABSTOP
```

-29-

| | |
|---|---|
| AUTOCHECKBOX | "Thu", DID_DAYTIMER_THU, 129, 95, 32, 10, NOT WS_TABSTOP |
| AUTOCHECKBOX | "Fri", DID_DAYTIMER_FRI, 129, 85, 32, 10, NOT WS_TABSTOP |
| AUTOCHECKBOX | "Sat", DID_DAYTIMER_SAT, 129, 75, 32, 10, NOT WS_TABSTOP |
| PUSHBUTTON | "~Daily", DID_DAYTIMER_DAILY, 129, 61, 35, 13, WS_GROUP |
| LTEXT | "... of the Month", STID_DAY_OFFSET, 92, 50, 70, 8, NOT WS_GROUP |
| AUTOCHECKBOX | "1st", DID_DAYTIMER_1ST, 89, 40, 32, 10, WS_GROUP |
| AUTOCHECKBOX | "Last", DID_DAYTIMER_LAST, 132, 40, 32, 10, NOT WS_TABSTOP |
| LTEXT | "Other (1-31)", DID_DAYTIMER_OTHERTEXT, 89, 29, 53, 8 |
| ENTRYFIELD | "", DID_DAYTIMER_OTHERENT, 146, 29, 17, 8, NOT ES_AUTOSCROLL \| ES_MARGIN |
| GROUPBOX | "~Month", -1, 174, 25, 86, 98, DT_MNEMONIC |
| AUTOCHECKBOX | "JAN", DID_DAYTIMER_JAN, 180, 102, 31, 10 |
| AUTOCHECKBOX | "FEB", DID_DAYTIMER_FEB, 180, 92, 32, 10, NOT WS_TABSTOP |
| AUTOCHECKBOX | "MAR", DID_DAYTIMER_MAR, 180, 82, 34, 10, NOT WS_TABSTOP |
| AUTOCHECKBOX | "APR", DID_DAYTIMER_APR, 180, 72, 32, 10, NOT WS_TABSTOP |
| AUTOCHECKBOX | "MAY", DID_DAYTIMER_MAY, 180, 62, 34, 10, NOT WS_TABSTOP |
| AUTOCHECKBOX | "JUN", DID_DAYTIMER_JUN, 180, 52, 32, 10, NOT WS_TABSTOP |
| AUTOCHECKBOX | "JUL", DID_DAYTIMER_JUL, 220, 102, 31, 10, NOT WS_TABSTOP |
| AUTOCHECKBOX | "AUG", DID_DAYTIMER_AUG, 220, 92, 33, 10, NOT WS_TABSTOP |
| AUTOCHECKBOX | "SEP", DID_DAYTIMER_SEP, 220, 82, 32, 10, NOT WS_TABSTOP |
| AUTOCHECKBOX | "OCT", DID_DAYTIMER_OCT, 220, 72, 32, 10, NOT WS_TABSTOP |
| AUTOCHECKBOX | "NOV", DID_DAYTIMER_NOV, 220, 62, 33, 10, NOT WS_TABSTOP |
| AUTOCHECKBOX | "DEC", DID_DAYTIMER_DEC, 220, 52, 33, 10, NOT WS_TABSTOP |
| PUSHBUTTON | "~Monthly", DID_DAYTIMER_ALL, 180, 29, 44, 13, WS_GROUP |
| GROUPBOX | "~Period", 1139, 262, 25, 83, 98, DT_MNEMONIC |
| AUTOCHECKBOX | "1", DID_DAYTIMER_PERIOD1, 267, 102, 19, 10 |
| AUTOCHECKBOX | "2", DID_DAYTIMER_PERIOD2, 267, 92, 19, 10, NOT WS_TABSTOP |
| AUTOCHECKBOX | "3", DID_DAYTIMER_PERIOD3, 267, 82, 19, 10, NOT WS_TABSTOP |
| AUTOCHECKBOX | "4", DID_DAYTIMER_PERIOD4, 267, 72, 19, 10, NOT WS_TABSTOP |
| AUTOCHECKBOX | "5", DID_DAYTIMER_PERIOD5, 267, 62, 19, 10, NOT WS_TABSTOP |
| AUTOCHECKBOX | "6", DID_DAYTIMER_PERIOD6, 267, 52, 19, 10, NOT WS_TABSTOP |
| AUTOCHECKBOX | "7", DID_DAYTIMER_PERIOD7, 289, 102, 19, 10, NOT WS_TABSTOP |
| AUTOCHECKBOX | "8", DID_DAYTIMER_PERIOD8, 289, 92, 19, 10, NOT WS_TABSTOP |
| AUTOCHECKBOX | "9", DID_DAYTIMER_PERIOD9, 289, 82, 19, 10, NOT WS_TABSTOP |
| AUTOCHECKBOX | "10", DID_DAYTIMER_PERIOD10, 289, 72, 25, 10, NOT WS_TABSTOP |
| AUTOCHECKBOX | "11", DID_DAYTIMER_PERIOD11, 289, 62, 25, 10, NOT WS_TABSTOP |
| AUTOCHECKBOX | "12", DID_DAYTIMER_PERIOD12, 289, 52, 25, 10, NOT |

```
                      WS_TABSTOP
        AUTOCHECKBOX  "13", DID_DAYTIMER_PERIOD13, 311, 102, 25, 10, NOT
                      WS_TABSTOP
        PUSHBUTTON    "-Periodically", DID_DAYTIMER_PERIODICALLY, 267, 28,
                      61, 14, WS_GROUP
        AUTOCHECKBOX  "-Hold Batch", DID_DAYTIMER_HOLD, 36, 4, 65, 10,
                      WS_GROUP
        DEFPUSHBUTTON "Commi-t", DID_OK, 239, 3, 50, 13, WS_GROUP
        PUSHBUTTON    "-Cancel", IDI_MGLASS1, 294, 3, 50, 13, NOT
                      WS_TABSTOP
    END
END DLGTEMPLATE IDD_FILTER LOADONCALL MOVEABLE DISCARDABLE
BEGIN
    DIALOG "Set Criteria", IDD_FILTER, 7, 5, 318, 142, FS_NOBYTEALIGN |
            WS_VISIBLE, FCF_SYSMENU | FCF_TITLEBAR
    BEGIN
        LTEXT         "Batch Name:", 0, 15, 117, 65, 8
        CONTROL       "JOBNAME", DID_FILTER_JOBCOMBO, 87, 46, 152, 80,
                      WC_COMBOBOX, CBS_DROPDOWNLIST | WS_TABSTOP |
                      WS_VISIBLE
        PUSHBUTTON    "Clear", DID_FILTER_JOBCLEAR, 252, 114, 53, 12
        LTEXT         "Scheduled By:", 0, 15, 97, 65, 8, NOT WS_GROUP
        CONTROL       "SCHEDBY", DID_FILTER_BYCOMBO, 87, 26, 152, 80,
                      WC_COMBOBOX, CBS_DROPDOWNLIST | WS_TABSTOP |
                      WS_VISIBLE
        PUSHBUTTON    "Clear", DID_FILTER_BYCLEAR, 252, 94, 53, 12
        LTEXT         "Target Group:", 0, 15, 77, 65, 8, NOT WS_GROUP
        CONTROL       "GROUP", DID_FILTER_GROUPCOMBO, 87, 6, 152, 80,
                      WC_COMBOBOX, CBS_DROPDOWNLIST | WS_TABSTOP |
                      WS_VISIBLE
        PUSHBUTTON    "Clear", DID_FILTER_GROUPCLEAR, 252, 74, 53, 12
        GROUPBOX      "Scheduled Run Date Range", 0, 13, 30, 293, 32, NOT
                      WS_GROUP
        LTEXT         "Start:", 0, 21, 38, 26, 8, NOT WS_GROUP
        CONTROL       "Formatted", DID_FILTER_START, 51, 38, 102, 8,
                      "Formatted", WS_TABSTOP | WS_VISIBLE
//      ENTRYFIELD    "", DID_FILTER_START, 51, 38, 102, 8, NOT
//                    ES_AUTOSCROLL | ES_MARGIN
        LTEXT         "End:", 0, 169, 38, 20, 8, NOT WS_GROUP
        CONTROL       "Formatted", DID_FILTER_END, 194, 38, 102, 8,
                      "Formatted", WS_TABSTOP | WS_VISIBLE
//      ENTRYFIELD    "", DID_FILTER_END, 194, 38, 102, 8, NOT
//                    ES_AUTOSCROLL | ES_MARGIN
        DEFPUSHBUTTON "Commit", DID_OK, 5, 3, 150, 13
        PUSHBUTTON    "Cancel", IDI_MGLASS1, 163, 3, 150, 13
    END
END DLGTEMPLATE IDD_JOBLIST LOADONCALL MOVEABLE DISCARDABLE
BEGIN
    DIALOG "Edit a Batch List", IDD_JOBLIST, 5, 4, 408, 198, FS_NOBYTEALIGN |
            WS_VISIBLE, FCF_SYSMENU | FCF_TITLEBAR
    BEGIN
        CONTROL       "ADSLBHeading", DID_JOBLIST_HEADING, 5, 174, 395, 15,
                      "ADSLBHeading", WS_VISIBLE
        LISTBOX       DID_JOBLIST_ADSLIST, 5, 60, 395, 113, LS_OWNERDRAW |
                      LS_HORZSCROLL
        LTEXT         "Batch -Name", 0, 5, 43, 49, 8, DT_MNEMONIC
        ENTRYFIELD    "", DID_JOBLIST_JOBNAME, 10, 32, 140, 8, ES_MARGIN
        LTEXT         "Batch De-scription", 0, 170, 43, 79, 8, DT_MNEMONIC
        ENTRYFIELD    "", DID_JOBLIST_JOBDESC, 175, 32, 223, 8, ES_MARGIN
        PUSHBUTTON    "Cl-ear", DID_JOBLIST_CLEAR, 5, 5, 45, 13, WS_GROUP
        PUSHBUTTON    "-Add", DID_JOBLIST_INSERT, 55, 5, 45, 13, NOT
                      WS_TABSTOP
```

```
        PUSHBUTTON      "Cl~one", DID_JOBLIST_CLONE, 105, 5, 45, 13, NOT
                        WS_TABSTOP
        PUSHBUTTON      "~Delete", DID_JOBLIST_DELETE, 155, 5, 45, 13, NOT
                        WS_TABSTOP
        PUSHBUTTON      "~Modify Batch...", DID_JOBLIST_MODIFY, 205, 5, 76, 13,
                        NOT WS_TABSTOP
        PUSHBUTTON      "~Cancel", DID_OK, 340, 5, 60, 13
    END
END DLGTEMPLATE IDD_PICKSERV LOADONCALL MOVEABLE DISCARDABLE
BEGIN
    DIALOG  "Start Scheduler", IDD_PICKSERV, 39, 30, 260, 122,
            FS_NOBYTEALIGN | WS_VISIBLE, FCF_SYSMENU | FCF_TITLEBAR
    BEGIN
        ICON            IDI_SERVER, 0, 5, 101, 22, 16
        CONTROL         "ADSLBHeading", DID_PICKSERV_HEADING, 35, 89, 187,
                        15, "ADSLBHeading", WS_VISIBLE
        LISTBOX         DID_PICKSERV_ADSLIST, 35, 24, 190, 66, LS_OWNERDRAW |
                        LS_HORZSCROLL
        DEFPUSHBUTTON   "Commi~t", DID_OK, 35, 5, 90, 13, WS_GROUP
        PUSHBUTTON      "~Cancel", IDI_MGLASS1, 135, 5, 90, 13, NOT
                        WS_TABSTOP
    END
END DLGTEMPLATE IDD_EXECUTE LOADONCALL MOVEABLE DISCARDABLE
BEGIN
    DIALOG  "Executables", IDD_EXECUTE, 7, 37, 375, 137,
            FS_NOBYTEALIGN | WS_VISIBLE, FCF_SYSMENU | FCF_TITLEBAR
    BEGIN
        GROUPBOX        "", 0, 5, 19, 366, 113
        CONTROL         "ADSLBHeading", DID_EXECUTE_HEADING, 10, 108, 194,
                        15, "ADSLBHeading", WS_VISIBLE
        LISTBOX         DID_EXECUTE_ADSLIST, 10, 42, 196, 70, LS_OWNERDRAW |
                        LS_HORZSCROLL
        LTEXT           "Program ~Name", 0, 215, 91, 86, 8, DT_MNEMONIC
        ENTRYFIELD      "", DID_EXECUTE_PROGNAME, 227, 80, 128, 8, ES_MARGIN
        LTEXT           "Program ~Filename", 0, 215, 61, 90, 8, DT_MNEMONIC
        ENTRYFIELD      "", DID_EXECUTE_PROGFILE, 227, 50, 127, 8, ES_MARGIN
        PUSHBUTTON      "Cl~ear", DID_EXECUTE_CLEAR, 10, 25, 45, 13,
                        WS_GROUP
        PUSHBUTTON      "~Add", DID_EXECUTE_INSERT, 60, 25, 45, 13,
        PUSHBUTTON      "~Delete", DID_EXECUTE_DELETE, 110, 25, 45, 13,
//      PUSHBUTTON      "~Update", DID_EXECUTE_UPDATE, 110, 25, 45, 13, NOT
//                      WS_TABSTOP
//      PUSHBUTTON      "~Delete", DID_EXECUTE_DELETE, 160, 25, 45, 13, NOT
//                      WS_TABSTOP
        PUSHBUTTON      "~Cancel", DID_OK, 142, 3, 104, 13
    END
END DLGTEMPLATE IDD_MACHINES LOADONCALL MOVEABLE DISCARDABLE
BEGIN
    DIALOG  "Workstations", IDD_MACHINES, 35, 50, 249, 129,
            FS_NOBYTEALIGN | WS_VISIBLE, FCF_SYSMENU | FCF_TITLEBAR
    BEGIN
        LISTBOX         IDD_MACHINES_LIST, 4, 22, 239, 88, LS_MULTIPLESEL |
                        LS_OWNERDRAW | LS_HORZSCROLL | WS_GROUP
        PUSHBUTTON      "~Modify", IDD_MACHINES_MODIFY, 6, 4, 40, 14,
                        WS_GROUP | WS_DISABLED
        PUSHBUTTON      "~Delete", IDD_MACHINES_DELETE, 49, 4, 40, 14,
                        WS_DISABLED
        PUSHBUTTON      "~Cancel", IDD_MACHINES_CANCEL, 92, 4, 40, 14
        PUSHBUTTON      "~Help", IDD_MACHINES_HELP, 203, 4, 40, 14, BS_HELP
        CONTROL         "", IDD_MACHINES_LISTHEADER, 4, 111, 239, 15,
```

```
                            "ADSLBHeading", WS_VISIBLE
        END
END

DLGTEMPLATE IDD_WS_DETAILS LOADONCALL MOVEABLE DISCARDABLE
BEGIN
    DIALOG  "Workstation Details", IDD_WS_DETAILS, 57, 36, 252, 130,
            WS_VISIBLE, FCF_SYSMENU | FCF_TITLEBAR
        BEGIN
            LTEXT           "Workstation Name:", 201, 11, 116, 79, 8, NOT
                            WS_GROUP
            ENTRYFIELD      "", DID_WSDETAIL_MACHINENAME, 98, 116, 139, 8,
                            ES_MARGIN | WS_GROUP
            LTEXT           "Description:", 203, 39, 104, 51, 8, NOT WS_GROUP
            ENTRYFIELD      "", DID_WSDETAIL_DESCRIPTION, 98, 104, 139, 8,
                            ES_MARGIN
// Requires OS2 2.0
//          LTEXT           "Max Batches:", 205, 48, 92, 42, 8, NOT WS_GROUP
//          CONTROL         "", DID_WSDETAIL_MAXJOBS, 96, 90, 45, 12,
//                          WC_SPINBUTTON, SPBS_ALLCHARACTERS | SPBS_NUMERICONLY |
//                          SPBS_MASTER | SPBS_SERVANT | SPBS_JUSTDEFAULT |
//                          SPBS_FASTSPIN | WS_GROUP | WS_TABSTOP | WS_VISIBLE
            LTEXT           "Max Batches:", 205, 34, 92, 56, 8, NOT WS_GROUP
            ENTRYFIELD      "", DID_WSDETAIL_MAXJOBS, 98, 92, 30, 8, NOT
                            ES_AUTOSCROLL | ES_MARGIN
            LTEXT           "Select Groups", 207, 7, 80, 58, 8
            LISTBOX         DID_WSDETAIL_GROUPLIST, 8, 22, 235, 40,
                            LS_MULTIPLESEL | LS_OWNERDRAW | LS_HORZSCROLL
            DEFPUSHBUTTON   "Commi~t", DID_WSDETAIL_COMMIT, 6, 4, 42, 14,
                            WS_GROUP | WS_DISABLED
            PUSHBUTTON      "~Cancel", DID_WSDETAIL_CANCEL, 51, 4, 40, 14
            PUSHBUTTON      "~Help", DID_WSDETAIL_HELP, 206, 4, 40, 14, BS_HELP
            CONTROL         "", DID_WSDETAIL_GROUPLISTHEADER, 8, 63, 235, 15,
                            "ADSLBHeading", WS_VISIBLE
        END
END DLGTEMPLATE IDD_GROUPS LOADONCALL MOVEABLE DISCARDABLE
BEGIN
    DIALOG  "Groups", IDD_GROUPS, 35, 50, 249, 129, FS_NOBYTEALIGN |
            WS_VISIBLE, FCF_SYSMENU | FCF_TITLEBAR
        BEGIN
            LISTBOX         IDD_GROUPS_LIST, 4, 21, 239, 88, LS_MULTIPLESEL |
                            LS_OWNERDRAW | LS_HORZSCROLL | WS_GROUP
            PUSHBUTTON      "~Modify", IDD_GROUPS_MODIFY, 6, 4, 40, 14, WS_GROUP |
                            WS_DISABLED
            PUSHBUTTON      "~Delete", IDD_GROUPS_DELETE, 49, 4, 40, 14,
                            WS_DISABLED
            PUSHBUTTON      "~Cancel", IDD_GROUPS_CANCEL, 92, 4, 40, 14
            PUSHBUTTON      "~Help", IDD_GROUPS_HELP, 203, 4, 40, 14, BS_HELP
            CONTROL         "", IDD_GROUPS_LISTHEADER, 4, 111, 239, 15,
                            "ADSLBHeading", WS_VISIBLE
        END
END DLGTEMPLATE IDD_GRP_DETAILS LOADONCALL MOVEABLE DISCARDABLE
BEGIN
    DIALOG  "Group Details", IDD_GRP_DETAILS, 58, 48, 252, 119, WS_VISIBLE,
            FCF_SYSMENU | FCF_TITLEBAR
        BEGIN
            LTEXT           "Group Name:", 201, 15, 106, 53, 8, NOT WS_GROUP
            ENTRYFIELD      "", DID_GRPDETAIL_GROUPNAME, 76, 106, 164, 8,
                            ES_MARGIN | WS_GROUP
            LTEXT           "Description:", 203, 17, 94, 51, 8, NOT WS_GROUP
            ENTRYFIELD      "", DID_GRPDETAIL_DESCRIPTION, 76, 94, 164, 8,
                            ES_MARGIN
```

-33-

```
        LTEXT          "Select Workstations", 207, 7, 80, 84, 8
        LISTBOX        DID_GRPDETAIL_MACHINELIST, 8, 22, 235, 41,
                       LS_MULTIPLESEL | LS_OWNERDRAW | LS_HORZSCROLL |
                       WS_GROUP
        DEFPUSHBUTTON  "Commi~t", DID_GRPDETAIL_COMMIT, 6, 4, 42, 14,
                       WS_GROUP | WS_DISABLED
        PUSHBUTTON     "~Cancel", DID_GRPDETAIL_CANCEL, 51, 4, 40, 14
        PUSHBUTTON     "~Help", DID_GRPDETAIL_HELP, 206, 4, 40, 14, BS_HELP
        CONTROL        "", DID_GRPDETAIL_MACHINELISTHEADER, 8, 64, 235, 15,
                       "ADSLBHeading", WS_VISIBLE
    END
END
/************************************************************************
*
* Copyright (c) 1990, 1991, 1992, 1993 American Airlines
*
* File:       BATCH.H
*
* System:     Batch Administration
*
* Description:
*
* History:    David M. Wilson  08/01/90
*             Glenn Grundstrom
*
*
* This program is the CONFIDENTIAL and PROPRIETARY property
* of American Airlines.  Any unauthorized use, reproduction
* or transfer of this program is strictly prohibited.
*
* This is an unpublished work, and is subject to limited distribution
* and restricted disclosure only.  ALL RIGHTS RESERVED.
*
************************************************************************/

/* #define MSDEMO */ define BUTTONHORZSEP        2
define BUTTONVERTSEP        2
#define HEADTOPMARGIN        15
#define LISTEDGEMARGIN       10
#define TID_CLIENT_REFRESH   13
#define CLIENTREFRESH        15000
#define TID_SCHEDULER_UP     14
#define TID_SCHEDULER_DOWN   15
define FASTSCHEDREFRESH     2000 define TID_ZOOM_REFRESH     16
define ZOOMREFRESH          5000 define CLIENT_COLUMNS       7
define GRPDLG_1_COLUMNS     2
#define GRPDLG_2_COLUMNS     2
#define GRPDLG_3_COLUMNS     2
#define MCHDLG_COLUMNS       3
#define EXEDLG_COLUMNS       2
#define JBLST_COLUMNS        4
#define JBSTP_COLUMNS        4
#define RESUME_COLUMNS       3
#define PICKSERV_COLUMNS     2

SHORT sCurrentView;

define BITMAPCOUNT          15 typedef struct _ADSUSERBTN {
```

```
        USHORT      usButtonId;
        HPOINTER    hpointer;
) ADSUSERBTN;

#define PWD_MODIFY      1
define PWD_SCHED       2 define PWD_DATA_JOBID    1
define PWD_DATA_JOBNAME  2 typedef struct _PWDSTRUCT {
        USHORT      usPwdType;
        PSZ         pszJobData;
        USHORT      usDataType;
) PWDSTRUCT;

#ifdef MSDEMO
EXTERN USERATTR   UserAttr;
#endif

EXTERN USERATTR   * pUserAttr;

EXTERN DBPROCESS      *dbADS;
EXTERN DBPROCESS      *dbproc;
EXTERN DBPROCESS      *dbtemp;
EXTERN LOGINREC       *login;

EXTERN HAB        hab;
EXTERN HWND       hwndFrame;
EXTERN CHAR       pszFilterJob[JOBNAMELENGTH];
EXTERN CHAR       pszFilterBy[JOBEDITBYLENGTH];
EXTERN CHAR       pszFilterGroup[GROUPNAMELENGTH];
EXTERN CHAR       pszFilterStart[JOBDATELENGTH];
EXTERN CHAR       pszFilterEnd[JOBDATELENGTH];
EXTERN HPOINTER   hpointerArray[BITMAPCOUNT + 1];
EXTERN HWND       hwndHelpInstance;
EXTERN CHAR       szServerName[15];
EXTERN HELPINIT   hmiHelpData;
EXTERN LONG       GBLStatusColor;
EXTERN BOOL       GBLbAdmin;

/************************/
/* ICON AND BITMAP IDS  */
/************************/

/*
 * NOTE: Not all of the icon ids live here. Due to limitations of the
 *       resource compiler, the defines for icons with ids 2, 3, 4, & 17
 *       are assigned in the dialog box header files in which these icons
 *       appear.
 */ define IDI_BITBASE       2
define IDI_STOPLIGHT     5
#define IDI_RESCHED       6
#define IDI_RUSH          7
define IDI_ERASER        8 define IDI_STEPS         9
define IDI_WARN1         10
#define IDI_NOSERVER      11
```

```
#define IDI_NOJOBS           12
#define IDI_GRPBUSY          13
#define IDI_RUN              14
#define IDI_FINISH           15
define IDI_VERIFY           16 define IDB_STATUS           18 define CLIENTUSERBTNCOUNT   7

MRESULT EXPENTRY ClientWndProc(HWND, USHORT, MPARAM, MPARAM);
MRESULT EXPENTRY DayTimerDlgProc(HWND, USHORT, MPARAM, MPARAM);
MRESULT EXPENTRY EnterPasswordDlgProc(HWND, USHORT, MPARAM, MPARAM);
MRESULT EXPENTRY ExecuteDlgProc(HWND, USHORT, MPARAM, MPARAM);
MRESULT EXPENTRY FilterDlgProc(HWND, USHORT, MPARAM, MPARAM);
MRESULT EXPENTRY GroupsDlgProc(HWND, USHORT, MPARAM, MPARAM);
MRESULT EXPENTRY JobListDlgProc(HWND, USHORT, MPARAM, MPARAM);
MRESULT EXPENTRY JobStepDlgProc(HWND, USHORT, MPARAM, MPARAM);
MRESULT EXPENTRY MachinesDlgProc(HWND, USHORT, MPARAM, MPARAM);
MRESULT EXPENTRY NewTitleBarProc(HWND, USHORT, MPARAM, MPARAM);
MRESULT EXPENTRY PickServerDlgProc(HWND, USHORT, MPARAM, MPARAM);
MRESULT EXPENTRY ResumeDlgProc(HWND, USHORT, MPARAM, MPARAM);
MRESULT EXPENTRY SetPasswordDlgProc(HWND, USHORT, MPARAM, MPARAM);
MRESULT EXPENTRY ZoomDlgProc(HWND, USHORT, MPARAM, MPARAM);
SHORT GetSelectedItemString(HWND, USHORT, PSZ, USHORT, BOOL);
VOID LoadListBox(HWND, USHORT, PSZ, PSZ, USHORT);
VOID RushJob(HWND, PSZ);
VOID SetPasswordFlags(HWND, DBCHAR *, DBPROCESS *);
VOID SetPushButtons(HWND, USHORT, USHORT, USHORT *);
VOID SetStatusColor(VOID);
VOID SetUserRequest(HWND, PSZ, CHAR);
VOID ToggleButtonRange(HWND, USHORT, USHORT, BOOL, BOOL);
VOID ToggleEntryField(HWND, USHORT, USHORT, BOOL);
VOID safe_dbfcmd(DBPROCESS *dbproc, char *fstring, ...);
#************************************************************

# Copyright (c) 1990, 1991, 1992, 1993 American Airlines

# File:        BATCH.PMK

# System:      Batch Administration

# Description: Batch Administration Polymake file.

# History:     David M. Wilson  08/01/90
#              Glenn Grundstrom

This program is the CONFIDENTIAL and PROPRIETARY property
# of American Airlines. Any unauthorized use, reproduction
# or transfer of this program is strictly prohibited.

This is an unpublished work, and is subject to limited distribution
# and restricted disclosure only. ALL RIGHTS RESERVED.

#************************************************************

CFLAGS+=     -MT

OBJS=        batch01.obj batch02.obj batch03.obj

LIBS=        ads adsnet llibce

HEADERS=     batchdef.h batchdlg.h batch.h bamenu.h \
             bamenurc.h
```

```
DLGHEADERS=     dialog.h batchstr.h bamenurc.h

DIALOGS=        batch.dlg

ICONS=          lanrun.ico mglass1.ico sched1.ico golght.ico stoplght.ico \
                resched.ico bumpup.ico eraserdn.ico steps.ico warning1.ico \
                noserver.ico nojobs.ico grpbusy.ico running.ico finish.ico \
                verify.ico server.ico servflag.bmp

#ALL:           batch.exe batch.hlp
ALL:            batch.exe batch.res:      [$(DIALOGS) $(DLGHEADERS) $(ICONS)]

batch01.obj:    [$(HEADERS) $(DLGHEADERS)]

batch02.obj:    [$(HEADERS) $(DLGHEADERS)]

batch03.obj:    [$(HEADERS) $(DLGHEADERS)]

batch.exe:      $(OBJS) [batch.def] batch.res
                %do linkexe batch.hlp:     [batch.ipf]
ystatic char szRevision[] = "$Revision:   4.4  $ BATCH01.C";

/****************************************************************
*
* Copyright (c) 1990, 1991, 1992, 1993 American Airlines
*
* File:         BATCH01.C
*
* System:       Batch Administration
*
* Description:  The Batch Administration program provides a user
*               interface to Batch Scheduler, allowing users to build,
*               submit, and query batches.
*
*               Users identified as batch administrators will be able
*               to register the executable programs that users can
*               include in batches, register workstations that jobs can
*               run on, and can also be used to remotely start, pause,
*               and stop the Batch Scheduler on a LAN workstation.
*               The automated rescheduling of batch jobs is handled by
*               a stored procedure.  The Batch Scheduler is responsible
*               for identifying runnable jobs, for locating a target
*               machine, for shipping the execution requests to the
*               workstations, and for updating the job run record.
*
*               This module contains the main function, the window
*               message loop, the ClientWndProc, and many of the dialog
*               boxes used for inputing and displaying data.
*
* History:      David M. Wilson  08/01/90
*               Blain Stanga
*               Joe Bryan
*               Jeff Beardsley
*               Glenn Grundstrom
*
* This program is the CONFIDENTIAL and PROPRIETARY property
* of American Airlines.  Any unauthorized use, reproduction
* or transfer of this program is strictly prohibited.
*
* This is an unpublished work, and is subject to limited distribution
* and restricted disclosure only.  ALL RIGHTS RESERVED.
*
```

```c
/*******************************************************************/ define DBMSOS2
define INCL_PM
#define INCL_VIO
define INCL_GPILCIDS include <os2.h> include <stdio.h>
include <stdlib.h>
#include <string.h>
#include <malloc.h>
#include <sqlfront.h>
include <sqldb.h> define EXTERN include "adslen.h"
include "ads.h"
include "adsnet.h"
include "dialog.h"
include "batchdef.h"
include "batchdlg.h"
include "batch.h"
#include "errors.h"

HAB      hab;
PSZ      WC_CLIENT = "LanRunner";
HWND     hwndList;
HWND     hwndHead;
HWND     hwndClient;

USHORT   usTimer;
HBITMAP  hbmStatus;
PFNWP    OldTitleBarProc;

/*-----------------------------------------------------------------*/
/*                                                                 */
/* Function Prototypes                                             */
/*-----------------------------------------------------------------*/
MRESULT EXPENTRY ClientWndProc(HWND, USHORT, MPARAM, MPARAM);
MRESULT EXPENTRY wpSCFrame(HWND, USHORT, MPARAM, MPARAM);
MRESULT EXPENTRY ExecuteDlgProc(HWND, USHORT, MPARAM, MPARAM);
MRESULT EXPENTRY dpMachine(HWND, USHORT, MPARAM, MPARAM);      /* jdb */
MRESULT EXPENTRY dpWSDetail(HWND, USHORT, MPARAM, MPARAM);     /* jdb */
MRESULT EXPENTRY dpGroup(HWND, USHORT, MPARAM, MPARAM);        /* jdb */
MRESULT EXPENTRY dpGroupDetail(HWND, USHORT, MPARAM, MPARAM);  /* jdb */
MRESULT EXPENTRY ZoomDlgProc(HWND, USHORT, MPARAM, MPARAM);
MRESULT EXPENTRY FilterDlgProc(HWND, USHORT, MPARAM, MPARAM);
MRESULT EXPENTRY PickServerDlgProc(HWND, USHORT, MPARAM, MPARAM);
MRESULT EXPENTRY NewTitleBarProc(HWND, USHORT, MPARAM, MPARAM);
VOID SetStatusColor(VOID);
VOID SetActiveOptions(HWND);

/*******************************************************************/
/*                                                                 */
/*                          MAIN                                   */
/*                                                                 */
/*******************************************************************/

SHORT main(){
    HMQ    hmq;
    QMSG   qmsg;
    CHAR   szText1[80];
    CHAR   szText2[80];
```

```
static ULONG flFrameFlags = FCF_TITLEBAR | FCF_SYSMENU |
                            FCF_SIZEBORDER | FCF_ICON | FCF_MINMAX |
                            FCF_SHELLPOSITION | FCF_NOBYTEALIGN |
                            FCF_MENU | FCF_ACCELTABLE | FCF_TASKLIST;

hab = WinInitialize(0);
hmq = WinCreateMsgQueue(hab, 0);

ADSRegisterClass(hab);
WinRegisterClass(hab, WC_CLIENT, (PFNWP)ClientWndProc, CS_SIZEREDRAW, 0);

/*
 * Set the default view - this is a global.
 */
sCurrentView = IDM_VIEWDEFAULT;

hwndFrame = WinCreateStdWindow (HWND_DESKTOP, 0L, &flFrameFlags,
    WC_CLIENT, (PSZ) NULL, 0L, (HMODULE)NULL, IDM_BA, &hwndClient);

pUserAttr = ADSLogin(&dbproc, WinWindowFromID(hwndFrame, FID_MENU), "BA");
WinSetWindowPos(hwndFrame, HWND_TOP, 0,0,0,0, SWP_ZORDER);
WinPostMsg(hwndClient, WM_TIMER, MPFROMSHORT(TID_CLIENT_REFRESH), 0L);

WinSendMsg(hwndFrame, WM_USER, MPFROMP(WinSubclassWindow(hwndFrame,
    (PFNWP)wpSCFrame)), 0);

/*
 * Prepare HELPINIT data structure...
 */
hmiHelpData.cb                      = sizeof(HELPINIT);
hmiHelpData.ulReturnCode            = 0;
hmiHelpData.pszTutorialName         = NULL;
hmiHelpData.phtHelpTable            = (PVOID)(0xFFFF0000 | ID_HELPTABLE);
hmiHelpData.hmodHelpTableModule     = 0L;
hmiHelpData.hmodAccelActionBarModule = 0L;
hmiHelpData.idAccelTable            = 0;
hmiHelpData.idActionBar             = 0;

WinLoadString(hab, (HMODULE)NULL, IDS_USERTITLE,
                                sizeof(szText1), (PSZ)szText1);
hmiHelpData.pszHelpWindowTitle      = szText1;
hmiHelpData.usShowPanelId           = CMIC_HIDE_PANEL_ID;
hmiHelpData.pszHelpLibraryName      = "batch.hlp";

/*
 * Create HELP instance and associate it with the application frame.
 */
if (!(hwndHelpInstance = WinCreateHelpInstance(hab, &hmiHelpData))) {
    WinLoadString(hab, (HMODULE)NULL, IDS_NO_HELP,
                                sizeof(szText1), (PSZ)szText1);
    WinLoadString(hab, (HMODULE)NULL, IDS_WARNING,
                                sizeof(szText2), (PSZ)szText2);
    WinMessageBox(HWND_DESKTOP, HWND_DESKTOP, szText1, szText2,
                (USHORT) NULL, MB_OK | MB_ICONEXCLAMATION | MB_MOVEABLE);
} /* if */
else
    WinAssociateHelpInstance(hwndHelpInstance, hwndFrame);

WinLoadString(hab, (HMODULE)NULL, IDS_CANT_LOGON,
                                sizeof(szText1), (PSZ)szText1);
if (dbproc==NULL) {
    WinMessageBox(HWND_DESKTOP, HWND_DESKTOP, szText1,
                NULL, (USHORT) NULL,
                MB_OK | MB_ICONEXCLAMATION | MB_MOVEABLE);
```

-39-

```
   if (hwndHelpInstance)
       WinDestroyHelpInstance(hwndHelpInstance);
   WinDestroyWindow(hwndFrame);
   WinDestroyMsgQueue (hmq) ;
   WinTerminate(hab) ;

ADSExitProgram(0);
   return(0);
} /* if */

/*
 * If the user is an administrator (ie the IDM_ADMIN menu exists),
 * set the titlebar to the admin title, else use the normal title.
 */
if((WinSendMsg(WinWindowFromID(hwndFrame, FID_MENU), MM_ISITEMVALID,
MPFROM2SHORT(IDM_WORKSTATIONS, TRUE), NULL)) ||
(WinSendMsg(WinWindowFromID(hwndFrame, FID_MENU), MM_ISITEMVALID,
MPFROM2SHORT(IDM_GROUPS, TRUE), NULL)) ||
(WinSendMsg(WinWindowFromID(hwndFrame, FID_MENU), MM_ISITEMVALID,
MPFROM2SHORT(IDM_EXECUTE, TRUE), NULL))) {

GBLbAdmin = TRUE;
    WinLoadString(hab, (HMODULE)NULL, IDS_ADMINTITLE,
                      sizeof(szText1), (PSZ)szText1);
} /* if */
else {
    GBLbAdmin = FALSE;
    WinLoadString(hab, (HMODULE)NULL, IDS_USERTITLE,
                      sizeof(szText1), (PSZ)szText1);
} /* else */

WinSetWindowText(hwndFrame, szText1);
/*
 * Subclass the titlebar so we can paint our status bitmaps
 */
OldTitleBarProc = WinSubclassWindow(WinWindowFromID(hwndFrame, FID_TITLEBAR),
                                    (PFNWP)NewTitleBarProc);

WinShowWindow(hwndFrame, TRUE);

/* THE loop */
while (WinGetMsg (hab, &qmsg, NULL, 0, 0))
       WinDispatchMsg (hab, &qmsg) ;

if (hwndHelpInstance)
    WinDestroyHelpInstance(hwndHelpInstance);
WinDestroyWindow(hwndFrame);
WinDestroyMsgQueue(hmq);
WinTerminate(hab);

ADSExitProgram(0);

dbclose(dbproc);
return(0);
} /* main */

/*****************************************************************/
/*                                                               */
/* ClientWndProc                                                 */
/*                                                               */
/* Handles the creation of the buttons, the painting of the client window, */
/* all button and menu selections and refresh timer messages.    */
/*                                                               */
/* Note: The refresh timer is stopped upon entry to each dialog box to */
/*       improve responsivness.                                  */
```

```
/*                                                                        */
/**************************************************************************/
MRESULT EXPENTRY ClientWndProc(HWND hwnd, USHORT msg, MPARAM mp1, MPARAM mp2){
   HPS              hps;
   HWND             hwndButton;
   HWND             hwndMenu;
   RECTL            rectl;
   PSWP             pswp = mp1;
   USHORT           bitmap;
   USHORT           button;
   USHORT           xButton;
   USHORT           yButton;
   USHORT           cxButton;
   USHORT           cyButton;
   USHORT           i;
   USHORT           usBytes;
   POINTL           ptl;
   DBCHAR           JobRunID[JOBIDLENGTH];
   ULONG            ulNetConnect;
   USHORT           usRequest;
   FONTMETRICS      fm;
   CHAR             szText1[80];
   CHAR             szText2[80];

static BOOL       bInitial = TRUE;
   static SHORT      color = 0;
   static SHORT      sTextHeight;
   static ADSUSERBTN ButtonArray[CLIENTUSERBTNCOUNT];
   static USHORT     usPushButtons[CLIENTUSERBTNCOUNT];
   static CHAR       szHeadingTop[80];
   static CHAR       szHeadingBottom[80];
   static LONG       alColWidth[CLIENT_COLUMNS];
   static LONG       lcxVScrollBar;
   static USHORT     usStatusTick = 0;

switch (msg) { case WM_CONTROL: /*---------------------------------------------------*/
         switch (SHORT2FROMMP(mp1))
         {
            case LN_SELECT:
               if (SHORT1FROMMP(mp1) == ID_CLIENT_ADSLIST)
                  SetActiveOptions(hwnd);
               return (0);

/*
             * If the user has double clicked on an item call the zoom dlg.
             */
            case LN_ENTER: /*-----------------------------------------------*/
               if (SHORT1FROMMP(mp1) == ID_CLIENT_ADSLIST) {
                  if (GetSelectedItemString( hwnd, ID_CLIENT_ADSLIST,
                                    JobRunID, JOBIDLENGTH, TRUE) < 0)
                     return(0);
                  WinDlgBox(HWND_DESKTOP, hwnd, (PFNWP)ZoomDlgProc,
                            (HMODULE)NULL, IDD_ZOOM, (PVOID) atol(JobRunID));
               } /* if */
               return(0);

} /* switch */
         break;

case WM_CREATE: /*----------------------------------------------------*/
         /* Clear the view filters (Global). */
         strcpy(pszFilterJob, "");
         strcpy(pszFilterBy, "");
         strcpy(pszFilterGroup, "");
```

-41-

```
strcpy(pszFilterStart, "");
strcpy(pszFilterEnd, "");

/*
 * Load the column title strings from the resource.
 */
WinLoadString(hab, (HMODULE)NULL, IDS_CLIENT_LIST1_TOP,
                    sizeof(szHeadingTop), (PSZ)szHeadingTop);
WinLoadString(hab, (HMODULE)NULL, IDS_CLIENT_LIST1_BOT,
                    sizeof(szHeadingBottom), (PSZ)szHeadingBottom);

/* Set the column widths to zero. */
for (i = 0; i < CLIENT_COLUMNS; i++)
        alColWidth[i] = 0;

/* Find the button sizes */
xButton = BUTTONHORZSEP;
yButton = BUTTONVERTSEP;
cxButton = (USHORT) WinQuerySysValue(HWND_DESKTOP, SV_CXICON) + 16;
cyButton = (USHORT) WinQuerySysValue(HWND_DESKTOP, SV_CYICON) + 16;

/* Create the Listbox and its heading */
hwndHead = WinCreateWindow (hwnd, "ADSLBHeading", "",
                            0L,
                            0,0,0,0,
                            hwnd, HWND_BOTTOM,
                            ID_CLIENT_HEADING, NULL, NULL);

hwndList = WinCreateWindow (hwnd, WC_LISTBOX, "",
                            LS_HORZSCROLL | LS_OWNERDRAW | WS_TABSTOP,
                            0,0,0,0,
                            hwnd, HWND_BOTTOM,
                            ID_CLIENT_ADSLIST, NULL, NULL);

/*
 * Figure out how much vertical space we need for current font on
 * the current device.
 */
hps = WinGetPS(hwnd);
GpiQueryFontMetrics(hps, (LONG) sizeof(fm), &fm);
/*
 * Save the font height. The lowercase descender height was left off
 * because the heading text was too spread out with it.
 */
sTextHeight =(SHORT)(fm.lMaxBaselineExt);
hbmStatus = GpiLoadBitmap(hps, 0, IDB_STATUS, 0L, 0L);
WinReleasePS(hps);

/* Load ALL of the applications bitmaps */
for (bitmap = 0; bitmap < BITMAPCOUNT; bitmap++)
    hpointerArray[bitmap] = WinLoadPointer( HWND_DESKTOP,
                            (HMODULE)NULL, bitmap + IDI_BITBASE);

/*
 * Create all of the buttons. The first set of bitmaps are also
 * button tops.
 */
for (button = 0; button < CLIENTUSERBTNCOUNT; button++) {
    ButtonArray[button].usButtonId = USRBTN_BASE + button;
    ButtonArray[button].hpointer = hpointerArray[button];

hwndButton = WinCreateWindow (hwnd, WC_BUTTON,
                    "",
                    BS_PUSHBUTTON,
                    0,0,0,0,
```

```
                            hwnd, HWND_BOTTOM,
                            ButtonArray[button].usButtonId,
                            NULL, NULL);

/* Horzontial whitespace between buttons */
        xButton += cxButton + BUTTONHORZSEP;
        usPushButtons[button] = ButtonArray[button].usButtonId;
        ADSSubclassPushButton(hwndButton, hpointerArray[button],
                              hpointerArray[button], SYSCLR_BUTTONMIDDLE);
    } /* for */

/* Set Default Button */
    SetPushButtons(hwnd, CLIENTUSERBTNCOUNT, ID_CLIENT_MGLASS,
                                    usPushButtons);

/* Initially disable some menu choices and icons */
    SetActiveOptions(hwnd);

/* Get the width of the vertical scroll bar for heading sizing */
    lcxVScrollBar = WinQuerySysValue(HWND_DESKTOP, SV_CXVSCROLL);

/*
     * Post a Timer message so that we get a fast refresh
     */
    break;

case WM_TIMER: /*-----------------------------------------------------*/
    switch (SHORT1FROMMP(mp1)) {
        case TID_SCHEDULER_UP: /*-------------------------------------*/
            DosBeep(600, 100);
            WinStopTimer(hab, hwndClient, usTimer);
            SetStatusColor();
            if (GBLStatusColor == 0x00FF0000L)
                usTimer = WinStartTimer(hab, hwndClient,
                            TID_SCHEDULER_UP, FASTSCHEDREFRESH);
            else
                usTimer = WinStartTimer(hab, hwndClient,
                            TID_CLIENT_REFRESH, CLIENTREFRESH);
            return(0);

case TID_SCHEDULER_DOWN: /*-----------------------------------*/
            WinStopTimer(hab, hwndClient, usTimer);
            SetStatusColor();
            if (GBLStatusColor == 0x00FF0000L)
                usTimer = WinStartTimer(hab, hwndClient,
                            TID_CLIENT_REFRESH, CLIENTREFRESH);
            else
                usTimer = WinStartTimer(hab, hwndClient,
                            TID_SCHEDULER_DOWN, FASTSCHEDREFRESH);
            return(0);

/*
         * Tick, Tick, Tick. Clear the column widths to force a recalc.
         * Reload the listbox.
         */
        case TID_CLIENT_REFRESH: /*-----------------------------------*/
            for (i = 0; i < CLIENT_COLUMNS; i++)
                alColWidth[i] = 0;

if (GetSelectedItemString( hwnd, ID_CLIENT_ADSLIST,
                            JobRunID, JOBIDLENGTH, FALSE) >= 0)
                LoadListBox(hwnd, ID_CLIENT_ADSLIST, (PSZ)NULL,
                                (PSZ)JobRunID, sCurrentView);
            else
                LoadListBox(hwnd, ID_CLIENT_ADSLIST, (PSZ)NULL,
                                (PSZ)NULL, sCurrentView);
```

-43-

```
        if (!(usStatusTick++%4))
            SetStatusColor();

dbcmd(dbproc, "SELECT convert(char(10), GetDate(), 8)");
        dbsqlexec(dbproc);
        dbresults(dbproc);
        {
            char buffer[11];
            dbbind(dbproc, 1, NTBSTRINGBIND, 11, buffer);
            while(dbnextrow(dbproc)!=NO_MORE_ROWS);
            WinSendMsg( WinWindowFromID(WinQueryWindow(hwnd,
                    QW_PARENT, FALSE), FID_MENU), MM_SETITEMTEXT,
                    MPFROMSHORT(IDM_BA_DBTIME), MPFROMP(buffer) );
        } return(0);
    } /* switch */
    break;

case WM_INITMENU: /*---------------------------------------------*/
    WinStopTimer(hab, hwndClient, usTimer);
    return(0);

case WM_MENUEND: /*----------------------------------------------*/
    usTimer = WinStartTimer(hab, hwndClient,
                TID_CLIENT_REFRESH, CLIENTREFRESH);
    return(0);

case WM_ACTIVATE: /*---------------------------------------------*/
    if (SHORT1FROMMP(mp1)) {
        usTimer = WinStartTimer(hab, hwndClient,
                    TID_CLIENT_REFRESH, CLIENTREFRESH);
        /*
         * Post a Timer message so that we get a fast refresh
         */
        if (!(bInitial))
            WinPostMsg(hwndClient, WM_TIMER,
                    MPFROMSHORT(TID_CLIENT_REFRESH), 0L);
        else
            bInitial = FALSE;
    } /* if */
    else
        WinStopTimer(hab, hwndClient, usTimer);
    return(0);

case WM_CLOSE: /*------------------------------------------------*/
    /* Bye, Bye.  Throw out those pointers on your way out. */
    WinStopTimer(hab, hwndClient, usTimer);
    WinDestroyWindow(hwndList);
    WinDestroyWindow(hwndHead);
    for (button = 0; button < CLIENTUSERBTNCOUNT; button++)
        WinDestroyWindow(WinWindowFromID(hwnd,
                        ButtonArray[button].usButtonId));
    for (bitmap = 0; bitmap < BITMAPCOUNT; bitmap++)
        WinDestroyPointer(hpointerArray[bitmap]);
    break;

case WM_SIZE: /*-------------------------------------------------*/
    /*
     * Allow the list, heading and buttons to be sized and
     * positioned based on the size of the frame.
     */
    xButton = BUTTONHORZSEP;
    yButton = BUTTONVERTSEP;
    cxButton = (USHORT) WinQuerySysValue(HWND_DESKTOP, SV_CXICON) + 16;
    cyButton = (USHORT) WinQuerySysValue(HWND_DESKTOP, SV_CYICON) + 16;
```

-44-

```
        WinSetWindowPos(hwndHead,
                    (HWND) NULL,
                    LISTEDGEMARGIN,
                    SHORT2FROMMP( mp2 ) - sTextHeight * 2 - HEADTOPMARGIN,
                    SHORT1FROMMP( mp2 ) - 2 * LISTEDGEMARGIN
                                                    - (SHORT) lcxVScrollBar,
                    sTextHeight * 2,
                    SWP_SIZE | SWP_MOVE | SWP_SHOW);

WinSetWindowPos(hwndList, (HWND) NULL,
                    LISTEDGEMARGIN,
                    cyButton + 2 * BUTTONVERTSEP + LISTEDGEMARGIN,
                    SHORT1FROMMP( mp2 ) - 2 * LISTEDGEMARGIN,
                    SHORT2FROMMP( mp2 ) - (cyButton + 2 * BUTTONVERTSEP)
                        - sTextHeight*2 - HEADTOPMARGIN - LISTEDGEMARGIN - 1,
                    SWP_SIZE | SWP_MOVE | SWP_SHOW);

for (button = 0; button < CLIENTUSERBTNCOUNT; button++) {
            /* If this is the schedule button, right justify */
            if (ButtonArray[button].usButtonId == ID_CLIENT_SCHED) {
                WinSetWindowPos(WinWindowFromID(hwnd,
                                            ButtonArray[button].usButtonId),
                            (HWND) NULL,
                            SHORT1FROMMP( mp2 ) - BUTTONHORZSEP - cxButton,
                            yButton, cxButton, cyButton,
                            SWP_SIZE | SWP_MOVE | SWP_SHOW);
            } /* if */
            else {
                /* else left justify the rest */
                WinSetWindowPos(WinWindowFromID(hwnd,
                                            ButtonArray[button].usButtonId),
                            (HWND) NULL,
                            xButton, yButton, cxButton, cyButton,
                            SWP_SIZE | SWP_MOVE | SWP_SHOW);

xButton += cxButton + BUTTONHORZSEP;
            } /* else */
        } /* for */
        break;

case WM_COMMAND: /*-------------------------------------------------*/
    switch (COMMANDMSG(&msg)->cmd) { case IDM_BA_DBTIME: /*-------------------------------------*/
            WinPostMsg(hwnd, WM_TIMER,
                    MPFROMSHORT(TID_CLIENT_REFRESH), 0L);
            break;

/*
         * ADMIN, executables menu.
         */
        case IDM_EXECUTE: /*---------------------------------------*/
            WinDlgBox(HWND_DESKTOP, hwnd, (PFNWP)ExecuteDlgProc,
                    (HMODULE)NULL, IDD_EXECUTE, (PVOID) atol(JobRunID));
            return(0);

/*
         * ADMIN, workstations menu.
         */
        case IDM_WORKSTATIONS: /*----------------------------------*/
            WinDlgBox(HWND_DESKTOP, hwnd, (PFNWP)dpMachine,
                    (HMODULE)NULL, IDD_MACHINES, NULL);
            return(0);

/*
```

```
 * ADMIN, groups menu.
 */
case IDM_GROUPS: /*-----------------------------------------*/
    WinDlgBox(HWND_DESKTOP, hwnd, (PFNWP)dpGroup,
        (HMODULE)NULL, IDD_GROUPS, NULL);
    return(0);

/*
 * FILE, exit menu.
 */
case IDM_EXIT: /*-------------------------------------------*/
    WinPostMsg(hwnd, WM_CLOSE, 0L, 0L);
    WinStopTimer(hab, hwnd, usTimer);
    usTimer = 0;
    return(0);

/*
 * SCHEDULER, Refuse new jobs menu.
 */
case IDM_REFUSEJOBS: /*-------------------------------------*/
    if (ADSNetConnect(&ulNetConnect, szServerName,
        BATCHD_SERVICE)){
        break;
    } /* if */
    usRequest = BATCHD_REFUSE_NEWJOBS;
    /* Tickle the scheduler so it will look for runnables. */
    ADSNetWrite(ulNetConnect, &usRequest, sizeof(usRequest));
    ADSNetDisconnect(ulNetConnect);
    SetStatusColor();
    return(0);

/*
 * SCHEDULER, Accept new jobs menu.
 */
case IDM_ACCEPTJOBS: /*-------------------------------------*/
    if (ADSNetConnect(&ulNetConnect, szServerName,
        BATCHD_SERVICE)){
        break;
    } /* if */
    usRequest = BATCHD_ACCEPT_NEWJOBS;
    ADSNetWrite(ulNetConnect, &usRequest, sizeof(usRequest));
    ADSNetDisconnect(ulNetConnect);
    SetStatusColor();
    return(0);

/*
 * SCHEDULER, Start
 */
case IDM_STARTSCHED: /*-------------------------------------*/
    /*
     * We will start no scheduler before its time. If the
     * scheduler is running (ie the current status icon color
     * is NOT RED) we will post an error message and ignore
     * the request. The StatusColor flag is used for speed -
     * net connects to a non-existant server are slow.
     */
    if (GBLStatusColor == 0x00FF0000L) {
        WinStopTimer(hab, hwndClient, usTimer);
        if(WinDlgBox(HWND_DESKTOP, hwnd,
            (PFNWP)PickServerDlgProc, (HMODULE)NULL,
            IDD_PICKSERV, NULL))
            usTimer = WinStartTimer(hab, hwndClient,
                        TID_SCHEDULER_UP, FASTSCHEDREFRESH);
        else
            usTimer = WinStartTimer(hab, hwndClient,
                        TID_CLIENT_REFRESH, CLIENTREFRESH);
```

```
    } /* if */
    else {
       WinLoadString(hab, (HMODULE)NULL, IDS_CANT_START,
                            sizeof(szText1), (PSZ)szText1);
       WinLoadString(hab, (HMODULE)NULL, IDS_ERROR,
                            sizeof(szText2), (PSZ)szText2);
       WinMessageBox(HWND_DESKTOP, HWND_DESKTOP, szText1,
                     szText2, (USHORT) NULL,
                     MB_OK | MB_ERROR | MB_MOVEABLE);
    } /* else */
    WinUpdateWindow(hwnd);
    return(0);

/*
 * SCHEDULER, Stop
 */
case IDM_STOPSCHED: /*----------------------------------------*/
    WinStopTimer(hab, hwndClient, usTimer);

if (ADSNetConnect(&ulNetConnect,
    szServerName, BATCHD_SERVICE)){
       break;
    } /* if */ usRequest = BATCHD_STOP;
    ADSNetWrite(ulNetConnect, &usRequest, sizeof(usRequest));
    ADSNetRead(ulNetConnect, &usRequest,
               sizeof(usRequest), &usBytes);

if (usRequest) {
       WinLoadString(hab, (HMODULE)NULL, IDS_CANT_STOP,
                            sizeof(szText1), (PSZ)szText1);
       WinLoadString(hab, (HMODULE)NULL, IDS_ERROR,
                            sizeof(szText2), (PSZ)szText2);
       WinMessageBox(HWND_DESKTOP, HWND_DESKTOP, szText1,
                     szText2, (USHORT) NULL,
                     MB_OK | MB_ERROR | MB_MOVEABLE);
    } /* if */
    ADSNetDisconnect(ulNetConnect);
    usTimer = WinStartTimer(hab, hwndClient,
         TID_SCHEDULER_DOWN, FASTSCHEDREFRESH);
    return(0);

/*
 * JOBS, Edit job menu.
 */
case IDM_JOBEDIT: /*----------------------------------------*/
    WinDlgBox(HWND_DESKTOP, hwnd, (PFNWP)JobListDlgProc,
         (HMODULE)NULL, IDD_JOBLIST, NULL);
    return(0);

/*
 * JOBS, Schedule a job menu
 */
case IDM_JOBSCHEDULE: /*----------------------------------------*/
case ID_CLIENT_SCHED: /*----------------------------------------*/
    WinDlgBox(HWND_DESKTOP, hwnd, (PFNWP)DayTimerDlgProc,
         (HMODULE)NULL, IDD_DAYTIMER, NULL);
    return(0);

/*
 * JOBS, Reschedule selected job menu.
 */
case IDM_JOBRESCHED: /*----------------------------------------*/
case ID_CLIENT_RESCHED: /*----------------------------------------*/
    if (GetSelectedItemString( hwnd, ID_CLIENT_ADSLIST,
```

-47-

```
                              JobRunID, JOBIDLENGTH, TRUE) < 0)
            return(0);
        WinDlgBox(HWND_DESKTOP, hwnd,
                  (PFNWP)DayTimerDlgProc, (HMODULE)NULL,
                  IDD_DAYTIMER, (PVOID) JobRunID);
        return(0);

/*
 * JOBS, Rush selected job menu
 */
case IDM_JOBRUSH: /*----------------------------------------*/
case ID_CLIENT_RUSH: /*-------------------------------------*/
        if (GetSelectedItemString( hwnd, ID_CLIENT_ADSLIST,
                              JobRunID, JOBIDLENGTH, TRUE) < 0)
            return(0);
        RushJob(hwnd, JobRunID);
        return(0);

/*
 * JOBS, Zoom/Inspect menu
 */
case IDM_JOBZOOM: /*----------------------------------------*/
case ID_CLIENT_MGLASS: /*-----------------------------------*/
        if (GetSelectedItemString( hwnd, ID_CLIENT_ADSLIST,
                              JobRunID, JOBIDLENGTH, TRUE) < 0)
            return(0);
        WinDlgBox(HWND_DESKTOP, hwnd, (PFNWP)ZoomDlgProc,
                  (HMODULE)NULL, IDD_ZOOM, (PVOID) atol(JobRunID));
        return(0);

/*
 * JOBS, Hold this job menu
 */
case IDM_JOBHOLD: /*----------------------------------------*/
case ID_CLIENT_STOPLIGHT: /*--------------------------------*/
        if (GetSelectedItemString( hwnd, ID_CLIENT_ADSLIST,
                              JobRunID, JOBIDLENGTH, TRUE) < 0)
            return(0);
        SetUserRequest(hwnd, JobRunID, 'H');
        return(0);

/*
 * JOB, Resume this job menu
 */
case IDM_JOBRESUME: /*--------------------------------------*/
case ID_CLIENT_GOLIGHT: /*----------------------------------*/
        if (GetSelectedItemString( hwnd, ID_CLIENT_ADSLIST,
                              JobRunID, JOBIDLENGTH, TRUE) < 0)
            return(0);
        WinDlgBox(HWND_DESKTOP, hwnd, (PFNWP)ResumeDlgProc,
                  (HMODULE)NULL, IDD_RESUME, (PVOID) JobRunID);
        return(0);

/*
 * JOB, Cancel/delete this job menu
 */
case IDM_JOBCANCEL: /*--------------------------------------*/
case ID_CLIENT_ERASER: /*-----------------------------------*/
        if (GetSelectedItemString( hwnd, ID_CLIENT_ADSLIST,
                              JobRunID, JOBIDLENGTH, TRUE) < 0)
            return(0);
        SetUserRequest(hwnd, JobRunID, 'C');
        SetActiveOptions(hwnd);
        return(0);

/*
```

-48-

```
    * VIEW, DEFAULT | HISTORY | ALL menu
    */
    case IDM_VIEWDEFAULT: /*----------------------------------------*/
    case IDM_VIEWHISTORY: /*----------------------------------------*/
    case IDM_VIEWALL: /*--------------------------------------------*/
        hwndMenu = WinWindowFromID(WinQueryWindow(hwnd,
                                    QW_PARENT, FALSE), FID_MENU);

/* Clear the old view menu checkmark */
        WinSendMsg(hwndMenu,
                   MM_SETITEMATTR,
                   MPFROM2SHORT(sCurrentView, TRUE),
                   MPFROM2SHORT(MIA_CHECKED, 0));

/* Save the new view in the global */
        sCurrentView = COMMANDMSG(&msg)->cmd;

/* Set the new view menu checkmark */
        WinSendMsg(hwndMenu,
                   MM_SETITEMATTR,
                   MPFROM2SHORT(sCurrentView, TRUE),
                   MPFROM2SHORT(MIA_CHECKED, MIA_CHECKED));

WinSendMsg(hwnd, WM_TIMER,
                   MPFROMSHORT(TID_CLIENT_REFRESH), 0L);

/*
         * Disable some of the buttons if this new view is not
         * the default. Also, take into account if a selection
         * has been made from the list box.
         */
        SetActiveOptions(hwnd);

break;

/*
     * VIEW, Filter menu.
     */
    case IDM_FILTER: /*---------------------------------------------*/
        WinDlgBox(HWND_DESKTOP, hwnd, (PFNWP)FilterDlgProc,
                  (HMODULE)NULL, IDD_FILTER, NULL );
        return(0);

/*
     * HELP for HELP - We get to call it ourselves...
     */
    case IDM_BA_HEL_HFH: /*-----------------------------------------*/
        WinSendMsg(hwndHelpInstance, HM_DISPLAY_HELP, 0L, 0L);
        return (0);
    } /* switch */
    break;

/*
 * Paint the client area, the button area, and the separator.
 */
case WM_PAINT: /*---------------------------------------------------*/
    /* Calc button size */
    cyButton = (USHORT) WinQuerySysValue(HWND_DESKTOP, SV_CYICON) + 16;

hps = WinBeginPaint(hwnd, NULL, NULL);

/* Fill everything but button area with background color. */
    WinQueryWindowRect(hwnd, &rectl);
    rectl.yBottom = cyButton + 2 * BUTTONVERTSEP;
    WinFillRect(hps, &rectl, SYSCLR_BUTTONMIDDLE);
```

-49-

```
        /* Fill button area with grey */
        rectl.yTop = rectl.yBottom;
        rectl.yBottom = 0;
        WinFillRect(hps, &rectl, SYSCLR_BUTTONMIDDLE);

/* Draw separator line */
        ptl.x = 0;
        ptl.y = rectl.yTop;
        GpiMove(hps, &ptl);
        ptl.x = rectl.xRight;
        GpiSetColor(hps, SYSCLR_WINDOWTEXT);
        GpiLine(hps, &ptl);
        WinEndPaint(hps);

return(0);

/* Required multicolumn list stuff */
    case WM_MEASUREITEM: /*---------------------------------------------*/
        switch (SHORT1FROMMP(mp1)) {
            case ID_CLIENT_ADSLIST: /*------------------------------------*/
                return (MRFROMLONG(ADSLBMeasure(hwnd, ID_CLIENT_ADSLIST,
                                    SHORT1FROMMP(mp2), alColWidth, CLIENT_COLUMNS,
                                    ID_CLIENT_HEADING, szHeadingTop,
                                    szHeadingBottom)));
        } /* switch */
        return(0);

/* Ditto */
    case WM_DRAWITEM: /*--------------------------------------------------*/
        switch (SHORT1FROMMP(mp1)) {
            case ID_CLIENT_ADSLIST: /*------------------------------------*/
                ADSLBDraw(hwnd, ID_CLIENT_ADSLIST,
                          (POWNERITEM)PVOIDFROMMP(mp2), alColWidth,
                          CLIENT_COLUMNS, ID_CLIENT_HEADING, FALSE);
                return (MRFROMSHORT(TRUE));
        } /* switch */
        return(0);

/* KEYS HELP */
    case HM_QUERY_KEYS_HELP: /*-----------------------------------------*/
        return(MRFROMSHORT(IDH_BA_HEL_SC_HELPKEYS));
    } /* switch */
    return WinDefWindowProc(hwnd, msg, mp1, mp2);
} /* ClientWndProc */

/*--------------------------------------------------------------------*/
/* wpSCFrame - Subclassed Frame Procedure                             */
/*--------------------------------------------------------------------*/
MRESULT EXPENTRY wpSCFrame(HWND hwnd, USHORT msg, MPARAM mp1, MPARAM mp2){
    static PFNWP OldProc;

switch(msg){
        case WM_USER: /*----------------------------------------------*/
            OldProc = (PFNWP)PVOIDFROMMP(mp1);
            return 0;
        break;

case WM_QUERYTRACKINFO:{ /*----------------------------------*/
            PTRACKINFO pti;
            MRESULT    mr;

pti = PVOIDFROMMP(mp2);
            mr = OldProc(hwnd, msg, mp1, mp2);

pti->ptlMinTrackSize.x =
```

-50-

```
            WinQuerySysValue(HWND_DESKTOP, SV_CXICON) * 12;
        pti->ptlMinTrackSize.y =
            WinQuerySysValue(HWND_DESKTOP, SV_CYICON) * 7;

return mr;
    } break;

} /* switch */ return OldProc(hwnd, msg, mp1, mp2);
} /* wpSCFrame */

/***********************************************************************/
/*                                                                     */
/* ExecuteDlgProc                                                      */
/*                                                                     */
/* This dlgproc allows the batch administrator to maintain the registered */
/* executable list. An executable must be registered before it can be  */
/* used in a Batch Job. Table: SSAvailProgramTable                     */
/*                                                                     */
/***********************************************************************/
MRESULT EXPENTRY ExecuteDlgProc(HWND hwnd, USHORT msg, MPARAM mp1, MPARAM mp2)
{
  static CHAR    szHeadingTop[80];
  static CHAR    szHeadingBottom[80];
  static LONG    alColWidth[EXEDLG_COLUMNS];

USHORT         i;
  USHORT         usNotifyCode;
  CHAR           abBuffer[250];
  DBCHAR         ProgramName[EXECUTENAMELENGTH];
  DBCHAR         FileName[EXECUTEFILELENGTH];
  static USHORT  usPushButtons[EXECUTENUMBUTTONS];
  USHORT         fDelete;

switch (msg) {
    case WM_CONTROL: /*--------------------------------------------------*/
        usNotifyCode = (USHORT) SHORT2FROMMP(mp1);

switch (SHORT1FROMMP(mp1)) {
            case DID_EXECUTE_ADSLIST: /*-----------------------------------*/
                switch (usNotifyCode) {
                    /*
                     * If a list item is selected, query the data and fill
                     * in the entry fields.
                     */
                    case LN_SELECT: /*-----------------------------------*/
                        if (GetSelectedItemString(hwnd, DID_EXECUTE_ADSLIST,
                                    ProgramName, sizeof(ProgramName), TRUE) < 0)
                            return(0);

WinSetPointer(HWND_DESKTOP,
                                WinQuerySysPointer(HWND_DESKTOP, SPTR_WAIT, TRUE));

safe_dbfcmd(dbproc,
                           " SELECT"
                           "    ProgramName,"
                           "    AvailProgramFileName"
                           " FROM SSAvailProgramTable"
                           " WHERE ProgramName LIKE \"%s\""
                           " ORDER BY ProgramName",
                            ProgramName);

dbsqlexec(dbproc);
                        dbresults(dbproc);
```

-51-

```
                    dbbind(dbproc, 1, NTBSTRINGBIND, (LONG)sizeof(ProgramName),
                                                                   ProgramName);
                    dbbind(dbproc, 2, NTBSTRINGBIND, (LONG)sizeof(FileName),
                                                                   FileName);
                    dbnextrow(dbproc);

WinSetDlgItemText(hwnd, DID_EXECUTE_PROGNAME, ProgramName);
                    WinSetDlgItemText(hwnd, DID_EXECUTE_PROGFILE, FileName);
                    SetPushButtons(hwnd, EXECUTENUMBUTTONS, DID_EXECUTE_CLEAR,
                                                           usPushButtons);

fDelete = TRUE;
                    if (!strcmpi(FileName, "RESETRPT.EXE"))
                        fDelete = FALSE;
                    if (!strcmpi(FileName, "SQR.EXE"))
                        fDelete = FALSE;
                    if (!strcmpi(FileName, "NPRINT.EXE"))
                        fDelete = FALSE;
                    if (!strcmpi(FileName, "GLPOST.EXE"))
                        fDelete = FALSE;
                    if (!strcmpi(FileName, "ACTRJE.EXE"))
                        fDelete = FALSE;
                    WinEnableWindow(WinWindowFromID(hwnd, DID_EXECUTE_DELETE),
                            fDelete);

dbcanquery(dbproc);
                    while (dbresults(dbproc) != NO_MORE_RESULTS)
                        dbcanquery(dbproc);

WinSetPointer(HWND_DESKTOP,
                            WinQuerySysPointer(HWND_DESKTOP, SPTR_ARROW, TRUE));
                    break;
            } /* switch */
        break;
    } /* switch */
    break;

case WM_INITDLG: /*-----------------------------------------------------*/
    /*
     * Change pointer to hourglass.
     */
    WinSetPointer(HWND_DESKTOP,
            WinQuerySysPointer(HWND_DESKTOP, SPTR_WAIT, TRUE));

/*
     * Load the column title strings from the resource.
     */
    WinLoadString(hab, (HMODULE)NULL, IDS_EXECUTE_LIST1_TOP,
                        sizeof(szHeadingTop), (PSZ)szHeadingTop);
    WinLoadString(hab, (HMODULE)NULL, IDS_EXECUTE_LIST1_BOT,
                        sizeof(szHeadingBottom), (PSZ)szHeadingBottom);

/* Clear column widths */
    for (i = 0; i < EXEDLG_COLUMNS; i++)
        alColWidth[i] = 0;

/* Store button ids and set default */
    usPushButtons[0] = DID_EXECUTE_CLEAR;
    usPushButtons[1] = DID_EXECUTE_INSERT;
    usPushButtons[2] = DID_EXECUTE_DELETE;
    usPushButtons[3] = DID_OK;

/* Set Maximum entry field lengths */
    WinSendDlgItemMsg(hwnd, DID_EXECUTE_PROGNAME, EM_SETTEXTLIMIT,
        MPFROMSHORT(EXECUTENAMELENGTH - 1), 0L);
    WinSendDlgItemMsg(hwnd, DID_EXECUTE_PROGFILE, EM_SETTEXTLIMIT,
```

-52-

```
            MPFROMSHORT(EXECUTEFILELENGTH - 1), 0L);

/* Load the listbox with the executables */
        LoadListBox(hwnd, DID_EXECUTE_ADSLIST, (PSZ)NULL, (PSZ)NULL, 0);

SetPushButtons(hwnd, EXECUTENUMBUTTONS, DID_EXECUTE_INSERT,
                usPushButtons);
        WinSetFocus(HWND_DESKTOP, WinWindowFromID(hwnd, DID_EXECUTE_PROGNAME));
        WinEnableWindow(WinWindowFromID(hwnd, DID_EXECUTE_DELETE), FALSE);

/* Restore the pointer. */
        WinSetPointer(HWND_DESKTOP,
                    WinQuerySysPointer(HWND_DESKTOP, SPTR_ARROW, TRUE));

return(0);

/* Multicolumn List box stuff */ case WM_MEASUREITEM: /*----------------------------------------------*/
        switch (SHORT1FROMMP(mp1)) {
            case DID_EXECUTE_ADSLIST: /*-----------------------------------*/
                return (MRFROMLONG(ADSLBMeasure(hwnd, DID_EXECUTE_ADSLIST,
                                    SHORT1FROMMP(mp2), alColWidth, MCHDLG_COLUMNS,
                                    DID_EXECUTE_HEADING, szHeadingTop,
                                    szHeadingBottom)));
        } /* switch */
        return(0);

case WM_DRAWITEM: /*-------------------------------------------------*/
        switch (SHORT1FROMMP(mp1)) {
            case DID_EXECUTE_ADSLIST: /*-----------------------------------*/
                ADSLBDraw(hwnd, DID_EXECUTE_ADSLIST,
                        (POWNERITEM)PVOIDFROMMP(mp2), alColWidth,
                        MCHDLG_COLUMNS, DID_EXECUTE_HEADING, FALSE);
                return (MRFROMSHORT(TRUE));
        } /* switch */
        return(0);

case WM_COMMAND: /*--------------------------------------------------*/
        switch (COMMANDMSG(&msg)->cmd) {
            case DID_OK: /*-----------------------------------------------*/
                WinDismissDlg(hwnd, TRUE);
                return(0);

/*
             * CLEAR BUTTON - Clear the entry fields and the listbox selection
             */
            case DID_EXECUTE_CLEAR: /*--------------------------------------*/
                WinSendDlgItemMsg(hwnd, DID_EXECUTE_ADSLIST, LM_SELECTITEM,
                                            (MPARAM)LIT_NONE, 0L);
                WinSetDlgItemText(hwnd, DID_EXECUTE_PROGNAME, "");
                WinSetDlgItemText(hwnd, DID_EXECUTE_PROGFILE, "");
                SetPushButtons(hwnd, EXECUTENUMBUTTONS, DID_EXECUTE_INSERT,
                        usPushButtons);
                WinSetFocus(HWND_DESKTOP,
                        WinWindowFromID(hwnd, DID_EXECUTE_PROGNAME));
                WinEnableWindow(WinWindowFromID(hwnd, DID_EXECUTE_DELETE), FALSE);
                return(0);

/*
             * INSERT BUTTON - Get data from the entry fields and insert
             * a new record.
             */
            case DID_EXECUTE_INSERT: /*-------------------------------------*/
                if (!WinQueryDlgItemText(hwnd, DID_EXECUTE_PROGNAME,
                                            EXECUTENAMELENGTH, ProgramName))
```

-53-

```
      return(0);
   if (!WinQueryDlgItemText(hwnd, DID_EXECUTE_PROGFILE,
                                  EXECUTEFILELENGTH, FileName))
      return(0);

WinSetPointer(HWND_DESKTOP,
         WinQuerySysPointer(HWND_DESKTOP, SPTR_WAIT, TRUE));

safe_dbfcmd(dbproc,
      " INSERT into SSAvailProgramTable"
      " VALUES (\"%s\", \"%s\")",
        ProgramName,
        FileName);

if (dbsqlexec(dbproc))
   {
      dbcanquery(dbproc);
      while (dbresults(dbproc) != NO_MORE_RESULTS)
         dbcanquery(dbproc);
      WinSetDlgItemText(hwnd, DID_EXECUTE_PROGNAME, "");
      WinSetDlgItemText(hwnd, DID_EXECUTE_PROGFILE, "");
      LoadListBox(hwnd, DID_EXECUTE_ADSLIST, (PSZ)NULL,
            (PSZ)NULL, 0);

SetPushButtons(hwnd, EXECUTENUMBUTTONS, DID_EXECUTE_INSERT,
            usPushButtons);
      WinSetFocus(HWND_DESKTOP, WinWindowFromID(hwnd,
            DID_EXECUTE_PROGNAME));
      WinEnableWindow(WinWindowFromID(hwnd, DID_EXECUTE_DELETE),
            FALSE);

} /* if */
   else
   {
      ADSMsgBox(dbproc, ALRDY_EXST, NULL, ProgramName);
      dbcanquery(dbproc);
      while (dbresults(dbproc) != NO_MORE_RESULTS)
         dbcanquery(dbproc);
   }

WinSetPointer(HWND_DESKTOP,
         WinQuerySysPointer(HWND_DESKTOP, SPTR_ARROW, TRUE));
   return (0);

/*
 * DELETE BUTTON - Delete the current item but leave the
 * data in the entry field to allow an undo.
 */
case DID_EXECUTE_DELETE: /*---------------------------------------*/
   if (GetSelectedItemString( hwnd, DID_EXECUTE_ADSLIST,
                              abBuffer, EXECUTENAMELENGTH, TRUE) < 0)
      return(0);

WinSetPointer(HWND_DESKTOP,
         WinQuerySysPointer(HWND_DESKTOP, SPTR_WAIT, FALSE));

safe_dbfcmd(dbproc,
      " DELETE SSAvailProgramTable"
      " WHERE ProgramName = \"%s\"",
        abBuffer);

dbsqlexec(dbproc);
   dbcanquery(dbproc);
   while (dbresults(dbproc) != NO_MORE_RESULTS)
      dbcanquery(dbproc);
   WinSetDlgItemText(hwnd, DID_EXECUTE_PROGNAME, "");
```

```
              WinSetDlgItemText(hwnd, DID_EXECUTE_PROGFILE, "");
              LoadListBox(hwnd, DID_EXECUTE_ADSLIST, (PSZ)NULL, (PSZ)NULL, 0);

SetPushButtons(hwnd, EXECUTENUMBUTTONS, DID_EXECUTE_INSERT,
                   usPushButtons);
              WinSetFocus(HWND_DESKTOP, WinWindowFromID(hwnd,
                   DID_EXECUTE_PROGNAME));
              WinEnableWindow(WinWindowFromID(hwnd, DID_EXECUTE_DELETE),
                   FALSE);

WinSetPointer(HWND_DESKTOP,
                    WinQuerySysPointer(HWND_DESKTOP, SPTR_ARROW, FALSE));
              return (0);
         } /* switch */
         break;
    } /* switch */
    return WinDefDlgProc(hwnd, msg, mp1, mp2);
} /* ExecuteDlgProc */

/*----------------------------------------------------------------------*/
/* dpMachine - Maintain SSMachineTable and SSGrpMachineTable (jdb)      */
/*----------------------------------------------------------------------*/
typedef struct _MACHINEDATA{               /* for use with dpMachine,   */
    CHAR   achMachineName[15+1];           /* and dpMachineDetail.      */
    CHAR   achMachineDescr[80+1];
    USHORT usMaxJobs;
}MACHINEDATA, *PMACHINEDATA;

MRESULT EXPENTRY dpMachine(HWND hwnd, USHORT msg, MPARAM mp1, MPARAM mp2){ define ACHBIND(n,a) dbbind(dbproc,n,NTBSTRINGBIND,sizeof(a),a)
    #define SHORTBIND(n,a) dbbind(dbproc,n,SMALLBIND,2,(PBYTE)&a)

define MACHINELISTBUFSIZE 15+1+80+1 define UM_FILLMACHINELIST WM_USER

/*----------------------------------------------------------------*/
    /* Multi-Column Listbox stuff                                     */
    /*----------------------------------------------------------------*/
    #define HEADER_TOP        "Workstation\tWorkstation"
    #define HEADER_BOTTOM     "Name\tDescription"
    #define NUMBER_OF_COLUMNS 2
    static ULONG alColWidth[NUMBER_OF_COLUMNS];

switch(msg){
       case WM_INITDLG: /*----------------------------------------------*/
           WinSendMsg(hwnd, UM_FILLMACHINELIST, 0, 0);
           WinSetFocus(HWND_DESKTOP, WinWindowFromID(hwnd, IDD_MACHINES_LIST));
       break;

case UM_FILLMACHINELIST:{ /*----------------------------------------*/
           MACHINEDATA mdata;
           CHAR    buffer[MACHINELISTBUFSIZE];
           RETCODE rc;

WinSendDlgItemMsg(hwnd, IDD_MACHINES_LIST, LM_DELETEALL, 0, 0);

WinSendDlgItemMsg(hwnd, IDD_MACHINES_LIST,
               LM_INSERTITEM, MPFROMSHORT(LIT_END),
               MPFROMP("<NEW>\tDefine a new workstation"));

dbcmd(dbproc,
             " SELECT"
             "    MachineName,"
```

```
"     MachineDescr,"
"     MaxJobs"
" FROM SSMachineTable"
" ORDER BY MachineName");
dbsqlexec(dbproc);
while((rc=dbresults(dbproc)) != NO_MORE_RESULTS){
    if(rc==SUCCEED){
        ACHBIND(1,mdata.achMachineName);
        ACHBIND(2,mdata.achMachineDescr);
        SHORTBIND(3,mdata.usMaxJobs);

while(dbnextrow(dbproc)!=NO_MORE_ROWS){
            HWND    hwndList;
            USHORT  index;

hwndList = WinWindowFromID(hwnd,
                IDD_MACHINES_LIST);
            strcpy(buffer, mdata.achMachineName);
            strcat(buffer, "\t");
            strcat(buffer, mdata.achMachineDescr);
            index = SHORT1FROMMR(WinSendMsg(hwndList,
                LM_INSERTITEM, MPFROMSHORT(LIT_END),
                MPFROMP(buffer)));
            WinSendMsg(hwndList, LM_SETITEMHANDLE,
                MPFROMSHORT(index),
                MPFROMSHORT(mdata.usMaxJobs));
        } /* while */
    } /* if */
} /* while */
WinEnableWindow(WinWindowFromID(hwnd,
    IDD_MACHINES_MODIFY), FALSE);
WinEnableWindow(WinWindowFromID(hwnd,
    IDD_MACHINES_DELETE), FALSE);
} break;

case WM_CONTROL: /*------------------------------------------------*/
    switch(SHORT1FROMMP(mp1)){
        case IDD_MACHINES_LIST: /*--------------------------------*/
            switch(SHORT2FROMMP(mp1)){
                case LN_SELECT:{ /*-------------------------------*/
                    USHORT  index;
                    BOOL    bModify, bDelete, bDefault;
                    HWND    hwndList;

hwndList = WinWindowFromID(hwnd,
                        IDD_MACHINES_LIST);
                    if ((index=SHORT1FROMMR(WinSendMsg( hwndList,
                            LM_QUERYSELECTION, MPFROMSHORT(LIT_FIRST),
                            0) )) != LIT_NONE)
                    {
                        if (SHORT1FROMMR( WinSendMsg( hwndList,
                                LM_QUERYSELECTION, MPFROMSHORT(index),
                                0) ) != LIT_NONE)
                        {                      /* 2 items or more */
                            bModify = FALSE;
                            bDelete = TRUE;
                            bDefault = IDD_MACHINES_DELETE;
                        } /* if */
                        else
                        {                      /* 1 item selected */
                            bModify = TRUE;
                            bDelete = TRUE;
                            bDefault = IDD_MACHINES_MODIFY;
                        } /* else */
                    } /* if */
                    else
```

-56-

```
                        {                       /* No item selected */
                            bModify = FALSE;
                            bDelete = FALSE;
                            bDefault = IDD_MACHINES_LIST;
                        } /* else */

WinEnableWindow(WinWindowFromID(hwnd,
                                IDD_MACHINES_MODIFY), bModify);
                        WinEnableWindow(WinWindowFromID(hwnd,
                                IDD_MACHINES_DELETE), bDelete);
                        WinSendMsg(WinWindowFromID(hwnd, bDefault),
                                BM_SETDEFAULT, (MPARAM)TRUE, NULL);
                    } break;

case LN_ENTER: /*----------------------------------*/
                        WinSendDlgItemMsg(hwnd, IDD_MACHINES_MODIFY,
                                BM_CLICK, 0, 0);
                        break;

} /* switch */
            break;
        } /* switch */
    break;

case WM_COMMAND: /*------------------------------------------------*/
        switch(SHORT1FROMMP(mp1)){
            case IDD_MACHINES_MODIFY:{ /*------------------------------*/
                MACHINEDATA Mdat;
                USHORT  index, i;
                HWND    hwndList;
                CHAR    buffer[MACHINELISTBUFSIZE];

hwndList = WinWindowFromID(hwnd, IDD_MACHINES_LIST);

index = SHORT1FROMMR( WinSendMsg(hwndList,
                        LM_QUERYSELECTION, MPFROMSHORT(LIT_FIRST), 0));
                WinSendMsg(hwndList, LM_QUERYITEMTEXT, MPFROM2SHORT(index,
                        MACHINELISTBUFSIZE), MPFROMP(buffer));

for(i=0; buffer[i]!='\t'; i++); /* Find TAB in buffer  */
                buffer[i++]=0;                  /* Terminate at TAB    */
                strcpy(Mdat.achMachineName, buffer);
                strcpy(Mdat.achMachineDescr, buffer+i);
                Mdat.usMaxJobs = SHORT1FROMMR( WinSendMsg(hwndList,
                        LM_QUERYITEMHANDLE, MPFROMSHORT(index), 0));

if (index == 0)
                    Mdat.achMachineName[0] = 0;
                if (WinDlgBox(HWND_DESKTOP, hwnd, (PFNWP)dpWSDetail,
                        (HMODULE)NULL, IDD_WS_DETAILS, &Mdat) ==
                        DID_WSDETAIL_COMMIT)
                    WinSendMsg(hwnd, UM_FILLMACHINELIST, 0, 0);
                else
                    WinSendMsg(hwndList, LM_SELECTITEM, MPFROMSHORT(index),
                            MPFROMSHORT(FALSE));

WinSetFocus(HWND_DESKTOP, hwndList);

return 0;
            } break;

case IDD_MACHINES_DELETE: /*-------------------------------*/
                if(WinMessageBox(HWND_DESKTOP, hwnd, "Are you sure "
                        "you want to delete marked workstations? Press "
                        "'Yes' to commit this change.", "Commit?", 1,
                        MB_YESNO | MB_ICONEXCLAMATION) == MBID_YES)
```

```
            {
                USHORT  index, i;
                HWND    hwndList;
                CHAR    buffer[MACHINELISTBUFSIZE];

hwndList = WinWindowFromID(hwnd, IDD_MACHINES_LIST);

index = SHORT1FROMMR( WinSendMsg(hwndList,
                    LM_QUERYSELECTION, MPFROMSHORT(LIT_FIRST), 0) );
                while(index != LIT_NONE){
                    WinSendMsg(hwndList, LM_QUERYITEMTEXT,
                        MPFROM2SHORT(index, MACHINELISTBUFSIZE),
                        MPFROMP(buffer));
                    for(i=0; buffer[i]!='\t'; i++);
                    buffer[i++]=0;

dbfcmd(dbproc,
                        " DELETE SSMachineTable"
                        " WHERE MachineName = \"%s\"",
                        buffer);
                    dbsqlexec(dbproc);
                    while(dbresults(dbproc) != NO_MORE_RESULTS);
                    index = SHORT1FROMMR( WinSendMsg(hwndList,
                        LM_QUERYSELECTION, MPFROMSHORT(index), 0));
                } /* while */
                WinSendMsg(hwnd, UM_FILLMACHINELIST, 0, 0);
                WinSetFocus(HWND_DESKTOP, hwndList);
                return 0;
            } /* if */
            break;

} /* switch */
        break;

/*------------------------------------------------------------------*/
    /* Multi-Column Listbox stuff                                       */
    /*------------------------------------------------------------------*/
    case WM_MEASUREITEM: /*-------------------------------------------*/
        return (MRFROMLONG(ADSLBMeasure(hwnd, IDD_MACHINES_LIST,
            SHORT1FROMMP(mp2), alColWidth, NUMBER_OF_COLUMNS,
            IDD_MACHINES_LISTHEADER, HEADER_TOP, HEADER_BOTTOM)));
        return(0);
        break;

case WM_DRAWITEM: /*----------------------------------------------*/
        ADSLBDraw(hwnd, IDD_MACHINES_LIST,
            (POWNERITEM)PVOIDFROMMP(mp2), alColWidth,
            NUMBER_OF_COLUMNS, IDD_MACHINES_LISTHEADER, FALSE);
        return (MRFROMSHORT(TRUE));
        break;

} /* switch */
    return WinDefDlgProc(hwnd, msg, mp1, mp2);
    #undef MACHINELISTBUFSIZE
    #undef HEADER_TOP
    #undef HEADER_BOTTOM
    #undef NUMBER_OF_COLUMNS
} /* dpMachine */

/*--------------------------------------------------------------------*/
/* dpWSDetail - Workstation Details (jdb)                             */
/*--------------------------------------------------------------------*/
MRESULT EXPENTRY dpWSDetail(HWND hwnd, USHORT msg, MPARAM mp1, MPARAM mp2){ define GROUPLISTBUFSIZE 3+1+25+1+80+1
```

-58-

```
#define UM_SETBUTTONSTATES WM_USER

/*------------------------------------------------------------------*/
/* Multi-Column Listbox stuff                                       */
/*------------------------------------------------------------------*/
#define HEADER_TOP          "Group\tGroup\tGroup"
#define HEADER_BOTTOM       "Member\tName\tDescription"
#define NUMBER_OF_COLUMNS   3
static ULONG alColWidth[NUMBER_OF_COLUMNS];

switch(msg){
    case WM_INITDLG:{ /*----------------------------------------*/
        PMACHINEDATA pMdat;
        CHAR    achMember[3+1];
        CHAR    achGrpName[25+1];
        CHAR    achGrpDescr[80+1];
        CHAR    buffer[GROUPLISTBUFSIZE];
        HWND    hwndList;

hwndList = WinWindowFromID(hwnd, DID_WSDETAIL_GROUPLIST);
        WinSendMsg(hwndList, LM_INSERTITEM, MPFROMSHORT(LIT_FIRST),
            MPFROMP("<No Groups defined>"));
        WinEnableWindow(hwndList, FALSE);

WinSendDlgItemMsg(hwnd, DID_WSDETAIL_MACHINENAME,
            EM_SETTEXTLIMIT, MPFROMSHORT(15), 0);
        WinSendDlgItemMsg(hwnd, DID_WSDETAIL_DESCRIPTION,
            EM_SETTEXTLIMIT, MPFROMSHORT(80), 0);
        WinSendDlgItemMsg(hwnd, DID_WSDETAIL_MAXJOBS,
            EM_SETTEXTLIMIT, MPFROMSHORT(3), 0);

pMdat = (PMACHINEDATA)PVOIDFROMMP(mp2);

#if 0
 Requires OS/2 2.0
        WinSendDlgItemMsg(hwnd, DID_WSDETAIL_MAXJOBS, SPBM_SETLIMITS,
            MPFROMLONG(100L), MPFROMLONG(0L));
endif if(pMdat->achMachineName[0]){
            WinSetDlgItemText(hwnd, DID_WSDETAIL_MACHINENAME,
                pMdat->achMachineName);
            WinEnableWindow(WinWindowFromID(hwnd,
                DID_WSDETAIL_MACHINENAME), FALSE);
            WinSetDlgItemText(hwnd, DID_WSDETAIL_DESCRIPTION,
                pMdat->achMachineDescr);
#if 0
 Requires OS/2 2.0
            WinSendDlgItemMsg(hwnd, DID_WSDETAIL_MAXJOBS,
                SPBM_SETCURRENTVALUE, MPFROMSHORT(pMdat->usMaxJobs),
                0);
#endif
            WinSetDlgItemShort(hwnd, DID_WSDETAIL_MAXJOBS,
                pMdat->usMaxJobs, FALSE);
        } /* if */ dbfcmd(dbproc,
            " CREATE TABLE #batchtemp("
            "    Member      char(3),"
            "    GrpName     char(25),"
            "    GrpDescr    char(80)"
            " )"

" INSERT INTO #batchtemp"
            " SELECT"
            "    'No',"
```

-59-

```
"     GrpName,"
"     GrpDescr"
" FROM SSGrpTable"

" UPDATE #batchtemp"
" SET"
"     a.Member = 'Yes'"
" FROM #batchtemp a, SSGrpMachineTable b"
" WHERE a.GrpName = b.GrpName"
"   AND b.MachineName = \"%s\""

" SELECT"
"     Member,"
"     GrpName,"
"     GrpDescr"
" FROM #batchtemp"
" ORDER BY GrpName"

" DROP TABLE #batchtemp", pMdat->achMachineName);

dbsqlexec(dbproc);
if((dbresults(dbproc) == SUCCEED)       /* create */
&& (dbresults(dbproc) == SUCCEED)       /* insert */
&& (dbresults(dbproc) == SUCCEED)       /* update */
&& ((dbresults(dbproc)) == SUCCEED)){   /* select */
    ACHBIND(1,achMember);
    ACHBIND(2,achGrpName);
    ACHBIND(3,achGrpDescr);

while(dbnextrow(dbproc) != NO_MORE_ROWS){
        if(!WinIsWindowEnabled(hwndList)){
            WinEnableWindow(hwndList, TRUE);
            WinSendMsg(hwndList, LM_DELETEALL, 0, 0);
        } /* if */
        strcpy(buffer, achMember);
        if(buffer[0]=='N') strcat(buffer, " ");
        strcat(buffer, "\t");
        strcat(buffer, achGrpName);
        strcat(buffer, "\t");
        strcat(buffer, achGrpDescr);
        WinSendMsg(hwndList, LM_INSERTITEM,
            MPFROMSHORT(LIT_END), MPFROMP(buffer));
    } /* while */
} /* if */
while(dbresults(dbproc)!= NO_MORE_RESULTS);

WinEnableWindow(WinWindowFromID(hwnd, DID_WSDETAIL_COMMIT),
    FALSE);
WinSetWindowPtr(hwnd, QWL_USER, pMdat); /* Store Buffer address */ if(!WinIsWindowEnabled(WinWindowFromID(hwnd,
DID_WSDETAIL_MACHINENAME))) {
    WinSetFocus(HWND_DESKTOP, WinWindowFromID(hwnd,
        DID_WSDETAIL_DESCRIPTION));
    return MRFROMSHORT(TRUE);
} /* if */
} break;

case UM_SETBUTTONSTATES: /*----------------------------------------*/
    if( WinQueryWindowTextLength(
            WinWindowFromID( hwnd,
            DID_WSDETAIL_MACHINENAME))
        && WinQueryWindowTextLength(
            WinWindowFromID( hwnd,
            DID_WSDETAIL_DESCRIPTION))
    ){
```

-60-

```
            WinEnableWindow(WinWindowFromID(hwnd,
                DID_WSDETAIL_COMMIT), TRUE);
        } /* if */
        else{
            WinEnableWindow(WinWindowFromID(hwnd,
                DID_WSDETAIL_COMMIT), FALSE);
        } /* else */
    break;

case WM_CONTROL: /*-------------------------------------------------*/
        switch(SHORT1FROMMP(mp1)){
            case DID_WSDETAIL_GROUPLIST: /*----------------------------*/
                switch(SHORT2FROMMP(mp1)){
                    case LM_SELECT:{ /*-----------------------------------*/
                        CHAR    buffer[GROUPLISTBUFSIZE];
                        HWND    hwndList;
                        USHORT  index;

WinSendMsg(hwnd, UM_SETBUTTONSTATES, 0, 0);
                        hwndList = WinWindowFromID(hwnd,
                            DID_WSDETAIL_GROUPLIST);
                        WinEnableWindowUpdate(hwndList, FALSE);
                        index = SHORT1FROMMR( WinSendMsg(hwndList,
                            LM_QUERYSELECTION,
                            MPFROMSHORT(LIT_FIRST), 0) );
                        WinSendMsg(hwndList, LM_QUERYITEMTEXT,
                            MPFROM2SHORT(index,GROUPLISTBUFSIZE),
                            MPFROMP(buffer));
                        if(buffer[0]=='Y') memcpy(buffer, "No ", 3);
                        else memcpy(buffer, "Yes", 3);
                        WinSendMsg(hwndList, LM_SETITEMTEXT,
                            MPFROMSHORT(index),
                            MPFROMP(buffer));
                        WinSendMsg(hwndList, LM_SELECTITEM,
                            MPFROMSHORT(index),
                            MPFROMSHORT(FALSE));
                        WinEnableWindowUpdate(hwndList, TRUE);
                    } break;
                } /* switch */
            break;

case DID_WSDETAIL_MACHINENAME: /*--------------------------*/
            case DID_WSDETAIL_DESCRIPTION: /*--------------------------*/
            case DID_WSDETAIL_MAXJOBS: /*------------------------------*/
                switch(SHORT2FROMMP(mp1)){
                    case EN_CHANGE: /*---------------------------------*/
#if 0
 Requires OS/2 2.0
                    case SPBN_CHANGE: /*-------------------------------*/
#endif
                        WinSendMsg(hwnd, UM_SETBUTTONSTATES, 0, 0);
                    break;
                } /* switch */
            break;
        } /* switch */
    break;

case WM_COMMAND: /*-------------------------------------------------*/
        switch(SHORT1FROMMP(mp1)){
            case DID_WSDETAIL_COMMIT:{ /*------------------------------*/
                PMACHINEDATA pMdat;
                CHAR    buffer[GROUPLISTBUFSIZE];
                HWND    hwndList;
                INT     i, iCount, index;

pMdat = WinQueryWindowPtr(hwnd, QWL_USER);
```

-61-

```
                        WinQueryDlgItemText(hwnd, DID_WSDETAIL_MACHINENAME,
                            sizeof(pMdat->achMachineName), pMdat->achMachineName);
                        WinQueryDlgItemText(hwnd, DID_WSDETAIL_DESCRIPTION,
                            sizeof(pMdat->achMachineDescr),
                            pMdat->achMachineDescr);
#if 0
 Requires OS/2 2.0
                        WinSendDlgItemMsg(hwnd, DID_WSDETAIL_MAXJOBS,
                            SPBM_QUERYVALUE, MPFROMP(&ulTemp), 0);
#endif
                        WinQueryDlgItemShort(hwnd, DID_WSDETAIL_MAXJOBS,
                            &pMdat->usMaxJobs, FALSE);

/*----------------------------------------------------*/
                        /* Insert or Update rows in SSMachineTable            */
                        /*----------------------------------------------------*/
                        if(WinIsWindowEnabled(WinWindowFromID(hwnd,
                            DID_WSDETAIL_MACHINENAME))){
                            safe_dbfcmd(dbproc,
                                " INSERT INTO SSMachineTable("
                                "     MachineName,"
                                "     MachineDescr,"
                                "     MaxJobs,"
                                "     JobCnt"
                                " )"
                                " VALUES("
                                "     \"%s\","
                                "     \"%s\","
                                "     %d,"
                                "     0"
                                " )",
                                pMdat->achMachineName,
                                pMdat->achMachineDescr,
                                pMdat->usMaxJobs);
                        } /* if */
                        else{
                            safe_dbfcmd(dbproc,
                                " UPDATE SSMachineTable"
                                " SET"
                                "     MachineDescr = \"%s\","
                                "     MaxJobs = %d"
                                " WHERE MachineName = \"%s\"",
                                pMdat->achMachineDescr,
                                pMdat->usMaxJobs,
                                pMdat->achMachineName);
                        } /* else */
                        dbsqlexec(dbproc);
                        while(dbresults(dbproc) != NO_MORE_RESULTS);

/*----------------------------------------------------*/
                        /* Make coresponding changes to SSGrpMachineTable     */
                        /*----------------------------------------------------*/
                        hwndList = WinWindowFromID(hwnd, DID_WSDETAIL_GROUPLIST);
                        iCount = SHORT1FROMMR(WinSendMsg(hwndList,
                            LM_QUERYITEMCOUNT, 0, 0));
                        for(index=0; index<iCount; index++){
                            WinSendMsg(hwndList, LM_QUERYITEMTEXT,
                                MPFROM2SHORT(index, GROUPLISTBUFSIZE),
                                MPFROMP(buffer));
                            for(i=4; buffer[i]!='\t'; i++);
                            buffer[i]=0;
                            if(buffer[0]=='Y'){
                                dbfcmd(dbproc,
                                    " INSERT INTO SSGrpMachineTable"
                                    "     (GrpName, MachineName)"
                                    " VALUES(\"%s\", \"%s\")",
```

```
                                    buffer+4, pMdat->achMachineName);
                        } /* if */
                        else{
                            dbfcmd(dbproc,
                                " DELETE SSGrpMachineTable"
                                " WHERE GrpName = \"%s\""
                                "   AND MachineName = \"%s\"",
                                buffer+4, pMdat->achMachineName);
                        } /* else */
                        dbsqlexec(dbproc);
                        while(dbresults(dbproc) != NO_MORE_RESULTS);
                    } /* for */

} break;
            } /* switch */
        break;

/*-----------------------------------------------------------*/
        /* Multi-Column Listbox stuff                                */
        /*-----------------------------------------------------------*/
        case WM_MEASUREITEM:{ /*-------------------------------------*/
            MRESULT mr;

alColWidth[0]=0;
            mr = MRFROMLONG(ADSLBMeasure(hwnd,
                    DID_WSDETAIL_GROUPLIST, SHORT1FROMMP(mp2), alColWidth,
                    NUMBER_OF_COLUMNS, DID_WSDETAIL_GROUPLISTHEADER,
                    HEADER_TOP, HEADER_BOTTOM));
            return(mr);
        } break;

case WM_DRAWITEM: /*-----------------------------------------*/
            ADSLBDraw(hwnd, DID_WSDETAIL_GROUPLIST,
                    (POWNERITEM)PVOIDFROMMP(mp2), alColWidth,
                    NUMBER_OF_COLUMNS, DID_WSDETAIL_GROUPLISTHEADER, FALSE);
            return (MRFROMSHORT(TRUE));
        break;

} /* switch */
    return WinDefDlgProc(hwnd, msg, mp1, mp2);
    #undef GROUPLISTBUFSIZE
    #undef HEADER_TOP
    #undef HEADER_BOTTOM
    #undef NUMBER_OF_COLUMNS
} /* dpWSDetail */

/*-------------------------------------------------------------------*/
/* dpGroup - Maintain SSGrpTable and SSGrpMachineTable (jdb)         */
/*-------------------------------------------------------------------*/
typedef struct _GROUPDATA{              /* for use with dpGroup,     */
    CHAR    achGroupName[25+1];         /* and dpGroupDetail.        */
    CHAR    achGroupDescr[80+1];
}GROUPDATA, *PGROUPDATA;

MRESULT EXPENTRY dpGroup(HWND hwnd, USHORT msg, MPARAM mp1, MPARAM mp2){ define GROUPLISTBUFSIZE 25+1+80+1 define UM_FILLGROUPLIST WM_USER

/*---------------------------------------------------------------*/
    /* Multi-Column Listbox stuff                                    */
    /*---------------------------------------------------------------*/
    #define HEADER_TOP      "Group\tGroup"
    #define HEADER_BOTTOM   "Name\tDescription"
```

```
#define NUMBER_OF_COLUMNS   2
static ULONG alColWidth[NUMBER_OF_COLUMNS];

switch(msg){
    case WM_INITDLG: /*-------------------------------------------------*/
        WinSendMsg(hwnd, UM_FILLGROUPLIST, 0, 0);
        WinSetFocus(HWND_DESKTOP, WinWindowFromID(hwnd, IDD_GROUPS_LIST));
    break;

case UM_FILLGROUPLIST:{ /*----------------------------------------*/
        GROUPDATA gdata;
        CHAR    buffer[GROUPLISTBUFSIZE];
        RETCODE rc;

WinSendDlgItemMsg(hwnd, IDD_GROUPS_LIST, LM_DELETEALL, 0, 0);

WinSendDlgItemMsg(hwnd, IDD_GROUPS_LIST,
            LM_INSERTITEM, MPFROMSHORT(LIT_END),
            MPFROMP("<NEW>\tDefine a new group"));

dbcmd(dbproc,
            " SELECT"
            "    GrpName,"
            "    GrpDescr"
            " FROM SSGrpTable"
            " ORDER BY GrpName");
        dbsqlexec(dbproc);
        while((rc=dbresults(dbproc)) != NO_MORE_RESULTS){
            if(rc==SUCCEED){
                ACHBIND(1,gdata.achGroupName);
                ACHBIND(2,gdata.achGroupDescr);

while(dbnextrow(dbproc)!=NO_MORE_ROWS){
                    HWND    hwndList;
                    USHORT  index;

hwndList = WinWindowFromID(hwnd,
                        IDD_GROUPS_LIST);
                    strcpy(buffer, gdata.achGroupName);
                    strcat(buffer, "\t");
                    strcat(buffer, gdata.achGroupDescr);
                    index = SHORT1FROMMR(WinSendMsg(hwndList,
                        LM_INSERTITEM, MPFROMSHORT(LIT_END),
                        MPFROMP(buffer)));
                } /* while */
            } /* if */
        } /* while */
        WinEnableWindow(WinWindowFromID(hwnd,
            IDD_GROUPS_MODIFY), FALSE);
        WinEnableWindow(WinWindowFromID(hwnd,
            IDD_GROUPS_DELETE), FALSE);
    } break;

case WM_CONTROL: /*-----------------------------------------------*/
        switch(SHORT1FROMMP(mp1)){
            case IDD_GROUPS_LIST: /*---------------------------------*/
                switch(SHORT2FROMMP(mp1)){
                    case LN_SELECT:{ /*------------------------------*/
                        USHORT  index;
                        BOOL    bModify, bDelete, bDefault;
                        HWND    hwndList;

hwndList = WinWindowFromID(hwnd,
                            IDD_GROUPS_LIST);
                        if ((index = SHORT1FROMMR(WinSendMsg(hwndList,
                            LM_QUERYSELECTION, MPFROMSHORT(LIT_FIRST),
```

-64-

```
                        0))) != LIT_NONE)
            {
                if (SHORT1FROMMR(WinSendMsg(hwndList,
                        LM_QUERYSELECTION, MPFROMSHORT(index),
                        0)) != LIT_NONE)
                {                       /* 2 items or more  */
                    bModify = FALSE;
                    bDelete = TRUE;
                    bDefault = IDD_GROUPS_DELETE;
                } /* if */
                else
                {                       /* 1 item selected  */
                    bModify = TRUE;
                    bDelete = TRUE;
                    bDefault = IDD_GROUPS_MODIFY;
                } /* else */
            } /* if */
            else
            {                           /* No item selected */
                bModify = FALSE;
                bDelete = FALSE;
                bDefault = IDD_GROUPS_LIST;
            } /* else */

WinEnableWindow(WinWindowFromID(hwnd,
                    IDD_GROUPS_MODIFY), bModify);
            WinEnableWindow(WinWindowFromID(hwnd,
                    IDD_GROUPS_DELETE), bDelete);
            WinSendMsg(WinWindowFromID(hwnd, bDefault),
                    BM_SETDEFAULT, (MPARAM)TRUE, NULL);
            } break;

case LN_ENTER: /*------------------------------------*/
                WinSendDlgItemMsg(hwnd, IDD_GROUPS_MODIFY,
                    BM_CLICK, 0, 0);
                break;

} /* switch */
        break;
    } /* switch */
    break;

case WM_COMMAND: /*--------------------------------------------------*/
    switch(SHORT1FROMMP(mp1)){
        case IDD_GROUPS_MODIFY:{ /*--------------------------------*/
            GROUPDATA Gdat;
            USHORT    index, i;
            HWND      hwndList;
            CHAR      buffer[GROUPLISTBUFSIZE];

hwndList = WinWindowFromID(hwnd, IDD_GROUPS_LIST);

index = SHORT1FROMMR( WinSendMsg(hwndList,
                    LM_QUERYSELECTION, MPFROMSHORT(LIT_FIRST), 0) );
            WinSendMsg(hwndList, LM_QUERYITEMTEXT, MPFROM2SHORT(index,
                    GROUPLISTBUFSIZE), MPFROMP(buffer));

for(i=0; buffer[i]!='\t'; i++); /* Find TAB in buffer   */
            buffer[i++]=0;                  /* Terminate at TAB     */
            strcpy(Gdat.achGroupName, buffer);
            strcpy(Gdat.achGroupDescr, buffer+i);

if (index == 0)
                Gdat.achGroupName[0] = 0;
            if ((WinDlgBox(HWND_DESKTOP, hwnd, (PFNWP)dpGroupDetail,
                    (HMODULE)NULL, IDD_GRP_DETAILS, &Gdat) ==
```

```
                    DID_GRPDETAIL_COMMIT)
                WinSendMsg(hwnd, UM_FILLGROUPLIST, 0, 0);
            else
                WinSendMsg(hwndList, LM_SELECTITEM, MPFROMSHORT(index),
                    MPFROMSHORT(FALSE));

WinSetFocus(HWND_DESKTOP, hwndList);

return 0;
        } break;

case IDD_GROUPS_DELETE: /*--------------------------------*/
            if(WinMessageBox(HWND_DESKTOP, hwnd, "Are you sure "
                "you want to delete marked groups?  Press "
                "'Yes' to commit this change.", "Commit?", 1,
                MB_YESNO | MB_ICONEXCLAMATION) == MBID_YES){
                USHORT  index, i;
                HWND    hwndList;
                CHAR    buffer[GROUPLISTBUFSIZE];

hwndList = WinWindowFromID(hwnd, IDD_GROUPS_LIST);

index = SHORT1FROMMR( WinSendMsg(hwndList,
                    LM_QUERYSELECTION, MPFROMSHORT(LIT_FIRST), 0) );
                while(index != LIT_NONE){
                    WinSendMsg(hwndList, LM_QUERYITEMTEXT,
                        MPFROM2SHORT(index, GROUPLISTBUFSIZE),
                        MPFROMP(buffer));
                    for(i=0; buffer[i]!='\t'; i++);
                    buffer[i++]=0;

dbfcmd(dbproc,
                        " DELETE SSGrpTable"
                        " WHERE GrpName = \"%s\"",
                        buffer);
                    dbsqlexec(dbproc);
                    while(dbresults(dbproc) != NO_MORE_RESULTS);
                    index = SHORT1FROMMR( WinSendMsg(hwndList,
                        LM_QUERYSELECTION, MPFROMSHORT(index), 0));
                } /* while */
                WinSendMsg(hwnd, UM_FILLGROUPLIST, 0, 0);
                WinSetFocus(HWND_DESKTOP, hwndList);
                return 0;
            } /* if */
        break;

} /* switch */
break;

/*------------------------------------------------------------------*/
/* Multi-Column Listbox stuff                                       */
/*------------------------------------------------------------------*/
case WM_MEASUREITEM: /*--------------------------------------------*/
    return (MRFROMLONG(ADSLBMeasure(hwnd, IDD_GROUPS_LIST,
        SHORT1FROMMP(mp2), alColWidth, NUMBER_OF_COLUMNS,
        IDD_GROUPS_LISTHEADER, HEADER_TOP, HEADER_BOTTOM)));
    return(0);
break;

case WM_DRAWITEM: /*-----------------------------------------------*/
    ADSLBDraw(hwnd, IDD_GROUPS_LIST,
        (POWNERITEM)PVOIDFROMMP(mp2), alColWidth,
        NUMBER_OF_COLUMNS, IDD_GROUPS_LISTHEADER, FALSE);
    return (MRFROMSHORT(TRUE));
break;
```

```
        } /* switch */
        return WinDefDlgProc(hwnd, msg, mp1, mp2);
        #undef GROUPLISTBUFSIZE
        #undef HEADER_TOP
        #undef HEADER_BOTTOM
        #undef NUMBER_OF_COLUMNS
} /* dpGroup */

/*---------------------------------------------------------------------------*/
/* dpGroupDetail - Group details (jdb)                                       */
/*---------------------------------------------------------------------------*/
MRESULT EXPENTRY dpGroupDetail(HWND hwnd, USHORT msg, MPARAM mp1, MPARAM mp2){ define MACHINELISTBUFSIZE 3+1+15+1+80+1

/*-----------------------------------------------------------------------*/
    /* Multi-Column Listbox stuff                                            */
    /*-----------------------------------------------------------------------*/
    #define HEADER_TOP         "Workstation\tWorkstation\tWorkstation"
    #define HEADER_BOTTOM      "Member\tName\tDescription"
    #define NUMBER_OF_COLUMNS  3
    static ULONG alColWidth[NUMBER_OF_COLUMNS];

switch(msg){
        case WM_INITDLG:{ /*----------------------------------------------*/
            PGROUPDATA pGdat;
            CHAR    achMember[3+1];
            CHAR    achMachineName[15+1];
            CHAR    achMachineDescr[80+1];
            CHAR    buffer[MACHINELISTBUFSIZE];
            HWND    hwndList;

alColWidth[0]=0;

hwndList = WinWindowFromID(hwnd, DID_GRPDETAIL_MACHINELIST);
            WinSendMsg(hwndList, LM_INSERTITEM, MPFROMSHORT(LIT_FIRST),
                MPFROMP("<No Workstations defined>"));
            WinEnableWindow(hwndList, FALSE);

WinSendDlgItemMsg(hwnd, DID_GRPDETAIL_GROUPNAME,
                EM_SETTEXTLIMIT, MPFROMSHORT(25), 0);
            WinSendDlgItemMsg(hwnd, DID_GRPDETAIL_DESCRIPTION,
                EM_SETTEXTLIMIT, MPFROMSHORT(80), 0);

pGdat = (PGROUPDATA)PVOIDFROMMP(mp2);

if(pGdat->achGroupName[0]){
                WinSetDlgItemText(hwnd, DID_GRPDETAIL_GROUPNAME,
                    pGdat->achGroupName);
                WinEnableWindow(WinWindowFromID(hwnd,
                    DID_GRPDETAIL_GROUPNAME), FALSE);
                WinSetDlgItemText(hwnd, DID_GRPDETAIL_DESCRIPTION,
                    pGdat->achGroupDescr);
            } /* if */ dbfcmd(dbproc,
                " CREATE TABLE #batchtemp("
                "    Member          char(3),"
                "    MachineName     char(15),"
                "    MachineDescr    char(80)"
                " )"

" INSERT INTO #batchtemp"
                " SELECT"
                "    'No',"
```

```
"     MachineName,"
"     MachineDescr"
" FROM SSMachineTable"

" UPDATE #batchtemp"
" SET"
"     a.Member = 'Yes'"
" FROM #batchtemp a, SSGrpMachineTable b"
" WHERE a.MachineName = b.MachineName"
"    AND b.GrpName = \"%s\""

" SELECT"
"     Member,"
"     MachineName,"
"     MachineDescr"
" FROM #batchtemp"
" ORDER BY MachineName"

" DROP TABLE #batchtemp", pGdat->achGroupName);

dbsqlexec(dbproc);
if((dbresults(dbproc) == SUCCEED)        /* create */
&& (dbresults(dbproc) == SUCCEED)        /* insert */
&& (dbresults(dbproc) == SUCCEED)        /* update */
&& ((dbresults(dbproc)) == SUCCEED)){    /* select */
    ACHBIND(1,achMember);
    ACHBIND(2,achMachineName);
    ACHBIND(3,achMachineDescr);

while(dbnextrow(dbproc) != NO_MORE_ROWS){
        if(!WinIsWindowEnabled(hwndList)){
            WinEnableWindow(hwndList, TRUE);
            WinSendMsg(hwndList, LM_DELETEALL, 0, 0);
        } /* if */
        strcpy(buffer, achMember);
        if(buffer[0]=='N') strcat(buffer, " ");
        strcat(buffer, "\t");
        strcat(buffer, achMachineName);
        strcat(buffer, "\t");
        strcat(buffer, achMachineDescr);
        WinSendMsg(hwndList, LM_INSERTITEM,
            MPFROMSHORT(LIT_END), MPFROMP(buffer));
    } /* while */
} /* if */
while(dbresults(dbproc)!= NO_MORE_RESULTS);

WinEnableWindow(WinWindowFromID(hwnd, DID_GRPDETAIL_COMMIT),
    FALSE);
WinSetWindowPtr(hwnd, QWL_USER, pGdat); /* Store Buffer address */ if(!WinIsWindowEnabled(WinWindowFromID(hwnd,
DID_GRPDETAIL_GROUPNAME))){
    WinSetFocus(HWND_DESKTOP, WinWindowFromID(hwnd,
        DID_GRPDETAIL_DESCRIPTION));
    return MRFROMSHORT(TRUE);
} /* if */
} break;

case UM_SETBUTTONSTATES: /*-----------------------------------*/
    if( WinQueryWindowTextLength(
            WinWindowFromID( hwnd,
            DID_GRPDETAIL_GROUPNAME))
        && WinQueryWindowTextLength(
            WinWindowFromID( hwnd,
            DID_GRPDETAIL_DESCRIPTION))
    ){
```

```
            WinEnableWindow(WinWindowFromID(hwnd,
                DID_GRPDETAIL_COMMIT), TRUE);
        } /* if */
        else{
            WinEnableWindow(WinWindowFromID(hwnd,
                DID_GRPDETAIL_COMMIT), FALSE);
        } /* else */
    break;

case WM_CONTROL: /*---------------------------------------------*/
        switch(SHORT1FROMMP(mp1)){
            case DID_GRPDETAIL_MACHINELIST: /*------------------------*/
                switch(SHORT2FROMMP(mp1)){
                    case LN_SELECT:{ /*-------------------------------*/
                        CHAR    buffer[MACHINELISTBUFSIZE];
                        HWND    hwndList;
                        USHORT  index;

WinSendMsg(hwnd, UM_SETBUTTONSTATES, 0, 0);
                        hwndList = WinWindowFromID(hwnd,
                            DID_GRPDETAIL_MACHINELIST);
                        WinEnableWindowUpdate(hwndList, FALSE);
                        index = SHORT1FROMMR( WinSendMsg(hwndList,
                            LM_QUERYSELECTION,
                            MPFROMSHORT(LIT_FIRST), 0) );
                        WinSendMsg(hwndList, LM_QUERYITEMTEXT,
                            MPFROM2SHORT(index,MACHINELISTBUFSIZE),
                            MPFROMP(buffer));
                        if(buffer[0]=='Y') memcpy(buffer, "No ", 3);
                        else memcpy(buffer, "Yes", 3);
                        WinSendMsg(hwndList, LM_SETITEMTEXT,
                            MPFROMSHORT(index),
                            MPFROMP(buffer));
                        WinSendMsg(hwndList, LM_SELECTITEM,
                            MPFROMSHORT(index),
                            MPFROMSHORT(FALSE));
                        WinEnableWindowUpdate(hwndList, TRUE);
                    } break;
                } /* switch */
            break;

case DID_GRPDETAIL_GROUPNAME: /*--------------------------*/
            case DID_GRPDETAIL_DESCRIPTION: /*------------------------*/
                switch(SHORT2FROMMP(mp1)){
                    case EN_CHANGE: /*-------------------------------*/
                        WinSendMsg(hwnd, UM_SETBUTTONSTATES, 0, 0);
                    break;
                } /* switch */
            break;
        } /* switch */
    break;

case WM_COMMAND: /*---------------------------------------------*/
        switch(SHORT1FROMMP(mp1)){
            case DID_GRPDETAIL_COMMIT:{ /*----------------------------*/
                PGROUPDATA pGdat;
                CHAR    buffer[MACHINELISTBUFSIZE];
                HWND    hwndList;
                INT     i, iCount, index;

pGdat = WinQueryWindowPtr(hwnd, QWL_USER);
                WinQueryDlgItemText(hwnd, DID_GRPDETAIL_GROUPNAME,
                    sizeof(pGdat->achGroupName), pGdat->achGroupName);
                WinQueryDlgItemText(hwnd, DID_GRPDETAIL_DESCRIPTION,
                    sizeof(pGdat->achGroupDescr),
                    pGdat->achGroupDescr);
```

```
/*--------------------------------------------------------*/
/* Insert or Update rows in SSGrpTable                    */
/*--------------------------------------------------------*/
if(WinIsWindowEnabled(WinWindowFromID(hwnd,
DID_GRPDETAIL_GROUPNAME))){
    safe_dbfcmd(dbproc,
        " INSERT INTO SSGrpTable("
        "     GrpName,"
        "     GrpDescr"
        " )"
        " VALUES("
        "     \"%s\","
        "     \"%s\""
        " )",
        pGdat->achGroupName,
        pGdat->achGroupDescr);
} /* if */
else{
    safe_dbfcmd(dbproc,
        " UPDATE SSGrpTable"
        " SET"
        "     GrpDescr = \"%s\""
        " WHERE GrpName = \"%s\"",
        pGdat->achGroupDescr,
        pGdat->achGroupName);
} /* else */
dbsqlexec(dbproc);
while(dbresults(dbproc) != NO_MORE_RESULTS);

/*--------------------------------------------------------*/
/* Make coresponding changes to SSGrpMachineTable         */
/*--------------------------------------------------------*/
hwndList = WinWindowFromID(hwnd, DID_GRPDETAIL_MACHINELIST);
iCount = SHORT1FROMMR(WinSendMsg(hwndList,
    LM_QUERYITEMCOUNT, 0, 0));
for(index=0; index<iCount; index++){
    WinSendMsg(hwndList, LM_QUERYITEMTEXT,
        MPFROM2SHORT(index, MACHINELISTBUFSIZE),
        MPFROMP(buffer));
    for(i=4; buffer[i]!='\t'; i++);
    buffer[i]=0;
    if(buffer[0]=='Y'){
        dbfcmd(dbproc,
            " INSERT INTO SSGrpMachineTable"
            "     (GrpName, MachineName)"
            " VALUES(\"%s\", \"%s\")",
            pGdat->achGroupName, buffer+4);
    } /* if */
    else{
        dbfcmd(dbproc,
            " DELETE SSGrpMachineTable"
            " WHERE GrpName = \"%s\""
            "    AND MachineName = \"%s\"",
            pGdat->achGroupName, buffer+4);
    } /* else */
    dbsqlexec(dbproc);
    while(dbresults(dbproc) != NO_MORE_RESULTS);
} /* for */

} break;
  } /* switch */
break;

/*--------------------------------------------------------*/
/* Multi-Column Listbox stuff                             */
/*--------------------------------------------------------*/
```

-70-

```
        case WM_MEASUREITEM:( /*------------------------------------------*/
            MRESULT mr;

alColWidth[0]=0;
            mr = MRFROMLONG(ADSLBMeasure(hwnd,
                DID_GRPDETAIL_MACHINELIST, SHORT1FROMMP(mp2),
                alColWidth, NUMBER_OF_COLUMNS,
                DID_GRPDETAIL_MACHINELISTHEADER, HEADER_TOP,
                HEADER_BOTTOM));
            return(mr);
        } break;

case WM_DRAWITEM: /*------------------------------------------*/
            ADSLBDraw(hwnd, DID_GRPDETAIL_MACHINELIST,
                (POWNERITEM)PVOIDFROMMP(mp2), alColWidth,
                NUMBER_OF_COLUMNS, DID_GRPDETAIL_MACHINELISTHEADER,
                FALSE);
            return (MRFROMSHORT(TRUE));
        break;

} /* switch */
    return WinDefDlgProc(hwnd, msg, mp1, mp2);
    #undef MACHINELISTBUFSIZE
    #undef HEADER_TOP
    #undef HEADER_BOTTOM
    #undef NUMBER_OF_COLUMNS
} /* dpGroupDetail */

/****************************************************************/
/*                                                              */
/* ZoomDlgProc                                                  */
/*                                                              */
/* This dlgproc creates a window that provides additional information about */
/* any job existing in SSPendingJobTable. Rescheduling information is shown */
/* as is the current status of the Job and of the Batch Scheduler. A timer  */
/* is used to dynamically update this display to reflect changes in job and */
/* scheduler status.                                            */
/****************************************************************/
MRESULT EXPENTRY ZoomDlgProc(HWND hwnd, USHORT msg, MPARAM mp1, MPARAM mp2)
{
  DBCHAR            JobRunID[JOBIDLENGTH];
  DBCHAR            JobListName[JOBNAMELENGTH];
  DBCHAR            UserRqst;
  DBCHAR            CurrentStat;
  DBCHAR            StepNum[STEPNUMLENGTH];
  DBCHAR            StepResult[STEPNUMLENGTH];
  DBCHAR            GrpName[GROUPNAMELENGTH];
  DBCHAR            MachineName[MACHINENAMELENGTH];
  DBCHAR            StartTime[JOBDATELENGTH];
  DBCHAR            EndTime[JOBDATELENGTH];
  DBCHAR            NextRunDate[JOBDATELENGTH];
  DBCHAR            RecurWeekday[RECURLENGTH];
  DBCHAR            RecurMonthday[RECURLENGTH];
  DBCHAR            RecurMonth[RECURLENGTH];
  DBINT             RecurPrd;
  DBCHAR            SchedBy[JOBEDITBYLENGTH];
  DBCHAR            PriorityFlag;
  CHAR              buffer[80];
  USHORT            i;
  USHORT            usNum;
  CHAR              szText1[60];
  CHAR              szText2[60];
  static USHORT     usTimer;
  static ULONG      ulJobId;
  static HPOINTER   hpointerUserReq;
  static HPOINTER   hpointerStatus;
```

```
switch (msg) {
   case WM_COMMAND: /*------------------------------------------------------*/
      switch (COMMANDMSG(&msg)->cmd) {
         case DID_CANCEL: /*---------------------------------------------*/
            break;
      } /* switch */
      break;

/*
    * On the way out, disable updates to the icon status fields, then
    * restore the original icon to these fields. This prevents PM from
    * deleting the pointer handles that we may need later on.
    */
   case WM_DESTROY: /*------------------------------------------------------*/
      WinStopTimer(hab, hwndClient, usTimer);
      WinShowWindow(WinWindowFromID(hwnd, DID_ZOOM_USERREQ), FALSE);
      WinShowWindow(WinWindowFromID(hwnd, DID_ZOOM_STATUS), FALSE);

WinSendDlgItemMsg(hwnd, DID_ZOOM_USERREQ, SM_SETHANDLE,
                        (MPARAM) hpointerUserReq, (MPARAM) 0L);
      WinSendDlgItemMsg(hwnd, DID_ZOOM_STATUS, SM_SETHANDLE,
                        (MPARAM) hpointerStatus, (MPARAM) 0L);
      WinDismissDlg(hwnd, TRUE);
      break;

/*
    * Save the original pointer handles for our exit, save the incoming
    * JobRunId in the WindowWord, start the refresh timer and send a timer
    * message for quick initial paint.
    */
   case WM_INITDLG: /*------------------------------------------------------*/
      hpointerUserReq = (HPOINTER) WinSendDlgItemMsg(hwnd, DID_ZOOM_USERREQ,
                                    SM_QUERYHANDLE, (MPARAM)0L, (MPARAM) 0L);
      hpointerStatus = (HPOINTER) WinSendDlgItemMsg(hwnd, DID_ZOOM_STATUS,
                                    SM_QUERYHANDLE, (MPARAM)0L, (MPARAM) 0L);
      WinSetWindowULong(hwnd, QWL_USER, SHORT1FROMMP( mp2 ));
      usTimer = WinStartTimer(hab, hwnd,
                              TID_ZOOM_REFRESH, ZOOMREFRESH);
      WinSendMsg(hwnd, WM_TIMER, MPFROMSHORT(TID_ZOOM_REFRESH), 0L);
      return(0);

/*
    * Tick Tock. On each timer message query the latest and greatest
    * info about this job.
    */
   case WM_TIMER: /*--------------------------------------------------------*/
      if (SHORT1FROMMP(mp1) == TID_ZOOM_REFRESH) {
         /*
          * Change the pointer because this could take awhile.
          */
         WinSetPointer(HWND_DESKTOP,
                 WinQuerySysPointer(HWND_DESKTOP, SPTR_WAIT, FALSE));

/* Get the JobId from the WindowWord */
         ulJobId = WinQueryWindowULong(hwnd, QWL_USER);

/* Build and execute the SQL command buffer... */
         safe_dbfcmd(dbproc,
              " SELECT"
              "    JobRunID,"
              "    JobListName,"
              "    UserRqst,"
              "    CurrentStat,"
              "    StepNum,"
              "    StepResult,"
              "    GrpName,"
```

-72-

```
        "       MachineName,"
        "       PriorityFlag,"
        "       convert(char(30), StartDateTime, 0),"
        "       convert(char(30), EndDateTime, 0),"
        "       convert(char(30), NxtRunDateTime, 0),"
        "       RecurWeekday,"
        "       RecurMonthday,"
        "       RecurMonth,"
        "       RecurPrd,"
        "       SchedBy"
        " FROM SSPendingJobTable"
        " WHERE JobRunID = %ld",
          ulJobId);

dbsqlexec(dbproc);
  dbresults(dbproc);
  dbbind(dbproc, 1, NTBSTRINGBIND, (LONG)sizeof(JobRunID), JobRunID);
  dbbind(dbproc, 2, NTBSTRINGBIND, (LONG)sizeof(JobListName),
                                                    JobListName);
  dbbind(dbproc, 3, CHARBIND, (DBINT) 1, &UserRqst);
  dbbind(dbproc, 4, CHARBIND, (DBINT) 1, &CurrentStat);
  dbbind(dbproc, 5, NTBSTRINGBIND, (LONG)sizeof(StepNum), StepNum);
  dbbind(dbproc, 6, NTBSTRINGBIND, (LONG)sizeof(StepResult), StepResult);
  dbbind(dbproc, 7, NTBSTRINGBIND, (LONG)sizeof(GrpName), GrpName);
  dbbind(dbproc, 8, NTBSTRINGBIND, (LONG)sizeof(MachineName),
                                                    MachineName);
  dbbind(dbproc, 9, CHARBIND, (DBINT) 1, (BYTE *) &PriorityFlag);
  dbbind(dbproc, 10, NTBSTRINGBIND, (LONG)sizeof(StartTime), StartTime);
  dbbind(dbproc, 11, NTBSTRINGBIND, (LONG)sizeof(EndTime), EndTime);
  dbbind(dbproc, 12, NTBSTRINGBIND, (LONG)sizeof(NextRunDate),
                                                    NextRunDate);
  dbbind(dbproc, 13, NTBSTRINGBIND, (LONG)sizeof(RecurWeekday),
                                                    RecurWeekday);
  dbbind(dbproc, 14, NTBSTRINGBIND, (LONG)sizeof(RecurMonthday),
                                                    RecurMonthday);
  dbbind(dbproc, 15, NTBSTRINGBIND, (LONG)sizeof(RecurMonth),
                                                    RecurMonth);
  dbbind(dbproc, 16, INTBIND, 4, (BYTE *) &RecurPrd);
  dbbind(dbproc, 17, NTBSTRINGBIND, (LONG)sizeof(SchedBy), SchedBy);

if (dbnextrow(dbproc) != NO_MORE_ROWS) {
    /* Build the window title and set */

WinLoadString(hab, (HMODULE)NULL, IDS_JOB_ID,
                  sizeof(szText1), szText1);
    WinLoadString(hab, (HMODULE)NULL, IDS_JOB_NAME,
                  sizeof(szText2), szText2);

sprintf(buffer, "%s: %s  -  %s: %s",
                    szText1, JobRunID, szText2, JobListName);
    WinSetWindowText(hwnd, buffer);

/* Set the UserRqst icon based on the UserRqst field */
    WinShowWindow(WinWindowFromID(hwnd, DID_ZOOM_USERREQ), FALSE);
    switch (UserRqst) {
      /* Job is on Hold */
      case 'H': /*-----------------------------------------------*/
        WinSendDlgItemMsg(hwnd, DID_ZOOM_USERREQ, SM_SETHANDLE,
                   (MPARAM) hpointerArray[IDI_STOPLIGHT - IDI_BITBASE],
                   (MPARAM) 0L);
        WinShowWindow(WinWindowFromID(hwnd, DID_ZOOM_USERREQ), TRUE);
        break;

/* Job will execute one Step only */
      case 'S': /*-----------------------------------------------*/
        WinSendDlgItemMsg(hwnd, DID_ZOOM_USERREQ, SM_SETHANDLE,
```

```
                (MPARAM) hpointerArray[IDI_STEPS - IDI_BITBASE],
                (MPARAM) 0L);
        WinShowWindow(WinWindowFromID(hwnd, DID_ZOOM_USERREQ), TRUE);
        break;

/* Job has been Cancel by user */
    case 'C': /*----------------------------------------------------*/
        WinSendDlgItemMsg(hwnd, DID_ZOOM_USERREQ, SM_SETHANDLE,
                (MPARAM) hpointerArray[IDI_ERASER - IDI_BITBASE],
                (MPARAM) 0L);
        WinShowWindow(WinWindowFromID(hwnd, DID_ZOOM_USERREQ), TRUE);
        break;
} /* switch */

/* Set the job Current Status indicator icon */
WinShowWindow(WinWindowFromID(hwnd, DID_ZOOM_STATUS), FALSE);
switch (CurrentStat) {
    /* Danger Will Robinson - job errored out*/
    case 'E': /*----------------------------------------------------*/
        WinSendDlgItemMsg(hwnd, DID_ZOOM_STATUS, SM_SETHANDLE,
                (MPARAM) hpointerArray[IDI_WARN1 - IDI_BITBASE],
                (MPARAM) 0L);
        WinShowWindow(WinWindowFromID(hwnd, DID_ZOOM_STATUS), TRUE);
        break;

/* Group is busy */
    case 'G': /*----------------------------------------------------*/
        WinSendDlgItemMsg(hwnd, DID_ZOOM_STATUS, SM_SETHANDLE,
                (MPARAM) hpointerArray[IDI_GRPBUSY - IDI_BITBASE],
                (MPARAM) 0L);
        WinShowWindow(WinWindowFromID(hwnd, DID_ZOOM_STATUS), TRUE);
        break;

/* Job is running */
    case 'R': /*----------------------------------------------------*/
        WinSendDlgItemMsg(hwnd, DID_ZOOM_STATUS, SM_SETHANDLE,
                (MPARAM) hpointerArray[IDI_RUN - IDI_BITBASE],
                (MPARAM) 0L);
        WinShowWindow(WinWindowFromID(hwnd, DID_ZOOM_STATUS), TRUE);
        break;

/* SUCCESSFUL completion */
    case 'S': /*----------------------------------------------------*/
        WinSendDlgItemMsg(hwnd, DID_ZOOM_STATUS, SM_SETHANDLE,
                (MPARAM) hpointerArray[IDI_FINISH - IDI_BITBASE],
                (MPARAM) 0L);
        WinShowWindow(WinWindowFromID(hwnd, DID_ZOOM_STATUS), TRUE);
        break;

/*
     * Job is attempting to run on a workstation - probably awaiting
     * user verification.
     */
    case 'T': /*----------------------------------------------------*/
        WinSendDlgItemMsg(hwnd, DID_ZOOM_STATUS, SM_SETHANDLE,
                (MPARAM) hpointerArray[IDI_VERIFY - IDI_BITBASE],
                (MPARAM) 0L);
        WinShowWindow(WinWindowFromID(hwnd, DID_ZOOM_STATUS), TRUE);
        break;

/*
     * Job is scheduled and is awaiting execution.
     */
    case 'W': /*----------------------------------------------------*/
        WinSendDlgItemMsg(hwnd, DID_ZOOM_STATUS, SM_SETHANDLE,
                (MPARAM) hpointerArray[IDI_SCHED1 - IDI_BITBASE],
```

-74-

```
                                    (MPARAM) 0L);
            WinShowWindow(WinWindowFromID(hwnd, DID_ZOOM_STATUS), TRUE);
            break;
      } /* switch */

/* Set the text fields...*/
      WinSetDlgItemText(hwnd, DID_ZOOM_STEPNUM, StepNum);
      WinSetDlgItemText(hwnd, DID_ZOOM_STEPRESULT, StepResult);
      WinSetDlgItemText(hwnd, DID_ZOOM_GRPNAME, GrpName);
      WinSetDlgItemText(hwnd, DID_ZOOM_MACHINENAME, MachineName);
      WinSetDlgItemText(hwnd, DID_ZOOM_STARTTIME, StartTime);
      WinSetDlgItemText(hwnd, DID_ZOOM_ENDTIME, EndTime);
      if ((SHORT)PriorityFlag == '1' )
         WinLoadString(hab, (HMODULE)NULL, IDS_RUSH,
                                      sizeof(NextRunDate), NextRunDate);
      else if ((SHORT)PriorityFlag == '2')
         WinLoadString(hab, (HMODULE)NULL, IDS_ASAP,
                                      sizeof(NextRunDate), NextRunDate);
      WinSetDlgItemText(hwnd, DID_ZOOM_NEXTRUN, NextRunDate);

/* Loop through the days to disable/enable text as needed. */
      usNum = atoi(RecurWeekday);
      for (i = 0; i < 7; i++) {
         WinEnableWindow( WinWindowFromID(hwnd, DID_ZOOM_SUN + i),
                                      usNum & ((USHORT) 1 << i));
      } /* for */ if(atoi(RecurMonthday)==255)
          WinSetDlgItemText(hwnd, DID_ZOOM_MONTHDAY, "Last");
      else
          WinSetDlgItemText(hwnd, DID_ZOOM_MONTHDAY, RecurMonthday);

/* Loop through the months to disable text as needed. */
      usNum = atoi(RecurMonth);
      for (i = 0; i < 12; i++) {
         WinEnableWindow( WinWindowFromID(hwnd, DID_ZOOM_JAN + i),
                                      usNum & ((USHORT) 1 << i));
      } /* for */ for (i = 0; i < 13; i++) {
          WinEnableWindow( WinWindowFromID(hwnd, DID_ZOOM_1 + i),
               (USHORT)RecurPrd & ((USHORT) 1 << i));
       } /* for */
       if(RecurPrd) WinSetDlgItemText(hwnd,
            DID_ZOOM_PMOFFSET, "Day of the Period:");

WinSetDlgItemText(hwnd, DID_ZOOM_SCHEDBY, SchedBy);
      } /* if */
      dbcanquery(dbproc);
      while (dbresults(dbproc) != NO_MORE_RESULTS)
         dbcanquery(dbproc);
   } /* if */

/*
     * Restore the pointer to the default.
     */
     WinSetPointer(HWND_DESKTOP,
               WinQuerySysPointer(HWND_DESKTOP, SPTR_ARROW, FALSE));
      return(0);
   } /* switch */
   return WinDefDlgProc(hwnd, msg, mp1, mp2);
} /* ZoomDlgProc */
/***********************************************************************/
/*                                                                     */
/* FilterDlgProc                                                       */
```

```
/*                                                                         */
/* A view filter allows the user to define and view subsets of the jobs that */
/* live in the SSPendingJobTable. These Filters are GLOBAL and are used     */
/* to build the 'where' clause in the LoadListBox routine when items are    */
/* selected for display in the top level listbox.                           */
/****************************************************************************/
MRESULT EXPENTRY FilterDlgProc(HWND hwnd, USHORT msg, MPARAM mp1, MPARAM mp2)
{
    HWND    hwndMenu;
    USHORT  usCount;
    DBCHAR  ConvertDate[JOBDATELENGTH];

switch (msg) {
        case WM_COMMAND: /*------------------------------------------------*/
            switch (COMMANDMSG(&msg)->cmd) {
                case DID_CANCEL: /*--------------------------------------*/
                    WinDismissDlg(hwnd, TRUE);
                    return(0);

/*
                 * The following CLEAR buttons erase the contents of the related
                 * entry field.
                 */
                case DID_FILTER_JOBCLEAR: /*----------------------------*/
                    WinSetWindowText( WinWindowFromID(hwnd, DID_FILTER_JOBCOMBO), "");
                    strcpy(pszFilterJob, "");
                    return(MRFROMSHORT(1));

case DID_FILTER_BYCLEAR: /*-----------------------------*/
                    WinSetWindowText(WinWindowFromID(hwnd, DID_FILTER_BYCOMBO), "");
                    strcpy(pszFilterJob, "");
                    return(MRFROMSHORT(1));

case DID_FILTER_GROUPCLEAR: /*--------------------------*/
                    WinSetWindowText(WinWindowFromID(hwnd, DID_FILTER_GROUPCOMBO), "");
                    strcpy(pszFilterJob, "");
                    return(MRFROMSHORT(1));

/*
                 * Save the new filters.
                 */
                case DID_OK: /*-----------------------------------------*/
                    /*
                     * Keep a filter count (crude). If a filter exists we will
                     * set the Filter menu item checkmark.
                     */
                    usCount = WinQueryDlgItemText(hwnd, DID_FILTER_JOBCOMBO,
                                    JOBNAMELENGTH, pszFilterJob);
                    usCount += WinQueryDlgItemText(hwnd, DID_FILTER_BYCOMBO,
                                    JOBEDITBYLENGTH, pszFilterBy);
                    usCount += WinQueryDlgItemText(hwnd, DID_FILTER_GROUPCOMBO,
                                    GROUPNAMELENGTH, pszFilterGroup);
                    usCount += WinQueryDlgItemText(hwnd, DID_FILTER_START,
                                    DATELENGTH, ConvertDate);
                    ADSConvertDateToMDY(pUserAttr->szDateFmtCode, ConvertDate,
                            pszFilterStart);
                    usCount += WinQueryDlgItemText(hwnd, DID_FILTER_END,
                                    DATELENGTH, ConvertDate);
                    ADSConvertDateToMDY(pUserAttr->szDateFmtCode, ConvertDate,
                            pszFilterEnd);

/* Set the Filter menu item checkmark */
                    hwndMenu = WinWindowFromID(WinQueryWindow(hwndClient,
                                            QW_PARENT, FALSE), FID_MENU);

WinSendMsg(hwndMenu, MM_SETITEMATTR,
```

-76-

```
                   MPFROM2SHORT(IDM_FILTER, TRUE),
                   MPFROM2SHORT(MIA_CHECKED, usCount ? MIA_CHECKED : 0));

WinDismissDlg(hwnd, TRUE);
         WinSendMsg(hwnd, WM_TIMER, MPFROMSHORT(TID_CLIENT_REFRESH), 0L);
      } /* switch */
      break;

case WM_INITDLG: /*----------------------------------------------------------*/
      /* Load all available job names in the first combo box */
      LoadListBox(hwnd, DID_FILTER_JOBCOMBO, (PSZ) NULL, (PSZ)NULL, 0);
      WinSetWindowText(WinWindowFromID(hwnd, DID_FILTER_JOBCOMBO),
                       pszFilterJob);

/* Load all available job author names into the second list */
      LoadListBox(hwnd, DID_FILTER_BYCOMBO, (PSZ) NULL, (PSZ)NULL, 0);
      WinSetWindowText(WinWindowFromID(hwnd, DID_FILTER_BYCOMBO),
                       pszFilterBy);

/* Load all of the available groups ino the third */
      LoadListBox(hwnd, DID_FILTER_GROUPCOMBO, (PSZ) NULL, (PSZ)NULL, 0);
      WinSetWindowText(WinWindowFromID(hwnd, DID_FILTER_GROUPCOMBO),
                       pszFilterGroup);

ADSSetFormat(hwnd, DID_FILTER_START, pUserAttr->szDateFmtCode);
      ADSSetFormat(hwnd, DID_FILTER_END, pUserAttr->szDateFmtCode);

/* Set text limits on the date entry fields */
      WinSendDlgItemMsg(hwnd, DID_FILTER_START, EM_SETTEXTLIMIT,
                        MPFROMSHORT(JOBDATELENGTH - 1), 0L);
      ADSConvertDateFromMDY(pUserAttr->szDateFmtCode, ConvertDate,
              pszFilterStart);
      WinSetWindowText(WinWindowFromID(hwnd, DID_FILTER_START), ConvertDate);
      WinSendDlgItemMsg(hwnd, DID_FILTER_END, EM_SETTEXTLIMIT,
                        MPFROMSHORT(JOBDATELENGTH - 1), 0L);
      ADSConvertDateFromMDY(pUserAttr->szDateFmtCode, ConvertDate,
              pszFilterEnd);
      WinSetWindowText(WinWindowFromID(hwnd, DID_FILTER_END), ConvertDate);
      return(0);

} /* switch */
   return WinDefDlgProc(hwnd, msg, mp1, mp2);
} /* FilterDlgProc */
/****************************************************************************/
/*                                                                          */
/* PickServerDlgProc                                                        */
/*                                                                          */
/* This dlgproc allows the batch administrator to start the Batch Schedule  */
/* Server on one of the registered machines.                                */
/*                                                                          */
/****************************************************************************/
MRESULT EXPENTRY PickServerDlgProc(HWND hwnd, USHORT msg,
MPARAM mp1, MPARAM mp2){
   USHORT        i;
   USHORT        usResult;
   CHAR          szText1[80];
   CHAR          szText2[80];

static CHAR   szHeadingTop[80];
   static CHAR   szHeadingBottom[80];
   static LONG   alColWidth[PICKSERV_COLUMNS];

switch (msg) {
      case WM_INITDLG: /*----------------------------------------------------------*/
         /*
```

```
    * Change the pointer to the hour glass
    */
    WinSetPointer(HWND_DESKTOP,
          WinQuerySysPointer(HWND_DESKTOP, SPTR_WAIT, FALSE));

/*
     * Load the column title strings from the resource.
     */
    WinLoadString(hab, (HMODULE)NULL, IDS_PICKSERV_LIST1_TOP,
                         sizeof(szHeadingTop), (PSZ)szHeadingTop);
    WinLoadString(hab, (HMODULE)NULL, IDS_PICKSERV_LIST1_BOT,
                         sizeof(szHeadingBottom), (PSZ)szHeadingBottom);

/* Set column widths to zero */
    for (i = 0; i < PICKSERV_COLUMNS; i++)
          alColWidth[i] = 0;

/* Load the listbox with the machine list */
    LoadListBox(hwnd, DID_PICKSERV_ADSLIST, (PSZ)NULL, (PSZ)NULL, 0);

/* Restore the pointer to the default */
    WinSetPointer(HWND_DESKTOP,
          WinQuerySysPointer(HWND_DESKTOP, SPTR_ARROW, FALSE));
    return(0);

case WM_CONTROL: /*---------------------------------------------------*/
    switch (SHORT2FROMMP(mp1)) {

/*
         * If the user has double clicked on an item try to start server
         */
        case LN_ENTER: /*---------------------------------------------*/
            WinSetPointer(HWND_DESKTOP,
                  WinQuerySysPointer(HWND_DESKTOP, SPTR_WAIT, TRUE));
            if (GetSelectedItemString(hwnd, DID_PICKSERV_ADSLIST,
                         szServerName, MACHINENAMELENGTH, TRUE) >= 0) {
                if (ADSNetExec(szServerName, BATCHD_SERVICE, NULL,
                pUserAttr->szDefaultServer, &usResult, FALSE) ==
                EXEC_NOTFOUND) {
                    WinLoadString(hab, (HMODULE)NULL, IDS_MACHINE_UNAVAIL,
                         sizeof(szText1), (PSZ)szText1);
                    WinLoadString(hab, (HMODULE)NULL, IDS_ERROR,
                         sizeof(szText2), (PSZ)szText2);
                    WinMessageBox(HWND_DESKTOP, HWND_DESKTOP, szText1,
                         szText2, (USHORT) NULL,
                         MB_OK | MB_ERROR | MB_MOVEABLE);
                    return(0);
                } /* if */
                WinDismissDlg(hwnd, TRUE);
                return(0);
            } /* if */
            return(0);
    } /* switch */
    break;

/*
 * Multicolumn Listbox required stuff...
 */
case WM_MEASUREITEM: /*-----------------------------------------------*/
    switch (SHORT1FROMMP(mp1)) {
        case DID_PICKSERV_ADSLIST: /*--------------------------------*/
            return (MRFROMLONG(ADSLBMeasure(hwnd, DID_PICKSERV_ADSLIST,
                         SHORT1FROMMP(mp2), alColWidth, PICKSERV_COLUMNS,
                         DID_PICKSERV_HEADING, szHeadingTop,
                         szHeadingBottom)));
    } /* switch */
```

```
           return(0);

case WM_DRAWITEM: /*-------------------------------------------------*/
        switch (SHORT1FROMMP(mp1)) {
            case DID_PICKSERV_ADSLIST: /*----------------------------------*/
                ADSLBDraw(hwnd, DID_PICKSERV_ADSLIST,
                         (POWNERITEM)PVOIDFROMMP(mp2), alColWidth,
                         PICKSERV_COLUMNS, DID_PICKSERV_HEADING, FALSE);
                return (MRFROMSHORT(TRUE));
        } /* switch */
        return(0);

case WM_COMMAND: /*--------------------------------------------------*/
        switch (COMMANDMSG(&msg)->cmd) {
            case DID_OK: /*----------------------------------------------*/
                WinSetPointer(HWND_DESKTOP,
                         WinQuerySysPointer(HWND_DESKTOP, SPTR_WAIT, TRUE));
                if (GetSelectedItemString(hwnd, DID_PICKSERV_ADSLIST,
                         szServerName, MACHINENAMELENGTH, TRUE) >= 0)
                    if(ADSNetExec(szServerName, BATCHD_SERVICE, NULL,
                         pUserAttr->szDefaultServer, &usResult, FALSE) ==
                         EXEC_NOTFOUND){
                        WinLoadString(hab, (HMODULE)NULL, IDS_MACHINE_UNAVAIL,
                             sizeof(szText1), (PSZ)szText1);
                        WinLoadString(hab, (HMODULE)NULL, IDS_ERROR,
                             sizeof(szText2), (PSZ)szText2);
                        WinMessageBox(HWND_DESKTOP, HWND_DESKTOP, szText1,
                             szText2, (USHORT) NULL,
                             MB_OK | MB_ERROR | MB_MOVEABLE);
                        return(0);
                    } /* if */
                WinDismissDlg(hwnd, TRUE);
                return(0);

case DID_CANCEL: /*------------------------------------------*/
                WinDismissDlg(hwnd, FALSE);
                return(0);

} /* switch */
        break;
    } /* switch */
    return WinDefDlgProc(hwnd, msg, mp1, mp2);
} /* PickServerDlgProc */

/**************************************************************************/
/* NewTitleBarProc                                                        */
/*                                                                        */
/* This procedure either replaces or suppliments the standard paint routine*/
/* for the titlebar.  If the user does not have admin perms edges or the  */
/* batch scheduler is not up, a bitmap representing the scheduler is      */
/* displayed on the right edge of the standard titlebar.                  */
/*                                                                        */
/* If the user has admin priviledges and the server is running, the entire*/
/* titlebar is painted here.  The server name is placed on the right edge */
/* of the titlebar and the actual title text is centered in the remaining */
/* rectangle.                                                             */
/*                                                                        */
/* The color of the titlebar bitmap or server name indicates the following:*/
/*                                                                        */
/*      GREEN:  Server is running and is accepting jobs.                  */
/*      YELLOW: Server is running but will not start a new job.           */
/*      RED:    Server is not running.                                    */
/*                                                                        */
/**************************************************************************/
MRESULT EXPENTRY NewTitleBarProc( HWND hwnd, USHORT msg,
MPARAM mp1, MPARAM mp2){
```

```
HPS               hps;
HPS               hpsMemory;
HDC               hdcMemory;
RECTL             rectl;
RECTL             rectlFill;
RECTL             rectlText;
BITMAPINFOHEADER  BitInfo;
LONG              lcyTitleBar;
LONG              lRGBback;
SIZEL             sizl ;
POINTL            aptl[4] ;
USHORT            usRedDiff;
USHORT            usGreenDiff;
USHORT            usBlueDiff;
POINTL            ptlLeft;
POINTL            ptlRight;
MRESULT           mresult;

switch (msg) { case TBM_SETHILITE: /*---------------------------------------------*/
      WinEnableWindowUpdate(hwnd, FALSE);
      mresult = OldTitleBarProc(hwnd, msg, mp1, mp2);
      WinEnableWindowUpdate(hwnd, TRUE);
      return(mresult);

case WM_PAINT: /*----------------------------------------------------*/
      /*
       * If the application does not have focus, do not paint the server
       * status because the timer will not be running. Simply call the
       * default window proc for the titlebar and return a zero.
       */
      if (!(OldTitleBarProc(hwnd, TBM_QUERYHILITE, 0L, 0L)))
         OldTitleBarProc(hwnd, msg, mp1, mp2);

/*
       * Else if the user is not an admin or the server is not up,
       * will will display a bitmap on the default titlebar.
       */
      else if (!GBLbAdmin || GBLStatusColor == 0x00FF0000) {

/* Open memory DC and create PS associated with it. */
         hdcMemory = DevOpenDC (hab, OD_MEMORY, "*", 0L, NULL, NULL) ;
         sizl.cx = 0 ;
         sizl.cy = 0 ;
         hpsMemory = GpiCreatePS (hab, hdcMemory, &sizl,
                                  PU_PELS    | GPIF_DEFAULT |
                                  GPIT_MICRO | GPIA_ASSOC) ;
         GpiSetBitmap (hpsMemory, hbmStatus) ;

/* Call the original proc to allow the title bar to paint. */
         OldTitleBarProc(hwnd, msg, mp1, mp2);

/* Get the titlebar rectangle. */
         WinQueryWindowRect(hwnd, &rectl);

hps = WinGetPS(hwnd);

/* Get the height of the titlebar */
         lcyTitleBar = WinQuerySysValue(HWND_DESKTOP, SV_CYTITLEBAR);

/*
          * Set the color table to RGB mode so that we can paint dithered
          * colors on the titlebar.
          */
         GpiCreateLogColorTable(hps, LCOL_RESET, LCOLF_RGB,
```

-80-

```
                                              OL, OL, (PLONG) NULL);

/* Get the RGB value of the titlebar color */
    lRGBback = WinQuerySysColor(HWND_DESKTOP, SYSCLR_ACTIVETITLE, OL);

/*
     * Calculate the target and source bitmap coordinates.
     */
    aptl[0].x = rectl.xRight - lcyTitleBar + 1;
    aptl[0].y = 1 ;

aptl[1].x = aptl[0].x + lcyTitleBar - 1;
    aptl[1].y = aptl[0].y + lcyTitleBar - 1;

aptl[2].x = 0 ;
    aptl[2].y = 0 ;

GpiQueryBitmapParameters(hbmStatus, &BitInfo);
    aptl[3].x = BitInfo.cx;
    aptl[3].y = BitInfo.cy;

GpiSetBackColor(hps, 0L);

/*
     * Calculate the difference between the color components of the
     * titlebar and the current StatusColor. If the sum of these
     * differences is too small the icon may be too difficult to see.
     */
    usRedDiff = abs((SHORT)(((lRGBback & 0x00FF0000L) >> 16) -
                            ((GBLStatusColor & 0x00FF0000L) >> 16)));
    usGreenDiff = abs((SHORT)(((lRGBback & 0x0000FF00L) >> 8) -
                            ((GBLStatusColor & 0x0000FF00L) >> 8)));
    usBlueDiff = abs((SHORT)((lRGBback & 0x000000FFL) -
                            (GBLStatusColor & 0x000000FFL)));
    /*
     * The titlebar color may hide the icon so we will display a
     * black background around it.
     */
    GpiSetColor(hps, GBLStatusColor);
    GpiBitBlt (hps, hpsMemory, 4L, aptl, 0x00CCL, BBO_AND) ;

WinReleasePS(hps);

GpiDestroyPS (hpsMemory) ;
    DevCloseDC (hdcMemory) ;
) /* else-if */
/*
 * Else the user is an Admin, so we will display the server name
 * on the titlebar.
 */
else {
    /* Get the titlebar rectangle. */
    WinQueryWindowRect(hwnd, &rectl);
    ptlLeft.x = rectl.xLeft;
    ptlLeft.y = rectl.yBottom;
    ptlRight.x = rectl.xRight;
    ptlRight.y = rectl.yBottom;

OldTitleBarProc(hwnd, msg, mp1, mp2);

hps = WinGetPS(hwnd);

/* Set the color table to the RGB mode */
    GpiCreateLogColorTable(hps, LCOL_RESET, LCOLF_RGB,
                                              OL, OL, (PLONG) NULL);
    rectl.yBottom++;
```

```
        WinCopyRect(hab, &rectlText, &rectl);
        WinCopyRect(hab, &rectlFill, &rectl);

/*
         * Query the rectangle needed for the server name.  The WinDrawText
         * API is used to right justify the text.
         */
        WinDrawText(hps, -1, szServerName, &rectlText, 0L, 0L,
                    DT_QUERYEXTENT | DT_VCENTER | DT_RIGHT);

/*
         * Move this rectangle to the left a couple of pels for appearance.
         */
        WinOffsetRect(hab, &rectlText, -5, 0);

/*
         * Draw the text, allowing WinDrawText to fill the background
         * around the characters.
         */ rectlFill.xLeft = rectlText.xLeft - 5;
        WinFillRect(hps, &rectlFill, CLR_BLACK);
        GpiSetBackMix(hps, BM_OVERPAINT);
        WinDrawText(hps, -1, szServerName, &rectlText, GBLStatusColor,
                    0L, DT_LEFT);
        WinReleasePS(hps);
        return 0;
     } /* else */
     return(0);

default: /*---------------------------------------------------------------*/
     return(OldTitleBarProc(hwnd, msg, mp1, mp2));

} /* switch */
} /* NewTitleBarProc */
/***************************************************************************/
/* SetStatusColor                                                         */
/*                                                                        */
/* This routine checks the schedule server status and sets the global color */
/* flag .                                                                 */
/***************************************************************************/
VOID SetStatusColor(VOID){
   ULONG        ulNetConnect;
   USHORT       usRequest;
   USHORT       usBytes;
   RECTL        rectl;

safe_dbfcmd(dbproc,
      " SELECT ComputerName"
      " FROM SSRegisteredSvc "
      " WHERE SvcName = \"%s\"",
        BATCHD_SERVICE);

dbsqlexec(dbproc);
   dbresults(dbproc);
   dbbind(dbproc, 1, NTBSTRINGBIND, sizeof(szServerName), szServerName);

szServerName[0]=0;

/* If the scheduler is not registered, set status icon color to RED */
   if (dbnextrow(dbproc) == NO_MORE_ROWS) (
      GBLStatusColor = 0x00FF0000L;   /* 00RRGGBB */
   } /* if */
   else {
      while (dbnextrow(dbproc) != NO_MORE_ROWS) ;
```

```
    /* If the scheduler is not available, set status icon color to RED */
    if (ADSNetConnect(&ulNetConnect, szServerName, BATCHD_SERVICE)) {
        GBLStatusColor = 0x00FF0000L;   /* 00RRGGBB */
        safe_dbfcmd(dbproc,
            " DELETE from SSRegisteredSvc "
            " WHERE SvcName = \"%s\"",
            BATCHD_SERVICE);

dbsqlexec(dbproc);
        dbcanquery(dbproc);
        while (dbresults(dbproc) != NO_MORE_RESULTS)
            dbcanquery(dbproc);
    } /* if */
    else {
        /* Is the scheduler accepting new jobs ? */
        usRequest = BATCHD_QUERY_NEWJOBS;
        ADSNetWrite(ulNetConnect, &usRequest, sizeof(usRequest));
        ADSNetRead(ulNetConnect, &usRequest,
                                sizeof(usRequest), &usBytes);
        /* ...no: status icon to YELLOW. */
        if (usRequest)
            GBLStatusColor = 0x00FFFF00L;   /* 00RRGGBB */
        else
            GBLStatusColor = 0x0000FF00L;   /* 00RRGGBB */
        ADSNetDisconnect(ulNetConnect);
    } /* else */
} /* else */

/*
 * Need to force the icon to repaint.  This is done by invalidating
 * a tiny area of the titlebar underneath the icon to minimize
 * the amount of titlebar repainting and icon flash.
 */
WinQueryWindowRect(WinWindowFromID(hwndFrame, FID_TITLEBAR), &rectl);
if (!GBLbAdmin) {
    rectl.xLeft = rectl.xRight - 1;
    rectl.yBottom = rectl.yTop - 1;
} /* if */
WinInvalidateRect(WinWindowFromID(hwndFrame, FID_TITLEBAR), &rectl, TRUE);
} /* SetStatusColor */

/***************************************************************
*
* Function:    SetActiveOptions
*
* Description:
*
* Returns:     nothing
*
***************************************************************/
VOID SetActiveOptions(HWND hwnd)
{
    HWND    hwndMenu;
    LONG    sListSelectFlag;

hwndMenu = WinWindowFromID(WinQueryWindow(hwnd, QW_PARENT, FALSE), FID_MENU);
    sListSelectFlag = (LONG)WinSendMsg(WinWindowFromID(hwnd, ID_CLIENT_ADSLIST),
            LM_QUERYSELECTION, 0L, 0L);

/* Enable or disable menu pull downs */
    WinSendMsg(hwndMenu, MM_SETITEMATTR, MPFROM2SHORT(IDM_JOBSCHEDULE, TRUE),
            MPFROM2SHORT(MIA_DISABLED,
            (sCurrentView == IDM_VIEWDEFAULT) ? 0 : MIA_DISABLED));
    WinSendMsg(hwndMenu, MM_SETITEMATTR, MPFROM2SHORT(IDM_JOBRESCHED, TRUE),
            MPFROM2SHORT(MIA_DISABLED,
```

```
            (sCurrentView == IDM_VIEWDEFAULT && sListSelectFlag != LIT_NONE) ?
            0 : MIA_DISABLED));
    WinSendMsg(hwndMenu, MM_SETITEMATTR, MPFROM2SHORT(IDM_JOBRUSH, TRUE),
        MPFROM2SHORT(MIA_DISABLED,
            (sCurrentView == IDM_VIEWDEFAULT && sListSelectFlag != LIT_NONE) ?
            0: MIA_DISABLED));
    WinSendMsg(hwndMenu, MM_SETITEMATTR,
        MPFROM2SHORT(IDM_JOBZOOM, TRUE), MPFROM2SHORT(MIA_DISABLED,
            (sListSelectFlag != LIT_NONE) ? 0: MIA_DISABLED));
    WinSendMsg(hwndMenu, MM_SETITEMATTR, MPFROM2SHORT(IDM_JOBRESUME, TRUE),
        MPFROM2SHORT(MIA_DISABLED,
            (sCurrentView == IDM_VIEWDEFAULT && sListSelectFlag != LIT_NONE)
            ? 0: MIA_DISABLED));
    WinSendMsg(hwndMenu, MM_SETITEMATTR, MPFROM2SHORT(IDM_JOBHOLD, TRUE),
        MPFROM2SHORT(MIA_DISABLED,
            (sCurrentView == IDM_VIEWDEFAULT  && sListSelectFlag != LIT_NONE)
            ? 0: MIA_DISABLED));
    WinSendMsg(hwndMenu, MM_SETITEMATTR, MPFROM2SHORT(IDM_JOBCANCEL, TRUE),
        MPFROM2SHORT(MIA_DISABLED,
            (sListSelectFlag != LIT_NONE) ? 0: MIA_DISABLED));

/* Enable or disable icons */
    WinEnableWindow(WinWindowFromID(hwnd, ID_CLIENT_MGLASS),
        sListSelectFlag != LIT_NONE);
    WinEnableWindow(WinWindowFromID(hwnd, ID_CLIENT_GOLIGHT),
        sCurrentView == IDM_VIEWDEFAULT && sListSelectFlag != LIT_NONE);
    WinEnableWindow(WinWindowFromID(hwnd, ID_CLIENT_STOPLIGHT),
        sCurrentView == IDM_VIEWDEFAULT && sListSelectFlag != LIT_NONE);
    WinEnableWindow(WinWindowFromID(hwnd, ID_CLIENT_RESCHED),
        sCurrentView == IDM_VIEWDEFAULT && sListSelectFlag != LIT_NONE);
    WinEnableWindow(WinWindowFromID(hwnd, ID_CLIENT_RUSH),
        sCurrentView == IDM_VIEWDEFAULT && sListSelectFlag != LIT_NONE);
    WinEnableWindow(WinWindowFromID(hwnd, ID_CLIENT_ERASER),
        sListSelectFlag != LIT_NONE);
    WinEnableWindow(WinWindowFromID(hwnd, ID_CLIENT_SCHED),
        sCurrentView == IDM_VIEWDEFAULT);

return;
}
static char szRevision[] = "$Revision:   4.6  $ BATCH02.C";

/************************************************************************
*
* Copyright (c) 1990, 1991, 1992, 1993 American Airlines
*
* File:        BATCH02.C
*
* System:      Batch Administration
*
* Description: The Batch Administration program provides a user
*              interface to Batch Scheduler, allowing users to build,
*              submit, and query batches.
*
* History:     David M. Wilson  08/01/90
*              Blain Stanga
*              Joe Bryan
*              Jeff Beardsley
*              Glenn Grundstrom
*
* This program is the CONFIDENTIAL and PROPRIETARY property
* of American Airlines.  Any unauthorized use, reproduction
* or transfer of this program is strictly prohibited.
*
* This is an unpublished work, and is subject to limited distribution
* and restricted disclosure only.  ALL RIGHTS RESERVED.
```

-84-

```
*
*******************************************************************/ define DBMSOS2
define INCL_PM
define EXTERN extern include <os2.h>
include <stdio.h>
include <stdlib.h>
#include <string.h>
#include <sqlfront.h>
include <sqldb.h> include "adslen.h"
include "ads.h"
include "adsnet.h"
include "dialog.h"
include "batchdef.h"
include "batchdlg.h"
include "batch.h"

VOID SetJobStepOptions(HWND);

/******************************************************************/
/*                                                                */
/* JobListDlgProc                                                 */
/*                                                                */
/* This dialog box displays the complete list of batch jobs.  The user can */
/* create, modify, or delete jobs (assuming he has permission/passwords) */
/* here.  The maintenance of the actual job steps occurs within the */
/* JobStepDlgProc                                                 */
/******************************************************************/
MRESULT EXPENTRY JobListDlgProc(HWND hwnd, USHORT msg, MPARAM mp1, MPARAM mp2)
{
    static CHAR    szHeadingTop[80];
    static CHAR    szHeadingBottom[80];
    static LONG    alColWidth[JBLST_COLUMNS];

USHORT         i;
    USHORT         usNotifyCode;
    CHAR           abBuffer[250];
    DBCHAR         JobName[JOBNAMELENGTH];
    DBCHAR         JobDesc[JOBDESCLENGTH];
    DBCHAR         ProgramName[STEPPRGLENGTH];
    DBCHAR         ArgList1[STEPARGSLENGTH];
    DBCHAR         encrpt_arg[STEPARGSLENGTH];
    DBSMALLINT     job_step;
    CHAR           buff[250];
    PWDSTRUCT      pwdStruct;
    CHAR           szText1[80];
    CHAR           szText2[80];
    static USHORT  usPushButtons[JOBLISTNUMBUTTONS];

switch (msg) { case WM_CONTROL: /*---------------------------------------------*/
            usNotifyCode = (USHORT) SHORT2FROMMP(mp1);
            if (SHORT1FROMMP(mp1) != DID_JOBLIST_ADSLIST) break;
            switch (usNotifyCode) {
                /*
                 * If the user selects a job from the listbox, fill in the
                 * entry fields with the job name and description.
                 */
                case LN_SELECT: /*-----------------------------------------*/
                    if (GetSelectedItemString( hwnd, DID_JOBLIST_ADSLIST,
```

```
                    abBuffer, JOBNAMELENGTH, TRUE) < 0)
        return(0);

WinSetPointer(HWND_DESKTOP,
                  WinQuerySysPointer(HWND_DESKTOP, SPTR_WAIT, TRUE));

safe_dbfcmd(dbproc,
       " SELECT"
       "     JobListName,"
       "     JobListDescr"
       " FROM SSJobListTable"
       " WHERE JobListName LIKE \"%s\""
       " ORDER BY JobListName",
        abBuffer);

dbsqlexec(dbproc);
    dbresults(dbproc);
    dbbind(dbproc, 1, NTBSTRINGBIND, (LONG)sizeof(JobName),
                                                    JobName);
    dbbind(dbproc, 2, NTBSTRINGBIND, (LONG)sizeof(JobDesc),
                                                    JobDesc);
    dbnextrow(dbproc);
    WinSetDlgItemText(hwnd, DID_JOBLIST_JOBNAME, JobName);
    WinSetDlgItemText(hwnd, DID_JOBLIST_JOBDESC, JobDesc);
    SetPushButtons(hwnd, JOBLISTNUMBUTTONS,
                   DID_JOBLIST_MODIFY, usPushButtons);
    strcpy(buff, JobName);
    dbcanquery(dbproc);
    while (dbresults(dbproc) != NO_MORE_RESULTS)
        dbcanquery(dbproc);

/* Selection made, enable buttons */
    WinEnableWindow(WinWindowFromID(hwnd, DID_JOBLIST_CLONE), TRUE);
    WinEnableWindow(WinWindowFromID(hwnd, DID_JOBLIST_DELETE), TRUE);
    WinEnableWindow(WinWindowFromID(hwnd, DID_JOBLIST_MODIFY), TRUE);

WinSetPointer(HWND_DESKTOP,
                  WinQuerySysPointer(HWND_DESKTOP, SPTR_ARROW, TRUE));
    break;

/*
 * The user has double clicked on a list item, so start the
 * SSJobStepDlgProc.
 */
case LN_ENTER: /*---------------------------------------------*/
    if (GetSelectedItemString( hwnd, DID_JOBLIST_ADSLIST,
                      abBuffer, JOBNAMELENGTH, TRUE) < 0)
        return(0);
    WinDlgBox(HWND_DESKTOP, hwnd, (PFNWP)JobStepDlgProc,
              (HMODULE)NULL, IDD_JOBSTEP, (PVOID)abBuffer);
    /* Load all of the Job List headers into the listbox */
    LoadListBox(hwnd, DID_JOBLIST_ADSLIST, (PSZ)NULL, (PSZ)NULL, 0);

/* Disable buttons until a selection is made from list box */
    WinEnableWindow(WinWindowFromID(hwnd, DID_JOBLIST_CLONE), FALSE);
    WinEnableWindow(WinWindowFromID(hwnd, DID_JOBLIST_DELETE), FALSE);
    WinEnableWindow(WinWindowFromID(hwnd, DID_JOBLIST_MODIFY), FALSE);

return(0);
    } /* switch */
    break;

case WM_COMMAND: /*---------------------------------------------*/
    switch (COMMANDMSG(&msg)->cmd) {
        case DID_OK: /*---------------------------------------------*/
            WinDismissDlg(hwnd, TRUE);
```

```
        return(0);
/*
 * CLEAR BUTTON - clears the current listbox selection and
 * the contents of the two edit fields.
 */
case DID_JOBLIST_CLEAR: /*------------------------------------------*/
    WinSendDlgItemMsg(hwnd, DID_JOBLIST_ADSLIST, LM_SELECTITEM,
                                            (MPARAM)LIT_NONE, 0L);
    WinSetDlgItemText(hwnd, DID_JOBLIST_JOBNAME, "");
    WinSetDlgItemText(hwnd, DID_JOBLIST_JOBDESC, "");

SetPushButtons(hwnd, JOBLISTNUMBUTTONS, DID_JOBLIST_INSERT,
                                            usPushButtons);

/* Disable buttons until a selection is made from list box */
    WinEnableWindow(WinWindowFromID(hwnd, DID_JOBLIST_CLONE), FALSE);
    WinEnableWindow(WinWindowFromID(hwnd, DID_JOBLIST_DELETE), FALSE);
    WinEnableWindow(WinWindowFromID(hwnd, DID_JOBLIST_MODIFY), FALSE);

WinSetFocus(HWND_DESKTOP,
                WinWindowFromID(hwnd, DID_JOBLIST_JOBNAME));
    return(0);

/*
 * INSERT BUTTON - Inserts the data in the Job Name and the
 * Job Description entry fields into the SSJobListTable.
 */
case DID_JOBLIST_INSERT: /*------------------------------------------*/
    if (!WinQueryDlgItemText(hwnd, DID_JOBLIST_JOBNAME,
                                    JOBNAMELENGTH, JobName))
        return(0);

WinQueryDlgItemText(hwnd, DID_JOBLIST_JOBDESC,
                            JOBDESCLENGTH, JobDesc);

WinSetPointer(HWND_DESKTOP,
                WinQuerySysPointer(HWND_DESKTOP, SPTR_WAIT, TRUE));

safe_dbfcmd(dbproc,
        " INSERT INTO SSJobListTable"
        " VALUES (\"%s\", \"%s\", user_name(-1), getdate(), \"\", \"\")",
        JobName,
        JobDesc);

if (dbsqlexec(dbproc))
    {
        dbcanquery(dbproc);
        while (dbresults(dbproc) != NO_MORE_RESULTS)
            dbcanquery(dbproc);
        /* Clear the entry fields and reload the listbox */
        WinSetDlgItemText(hwnd, DID_JOBLIST_JOBNAME, "");
        WinSetDlgItemText(hwnd, DID_JOBLIST_JOBDESC, "");
        LoadListBox(hwnd, DID_JOBLIST_ADSLIST, (PSZ)NULL, (PSZ)NULL, 0);

/* Assume another insert will follow */
        WinSetFocus(HWND_DESKTOP,
                    WinWindowFromID(hwnd, DID_JOBLIST_JOBNAME));

/* Disable buttons until a selection is made from list box */
        WinEnableWindow(WinWindowFromID(hwnd, DID_JOBLIST_CLONE), FALSE);
        WinEnableWindow(WinWindowFromID(hwnd, DID_JOBLIST_DELETE), FALSE);
        WinEnableWindow(WinWindowFromID(hwnd, DID_JOBLIST_MODIFY), FALSE);
    }

WinSetPointer(HWND_DESKTOP,
```

-86-

-87-

```
                WinQuerySysPointer(HWND_DESKTOP, SPTR_ARROW, TRUE));
    return(0);

/*
 * CLONE BUTTON - the currently selected item will be cloned
 * (ie All of the jobs steps will be copied) to a new job list
 * whose name and description are obtained from the entry fields.
 */
case DID_JOBLIST_CLONE: /*---------------------------------------*/
    if (GetSelectedItemString( hwnd, DID_JOBLIST_ADSLIST,
                    abBuffer, JOBNAMELENGTH, TRUE) < 0)
        return(0);

/*
     * Get modify access password from user if needed.
     */
    pwdStruct.usPwdType = PWD_MODIFY;
    pwdStruct.pszJobData = abBuffer;
    pwdStruct.usDataType = PWD_DATA_JOBNAME;
    if (!(WinDlgBox(HWND_DESKTOP, hwnd, (PFNWP)EnterPasswordDlgProc,
            (HMODULE)NULL, IDD_PWDENTER, (PVOID) &pwdStruct))) {
        /*
         * Oops, the users does not know the password, so return.
         */
        DosBeep( 300, 300 );
        return(0);
    } /* if */

WinSetPointer(HWND_DESKTOP,
            WinQuerySysPointer(HWND_DESKTOP, SPTR_WAIT, TRUE));

WinQueryDlgItemText(hwnd, DID_JOBLIST_JOBNAME,
                                JOBNAMELENGTH, JobName);

WinQueryDlgItemText(hwnd, DID_JOBLIST_JOBDESC,
                                JOBDESCLENGTH, JobDesc);

/* Insert new job header into JobListTable */
    safe_dbfcmd(dbproc,
        " INSERT INTO SSJobListTable"
        " VALUES (\"%s\", \"%s\", user_name(-1), getdate(), \"\", \"\")",
        JobName,
        JobDesc);

if (dbsqlexec(dbproc)) {
        dbcanquery(dbproc);
        while (dbresults(dbproc) != NO_MORE_RESULTS)
            dbcanquery(dbproc);

/* Select the Job Steps from the original job...*/
        safe_dbfcmd(dbproc,
            " SELECT"
            "     JobStepNum,"
            "     ProgramName,"
            "     ArgumentList1,"
            "     ArgumentList2"
            " FROM SSJobStepTable"
            " WHERE JobListName LIKE \"%s\""
            " ORDER BY JobStepNum",
            abBuffer);

dbsqlexec(dbproc);
        dbresults(dbproc);
        dbbind(dbproc, 1, INTBIND, (DBINT)0, (BYTE *) &job_step);
        dbbind(dbproc, 2, NTBSTRINGBIND, (LONG)sizeof(ProgramName),
                                                        ProgramName);
```

```
dbbind(dbproc, 3, NTBSTRINGBIND, (LONG)sizeof(ArgList1),
                                                  ArgList1);
dbbind(dbproc, 4, NTBSTRINGBIND, (LONG)sizeof(encrpt_arg),
                                                  encrpt_arg);
if (dbnextrow(dbproc) != NO_MORE_ROWS) {
   if (!(dbtemp = dbopen(pUserAttr->login,
                         pUserAttr->szDefaultServer))) {
      WinLoadString(hab, (HMODULE)NULL, IDS_CANT_LOGON,
                         sizeof(szText1), (PSZ)szText1);
      WinLoadString(hab, (HMODULE)NULL, IDS_ERROR,
                         sizeof(szText2), (PSZ)szText2);
      WinMessageBox(HWND_DESKTOP, HWND_DESKTOP,
                    szText1, szText2, (USHORT) NULL,
                    MB_OK | MB_ERROR | MB_MOVEABLE);
      dbclose(dbtemp);
      WinSetPointer(HWND_DESKTOP,
         WinQuerySysPointer(HWND_DESKTOP, SPTR_ARROW, TRUE));
      return(0);
   } /* if */
   dbuse(dbtemp, pUserAttr->szDefaultDB);

/*
    * ...And loop through them, reinserting (copy) them into
    * the SSJobStepTable with our new JobID.
    */
   do {
      safe_dbfcmd(dbtemp,
         " INSERT INTO SSJobStepTable"
         " VALUES (\"%s\", %d, \"%s\", \"%s\", \"%s\")",
         JobName,
         job_step,
         ProgramName,
         ArgList1,
         encrpt_arg);

dbsqlexec(dbtemp);
      dbresults(dbtemp);
      dbcanquery(dbtemp);
      while (dbresults(dbtemp) != NO_MORE_RESULTS)
         dbcanquery(dbtemp);

} while (dbnextrow(dbproc) != NO_MORE_ROWS);
   dbclose(dbtemp);
} /* if */

/* Clear the entry fields and reload the list box */
WinSetDlgItemText(hwnd, DID_JOBLIST_JOBNAME, "");
WinSetDlgItemText(hwnd, DID_JOBLIST_JOBDESC, "");
dbcanquery(dbproc);
while (dbresults(dbproc) != NO_MORE_RESULTS)
   dbcanquery(dbproc);
LoadListBox(hwnd, DID_JOBLIST_ADSLIST, (PSZ)NULL, (PSZ)NULL, 0);

/* Disable buttons until a selection is made from list box */
WinEnableWindow(WinWindowFromID(hwnd, DID_JOBLIST_CLONE), FALSE);
WinEnableWindow(WinWindowFromID(hwnd, DID_JOBLIST_DELETE), FALSE);
WinEnableWindow(WinWindowFromID(hwnd, DID_JOBLIST_MODIFY), FALSE);

WinSetFocus(HWND_DESKTOP,
            WinWindowFromID(hwnd, DID_JOBLIST_JOBNAME));
} /* if */
WinSetPointer(HWND_DESKTOP,
            WinQuerySysPointer(HWND_DESKTOP, SPTR_ARROW, TRUE));
return(0);

/*
```

```
 * DELETE BUTTON - Delete the selected Job.
 */
case DID_JOBLIST_DELETE: /*---------------------------------------*/
    if (GetSelectedItemString( hwnd, DID_JOBLIST_ADSLIST,
                    abBuffer, JOBNAMELENGTH, TRUE) < 0)
        return(0);

/*
     * Get password from user if needed.
     */
    pwdStruct.usPwdType = PWD_MODIFY;
    pwdStruct.pszJobData = abBuffer;
    pwdStruct.usDataType = PWD_DATA_JOBNAME;
    if (!(WinDlgBox(HWND_DESKTOP, hwnd, (PFNWP)EnterPasswordDlgProc,
                (HMODULE)NULL, IDD_PWDENTER, (PVOID) &pwdStruct))) {
        /*
         * Oops, the users does not know the password, so return.
         */
        DosBeep( 300, 300 );
        return(0);
    } /* if */

WinSetPointer(HWND_DESKTOP,
            WinQuerySysPointer(HWND_DESKTOP, SPTR_WAIT, TRUE));

/* Delete the entry from the SSJobListTable */
    safe_dbfcmd(dbproc,
            " DELETE SSJobListTable"
            " WHERE JobListName = \"%s\"",
            abBuffer);

if (dbsqlexec(dbproc)) {
        dbcanquery(dbproc);
        while (dbresults(dbproc) != NO_MORE_RESULTS)
            dbcanquery(dbproc);

/* and each step from the SSJobStepTable */
        safe_dbfcmd(dbproc,
                " delete SSJobStepTable"
                " WHERE JobListName = \"%s\"",
                abBuffer);

dbsqlexec(dbproc);

dbcanquery(dbproc);
        while (dbresults(dbproc) != NO_MORE_RESULTS)
            dbcanquery(dbproc);

LoadListBox(hwnd, DID_JOBLIST_ADSLIST, (PSZ)NULL, (PSZ)NULL, 0);

/* Disable buttons until a selection is made from list box */
        WinEnableWindow(WinWindowFromID(hwnd, DID_JOBLIST_CLONE), FALSE);
        WinEnableWindow(WinWindowFromID(hwnd, DID_JOBLIST_DELETE), FALSE);
        WinEnableWindow(WinWindowFromID(hwnd, DID_JOBLIST_MODIFY), FALSE);

} /* if */

WinSetDlgItemText(hwnd, DID_JOBLIST_JOBNAME, "");
    WinSetDlgItemText(hwnd, DID_JOBLIST_JOBDESC, "");

WinSetPointer(HWND_DESKTOP,
            WinQuerySysPointer(HWND_DESKTOP, SPTR_ARROW, TRUE));
    return(0);

/*
 * MODIFY BUTTON - Call the JobStepDlgProc to build or modify
```

```
     * the steps in this job.
     */
    case DID_JOBLIST_MODIFY: /*----------------------------------------*/
        if (GetSelectedItemString( hwnd, DID_JOBLIST_ADSLIST,
                         abBuffer, JOBNAMELENGTH, TRUE) < 0)
            return(0);

WinDlgBox(HWND_DESKTOP, hwnd, (PFNWP)JobStepDlgProc,
            (HMODULE)NULL, IDD_JOBSTEP, (PVOID)abBuffer);
        /* Load all of the Job List headers into the listbox */
        LoadListBox(hwnd, DID_JOBLIST_ADSLIST, (PSZ)NULL, (PSZ)NULL, 0);

/* Disable buttons until a selection is made from list box */
        WinEnableWindow(WinWindowFromID(hwnd, DID_JOBLIST_CLONE), FALSE);
        WinEnableWindow(WinWindowFromID(hwnd, DID_JOBLIST_DELETE), FALSE);
        WinEnableWindow(WinWindowFromID(hwnd, DID_JOBLIST_MODIFY), FALSE);

return(0);
    } /* switch */
    break;

case WM_INITDLG: /*-----------------------------------------------------*/
    /*
     * Set the pointer to the hour glass while we wait...
     */
    WinSetPointer(HWND_DESKTOP,
                  WinQuerySysPointer(HWND_DESKTOP, SPTR_WAIT, TRUE));

/*
     * Load the column title strings from the resource.
     */
    WinLoadString(hab, (HMODULE)NULL, IDS_JOBLIST_LIST1_TOP,
                  sizeof(szHeadingTop), (PSZ)szHeadingTop);
    WinLoadString(hab, (HMODULE)NULL, IDS_JOBLIST_LIST1_BOT,
                  sizeof(szHeadingBottom), (PSZ)szHeadingBottom);

/* Clear the listbox column widths */
    for (i = 0; i < JBSTP_COLUMNS; i++)
        alColWidth[i] = 0;

/* Save the buttons that live on this dialog box in an array */
    usPushButtons[0] = DID_JOBLIST_CLEAR;
    usPushButtons[1] = DID_JOBLIST_INSERT;
    usPushButtons[2] = DID_JOBLIST_CLONE;
    usPushButtons[3] = DID_JOBLIST_DELETE;
    usPushButtons[4] = DID_JOBLIST_MODIFY;
    usPushButtons[5] = DID_OK;

/* Set the default button to the OK */
    SetPushButtons(hwnd, JOBLISTNUMBUTTONS, DID_OK, usPushButtons);

/* Load all of the Job List headers into the listbox */
    LoadListBox(hwnd, DID_JOBLIST_ADSLIST, (PSZ)NULL, (PSZ)NULL, 0);

/* Disable buttons until a selection is made from list box */
    WinEnableWindow(WinWindowFromID(hwnd, DID_JOBLIST_CLONE), FALSE);
    WinEnableWindow(WinWindowFromID(hwnd, DID_JOBLIST_DELETE), FALSE);
    WinEnableWindow(WinWindowFromID(hwnd, DID_JOBLIST_MODIFY), FALSE);

/* Set Maximum entry field lengths */
    WinSendDlgItemMsg(hwnd, DID_JOBLIST_JOBNAME, EM_SETTEXTLIMIT,
        MPFROMSHORT(JOBNAMELENGTH - 1), 0L);
    WinSendDlgItemMsg(hwnd, DID_JOBLIST_JOBDESC, EM_SETTEXTLIMIT,
        MPFROMSHORT(JOBDESCLENGTH - 1), 0L);

/* Restore the default pointer */
```

-91-

```
        WinSetPointer(HWND_DESKTOP,
                     WinQuerySysPointer(HWND_DESKTOP, SPTR_ARROW, TRUE));
        return(0);

/* Multicolumn Listbox stuff */
  case WM_MEASUREITEM: /*-------------------------------------------------*/
     switch (SHORT1FROMMP(mp1)) {
        case DID_JOBLIST_ADSLIST: /*-----------------------------------*/
           return (MRFROMLONG(ADSLBMeasure(hwnd, DID_JOBLIST_ADSLIST,
                                 SHORT1FROMMP(mp2), alColWidth,
                                 JBLST_COLUMNS, DID_JOBLIST_HEADING,
                                 szHeadingTop, szHeadingBottom)));
     } /* switch */
     return(0);

case WM_DRAWITEM: /*----------------------------------------------------*/
     switch (SHORT1FROMMP(mp1)) { case DID_JOBLIST_ADSLIST: /*-----------------------------------*/
           ADSLBDraw(hwnd, DID_JOBLIST_ADSLIST, (POWNERITEM)PVOIDFROMMP(mp2),
               alColWidth, JBLST_COLUMNS, DID_JOBLIST_HEADING, FALSE);
           return (MRFROMSHORT(TRUE));
     } /* switch */
     return(0);
  } /* END SWITCH */ return WinDefDlgProc(hwnd, msg, mp1, mp2);

} /* END JobLISTDlgProc */

/***************************************************************************/
/*                                                                         */
/* JobStepDlgProc                                                          */
/*                                                                         */
/* If the user has modify priviledges for the current job this dialog      */
/* box will appear to allow job steps to be modified. Steps can be added   */
/* and the user can specify the parameter list that should be passed to    */
/* each step. An encripted parameter field is also provided that will      */
/* provide some security for data like uname and passwords that must be    */
/* included on an argument list. The encripted parameter field is stored   */
/* in the database in an unreadable format to hide the contents from ISQL  */
/* and the like.                                                           */
/***************************************************************************/
MRESULT EXPENTRY JobStepDlgProc(HWND hwnd, USHORT msg, MPARAM mp1, MPARAM mp2)
{
  static CHAR    szHeadingTop[80];
  static CHAR    szHeadingBottom[80];
  static LONG    alColWidth[JBSTP_COLUMNS];

USHORT         i;
  USHORT         usNotifyCode;
  DBCHAR         JobName[JOBNAMELENGTH];
  DBCHAR         ProgramName[STEPPRGLENGTH];
  DBCHAR         ArgList1[STEPARGSLENGTH];
  DBCHAR         ArgList2[STEPARGSLENGTH];
  DBCHAR         encrpt_arg[STEPARGSLENGTH];
  DBCHAR         JobStepNum[STEPNUMLENGTH];
  LONG           stepcount;
  CHAR           buff[250];
  CHAR           szText1[80];
  CHAR           szText2[80];
  PWDSTRUCT      pwdStruct;
  static USHORT  usPushButtons[JOBSTEPNUMBUTTONS];
  DBCHAR         TmpJobListName[JOBNAMELENGTH];
  DBSMALLINT     TmpJobStepNum;
```

```
DBCHAR          TmpProgramName[STEPPRGLENGTH];
DBCHAR          TmpArgList1[STEPARGSLENGTH];
DBCHAR          TmpArgList2[STEPARGSLENGTH];
DBSMALLINT      AdjustCount;

switch (msg) { case WM_CONTROL: /*-----------------------------------------------------*/
      usNotifyCode = (USHORT) SHORT2FROMMP(mp1);
      strcpy(JobName, (PSZ)WinQueryWindowULong(hwnd, QWL_USER));

if (usNotifyCode == LN_SELECT) {
         switch (SHORT1FROMMP(mp1)) {
            /*
             * A step has been selected.  Fill in the entry fields with
             * the step data.
             */
            case DID_JOBSTEP_ADSLIST: /*----------------------------------*/
               if (GetSelectedItemString( hwnd, DID_JOBSTEP_ADSLIST,
                              JobStepNum, STEPNUMLENGTH, TRUE) < 0)
                  return(0);

WinSetPointer(HWND_DESKTOP,
                          WinQuerySysPointer(HWND_DESKTOP, SPTR_WAIT, TRUE));

safe_dbfcmd(dbproc,
                 " SELECT"
                 "    ProgramName,"
                 "    ArgumentList1,"
                 "    ArgumentList2"
                 " FROM SSJobStepTable"
                 " WHERE JobListName LIKE \"%s\""
                 "   AND JobStepNum = %d",
                   JobName,
                   atoi(JobStepNum));

dbsqlexec(dbproc);
               dbresults(dbproc);

dbbind(dbproc, 1, NTBSTRINGBIND, (LONG)sizeof(ProgramName),
                                                          ProgramName);
               dbbind(dbproc, 2, NTBSTRINGBIND, (LONG)sizeof(ArgList1),
                                                          ArgList1);
               dbbind(dbproc, 3, NTBSTRINGBIND, (LONG)sizeof(encrpt_arg),
                                                          encrpt_arg);

if (dbnextrow(dbproc) != NO_MORE_ROWS) {
                  WinSetDlgItemText(hwnd, DID_JOBSTEP_COMBO, ProgramName);
                  WinSetDlgItemText(hwnd, DID_JOBSTEP_ARGS1, ArgList1);
                  /* Decript the arg list before displaying */
                  ADSEncrypt(encrpt_arg, ArgList2);
                  WinSetDlgItemText(hwnd, DID_JOBSTEP_ARGS2, ArgList2);
               } /* if */
               dbcanquery(dbproc);
               while (dbresults(dbproc) != NO_MORE_RESULTS)
                  dbcanquery(dbproc);

SetJobStepOptions(hwnd);

WinSetPointer(HWND_DESKTOP,
                          WinQuerySysPointer(HWND_DESKTOP, SPTR_ARROW, TRUE));
               break;

case DID_JOBSTEP_COMBO:
               SetJobStepOptions(hwnd);
               break;
```

```
        } /* switch */
    } /* if */
    break;

case WM_COMMAND: /*----------------------------------------------------*/
    strcpy(JobName, (PSZ)WinQueryWindowULong(hwnd, QWL_USER));

switch (COMMANDMSG(&msg)->cmd) {
        case DID_OK: /*----------------------------------------------*/
            WinDismissDlg(hwnd, TRUE);
            return(0);

/*
         * CLEAR BUTTON - Clear the listbox selection and erase the
         * contents of the entry fields.
         */
        case DID_JOBSTEP_CLEAR: /*---------------------------------*/
            WinSendDlgItemMsg(hwnd, DID_JOBSTEP_ADSLIST, LM_SELECTITEM,
                                                (MPARAM)LIT_NONE, 0L);
            WinSetDlgItemText(hwnd, DID_JOBSTEP_COMBO, "");
            WinSetDlgItemText(hwnd, DID_JOBSTEP_ARGS1, "");
            WinSetDlgItemText(hwnd, DID_JOBSTEP_ARGS2, "");

SetPushButtons(hwnd, JOBSTEPNUMBUTTONS, DID_JOBSTEP_APPEND,
                                                usPushButtons);
            SetJobStepOptions(hwnd);

WinSetFocus(HWND_DESKTOP,
                        WinWindowFromID(hwnd, DID_JOBSTEP_COMBO));
            return(0);

/*
         * APPEND BUTTON - Take the entryfield data and append the step
         * list with this new step.
         */
        case DID_JOBSTEP_APPEND: /*--------------------------------*/
            if (!WinQueryDlgItemText(hwnd, DID_JOBSTEP_COMBO,
                                            STEPPRGLENGTH, ProgramName))
            {
                WinSetFocus(HWND_DESKTOP,
                            WinWindowFromID(hwnd, DID_JOBSTEP_COMBO));
                return(0);
            }

WinQueryDlgItemText(hwnd, DID_JOBSTEP_ARGS1,
                                        STEPARGSLENGTH, ArgList1);

WinQueryDlgItemText(hwnd, DID_JOBSTEP_ARGS2,
                                        STEPARGSLENGTH, ArgList2);

/* This upper limit on the argument list is limited by the OS */
            if (strlen(ArgList1) + strlen(ArgList2) > STEPARGSLENGTH) {
                DosBeep( 400, 50 );
                WinLoadString(hab, (HMODULE)NULL, IDS_TOO_LONG,
                                        sizeof(szText1), (PSZ)szText1);
                WinLoadString(hab, (HMODULE)NULL, IDS_WARNING,
                                        sizeof(szText2), (PSZ)szText2);
                WinMessageBox(HWND_DESKTOP, hwnd, szText1, szText2,
                                0, MB_OK | MB_WARNING | MB_MOVEABLE);
                return(0);
            } /* if */
            WinSetPointer(HWND_DESKTOP,
                        WinQuerySysPointer(HWND_DESKTOP, SPTR_WAIT, TRUE));

/* Encript the second argument list */
            ADSEncrypt(ArgList2, encrpt_arg);
```

```c
/* Get the number of job steps already present */
safe_dbfcmd(dbproc,
 " SELECT count(*)"
 " FROM SSJobStepTable"
 " WHERE JobListName LIKE \"%s\"",
    JobName);

dbsqlexec(dbproc);
dbresults(dbproc);
dbbind(dbproc, 1, INTBIND, (DBINT)0, (BYTE *) &stepcount);

dbnextrow(dbproc);
dbcanquery(dbproc);
while (dbresults(dbproc) != NO_MORE_RESULTS)
    dbcanquery(dbproc);

/* Append the new job step */
safe_dbfcmd(dbproc,
     " INSERT INTO SSJobStepTable"
     " VALUES (\"%s\", %d, \"%s\", \"%s\", \"%s\")",
        JobName,
        (SHORT)(stepcount + 1),
        ProgramName,
        ArgList1,
        encrpt_arg);

if (dbsqlexec(dbproc)) {
    dbresults(dbproc);

/* Update the modification time */
    safe_dbfcmd(dbproc,
     " UPDATE SSJobListTable"
     " SET"
     "     BuiltBy = user_name(-1),"
     "     LastMod = getdate()"
     " WHERE JobListName = \"%s\"",
        JobName);

dbsqlexec(dbproc);
    dbresults(dbproc);

/* Clear the entry fields */
    WinSetDlgItemText(hwnd, DID_JOBSTEP_COMBO, "");
    WinSetDlgItemText(hwnd, DID_JOBSTEP_ARGS1, "");
    WinSetDlgItemText(hwnd, DID_JOBSTEP_ARGS2, "");

while (dbresults(dbproc) != NO_MORE_RESULTS) ;
    dbcanquery(dbproc);
    while (dbresults(dbproc) != NO_MORE_RESULTS)
        dbcanquery(dbproc);

/* Reload the list box the the steps for the current job */
    strcpy(buff, (PSZ)WinQueryWindowULong(hwnd, QWL_USER));
    LoadListBox(hwnd, DID_JOBSTEP_ADSLIST,
                            (PSZ) buff, (PSZ)NULL, 0);

SetJobStepOptions(hwnd);

WinSetFocus(HWND_DESKTOP,
                WinWindowFromID(hwnd, DID_JOBSTEP_COMBO));
} /* if */
WinSetPointer(HWND_DESKTOP,
          WinQuerySysPointer(HWND_DESKTOP, SPTR_ARROW, TRUE));
return(0);

/*
```

-95-

```
* UPDATE BUTTON - Modify the selected job step with the
* entry field data.
*/
case DID_JOBSTEP_UPDATE: /*---------------------------------------*/
    if (GetSelectedItemString( hwnd, DID_JOBSTEP_ADSLIST,
                        JobStepNum, STEPNUMLENGTH, TRUE) < 0)
    {
        WinSetFocus(HWND_DESKTOP,
                    WinWindowFromID(hwnd, DID_JOBSTEP_COMBO));
        return(0);
    }

/* Get the data from the user */
    if (!WinQueryDlgItemText(hwnd, DID_JOBSTEP_COMBO,
                        STEPPRGLENGTH, ProgramName))
        return(0);

WinQueryDlgItemText(hwnd, DID_JOBSTEP_ARGS1,
                        STEPARGSLENGTH, ArgList1);

WinQueryDlgItemText(hwnd, DID_JOBSTEP_ARGS2,
                        STEPARGSLENGTH, ArgList2);

if (strlen(ArgList1) + strlen(ArgList2) > STEPARGSLENGTH) {
        DosBeep( 400, 50 );
        WinLoadString(hab, (HMODULE)NULL, IDS_TOO_LONG,
                        sizeof(szText1), (PSZ)szText1);
        WinLoadString(hab, (HMODULE)NULL, IDS_WARNING,
                        sizeof(szText2), (PSZ)szText2);
        WinMessageBox(HWND_DESKTOP, hwnd, szText1, szText2,
                    0, MB_OK | MB_WARNING | MB_MOVEABLE);
        return(0);
    } /* if */

WinSetPointer(HWND_DESKTOP,
                WinQuerySysPointer(HWND_DESKTOP, SPTR_WAIT, TRUE));

ADSEncrypt ( ArgList2, encrpt_arg );

/* Update the selected step */
    safe_dbfcmd(dbproc,
    " UPDATE SSJobStepTable"
    " SET"
    "     ProgramName = \"%s\","
    "     ArgumentList1 = \"%s\","
    "     ArgumentList2 = \"%s\""
    " WHERE JobListName = \"%s\""
    "   AND JobStepNum = %d",
        ProgramName,
        ArgList1,
        encrpt_arg,
        JobName,
        atoi(JobStepNum));

if (dbsqlexec(dbproc)) {
        dbcanquery(dbproc);
        while (dbresults(dbproc) != NO_MORE_RESULTS)
            dbcanquery(dbproc);

/* Update the job modification time. */
        safe_dbfcmd(dbproc,
        " UPDATE SSJobListTable"
        " SET"
        "     BuiltBy = user_name(-1),"
        "     LastMod = getdate()"
        " WHERE JobListName = \"%s\"",
```

-96-

```
            JobName);

dbsqlexec(dbproc);
    dbcanquery(dbproc);
    while (dbresults(dbproc) != NO_MORE_RESULTS)
        dbcanquery(dbproc);

/* Clear the entry fields */
    WinSetDlgItemText(hwnd, DID_JOBSTEP_COMBO, "");
    WinSetDlgItemText(hwnd, DID_JOBSTEP_ARGS1, "");
    WinSetDlgItemText(hwnd, DID_JOBSTEP_ARGS2, "");
    strcpy(buff, (PSZ)WinQueryWindowULong(hwnd, QWL_USER));

/* Reload the listbox to reflect the changes */
    LoadListBox(hwnd, DID_JOBSTEP_ADSLIST,
                (PSZ) buff, (PSZ)NULL, 0);

SetJobStepOptions(hwnd);

WinSetFocus(HWND_DESKTOP,
                WinWindowFromID(hwnd, DID_JOBSTEP_COMBO));
    } /* if */
    WinSetPointer(HWND_DESKTOP,
            WinQuerySysPointer(HWND_DESKTOP, SPTR_ARROW, TRUE));
    return(0);

/*
 * INSERT BUTTON - Insert a job step BEFORE the currently
 * selected step.
 */
case DID_JOBSTEP_INSERT: /*----------------------------------------*/
    if (GetSelectedItemString( hwnd, DID_JOBSTEP_ADSLIST,
                    JobStepNum, STEPNUMLENGTH, TRUE) < 0)
    {
        WinSetFocus(HWND_DESKTOP,
                WinWindowFromID(hwnd, DID_JOBSTEP_COMBO));
        return(0);
    }

/* Get the user input data */
    if (!WinQueryDlgItemText(hwnd, DID_JOBSTEP_COMBO,
                        STEPPRGLENGTH, ProgramName))
        return(0);

WinQueryDlgItemText(hwnd, DID_JOBSTEP_ARGS1,
                        STEPARGSLENGTH, ArgList1);

WinQueryDlgItemText(hwnd, DID_JOBSTEP_ARGS2,
                        STEPARGSLENGTH, ArgList2);

/* Make sure that the combined arg lists are not too big */
    if (strlen(ArgList1) + strlen(ArgList2) > STEPARGSLENGTH) {
        DosBeep( 400, 50 );
        WinLoadString(hab, (HMODULE)NULL, IDS_TOO_LONG,
                            sizeof(szText1), (PSZ)szText1);
        WinLoadString(hab, (HMODULE)NULL, IDS_WARNING,
                            sizeof(szText2), (PSZ)szText2);
        WinMessageBox(HWND_DESKTOP, hwnd, szText1, szText2,
                    0, MB_OK | MB_WARNING | MB_MOVEABLE);
        return(0);
    } /* if */

WinSetPointer(HWND_DESKTOP,
            WinQuerySysPointer(HWND_DESKTOP, SPTR_WAIT, TRUE));

ADSEncrypt(ArgList2, encrpt_arg);
```

```
/* must make room for the item to be inserted      */
/* this is done by deleting rows >= JobStepNum and */
/* re-inserting them with JobStepNum incremented   */

/* Get the number of job steps already present */
safe_dbfcmd(dbproc,
 " SELECT count(*)"
 " FROM SSJobStepTable"
 " WHERE JobListName LIKE \"%s\"",
   JobName);

dbsqlexec(dbproc);
dbresults(dbproc);
dbbind(dbproc, 1, INTBIND, (DBINT)0, (BYTE *) &stepcount);

dbnextrow(dbproc);
dbcanquery(dbproc);
while (dbresults(dbproc) != NO_MORE_RESULTS)
    dbcanquery(dbproc);

while (stepcount >= atoi(JobStepNum))
{
    safe_dbfcmd(dbproc,
        " SELECT *"
        " FROM SSJobStepTable"
        " WHERE JobListName = \"%s\""
        " AND JobStepNum = %d",
        JobName,
        (DBSMALLINT)stepcount);

if (dbsqlexec(dbproc) == FAIL)
        continue;
    dbresults(dbproc);
    dbbind(dbproc, 1, NTBSTRINGBIND, (LONG)sizeof(TmpJobListName),
        TmpJobListName);
    dbbind(dbproc, 2, SMALLBIND, (LONG)sizeof(TmpJobStepNum),
        (BYTE *)&TmpJobStepNum);
    dbbind(dbproc, 3, NTBSTRINGBIND, (LONG)sizeof(TmpProgramName),
        TmpProgramName);
    dbbind(dbproc, 4, NTBSTRINGBIND, (LONG)sizeof(TmpArgList1),
        TmpArgList1);
    dbbind(dbproc, 5, NTBSTRINGBIND, (LONG)sizeof(TmpArgList2),
        TmpArgList2);
    dbnextrow(dbproc);
    dbcanquery(dbproc);
    while (dbresults(dbproc) != NO_MORE_RESULTS)
        dbcanquery(dbproc);

/* delete the current record */
    safe_dbfcmd(dbproc,
        " DELETE SSJobStepTable"
        " WHERE JobListName = \"%s\""
        " AND JobStepNum = %d",
        TmpJobListName, TmpJobStepNum);

dbsqlexec(dbproc);
    dbcanquery(dbproc);
    while (dbresults(dbproc) != NO_MORE_RESULTS)
        dbcanquery(dbproc);

/* increment the job step and re-insert into table */
    TmpJobStepNum++;
    safe_dbfcmd(dbproc,
        " INSERT INTO SSJobStepTable"
        " VALUES (\"%s\", %d, \"%s\", \"%s\", \"%s\")",
        TmpJobListName, TmpJobStepNum, TmpProgramName,
```

```
        TmpArgList1, TmpArgList2);

dbsqlexec(dbproc);
    dbcanquery(dbproc);
    while (dbresults(dbproc) != NO_MORE_RESULTS)
        dbcanquery(dbproc);

stepcount--;
}

/* Insert new step into the SSJobStepTable at JobStepNum */
safe_dbfcmd(dbproc,
    " INSERT INTO SSJobStepTable"
    " VALUES (\"%s\", %d, \"%s\", \"%s\", \"%s\")",
    JobName,
    (DBSMALLINT)atoi(JobStepNum),
    ProgramName,
    ArgList1,
    encrpt_arg);

if (dbsqlexec(dbproc)) {
    dbcanquery(dbproc);
    while (dbresults(dbproc) != NO_MORE_RESULTS)
        dbcanquery(dbproc);

/* Update job modification time and date */
    safe_dbfcmd(dbproc,
        " UPDATE SSJobListTable"
        " SET"
        "     BuiltBy = user_name(-1),"
        "     LastMod = getdate()"
        " WHERE JobListName = \"%s\"",
        JobName);

dbsqlexec(dbproc);
    dbcanquery(dbproc);
    while (dbresults(dbproc) != NO_MORE_RESULTS)
        dbcanquery(dbproc);

/* Clear the entry fields */
    WinSetDlgItemText(hwnd, DID_JOBSTEP_COMBO, "");
    WinSetDlgItemText(hwnd, DID_JOBSTEP_ARGS1, "");
    WinSetDlgItemText(hwnd, DID_JOBSTEP_ARGS2, "");
    strcpy(buff, (PSZ)WinQueryWindowULong(hwnd, QWL_USER));

/* Reload the listbox to reflect the changes */
    LoadListBox(hwnd, DID_JOBSTEP_ADSLIST,
                (PSZ) buff, (PSZ)NULL, 0);

SetJobStepOptions(hwnd);

WinSetFocus(HWND_DESKTOP,
                WinWindowFromID(hwnd, DID_JOBSTEP_COMBO));
} /* if */
WinSetPointer(HWND_DESKTOP,
            WinQuerySysPointer(HWND_DESKTOP, SPTR_ARROW, TRUE));
return(0);

/*
 * DELETE BUTTON - Delete the currently selected Job Step,
 * without clearing the data from the entry fields to allow the
 * user to reverse this action.
 */
case DID_JOBSTEP_DELETE: /*----------------------------------------*/
    if (GetSelectedItemString( hwnd, DID_JOBSTEP_ADSLIST,
                        JobStepNum, STEPNUMLENGTH, TRUE) < 0 )
```

-99-

```
{
   WinSetFocus(HWND_DESKTOP,
               WinWindowFromID(hwnd, DID_JOBSTEP_COMBO));
   return(0);
}

WinSetPointer(HWND_DESKTOP,
           WinQuerySysPointer(HWND_DESKTOP, SPTR_WAIT, TRUE));

/* Delete the step from the JobStepTable */
safe_dbfcmd(dbproc,
      " DELETE SSJobStepTable"
      " WHERE JobListName = \"%s\""
      " AND JobStepNum = %d",
         JobName,
         atoi(JobStepNum));

dbsqlexec(dbproc);
dbcanquery(dbproc);
while (dbresults(dbproc) != NO_MORE_RESULTS)
    dbcanquery(dbproc);

/* get the number of Job Steps */
safe_dbfcmd(dbproc,
   " SELECT count(*)"
   " FROM SSJobStepTable"
   " WHERE JobListName LIKE \"%s\"",
     JobName);

dbsqlexec(dbproc);
dbresults(dbproc);
dbbind(dbproc, 1, INTBIND, (DBINT)0, (BYTE *) &stepcount);

dbnextrow(dbproc);
dbcanquery(dbproc);
while (dbresults(dbproc) != NO_MORE_RESULTS)
    dbcanquery(dbproc);

AdjustCount = atoi(JobStepNum);
TmpJobStepNum = AdjustCount;
while (AdjustCount <= (DBSMALLINT)stepcount)
{
    TmpJobStepNum++;
    safe_dbfcmd(dbproc,
         " SELECT *"
         " FROM SSJobStepTable"
         " WHERE JobListName = \"%s\""
         "  AND JobStepNum = %d",
         JobName,
         TmpJobStepNum);

dbsqlexec(dbproc);
    dbresults(dbproc);
    dbbind(dbproc, 1, NTBSTRINGBIND, (LONG)sizeof(TmpJobListName),
           TmpJobListName);
    dbbind(dbproc, 2, SMALLBIND, (LONG)sizeof(TmpJobStepNum),
           (BYTE *)&TmpJobStepNum);
    dbbind(dbproc, 3, NTBSTRINGBIND, (LONG)sizeof(TmpProgramName),
           TmpProgramName);
    dbbind(dbproc, 4, NTBSTRINGBIND, (LONG)sizeof(TmpArgList1),
           TmpArgList1);
    dbbind(dbproc, 5, NTBSTRINGBIND, (LONG)sizeof(TmpArgList2),
           TmpArgList2);
    if (dbnextrow(dbproc) == FAIL)
       continue;
    dbcanquery(dbproc);
```

-100-

```
    while (dbresults(dbproc) != NO_MORE_RESULTS)
       dbcanquery(dbproc);

/* delete the current record */
    safe_dbfcmd(dbproc,
        " DELETE SSJobStepTable"
        " WHERE JobListName = \"%s\""
        "   AND JobStepNum = %d",
        TmpJobListName, TmpJobStepNum);

dbsqlexec(dbproc);
    dbcanquery(dbproc);
    while (dbresults(dbproc) != NO_MORE_RESULTS)
       dbcanquery(dbproc);

/* re-insert into table */
    safe_dbfcmd(dbproc,
        " INSERT INTO SSJobStepTable"
        " VALUES (\"%s\", %d, \"%s\", \"%s\", \"%s\")",
        TmpJobListName, AdjustCount, TmpProgramName,
        TmpArgList1, TmpArgList2);

dbsqlexec(dbproc);
    dbcanquery(dbproc);
    while (dbresults(dbproc) != NO_MORE_RESULTS)
       dbcanquery(dbproc);

AdjustCount++;
}

/* Update the Job modification time and date */
safe_dbfcmd(dbproc,
 " UPDATE SSJobListTable"
 " SET"
 "     BuiltBy = user_name(-1),"
 "     LastMod = getdate()"
 " WHERE JobListName = \"%s\"",
   JobName);

dbsqlexec(dbproc);
dbcanquery(dbproc);
while (dbresults(dbproc) != NO_MORE_RESULTS)
   dbcanquery(dbproc);

strcpy(buff, (PSZ)WinQueryWindowULong(hwnd, QWL_USER));

/* Reload the list to reflect the changes */
LoadListBox(hwnd, DID_JOBSTEP_ADSLIST,
            (PSZ) buff, (PSZ)NULL, 0);

SetJobStepOptions(hwnd);

WinSetDlgItemText(hwnd, DID_JOBSTEP_COMBO, "");
WinSetDlgItemText(hwnd, DID_JOBSTEP_ARGS1, "");
WinSetDlgItemText(hwnd, DID_JOBSTEP_ARGS2, "");

WinSetPointer(HWND_DESKTOP,
            WinQuerySysPointer(HWND_DESKTOP, SPTR_ARROW, TRUE));
return(0);

/*
 * PASSWORDS... BUTTON calls the SetPasswordDlgProc to enable
 * the user to set, modify, or delete passwords for limiting
 * access to modifications of, or the scheduling of, the current
 * job.
 */
```

-101-

```
        case DID_JOBSTEP_PASSWORDS: /*----------------------------------*/
            /* Last parameter here is the JobID */
            WinDlgBox(HWND_DESKTOP, hwnd, (PFNWP)SetPasswordDlgProc,
                (HMODULE)NULL, IDD_PWDSET,
                (PVOID)WinQueryWindowULong(hwnd, QWL_USER));
            /*
             * Set the on-screen indicators to reflect the new status
             * (i.e. existance of) the modification and scheduling
             * passwords.
             */
            SetPasswordFlags(hwnd, JobName, dbproc);
            return(0);
        } /* switch */
        break;

case WM_INITDLG: /*-----------------------------------------------------*/
        /*
         * Get password from user if needed.  If the user does not
         * know the modify password for this job we will not create
         * the JobStepDlgProc nor will we display the job steps or
         * arguments.
         */
        pwdStruct.usPwdType = PWD_MODIFY;
        pwdStruct.pszJobData = (PSZ)PVOIDFROMMP(mp2);
        pwdStruct.usDataType = PWD_DATA_JOBNAME;
        if (!(WinDlgBox(HWND_DESKTOP, hwnd, (PFNWP)EnterPasswordDlgProc,
                    (HMODULE)NULL, IDD_PWDENTER, (PVOID) &pwdStruct))) {
            /*
             * Oops, the users does not know the password, so return.
             */
            DosBeep( 300, 300 );
            WinDismissDlg(hwnd, TRUE);
            return(0);
        } /* if */

/* Change the pointer to the hour glass */
        WinSetPointer(HWND_DESKTOP,
                    WinQuerySysPointer(HWND_DESKTOP, SPTR_WAIT, TRUE));

/*
         * Load the column title strings from the resource.
         */
        WinLoadString(hab, (HMODULE)NULL, IDS_JOBSTEP_LIST1_TOP,
                    sizeof(szHeadingTop), (PSZ)szHeadingTop);
        WinLoadString(hab, (HMODULE)NULL, IDS_JOBSTEP_LIST1_BOT,
                    sizeof(szHeadingBottom), (PSZ)szHeadingBottom);

/* Clear the column widths for the multicolumn listbox */
        for (i = 0; i < JBSTP_COLUMNS; i++)
                alColWidth[i] = 0;

/* Store the button ids in an array */
        usPushButtons[0] = DID_JOBSTEP_CLEAR;
        usPushButtons[1] = DID_JOBSTEP_APPEND;
        usPushButtons[2] = DID_JOBSTEP_INSERT;
        usPushButtons[3] = DID_JOBSTEP_UPDATE;
        usPushButtons[4] = DID_JOBSTEP_DELETE;
        usPushButtons[5] = DID_OK;

/* Set the button keyboard default to OK */
        SetPushButtons(hwnd, JOBSTEPNUMBUTTONS, DID_OK, usPushButtons);

/* Save Job Name */
        WinSetWindowULong(hwnd, QWL_USER, LONGFROMMP(mp2));

/* Set dialog box title bar */
```

```
        WinLoadString(hab, (HMODULE)NULL, IDS_JOB_NAME, sizeof(buff), buff);
        sprintf(buff, "%s: %s", buff, (PSZ) PVOIDFROMMP(mp2));
        WinSetWindowText(hwnd, buff);

/* Load the job steps into the main listbox on the dlg */
        LoadListBox(hwnd, DID_JOBSTEP_ADSLIST,
                    (PSZ) PVOIDFROMMP(mp2), (PSZ)NULL, 0);

/*
         * Load the registered executable program names into the
         * combo box. (Nothing outside of this list will be acceptable.)
         */
        LoadListBox(hwnd, DID_JOBSTEP_COMBO, (PSZ) "ALL", (PSZ)NULL, 0);

SetJobStepOptions(hwnd);

/* Set Maximum entry field lengths */
        WinSendDlgItemMsg(hwnd, DID_JOBSTEP_ARGS1, EM_SETTEXTLIMIT,
            MPFROMSHORT(STEPARGSLENGTH - 1), 0L);
        WinSendDlgItemMsg(hwnd, DID_JOBSTEP_ARGS2, EM_SETTEXTLIMIT,
            MPFROMSHORT(STEPARGSLENGTH - 1), 0L);

/* Set the on-screen password indicators */
        SetPasswordFlags(hwnd, (PSZ) PVOIDFROMMP(mp2), dbproc);

/* Restore the pointer to the default */
        WinSetPointer(HWND_DESKTOP,
                      WinQuerySysPointer(HWND_DESKTOP, SPTR_ARROW, TRUE));
        return(0);

/* Multicolumn listbox stuff */
    case WM_MEASUREITEM: /*----------------------------------------------*/
        switch (SHORT1FROMMP(mp1)) {
            case DID_JOBSTEP_ADSLIST: /*------------------------------------*/
                return (MRFROMLONG(ADSLBMeasure(hwnd, DID_JOBSTEP_ADSLIST,
                                    SHORT1FROMMP(mp2), alColWidth,
                                    JBSTP_COLUMNS, DID_JOBSTEP_HEADING,
                                    szHeadingTop, szHeadingBottom)));
        } /* switch */
        return(0);

case WM_DRAWITEM: /*--------------------------------------------------*/
        switch (SHORT1FROMMP(mp1)) {
            case DID_JOBSTEP_ADSLIST: /*------------------------------------*/
                ADSLBDraw(hwnd, DID_JOBSTEP_ADSLIST, (POWNERITEM)PVOIDFROMMP(mp2),
                    alColWidth, JBSTP_COLUMNS, DID_JOBSTEP_HEADING, FALSE);
                return (MRFROMSHORT(TRUE));
        } /* switch */
        return(0);
    } /* END SWITCH */ return WinDefDlgProc(hwnd, msg, mp1, mp2);

} /* END JobStepDlgProc */

/*************************************************************************
***/
/*                                                                      */
/* EnterPasswordDlgProc                                                 */
/*                                                                      */
/* This routine creates a small dialog box that prompts the user to enter */
/* password. Since password locks can be created on both the modification */
/* and the scheduling of a job, the usPwdType member of the PWDSTRUCT  */
/* identifies the type of password to be queried: PWD_MODIFY or PWD_SCHED. */
/* The password can be checked if the actual job name is provided or if */
```

```
/* a JobRunId is provided (the job name will be located automatically.    */
/*                                                                        */
/* Set the usDataType member to PWD_DATA_JOBNAME if the job name text is  */
/* being passed in member pszJobData.  Set usDataType to PWD_DATA_JOBID   */
/* if the job id is placed in member pszJobData.                          */
/************************************************************************/
MRESULT EXPENTRY EnterPasswordDlgProc(HWND hwnd, USHORT msg,
                                      MPARAM mp1, MPARAM mp2)
{
  DBCHAR        input_password[PASSWORDLENGTH];
  static DBCHAR ModifyPwd[PASSWORDLENGTH];
  static DBCHAR SchedPwd[PASSWORDLENGTH];
  static DBCHAR JobName[JOBNAMELENGTH];
  CHAR          buff1[PASSWORDLENGTH];
  PWDSTRUCT     *ppwdStruct;

switch (msg) {
    case WM_INITDLG: /*---------------------------------------------------*/
        WinSetPointer(HWND_DESKTOP,
                      WinQuerySysPointer(HWND_DESKTOP, SPTR_WAIT, TRUE));

/*
         * If the user is an administrator (ie the IDM_ADMIN menu exists),
         * we will not ask for the password.
         */
        if (GBLbAdmin)
            WinDismissDlg(hwnd, TRUE);

/* Set Max number of characters of the entry field */
        WinSendDlgItemMsg(hwnd, DID_PWDENTER_ENT1, EM_SETTEXTLIMIT,
            MPFROMSHORT(PASSWORDLENGTH - 1), 0L);

/* Save Structure Pointer */
        WinSetWindowULong(hwnd, QWL_USER, LONGFROMMP(mp2));
        ppwdStruct = (PWDSTRUCT *) LONGFROMMP(mp2);

/****************************************************************
         * At this point we don't yet know if a password has been set for
         * this job.  Lets check.
         ****************************************************************/

/*
         * If we have been given a job ID rather than the JobName, look up
         * the JobName...
         */
        if (ppwdStruct->usDataType == PWD_DATA_JOBID) { safe_dbfcmd(dbproc,
              " SELECT"
              "     PT.JobListName,"
              "     ModPwd,"
              "     SchedPwd"
              " FROM SSPendingJobTable PT, SSJobListTable"
              " WHERE PT.JobListName = SSJobListTable.JobListName"
              "   AND JobRunID = %ld",
                atol(ppwdStruct->pszJobData));

dbsqlexec(dbproc);
            dbresults(dbproc);
            dbbind(dbproc, 1, NTBSTRINGBIND, (LONG)JOBNAMELENGTH, JobName);
            dbbind(dbproc, 2, NTBSTRINGBIND, (LONG)sizeof(ModifyPwd), ModifyPwd);
            dbbind(dbproc, 3, NTBSTRINGBIND, (LONG)sizeof(SchedPwd), SchedPwd);
            dbnextrow(dbproc);
            dbcanquery(dbproc);
            while (dbresults(dbproc) != NO_MORE_RESULTS)
                dbcanquery(dbproc);
```

-104-

```
    } /* if */
    /*
     * Else the JobName was provided.
     */
    else { safe_dbfcmd(dbproc,
            " SELECT"
            "     ModPwd,"
            "     SchedPwd"
            " FROM SSJobListTable"
            " WHERE JobListName LIKE \"%s\"",
              ppwdStruct->pszJobData);

dbsqlexec(dbproc);
        dbresults(dbproc);

dbbind(dbproc, 1, NTBSTRINGBIND, (LONG)sizeof(ModifyPwd),
                                                    ModifyPwd);
        dbbind(dbproc, 2, NTBSTRINGBIND, (LONG)sizeof(SchedPwd),
                                                    SchedPwd);
        dbnextrow(dbproc);
        dbcanquery(dbproc);
        while (dbresults(dbproc) != NO_MORE_RESULTS)
            dbcanquery(dbproc);
    } /* else */
    /*
     * Check type of password check needed.  If password exists
     * (ie >= 6 chars) continue, else this dialog is not needed.
     */
    if (ppwdStruct->usPwdType == PWD_MODIFY) {
        if (strlen(ModifyPwd) < 6)
            WinDismissDlg(hwnd, TRUE);
    } /* if */
    else if (strlen(SchedPwd) < 6)
        WinDismissDlg(hwnd, TRUE);
    WinSetPointer(HWND_DESKTOP,
                WinQuerySysPointer(HWND_DESKTOP, SPTR_ARROW, TRUE));
    return(0);

case WM_COMMAND: /*-------------------------------------------------*/
    switch (COMMANDMSG(&msg)->cmd) {
        case DID_CANCEL: /*--------------------------------------------*/
            WinDismissDlg(hwnd, FALSE);
            return(0);

case DID_OK: /*------------------------------------------------*/
            WinQueryDlgItemText(hwnd, DID_PWDENTER_ENT1,
                                    PASSWORDLENGTH, input_password);

ADSEncrypt(input_password, buff1);

ppwdStruct = (PWDSTRUCT *) WinQueryWindowULong(hwnd, QWL_USER);

/*
             * Check type of password check needed and compare with correct
             * database field.
             */
            if (ppwdStruct->usPwdType == PWD_MODIFY)
                WinDismissDlg(hwnd,
                            strcmp(buff1, ModifyPwd) == 0);
            else
                WinDismissDlg(hwnd,
                            strcmp(buff1, SchedPwd) == 0);
            return(0);
    } /* switch */
```

```
  } /* switch */
  return WinDefDlgProc(hwnd, msg, mp1, mp2);

} /* END */

/****************************************************************************/
/*                                                                          */
/* SetPasswordDlgProc                                                       */
/*                                                                          */
/* This routine creates a dialog box that lets the user set job modification */
/* and scheduling passwords.  Since these passwords are entered into fields */
/* that do not allow the user to see what he has typed, a verify field      */
/* is used to help reduce typing errors.  To delete a password the user     */
/* delete all of the * placeholders from both the password field and from  */
/* verification field.                                                      */
/*                                                                          */
/* The passwords are encripted here before being saved in the database.    */
/****************************************************************************/
MRESULT EXPENTRY SetPasswordDlgProc(HWND hwnd, USHORT msg, MPARAM mp1, MPARAM mp2)
{
  DBCHAR    ModifyPwd[PASSWORDLENGTH];
  DBCHAR    modify_verify[PASSWORDLENGTH];
  DBCHAR    SchedPwd[PASSWORDLENGTH];
  DBCHAR    JobName[JOBNAMELENGTH];
  DBCHAR    sched_verify[PASSWORDLENGTH];
  SHORT     sModLength;
  SHORT     sSchLength;
  CHAR      buff1[PASSWORDLENGTH];
  CHAR      buff2[PASSWORDLENGTH];
  CHAR      szText1[80];
  CHAR      szText2[80];

switch (msg) {
    case WM_INITDLG: /*-----------------------------------------------------*/
      WinSetPointer(HWND_DESKTOP,
                    WinQuerySysPointer(HWND_DESKTOP, SPTR_WAIT, TRUE));
      /* Set text limits for the four entry fields */
      WinSendDlgItemMsg(hwnd, DID_PWDSET_ENT1, EM_SETTEXTLIMIT,
          MPFROMSHORT(PASSWORDLENGTH - 1), 0L);
      WinSendDlgItemMsg(hwnd, DID_PWDSET_ENT2, EM_SETTEXTLIMIT,
          MPFROMSHORT(PASSWORDLENGTH - 1), 0L);
      WinSendDlgItemMsg(hwnd, DID_PWDSET_ENT3, EM_SETTEXTLIMIT,
          MPFROMSHORT(PASSWORDLENGTH - 1), 0L);
      WinSendDlgItemMsg(hwnd, DID_PWDSET_ENT4, EM_SETTEXTLIMIT,
          MPFROMSHORT(PASSWORDLENGTH - 1), 0L);

/* Save Job Name */
      WinSetWindowULong(hwnd, QWL_USER, LONGFROMMP(mp2));

/* Query the SSJobListTable for the passwords for JobName */ safe_dbfcmd(dbproc,
        " SELECT"
        "     ModPwd,"
        "     SchedPwd"
        " FROM SSJobListTable"
        " WHERE JobListName LIKE \"%s\"",
          LONGFROMMP(mp2));

dbsqlexec(dbproc);
      dbresults(dbproc);

dbbind(dbproc, 1, NTBSTRINGBIND, (LONG)sizeof(ModifyPwd),
                                                    ModifyPwd);
      dbbind(dbproc, 2, NTBSTRINGBIND, (LONG)sizeof(SchedPwd),
```

-106-

```
                                                          SchedPwd);
    /*
     * Set the entry fields to the existing passwords.  These will
     * really only show a character count.
     */
    if (dbnextrow(dbproc) != NO_MORE_ROWS) {
       ADSEncrypt(ModifyPwd, buff1);
       WinSetDlgItemText(hwnd, DID_PWDSET_ENT1, buff1);
       WinSetDlgItemText(hwnd, DID_PWDSET_ENT2, buff1);
       ADSEncrypt(SchedPwd, buff1);
       WinSetDlgItemText(hwnd, DID_PWDSET_ENT3, buff1);
       WinSetDlgItemText(hwnd, DID_PWDSET_ENT4, buff1);
    } /* if */
    dbcanquery(dbproc);
    while (dbresults(dbproc) != NO_MORE_RESULTS)
       dbcanquery(dbproc);
    WinSetPointer(HWND_DESKTOP,
                 WinQuerySysPointer(HWND_DESKTOP, SPTR_ARROW, TRUE));
    return(0);

case WM_COMMAND: /*---------------------------------------------------*/
    switch (COMMANDMSG(&msg)->cmd) {

/* The user is committing to his changes */
       case DID_OK: /*------------------------------------------------*/ strcpy(JobName, (PSZ)WinQueryWindowULong(hwnd, QWL_USER));
          /*
           * Check the length of the modify password. If it exists
           * (ie length is greater than 0, it must be at least 6
           * characters in length.
           */
          sModLength = WinQueryDlgItemText(hwnd, DID_PWDSET_ENT1,
                          PASSWORDLENGTH, ModifyPwd);
          if (sModLength > 0) {
             if (sModLength < 6) {
                DosBeep( 400, 50 );
                WinLoadString(hab, (HMODULE)NULL, IDS_MODPWD_SHORT,
                              sizeof(szText1), (PSZ)szText1);
                WinLoadString(hab, (HMODULE)NULL, IDS_WARNING,
                              sizeof(szText2), (PSZ)szText2);
                WinMessageBox(HWND_DESKTOP, hwnd, szText1, szText2,
                           0, MB_OK | MB_WARNING | MB_MOVEABLE);
                return(0);
             } /* if */

/* Try to verify the password */
             WinQueryDlgItemText(hwnd, DID_PWDSET_ENT2,
                          PASSWORDLENGTH, modify_verify);
             if (strcmp(ModifyPwd, modify_verify) != 0) {
                WinLoadString(hab, (HMODULE)NULL, IDS_MOD_NOVERIFY,
                              sizeof(szText1), (PSZ)szText1);
                WinLoadString(hab, (HMODULE)NULL, IDS_WARNING,
                              sizeof(szText2), (PSZ)szText2);
                WinMessageBox(HWND_DESKTOP, hwnd, szText1, szText2,
                           0, MB_OK | MB_WARNING | MB_MOVEABLE);
                return(0);
             } /* if */
          } /* if */

/*
           * Same discussion here for the length and verification of
           * the scheduling password.
           */
          sSchLength = WinQueryDlgItemText(hwnd, DID_PWDSET_ENT3,
```

```
                                      PASSWORDLENGTH, SchedPwd);
                if (sSchLength > 0) {
                   if (sSchLength < 6) {
                      DosBeep( 400, 50 );
                      WinLoadString(hab, (HMODULE)NULL, IDS_SCHPWD_SHORT,
                                         sizeof(szText1), (PSZ)szText1);
                      WinLoadString(hab, (HMODULE)NULL, IDS_WARNING,
                                         sizeof(szText2), (PSZ)szText2);
                      WinMessageBox(HWND_DESKTOP, hwnd, szText1, szText2,
                                 0, MB_OK | MB_WARNING | MB_MOVEABLE);
                      return(0);
                   } /* if */

WinQueryDlgItemText(hwnd, DID_PWDSET_ENT4,
                                 PASSWORDLENGTH, sched_verify);
                   if (strcmp(SchedPwd, sched_verify) != 0) {
                      WinLoadString(hab, (HMODULE)NULL, IDS_SCH_NOVERIFY,
                                         sizeof(szText1), (PSZ)szText1);
                      WinLoadString(hab, (HMODULE)NULL, IDS_WARNING,
                                         sizeof(szText2), (PSZ)szText2);
                      WinMessageBox(HWND_DESKTOP, hwnd, szText1, szText2,
                                 0, MB_OK | MB_WARNING | MB_MOVEABLE);
                      return(0);
                   } /* if */
                } /* if */

WinSetPointer(HWND_DESKTOP,
                           WinQuerySysPointer(HWND_DESKTOP, SPTR_WAIT, TRUE));

ADSEncrypt(ModifyPwd, buff1);
                ADSEncrypt(SchedPwd, buff2);

safe_dbfcmd(dbproc,
                   " UPDATE SSJobListTable"
                   " SET"
                   "    ModPwd = \"%s\","
                   "    SchedPwd = \"%s\","
                   "    BuiltBy = user_name(-1),"
                   "    LastMod = getdate()"
                   " WHERE JobListName = \"%s\"",
                   buff1,
                   buff2,
                   JobName);

dbsqlexec(dbproc);
                dbcanquery(dbproc);
                while (dbresults(dbproc) != NO_MORE_RESULTS)
                   dbcanquery(dbproc);

WinSetPointer(HWND_DESKTOP,
                           WinQuerySysPointer(HWND_DESKTOP, SPTR_ARROW, TRUE));
                WinDismissDlg(hwnd, TRUE);
                return(0);
         } /* switch */
      } /* switch */
      return WinDefDlgProc(hwnd, msg, mp1, mp2);

} /* END */

/***************************************************************************/
/*                                                                         */
/* SetPasswordFlags                                                        */
/*                                                                         */
/* This routine sets the on-screen flags that indicate the existance of    */
/* passwords for the current job.                                          */
```

```
/***************************************************************************/
VOID SetPasswordFlags(HWND hwnd, DBCHAR * JobName, DBPROCESS * dbproc){
  DBCHAR    ModifyPwd[PASSWORDLENGTH];
  DBCHAR    SchedPwd[PASSWORDLENGTH];
  CHAR      buff[35];

WinSetPointer(HWND_DESKTOP,
                WinQuerySysPointer(HWND_DESKTOP, SPTR_WAIT, TRUE));

/* Query the passwords for the job */
  safe_dbfcmd(dbproc,
      " SELECT"
      "     ModPwd,"
      "     SchedPwd"
      " FROM SSJobListTable"
      " WHERE JobListName LIKE \"%s\"",
        JobName);

dbsqlexec(dbproc);
  dbresults(dbproc);

dbbind(dbproc, 1, NTBSTRINGBIND, (LONG)sizeof(ModifyPwd),
                                              ModifyPwd);
  dbbind(dbproc, 2, NTBSTRINGBIND, (LONG)sizeof(SchedPwd),
                                              SchedPwd);

if (dbnextrow(dbproc) != NO_MORE_ROWS) {
     /* if the password exists, show the text flag */
     ADSEncrypt(ModifyPwd, buff);
     if (strlen(buff) > 1)
        WinSetDlgItemText(hwnd, DID_JOBSTEP_RESTRICT1, "Modify");
     else
        WinSetDlgItemText(hwnd, DID_JOBSTEP_RESTRICT1, "");
     ADSEncrypt(SchedPwd, buff);
     if (strlen(buff) > 1)
        WinSetDlgItemText(hwnd, DID_JOBSTEP_RESTRICT2, "Schedule");
     else
        WinSetDlgItemText(hwnd, DID_JOBSTEP_RESTRICT2, "");
  } /* if */
  dbcanquery(dbproc);
  while (dbresults(dbproc) != NO_MORE_RESULTS)
     dbcanquery(dbproc);

WinSetPointer(HWND_DESKTOP,
                WinQuerySysPointer(HWND_DESKTOP, SPTR_ARROW, TRUE));
  return;
} /* SetPasswordFlags */

/***************************************************************************/
/*                                                                         */
/* ResumeDlgProc                                                           */
/*                                                                         */
/* This dialog proc is designed to allow a user to resume a held job. This */
/* can occur at the next logical step, or the job can resume at any step.  */
/* The user can skip steps altogether or temporarily modify the flow of    */
/* execution of the job.  In addition the user can place the job in a single */
/* step mode which will allow the job to execute one step before it is     */
/* automatically held by the Batch Server.                                 */
/*                                                                         */
/***************************************************************************/
MRESULT EXPENTRY ResumeDlgProc(HWND hwnd, USHORT msg, MPARAM mp1, MPARAM mp2)
{
  static CHAR    szHeadingTop[80];
  static CHAR    szHeadingBottom[80];
  static LONG    alColWidth[RESUME_COLUMNS];
```

-109-

```
static PSZ      qualptr;

USHORT     i;
USHORT     iStepNum;
USHORT     iSearchSelect;
USHORT     usNotifyCode;
DBCHAR     JobRunID[JOBIDLENGTH];
DBCHAR     JobListName[JOBNAMELENGTH];
DBCHAR     StepNum[STEPNUMLENGTH];
DBCHAR     StepResult[STEPNUMLENGTH];
DBCHAR     GrpName[GROUPNAMELENGTH];
DBCHAR     MachineName[MACHINENAMELENGTH];
DBCHAR     UserRqst;
DBCHAR     CurrentStat;
CHAR       buff[250];
CHAR       szText1[60];
CHAR       szText2[60];
ULONG      ulNetConnect;
PWDSTRUCT  pwdStruct;

switch (msg) { case WM_CONTROL: /*----------------------------------------------------*/
      usNotifyCode = (USHORT) SHORT2FROMMP(mp1);
      if (usNotifyCode == LN_SELECT) {
         switch (SHORT1FROMMP(mp1)) {
            /*
             * If an item on the list is selected, update the text
             * that shows the next step to be executed.
             */
            case DID_RESUME_ADSLIST: /*----------------------------------*/
               if (GetSelectedItemString(hwnd, DID_RESUME_ADSLIST,
                                 StepNum, STEPNUMLENGTH, TRUE) < 0)
                  return(0);

WinSetDlgItemText(hwnd, DID_RESUME_NEXTSTEP, StepNum);
               break;
         } /* switch */
      } /* if */
      break;

case WM_COMMAND: /*----------------------------------------------------*/
      switch (COMMANDMSG(&msg)->cmd) {
         case DID_OK: /*--------------------------------------------------*/
         case DID_RESUME_STEP: /*-----------------------------------------*/
            WinSetPointer(HWND_DESKTOP,
                         WinQuerySysPointer(HWND_DESKTOP, SPTR_WAIT, TRUE));

if (SHORT1FROMMR(WinSendDlgItemMsg(hwnd, DID_RESUME_ANYINGROUP,
                                 BM_QUERYCHECK, 0L, 0L )))
               WinLoadString(hab, (HMODULE)NULL, IDS_BLANK,
                                 sizeof(MachineName), MachineName);
            else {
               WinQueryDlgItemText(hwnd, DID_RESUME_MACHINE,
                                 MACHINENAMELENGTH, MachineName);

WinLoadString(hab, (HMODULE)NULL, IDS_ANY,
                                 sizeof(szText1), szText1);
               if (strcmp(MachineName, szText1) == 0)
                  WinLoadString(hab, (HMODULE)NULL, IDS_BLANK,
                                 sizeof(MachineName), MachineName);
            } /* else */
            /*
             * If there is not a selected item on the list then we assume
             * that the job has been completed and that the user does not
             * wish to reexecute a step. The next job step is set to one
```

-110-

```
 * beyond the last executed which will cause the rescheduler
 * to handle the job.
 */
if (WinSendDlgItemMsg(hwnd, DID_RESUME_ADSLIST,
                     LM_QUERYSELECTION, (MPARAM)LIT_FIRST,
                     (MPARAM)OL) == (MRESULT)LIT_NONE) {
   WinQueryDlgItemText(hwnd, DID_RESUME_STEPOUT,
                       STEPNUMLENGTH, StepNum);
   sprintf(StepNum, "%d", atoi(StepNum) + 1);
} /* if */
else
   WinQueryDlgItemText(hwnd, DID_RESUME_NEXTSTEP,
                       STEPNUMLENGTH, StepNum);

/*
 * If OK button was pressed, update the job record, clearing
 * the UserRqst field to allow it to resume.  The machine
 * name and current step number are also set.
 */
if (COMMANDMSG(&msg)->cmd == DID_OK) {
   safe_dbfcmd(dbproc,
      " UPDATE SSPendingJobTable"
      " SET"
      "    UserRqst = \" \","
      "    MachineName = \"%s\","
      "    StepNum = %d,"
      "    StepResult = 0 %s",
      MachineName,
      atoi(StepNum) - 1,
      qualptr);

} /* if */
/*
 * Else the SINGLE STEP button was pressed, update the job record,
 * setting the user_resquest field to (S)tep.
 */
else {
   safe_dbfcmd(dbproc,
      " UPDATE SSPendingJobTable"
      " SET"
      "    UserRqst = \"S\","
      "    MachineName = \"%s\","
      "    StepNum = %d,"
      "    StepResult = 0 %s",
      MachineName,
      atoi(StepNum) - 1,
      qualptr);

} /* else */
dbfreequal(qualptr);
if ((dbsqlexec(dbproc) == FAIL) || (dbresults(dbproc) == FAIL)) {
   DosBeep( 400, 50 );
   WinLoadString(hab, (HMODULE)NULL, IDS_ITEM_BUSY,
                 sizeof(szText1), (PSZ)szText1);
   WinLoadString(hab, (HMODULE)NULL, IDS_WARNING,
                 sizeof(szText2), (PSZ)szText2);
   WinMessageBox(HWND_DESKTOP, hwnd, szText1, szText2,
                 0, MB_OK | MB_WARNING | MB_MOVEABLE);
} /* if */ while (dbresults(dbproc) != NO_MORE_RESULTS)
   dbcanquery(dbproc);
WinDismissDlg(hwnd, TRUE);

/* Ask the server to examine the runnable list */
if (!ADSNetConnect(&ulNetConnect, szServerName, BATCHD_SERVICE))
```

-111-

```
            ADSNetDisconnect(ulNetConnect);
         WinSetPointer(HWND_DESKTOP,
                    WinQuerySysPointer(HWND_DESKTOP, SPTR_ARROW, TRUE));
         return(0);

case DID_CANCEL: /*------------------------------------------------*/
         dbfreequal(qualptr);
         break;

} /* switch */
   break;

case WM_INITDLG: /*------------------------------------------------------*/
   /*
    * Get password from user if needed.
    */
   pwdStruct.usPwdType = PWD_SCHED;
   pwdStruct.pszJobData = (PSZ)mp2;
   pwdStruct.usDataType = PWD_DATA_JOBID;
   if (!(WinDlgBox(HWND_DESKTOP, hwnd, (PFNWP)EnterPasswordDlgProc,
               (HMODULE)NULL, IDD_PWDENTER, (PVOID) &pwdStruct))) {
      /*
       * Oops, the users does not know the password, so return.
       */
      DosBeep( 300, 300 );
      WinDismissDlg(hwnd, FALSE);
      return;
   } /* if */

WinSetPointer(HWND_DESKTOP,
               WinQuerySysPointer(HWND_DESKTOP, SPTR_WAIT, TRUE));

/*
    * Load the column title strings from the resource.
    */
   WinLoadString(hab, (HMODULE)NULL, IDS_RESUME_LIST1_TOP,
               sizeof(szHeadingTop), (PSZ)szHeadingTop);
   WinLoadString(hab, (HMODULE)NULL, IDS_RESUME_LIST1_BOT,
               sizeof(szHeadingBottom), (PSZ)szHeadingBottom);

/* Set column widths to zero */
   for (i = 0; i < RESUME_COLUMNS; i++)
      alColWidth[i] = 0;

/* Get the current job status info */
   safe_dbfcmd(dbproc,
      " SELECT"
      "    JobRunID,"
      "    JobListName,"
      "    StepNum,"
      "    StepResult,"
      "    UserRqst,"
      "    CurrentStat,"
      "    GrpName,"
      "    MachineName"
      " FROM SSPendingJobTable"
      " WHERE JobRunID = %ld "
      " FOR browse",
         atol((PSZ)mp2));

dbsqlexec(dbproc);
   dbresults(dbproc);
   dbbind(dbproc, 1, NTBSTRINGBIND, (LONG)sizeof(JobRunID), JobRunID);
   dbbind(dbproc, 2, NTBSTRINGBIND, (LONG)sizeof(JobListName), JobListName);
   dbbind(dbproc, 3, NTBSTRINGBIND, (LONG)sizeof(StepNum), StepNum);
   dbbind(dbproc, 4, NTBSTRINGBIND, (LONG)sizeof(StepResult), StepResult);
```

```
dbbind(dbproc, 5, CHARBIND, (DBINT) 1, &UserRqst);
dbbind(dbproc, 6, CHARBIND, (DBINT) 1, &CurrentStat);
dbbind(dbproc, 7, NTBSTRINGBIND, (LONG)sizeof(GrpName), GrpName);
dbbind(dbproc, 8, NTBSTRINGBIND, (LONG)sizeof(MachineName), MachineName);

if (dbnextrow(dbproc) != NO_MORE_ROWS) {
  qualptr = dbqual(dbproc, -1, "SSPendingJobTable");

/* Set titlebar text */
  WinLoadString(hab, (HMODULE)NULL, IDS_JOB_ID,
                sizeof(szText1), szText1);
  WinLoadString(hab, (HMODULE)NULL, IDS_JOB_NAME,
                sizeof(szText2), szText2);

sprintf(buff, "%s: %s  -  %s: %s",
                     szText1, JobRunID, szText2, JobListName);
  WinSetWindowText(hwnd, buff);

/* Figure out and display which step is next */
  WinSetDlgItemText(hwnd, DID_RESUME_STEPOUT, StepNum);
  iStepNum = atoi(StepNum);
  if (iStepNum) {
    WinSetDlgItemText(hwnd, DID_RESUME_RETURNCODE, StepResult);
    WinLoadString(hab, (HMODULE)NULL, IDS_BLANK,
                        sizeof(szText1), szText1);
    if ((strcmp(MachineName, "") == 0) ||
                        (strcmp(MachineName, szText1) == 0)) {
      WinLoadString(hab, (HMODULE)NULL, IDS_ANY,
                          sizeof(szText1), szText1);
      WinSetDlgItemText(hwnd, DID_RESUME_MACHINE, szText1);
      WinEnableWindowUpdate(WinWindowFromID(hwnd,
                            DID_RESUME_ANYINGROUP), FALSE );
    } /* if */
    else
      WinSetDlgItemText(hwnd, DID_RESUME_MACHINE, MachineName);
  } /* if */
  else {
    WinLoadString(hab, (HMODULE)NULL, IDS_BLANK,
                        sizeof(szText1), szText1);
    WinSetDlgItemText(hwnd, DID_RESUME_RETURNCODE, szText1);
    WinLoadString(hab, (HMODULE)NULL, IDS_ANY,
                        sizeof(szText1), szText1);
    WinSetDlgItemText(hwnd, DID_RESUME_MACHINE, szText1);
    WinEnableWindowUpdate(WinWindowFromID(hwnd,
                          DID_RESUME_ANYINGROUP), FALSE );
    iSearchSelect = 0;
  } /* else */

/* Save the JobListName */
  strcpy(buff, JobListName);
  dbcanquery(dbproc);
  while (dbresults(dbproc) != NO_MORE_RESULTS)
    dbcanquery(dbproc);

/* Load the list box with the job's steps */
  LoadListBox(hwnd, DID_RESUME_ADSLIST,
                        (PSZ) JobListName, (PSZ)NULL, 0);

/* Select the next step to execute */
  if (iStepNum) {
    sprintf(buff, "\r%d\t", iStepNum);
    iSearchSelect = (USHORT) SHORT1FROMMR(
        WinSendDlgItemMsg(hwnd, DID_RESUME_ADSLIST, LM_SEARCHSTRING,
            MPFROM2SHORT(LSS_PREFIX | LSS_CASESENSITIVE, LIT_FIRST),
            buff)) + 1;
  } /* if */
```

-113-

```
            else
                iSearchSelect = 0;

if (!WinSendDlgItemMsg(hwnd, DID_RESUME_ADSLIST, LM_SELECTITEM,
                    MPFROMSHORT(iSearchSelect), (MPARAM)TRUE))
                WinSetDlgItemText(hwnd, DID_RESUME_NEXTSTEP, "FINISHED");

} /* if */
         WinSetPointer(HWND_DESKTOP,
                       WinQuerySysPointer(HWND_DESKTOP, SPTR_ARROW, TRUE));
         return(0);

case WM_MEASUREITEM: /*--------------------------------------------*/
         switch (SHORT1FROMMP(mp1)) {
            case DID_RESUME_ADSLIST: /*------------------------------*/
               return (MRFROMLONG(ADSLBMeasure(hwnd, DID_RESUME_ADSLIST,
                                  SHORT1FROMMP(mp2), alColWidth,
                                  RESUME_COLUMNS, DID_RESUME_HEADING,
                                  szHeadingTop, szHeadingBottom)));
         } /* if */
         return(0);

case WM_DRAWITEM: /*-----------------------------------------------*/
         switch (SHORT1FROMMP(mp1)) {
            case DID_RESUME_ADSLIST: /*------------------------------*/
               ADSLBDraw(hwnd, DID_RESUME_ADSLIST, (POWNERITEM)PVOIDFROMMP(mp2),
                   alColWidth, RESUME_COLUMNS, DID_RESUME_HEADING, FALSE);
               return (MRFROMSHORT(TRUE));
         } /* switch */
         return(0);
   } /* END SWITCH */ return WinDefDlgProc(hwnd, msg, mp1, mp2);

} /* END JobStepDlgProc */

/*************************************************************************/
/* GetSelectedItemString                                                 */
/*                                                                       */
/* This routine queries the listbox identified by the idList parameter   */
/* and returns the text found in the FIRST column of the selected item.  */
/*                                                                       */
/* If the bStrip flag is set the pszBuffer will be stripped of any multi-*/
/* column formatting characters that may exist.                          */
/*************************************************************************/
SHORT GetSelectedItemString(HWND hwnd, USHORT idList, PSZ pszBuffer,
                            USHORT usBufferLength, BOOL bStrip)
{
   USHORT    iSelection;
   PSZ       pchar;

/* Get the index of the selected list item */
   iSelection = (SHORT) SHORT1FROMMR(WinSendDlgItemMsg(hwnd, idList,
                                     LM_QUERYSELECTION, 0L, 0L));

if (iSelection == LIT_NONE) {
      return(iSelection);
   } /* if */

/* Get the text string for item at offset iSelection */
   WinSendDlgItemMsg(hwnd, idList, LM_QUERYITEMTEXT,
                     MPFROM2SHORT(iSelection, usBufferLength),
                     MPFROMP(pszBuffer));

/* Terminate the output buffer at the first column break */
```

-114-

```
   pchar = strchr(pszBuffer, '\t');
   *pchar = 0;

/* If requested, clean up the string */
   if (bStrip)
      while (pszBuffer[0] == '\r' || pszBuffer[0] == '\n')
         strcpy(pszBuffer, pszBuffer + 1);

return(iSelection);
} /* GetSelectedItemString */

/***************************************************************************/
/* LoadListBox                                                             */
/*                                                                         */
/* This popular routine is called to load list boxes and combo boxes with  */
/* the results of a SQL select. The tables queried and data returned are   */
/* are completely dependent on the id of the control to be loaded. WHERE   */
/* clauses can be built to include strings passed in with pszWhere1. If    */
/* the pszSelect string is provided this routine will attempt select the   */
/* list item that matches. usStyle is used to determine which view should  */
/* be loaded into the top-level client window listbox.                     */
/***************************************************************************/
VOID LoadListBox(HWND hwnd, USHORT idList, PSZ pszWhere1,
                 PSZ pszSelect, USHORT usStyle)
{
   SHORT     iSearchSelect;
   DBCHAR    ProgramName[EXECUTENAMELENGTH];
   DBCHAR    FileName[EXECUTEFILELENGTH];
   DBCHAR    MachineName[MACHINENAMELENGTH];
   DBCHAR    MachineDesc[MACHINEDESCLENGTH];
   DBCHAR    GrpName[GROUPNAMELENGTH];

DBCHAR    JobListName[JOBNAMELENGTH];
   DBCHAR    JobListDesc[JOBDESCLENGTH];
   DBCHAR    BuiltBy[JOBEDITBYLENGTH];
   DBCHAR    JobStepNum[STEPNUMLENGTH];
   DBCHAR    JobProgramName[STEPPRGLENGTH];
   DBCHAR    ArgList1[STEPARGSLENGTH];
   DBCHAR    JobRunID[JOBIDLENGTH];
   DBCHAR    UserRqst;
   DBCHAR    CurrentStat;
   DBCHAR    NextRunDate[JOBDATELENGTH];
   DBCHAR    LastModifiedDate[DATELENGTH];
   DBCHAR    ConvertDate[DATELENGTH];
   DBCHAR    LastModifiedTime[TIMELENGTH];
   DBCHAR    SchedBy[JOBEDITBYLENGTH];
   DBCHAR    PriorityFlag;
   CHAR      abBuffer[256];
   CHAR      pszUserRequest[15];
   CHAR      pszCurStatus[15];

WinSetPointer(HWND_DESKTOP,
                 WinQuerySysPointer(HWND_DESKTOP, SPTR_WAIT, TRUE));

/* Prevent updates to the list (multicolumn list requirement) */
   WinEnableWindowUpdate(WinWindowFromID(hwnd, idList), FALSE);

/* Flush the old data */
   WinSendDlgItemMsg(hwnd, idList, LM_DELETEALL, 0, 0);

/*************************************************************
    * On the list id build the SQL command buffer and bind to variables
    *************************************************************/
   switch (idList) {
```

```
/*
 * Main top-level status display listbox
 */
case ID_CLIENT_ADSLIST: /*-------------------------------------------*/
    /* Turn off the listbox heading area update to force a complete paint */
    WinEnableWindowUpdate(WinWindowFromID(hwnd, ID_CLIENT_HEADING), FALSE);

/* If filter is NULL, set wildcards */
    if (strlen(pszFilterJob) <= 0)
        strcpy(pszFilterJob, "%%");

if (strlen(pszFilterBy) <= 0)
        strcpy(pszFilterBy, "%%");

if (strlen(pszFilterGroup) <= 0)
        strcpy(pszFilterGroup, "%%");

if (strlen(pszFilterStart) <= 0)
        strcpy(pszFilterStart, "01/01/50");

if (strlen(pszFilterEnd) <= 0)
        strcpy(pszFilterEnd, "12/31/49");

/*
     * The actual select depends on the current view.  Refer to the
     * stored procedures for the critera.
     */
    switch (usStyle) {
        case IDM_VIEWDEFAULT: /*-------------------------------------------*/
            safe_dbfcmd(dbproc,
                " SELECT"
                "    JobRunID,"
                "    JobListName,"
                "    UserRqst,"
                "    CurrentStat,"
                "    PriorityFlag,"
                "    NxtRunDateTime,"
                "    GrpName,"
                "    SchedBy"
                " FROM SSPendingJobTable"
                " WHERE CurrentStat LIKE \"*[EGRTW]\""
                "   and UserRqst not LIKE \"*[C]\""
                "   and JobListName LIKE \"%s\""
                "   and SchedBy LIKE \"%s\""
                "   and GrpName LIKE \"%s\""
                "   and NxtRunDateTime >= convert(datetime, \"%s 12:00am\")"
                "   and NxtRunDateTime <= convert(datetime, \"%s 11:59pm\")"
                " ORDER BY PriorityFlag, NxtRunDateTime, JobRunID",
                pszFilterJob,
                pszFilterBy,
                pszFilterGroup,
                pszFilterStart,
                pszFilterEnd);

dbsqlexec(dbproc);
            dbresults(dbproc);
            dbbind(dbproc, 1, NTBSTRINGBIND, (LONG)sizeof(JobRunID),
                                                        JobRunID);
            dbbind(dbproc, 2, NTBSTRINGBIND, (LONG)sizeof(JobListName),
                                                        JobListName);
            dbbind(dbproc, 3, CHARBIND, (DBINT) 1, &UserRqst);
            dbbind(dbproc, 4, CHARBIND, (DBINT) 1, &CurrentStat);
            dbbind(dbproc, 5, CHARBIND, (DBINT) 1, (BYTE *) &PriorityFlag);
            dbbind(dbproc, 6, NTBSTRINGBIND, (LONG)sizeof(NextRunDate),
                                                        NextRunDate);
            dbbind(dbproc, 7, NTBSTRINGBIND, (LONG)sizeof(GrpName), GrpName);
```

```
    dbbind(dbproc, 8, NTBSTRINGBIND, (LONG)sizeof(SchedBy), SchedBy);
    break;

case IDM_VIEWHISTORY: /*----------------------------------------*/
    safe_dbfcmd(dbproc,
        " SELECT"
        "     JobRunID,"
        "     JobListName,"
        "     UserRqst,"
        "     CurrentStat,"
        "     PriorityFlag,"
        "     NxtRunDateTime,"
        "     GrpName,"
        "     SchedBy"
        " FROM SSPendingJobTable"
        " WHERE (CurrentStat LIKE \"[SE]\""
        "     OR UserRqst LIKE \"[C]\")"
        "   AND JobListName LIKE \"%s\""
        "   AND SchedBy LIKE \"%s\""
        "   AND GrpName LIKE \"%s\""
        "   AND NxtRunDateTime >= convert(datetime, \"%s\")"
        "   AND NxtRunDateTime <= convert(datetime, \"%s\")"
        " ORDER BY JobRunID",
            pszFilterJob, pszFilterBy, pszFilterGroup,
            pszFilterStart, pszFilterEnd);

dbsqlexec(dbproc);
    dbresults(dbproc);
    dbbind(dbproc, 1, NTBSTRINGBIND, (LONG)sizeof(JobRunID),
                                                        JobRunID);
    dbbind(dbproc, 2, NTBSTRINGBIND, (LONG)sizeof(JobListName),
                                                        JobListName);
    dbbind(dbproc, 3, CHARBIND, (DBINT) 1, &UserRqst);
    dbbind(dbproc, 4, CHARBIND, (DBINT) 1, &CurrentStat);
    dbbind(dbproc, 5, CHARBIND, (DBINT) 1, (BYTE *) &PriorityFlag);
    dbbind(dbproc, 6, NTBSTRINGBIND, (LONG)sizeof(NextRunDate),
                                                        NextRunDate);
    dbbind(dbproc, 7, NTBSTRINGBIND, (LONG)sizeof(GrpName), GrpName);
    dbbind(dbproc, 8, NTBSTRINGBIND, (LONG)sizeof(SchedBy), SchedBy);
    break;

case IDM_VIEWALL: /*----------------------------------------*/
    safe_dbfcmd(dbproc,
        " SELECT"
        "     JobRunID,"
        "     JobListName,"
        "     UserRqst,"
        "     CurrentStat,"
        "     PriorityFlag,"
        "     NxtRunDateTime,"
        "     GrpName,"
        "     SchedBy"
        " FROM SSPendingJobTable"
        " WHERE JobListName LIKE \"%s\""
        "   AND SchedBy LIKE \"%s\""
        "   AND GrpName LIKE \"%s\""
        "   AND NxtRunDateTime >= convert(datetime, \"%s\")"
        "   AND NxtRunDateTime <= convert(datetime, \"%s\")"
        " ORDER BY JobRunID", pszFilterJob, pszFilterBy, pszFilterGroup,
            pszFilterStart, pszFilterEnd);

dbsqlexec(dbproc);
    dbresults(dbproc);
    dbbind(dbproc, 1, NTBSTRINGBIND, (LONG)sizeof(JobRunID),
```

-116-

-117-

```
                                                                          JobRunID);
            dbbind(dbproc, 2, NTBSTRINGBIND, (LONG)sizeof(JobListName),
                                                                         JobListName);
            dbbind(dbproc, 3, CHARBIND, (DBINT) 1, &UserRqst);
            dbbind(dbproc, 4, CHARBIND, (DBINT) 1, &CurrentStat);
            dbbind(dbproc, 5, CHARBIND, (DBINT) 1, (BYTE *) &PriorityFlag);
            dbbind(dbproc, 6, NTBSTRINGBIND, (LONG)sizeof(NextRunDate),
                                                                        NextRunDate);
            dbbind(dbproc, 7, NTBSTRINGBIND, (LONG)sizeof(GrpName), GrpName);
            dbbind(dbproc, 8, NTBSTRINGBIND, (LONG)sizeof(SchedBy), SchedBy);
            break;
    } /* switch */

/* Restore those NULLs */
    if (strcmp(pszFilterJob, "%%") == 0)
       strcpy(pszFilterJob, "");

if (strcmp(pszFilterBy, "%%") == 0)
       strcpy(pszFilterBy, "");

if (strcmp(pszFilterGroup, "%%") == 0)
       strcpy(pszFilterGroup, "");

if (strcmp(pszFilterStart, "1/1/1900 12:00am") == 0)
       strcpy(pszFilterStart, "");

if (strcmp(pszFilterEnd, "12/31/3000 11:59pm") == 0)
       strcpy(pszFilterEnd, "");
    break;

/*
 * ExecuteDlgProc Listbox
 */
case DID_EXECUTE_ADSLIST: /*----------------------------------------*/
    dbcmd(dbproc,
       " SELECT"
       "     ProgramName,"
       "     AvailProgramFileName"
       " FROM SSAvailProgramTable"
       " ORDER BY ProgramName");

dbsqlexec(dbproc);
    dbresults(dbproc);
    dbbind(dbproc, 1, NTBSTRINGBIND, (LONG)sizeof(ProgramName),
                                                               ProgramName);
    dbbind(dbproc, 2, NTBSTRINGBIND, (LONG)sizeof(FileName),
                                                               FileName);
    break;

/*
 * JobListDlgProc Listbox
 */
case DID_JOBLIST_ADSLIST: /*----------------------------------------*/
    dbcmd(dbproc,
       " SELECT"
       "     JobListName,"
       "     BuiltBy,"
       "     convert(char(11), LastMod, 1),"
       "     convert(char(9), LastMod, 8),"
       "     JobListDescr"
       " FROM SSJobListTable"
       " ORDER BY JobListName");

dbsqlexec(dbproc);
    dbresults(dbproc);
    dbbind(dbproc, 1, NTBSTRINGBIND, (LONG)sizeof(JobListName),
```

```
            JobListName);
    dbbind(dbproc, 2, NTBSTRINGBIND, (LONG)sizeof(BuiltBy), BuiltBy);
    dbbind(dbproc, 3, NTBSTRINGBIND, (LONG)sizeof(LastModifiedDate),
            LastModifiedDate);
    dbbind(dbproc, 4, NTBSTRINGBIND, (LONG)sizeof(LastModifiedTime),
            LastModifiedTime);
    dbbind(dbproc, 5, NTBSTRINGBIND, (LONG)sizeof(JobListDesc),
            JobListDesc);
    break;

/*
 * JobStepDlgProc Listbox
 */
case DID_JOBSTEP_ADSLIST: /*----------------------------------------*/
    safe_dbfcmd(dbproc,
    " SELECT"
    "     JobStepNum,"
    "     ProgramName,"
    "     ArgumentList1,"
    "     ArgumentList2"
    " FROM SSJobStepTable"
    " WHERE JobListName LIKE \"%s\""
    " ORDER BY JobStepNum",
      pszWhere1);

dbsqlexec(dbproc);
    dbresults(dbproc);
    dbbind(dbproc, 1, NTBSTRINGBIND, (LONG)sizeof(JobStepNum),
                                                    JobStepNum);
    dbbind(dbproc, 2, NTBSTRINGBIND, (LONG)sizeof(JobProgramName),
                                                    JobProgramName);
    dbbind(dbproc, 3, NTBSTRINGBIND, (LONG)sizeof(ArgList1),
                                                    ArgList1);

if (pszWhere1) {
       WinLoadString(hab, (HMODULE)NULL, IDS_JOB_STEPS,
                    sizeof(abBuffer), abBuffer);
       sprintf(abBuffer, "%s: %s", abBuffer, pszWhere1);
    } /* if */
    else
       WinLoadString(hab, (HMODULE)NULL, IDS_NO_JOB,
                    sizeof(abBuffer), abBuffer);
    break;

/*
 * JobStepDlgProc Program Name Combo Box
 */
case DID_JOBSTEP_COMBO: /*----------------------------------------*/
    dbcmd(dbproc,
    " SELECT"
    "     ProgramName,"
    "     AvailProgramFileName"
    " FROM SSAvailProgramTable"
    " ORDER BY ProgramName");

dbsqlexec(dbproc);
    dbresults(dbproc);
    dbbind(dbproc, 1, NTBSTRINGBIND,
                (LONG)sizeof(JobProgramName), JobProgramName);
    break;

/*
 * DayTimerDlgProc Job List Combo Box
 */
case DID_DAYTIMER_JOBCOMBO: /*----------------------------------------*/
    dbcmd(dbproc,
```

-119-

```
    " SELECT"
    "    JobListName,"
    "    JobListDescr"
    " FROM SSJobListTable"
    " ORDER BY JobListName");

dbsqlexec(dbproc);
    dbresults(dbproc);
    dbbind(dbproc, 1, NTBSTRINGBIND,
                (LONG)sizeof(JobListName), JobListName);

break;

/*
 * DayTimerDlgProc Group name Combo box
 */
case DID_DAYTIMER_GRPCOMBO: /*----------------------------------------*/
    dbcmd(dbproc,
    " SELECT"
    "    GrpName,"
    "    GrpDescr"
    " FROM SSGrpTable"
    " ORDER BY GrpName");

dbsqlexec(dbproc);
    dbresults(dbproc);
    dbbind(dbproc, 1, NTBSTRINGBIND,
                (LONG)sizeof(GrpName), GrpName);

break;

/*
 * ResumeDlgProc List box
 */
case DID_RESUME_ADSLIST: /*----------------------------------------*/
    safe_dbfcmd(dbproc,
    " SELECT"
    "    JobStepNum,"
    "    ProgramName,"
    "    ArgumentList1,"
    "    ArgumentList2"
    " FROM SSJobStepTable"
    " WHERE JobListName LIKE \"%s\""
    " ORDER BY JobStepNum",
        pszWhere1);

dbsqlexec(dbproc);
    dbresults(dbproc);
    dbbind(dbproc, 1, NTBSTRINGBIND, (LONG)sizeof(JobStepNum),
                                                JobStepNum);
    dbbind(dbproc, 2, NTBSTRINGBIND, (LONG)sizeof(JobProgramName),
                                                JobProgramName);
    dbbind(dbproc, 3, NTBSTRINGBIND, (LONG)sizeof(ArgList1),
                                                ArgList1);
    break;

/*
 * FilterDlgProc Job Combo Box
 */
case DID_FILTER_JOBCOMBO: /*----------------------------------------*/
    dbcmd(dbproc,
    " SELECT"
    "    distinct JobListName"
    " FROM SSPendingJobTable"
    " ORDER BY JobListName");

dbsqlexec(dbproc);
    dbresults(dbproc);
```

```
        dbbind(dbproc, 1, NTBSTRINGBIND,
                    (LONG)sizeof(JobListName), JobListName);
        break;

/*
     * FilterDlgProc Scheduled By Combo Box
     */
    case DID_FILTER_BYCOMBO: /*---------------------------------------*/
        dbcmd(dbproc,
         " SELECT"
         "     distinct SchedBy"
         " FROM SSPendingJobTable"
         " ORDER BY SchedBy");

dbsqlexec(dbproc);
        dbresults(dbproc);
        dbbind(dbproc, 1, NTBSTRINGBIND,
                    (LONG)sizeof(SchedBy), SchedBy);
        break;

/*
     * FilterDlgProc Group Combo Box
     */
    case DID_FILTER_GROUPCOMBO: /*------------------------------------*/
        dbcmd(dbproc,
         " SELECT"
         "     distinct GrpName"
         " FROM SSPendingJobTable"
         " ORDER BY GrpName");

dbsqlexec(dbproc);
        dbresults(dbproc);
        dbbind(dbproc, 1, NTBSTRINGBIND,
                    (LONG)sizeof(GrpName), GrpName);
        break;

/*
     * PickServerDlgProc Listbox #1
     */
    case DID_PICKSERV_ADSLIST: /*-------------------------------------*/
        dbcmd(dbproc,
         " SELECT"
         "     MachineName,"
         "     MachineDescr,"
         "     MaxJobs"
         " FROM SSMachineTable"
         " ORDER BY MachineName");

dbsqlexec(dbproc);
        dbresults(dbproc);
        dbbind(dbproc, 1, NTBSTRINGBIND, (LONG)sizeof(MachineName),
                                                        MachineName);
        dbbind(dbproc, 2, NTBSTRINGBIND, (LONG)sizeof(MachineDesc),
                                                        MachineDesc);
        break;

default:
        WinSetPointer(HWND_DESKTOP,
                    WinQuerySysPointer(HWND_DESKTOP, SPTR_ARROW, TRUE));
        return;
    } /* switch */

/***********************************************************
 * Loop through returned rows...
 *
 *   Building the strings to insert into the list control.
```

-121-

```
 *
 *    Inserting the string into the list.
 ***********************************************************/
if (dbnextrow(dbproc) != NO_MORE_ROWS)
   do {
      /*
       * Switch on the Listbox id
       */
      switch (idList) {
         /*
          * Top level list box
          */
         case ID_CLIENT_ADSLIST: /*----------------------------------------*/
            switch (usStyle) {
               case IDM_VIEWDEFAULT: /*----------------------------------*/
               case IDM_VIEWHISTORY: /*----------------------------------*/
               case IDM_VIEWALL: /*--------------------------------------*/
                  /*
                   * Build printable strings for status flags.
                   */
                  if ((SHORT)PriorityFlag == '1')
                     WinLoadString(hab, (HMODULE)NULL, IDS_RUSH,
                                   sizeof(NextRunDate), NextRunDate);
                  else if ((SHORT)PriorityFlag == '2')
                     WinLoadString(hab, (HMODULE)NULL, IDS_ASAP,
                                   sizeof(NextRunDate), NextRunDate);
                  switch (UserRqst) {
                     case ' ': /*-------------------------------------*/
                        WinLoadString(hab, (HMODULE)NULL, IDS_BLANK,
                                      sizeof(pszUserRequest), pszUserRequest);
                        break;
                     case 'H': /*-------------------------------------*/
                        WinLoadString(hab, (HMODULE)NULL, IDS_HOLD,
                                      sizeof(pszUserRequest), pszUserRequest);
                        break;
                     case 'S': /*-------------------------------------*/
                        WinLoadString(hab, (HMODULE)NULL, IDS_STEP,
                                      sizeof(pszUserRequest), pszUserRequest);
                        break;
                     case 'C': /*-------------------------------------*/
                        WinLoadString(hab, (HMODULE)NULL, IDS_CANCEL,
                                      sizeof(pszUserRequest), pszUserRequest);
                        break;
                  } /* switch */ switch (CurrentStat) {
                     case 'E': /*-------------------------------------*/
                        WinLoadString(hab, (HMODULE)NULL, IDS_ERROR,
                                      sizeof(pszCurStatus), pszCurStatus);
                        break;
                     case 'G': /*-------------------------------------*/
                        WinLoadString(hab, (HMODULE)NULL, IDS_GROUP_BUSY,
                                      sizeof(pszCurStatus), pszCurStatus);
                        break;
                     case 'R': /*-------------------------------------*/
                        WinLoadString(hab, (HMODULE)NULL, IDS_RUNNING,
                                      sizeof(pszCurStatus), pszCurStatus);
                        break;
                     case 'S': /*-------------------------------------*/
                        WinLoadString(hab, (HMODULE)NULL, IDS_SUCCESS,
                                      sizeof(pszCurStatus), pszCurStatus);
                        break;
                     case 'T': /*-------------------------------------*/
                        WinLoadString(hab, (HMODULE)NULL, IDS_ATTEMPTING,
                                      sizeof(pszCurStatus), pszCurStatus);
                        break;
```

-122-

```
            case 'W': /*----------------------------------------*/
                WinLoadString(hab, (HMODULE)NULL, IDS_WAITING,
                              sizeof(pszCurStatus), pszCurStatus);
                break;
            } /* switch */ sprintf(abBuffer, "\r%s\t%s\t%s\t%s\t%s\t%s\t%s",
                JobRunID, JobListName, pszUserRequest, pszCurStatus,
                NextRunDate, GrpName, SchedBy);
            break;
        } /* switch */
        WinEnableWindowUpdate(WinWindowFromID(hwnd, ID_CLIENT_HEADING),
                              TRUE);
        break;

case DID_EXECUTE_ADSLIST: /*----------------------------------------*/
        sprintf(abBuffer,
                "%s\t%s", ProgramName, FileName);
        break;

case DID_PICKSERV_ADSLIST: /*----------------------------------------*/
        sprintf(abBuffer, "%s\t%s", MachineName, MachineDesc);
        break;

case DID_JOBLIST_ADSLIST: /*----------------------------------------*/
        ADSConvertDateFromMDY(pUserAttr->szDateFmtCode, ConvertDate,
                LastModifiedDate);
        sprintf(abBuffer, "%s\t%s\t%s\t%s %s", JobListName,
                JobListDesc, BuiltBy, ConvertDate,
                LastModifiedTime);
        break;

case DID_JOBSTEP_ADSLIST: /*----------------------------------------*/
        sprintf(abBuffer, "\r%s\t%s\t%s",
                JobStepNum, JobProgramName, ArgList1);
        break;

case DID_JOBSTEP_COMBO: /*----------------------------------------*/
        sprintf(abBuffer, "%s", JobProgramName);
        break;

case DID_DAYTIMER_JOBCOMBO: /*----------------------------------------*/
        sprintf(abBuffer, "%s", JobListName);
        break;

case DID_DAYTIMER_GRPCOMBO: /*----------------------------------------*/
        sprintf(abBuffer, "%s", GrpName);
        break;

case DID_RESUME_ADSLIST: /*----------------------------------------*/
        sprintf(abBuffer, "\r%s\t%s\t%s",
                JobStepNum, JobProgramName, ArgList1);
        break;

case DID_FILTER_JOBCOMBO: /*----------------------------------------*/
        sprintf(abBuffer, "%s", JobListName);
        break;

case DID_FILTER_BYCOMBO: /*----------------------------------------*/
        sprintf(abBuffer, "%s", SchedBy);
        break;

case DID_FILTER_GROUPCOMBO: /*----------------------------------------*/
        sprintf(abBuffer, "%s", GrpName);
        break;
```

-123-

```
            default:
                WinSetPointer(HWND_DESKTOP,
                              WinQuerySysPointer(HWND_DESKTOP, SPTR_ARROW, TRUE));
                return;
        } /* switch */

WinSendDlgItemMsg(hwnd, idList, LM_INSERTITEM,
                          MPFROMSHORT(LIT_END), MPFROMP(abBuffer));

} while (dbnextrow(dbproc) != NO_MORE_ROWS);

else {
      /*
       * Else, there are no items in the database table so insert a
       * blank line to allow the headings to display.
       */
      sprintf(abBuffer, " ");
      WinSendDlgItemMsg(hwnd, idList, LM_INSERTITEM,
                        MPFROMSHORT(LIT_END), MPFROMP(abBuffer));
      WinSendDlgItemMsg(hwnd, idList, LM_DELETEALL, 0, 0);
    } /* else */
    dbcanquery(dbproc);
    while (dbresults(dbproc) != NO_MORE_RESULTS)
        dbcanquery(dbproc);

/* If this is the main list, be sure to turn the heading back on. */
    if (idList == ID_CLIENT_ADSLIST)
        WinEnableWindowUpdate(WinWindowFromID(hwnd, ID_CLIENT_HEADING),
                              TRUE);

/*
     * Try to select the item that matches the pszSelect string.
     */
    if (pszSelect != NULL) {
      iSearchSelect = (USHORT) SHORT1FROMMR(
          WinSendDlgItemMsg(hwnd, idList, LM_SEARCHSTRING,
                MPFROM2SHORT(LSS_PREFIX | LSS_CASESENSITIVE, LIT_FIRST),
                pszSelect));

WinSendDlgItemMsg(hwnd, idList, LM_SELECTITEM,
            MPFROMSHORT(iSearchSelect), (MPARAM)TRUE);
    } /* if */

WinShowWindow(WinWindowFromID(hwnd, idList), TRUE);

WinSetPointer(HWND_DESKTOP,
                  WinQuerySysPointer(HWND_DESKTOP, SPTR_ARROW, TRUE));
    return;
} /* LoadListBox */

/***************************************************************************/
/* SetPushButtons                                                          */
/*                                                                         */
/* Loops through the buttons in array pointed to by usPushButtons, setting */
/* the default flag in the button identified by idDefault and clearing the */
/* flags on the remaining buttons in the array.                            */
/***************************************************************************/
VOID SetPushButtons(HWND hwnd, USHORT usNumButtons,
                    USHORT idDefault, USHORT *usPushButtons)

{
    USHORT  i;

for (i = 0; i < usNumButtons; i++)
        WinSendDlgItemMsg(hwnd, *(usPushButtons + i), BM_SETDEFAULT,
              (MPARAM)(idDefault == *(usPushButtons + i)), (MPARAM) 0L);
```

} /* SetPushButtons */

/*****************************************************************************/
/* SetUserRequest                                                          */
/*                                                                         */
/* This routine sets the UserRqst field of a Job.  If the UserRqst         */
/* is a CANCEL, it may request verification.  This type of a change to a job */
/* is considered a change to the job schedule so a password will be required */
/* if it is set.  The actually deletion of items from the SSPendingJobTable  */
/* is handled by the SSBatchTrigger when the UserRqst changes to 'C'       */
/*****************************************************************************/
VOID SetUserRequest(HWND hwnd, PSZ pszJobID, CHAR cUserRequest){
    PSZ        qualptr;
    DBCHAR     UserRqst;
    DBCHAR     CurrentStat;
    DBCHAR     JobRunID[JOBIDLENGTH];
    CHAR       buffer[80];
    CHAR       szText1[80];
    CHAR       szText2[80];
    PWDSTRUCT  pwdStruct;

WinSetPointer(HWND_DESKTOP, WinQuerySysPointer(HWND_DESKTOP,
        SPTR_WAIT, TRUE));

/*
     * Build the SQL Command buffer and execute.  We want to be aware of the
     * CurrentStat and the existing UserRqst.  This is a 'for browse' -
     * we will not change any Job that is modified after this select.
     */
    safe_dbfcmd(dbproc,
        " SELECT"
        "    JobRunID,"
        "    UserRqst,"
        "    CurrentStat"
        " FROM SSPendingJobTable"
        " WHERE JobRunID = %ld"
        " FOR browse",
        atol(pszJobID));

dbsqlexec(dbproc);
    dbresults(dbproc);
    dbbind(dbproc, 1, NTBSTRINGBIND, (LONG)sizeof(JobRunID), JobRunID);
    dbbind(dbproc, 2, CHARBIND, (DBINT) 1, &UserRqst);
    dbbind(dbproc, 3, CHARBIND, (DBINT) 1, &CurrentStat);

if (dbnextrow(dbproc) != NO_MORE_ROWS) {
        qualptr = dbqual(dbproc, -1, "SSPendingJobTable");
        dbcanquery(dbproc);
        while (dbresults(dbproc) != NO_MORE_RESULTS)
            dbcanquery(dbproc);

/*
         * Get the scheduling password from user if needed.
         */
        pwdStruct.usPwdType = PWD_SCHED;
        pwdStruct.pszJobData = pszJobID;
        pwdStruct.usDataType = PWD_DATA_JOBID;
        if (!(WinDlgBox(HWND_DESKTOP, hwnd, (PFNWP)EnterPasswordDlgProc,
                (HMODULE)NULL, IDD_PWDENTER, (PVOID) &pwdStruct))) {
            /*
             * Oops, the user does not know the password, so return.
             */
            DosBeep( 300, 300 );
            WinSetPointer(HWND_DESKTOP,
                    WinQuerySysPointer(HWND_DESKTOP, SPTR_ARROW, TRUE));
```

```
        return;
    } /* if */
    /*
     * We have decided to not verify deletes of successfully completed
     * jobs.  If the job is password protected the user would have been
     * queried for the password or he is the admin.
     */
    if (cUserRequest == 'C' && !(CurrentStat == 'S')) {
       DosBeep( 400, 50 );
       if (CurrentStat == 'R') {
          WinLoadString(hab, (HMODULE)NULL, IDS_JOB,
                        sizeof(szText1), szText1);
          WinLoadString(hab, (HMODULE)NULL, IDS_ERASE_RUN,
                        sizeof(szText2), szText2);
          sprintf(buffer, "%s %s %s", szText1, pszJobID, szText2);
       } /* if */
       else {
          WinLoadString(hab, (HMODULE)NULL, IDS_ERASE_JOB,
                        sizeof(szText1), szText1);
          sprintf(buffer, "%s%s", szText1, pszJobID);
       } /* else */
       WinLoadString(hab, (HMODULE)NULL, IDS_ERASE,
                     sizeof(szText1), szText1);
       if (MBID_CANCEL == WinMessageBox( HWND_DESKTOP, hwnd, buffer, szText1,
              0, MB_OKCANCEL | MB_QUERY | MB_DEFBUTTON1 | MB_MOVEABLE)) {
          dbfreequal(qualptr);
          WinSetPointer(HWND_DESKTOP,
                        WinQuerySysPointer(HWND_DESKTOP, SPTR_ARROW, TRUE));
          return;
       } /* if */
    } /* if */

WinSetPointer(HWND_DESKTOP,
                  WinQuerySysPointer(HWND_DESKTOP, SPTR_WAIT, TRUE));
    /*
     * Build the SQL command buffer to do the update.  Don't update
     * the job if it has been touched since we last looked.
     */
    UserRqst = cUserRequest;
    safe_dbfcmd(dbproc,
            " UPDATE SSPendingJobTable"
            " SET UserRqst = \"%c\" %s",
            UserRqst,
            qualptr);

dbfreequal(qualptr);

if ((dbsqlexec(dbproc) == FAIL) || (dbresults(dbproc) == FAIL)) {
       DosBeep( 400, 50 );
       WinLoadString(hab, (HMODULE)NULL, IDS_ITEM_BUSY,
                            sizeof(szText1), (PSZ)szText1);
       WinLoadString(hab, (HMODULE)NULL, IDS_WARNING,
                            sizeof(szText2), (PSZ)szText2);
       WinMessageBox(HWND_DESKTOP, hwnd, szText1, szText2,
                     0, MB_OK | MB_WARNING | MB_MOVEABLE);
    } /* if */
    WinSendMsg(hwnd, WM_TIMER, MPFROMSHORT(TID_CLIENT_REFRESH), 0L);
    dbcanquery(dbproc);
    while (dbresults(dbproc) != NO_MORE_RESULTS)
       dbcanquery(dbproc);
    } /* if */
    WinSetPointer(HWND_DESKTOP,
                  WinQuerySysPointer(HWND_DESKTOP, SPTR_ARROW, TRUE));
} /* SetUserRequest */
```

```
/****************************************************************************/
/* RushJob                                                                  */
/*                                                                          */
/* RushJob accepts a JobID for a scheduled and waiting job and changes its  */
/* run priority to a 1. A Rushed Job will run immediately rather than at    */
/* its scheduled date and time. The user will be queried for a password if  */
/* a scheduling password has been set for the job. After completion the     */
/* Rushed Job will be rescheduled as it normally would have been.           */
/*                                                                          */
/****************************************************************************/
VOID RushJob(HWND hwnd, PSZ pszJobID)
{
    ULONG       ulNetConnect;
    PSZ         qualptr;
    DBCHAR      CurrentStat;
    PWDSTRUCT   pwdStruct;
    CHAR        szText1[80];
    CHAR        szText2[80];

/*
     * Get the scheduling password from the user if it is needed.
     */
    pwdStruct.usPwdType = PWD_SCHED;
    pwdStruct.pszJobData = pszJobID;
    pwdStruct.usDataType = PWD_DATA_JOBID;
    if (!(WinDlgBox(HWND_DESKTOP, hwnd, (PFNWP)EnterPasswordDlgProc,
                (HMODULE)NULL, IDD_PWDENTER, (PVOID) &pwdStruct))) {
        /*
         * Oops, the user does not know the password, so return.
         */
        DosBeep( 300, 300 );
        return;
    } /* if */

WinSetPointer(HWND_DESKTOP,
                WinQuerySysPointer(HWND_DESKTOP, SPTR_WAIT, TRUE));
    /*
     * To Rush a Job the PriorityFlag is set to 1. Use the 'for browse'
     * clause to insure that the job is not updated elsewhere before
     * we update it here.
     */
    safe_dbfcmd(dbproc,
        " SELECT"
        "     CurrentStat"
        " FROM SSPendingJobTable"
        " WHERE JobRunID = %ld"
        " FOR browse",
            atol(pszJobID));

dbsqlexec(dbproc);
    dbresults(dbproc);
    dbbind(dbproc, 1, CHARBIND, (DBINT) 1, &CurrentStat);

/*
     * To RUSH, the job MUST be Waiting
     */
    if ((dbnextrow(dbproc) != NO_MORE_ROWS) && (CurrentStat == 'W'))
    {
        qualptr = dbqual(dbproc, -1, "SSPendingJobTable");
        dbcanquery(dbproc);
        while (dbresults(dbproc) != NO_MORE_RESULTS)
            dbcanquery(dbproc);
        safe_dbfcmd(dbproc,
            " UPDATE SSPendingJobTable"
            " SET PriorityFlag = \"1\" %s", qualptr);
```

```
      dbfreequal(qualptr);
      if ((dbsqlexec(dbproc) == FAIL) || (dbresults(dbproc) == FAIL))
      {
         DosBeep( 400, 50 );
         WinLoadString(hab, (HMODULE)NULL, IDS_ITEM_BUSY,
                              sizeof(szText1), (PSZ)szText1);
         WinLoadString(hab, (HMODULE)NULL, IDS_WARNING,
                              sizeof(szText2), (PSZ)szText2);
         WinMessageBox(HWND_DESKTOP, hwnd, szText1, szText2,
                  0, MB_OK | MB_WARNING | MB_MOVEABLE);
      } /* if */
      else
         /*
          * Since this is a rush, get the server to examine its runnable list.
          */
         if (!ADSNetConnect(&ulNetConnect, szServerName, BATCHD_SERVICE))
             ADSNetDisconnect(ulNetConnect);

dbcanquery(dbproc);
      while (dbresults(dbproc) != NO_MORE_RESULTS)
         dbcanquery(dbproc);
   } /* if */
   else
   {
      dbcanquery(dbproc);
      while (dbresults(dbproc) != NO_MORE_RESULTS)
         dbcanquery(dbproc);
   }

WinSetPointer(HWND_DESKTOP,
              WinQuerySysPointer(HWND_DESKTOP, SPTR_ARROW, TRUE));
} /* RushJob */

/***********************************************************************
 *
 * Function:    SetJobStepOptions
 *
 * Description: Set buttons as enabled or disabled depending on list
 *              box and combo box selections.
 *
 * Returns:     nothing
 *
 ***********************************************************************/
VOID SetJobStepOptions(HWND hwnd)
{
   LONG   sListBoxSel;
   USHORT sComboBoxSel;

sListBoxSel = (LONG)WinSendMsg(WinWindowFromID(hwnd, DID_JOBSTEP_ADSLIST),
         LM_QUERYSELECTION, 0L, 0L);
   sComboBoxSel = WinQueryDlgItemTextLength(hwnd, DID_JOBSTEP_COMBO);

WinEnableWindow(WinWindowFromID(hwnd, DID_JOBSTEP_APPEND),
         sComboBoxSel != 0);
   WinEnableWindow(WinWindowFromID(hwnd, DID_JOBSTEP_INSERT),
         sListBoxSel != LIT_NONE);
   WinEnableWindow(WinWindowFromID(hwnd, DID_JOBSTEP_UPDATE),
         sListBoxSel != LIT_NONE);
   WinEnableWindow(WinWindowFromID(hwnd, DID_JOBSTEP_DELETE),
         sListBoxSel != LIT_NONE);

return;
} static char szRevision[] = "$Revision:   4.4  $ BATCH03.C";
```

```
/****************************************************************
*
* Copyright (c) 1990, 1991, 1992, 1993 American Airlines
*
* File:        BATCH01.C
*
* System:      Batch Administration
*
* Description: The Batch Administration program provides a user
*              interface to Batch Scheduler, allowing users to build,
*              submit, and query batches.
*
*              This module contains DayTimerDlgProc, which controls
*              the dialog box used to schedule and reschedule batches.
*
* History:     David M. Wilson  08/01/90
*              Blain Stanga
*              Joe Bryan
*              Jeff Beardsley
*              Glenn Grundstrom
*
* This program is the CONFIDENTIAL and PROPRIETARY property
* of American Airlines. Any unauthorized use, reproduction
* or transfer of this program is strictly prohibited.
*
* This is an unpublished work, and is subject to limited distribution
* and restricted disclosure only.  ALL RIGHTS RESERVED.
*
****************************************************************/ define DBMSOS2
define INCL_PM
define EXTERN extern include <os2.h>
include <stdio.h>
include <string.h>
include <stdlib.h>
include <stdarg.h>
include <ctype.h>
include "sqlfront.h"
include "sqldb.h"

include "adslen.h"
include "ads.h"
include "adsnet.h"
include "dialog.h"
include "batchdef.h"
include "batchdlg.h"
include "batch.h"
/****************************************************************/
/*                                                              */
/* DayTimerDlgProc                                              */
/*                                                              */
/* This routine displays, controls, and extracts data from a dialog box */
/* that allows the user to schedule or reschedule a batch job.  */
/*                                                              */
/* Information from this dialog box is placed in the SSPendingJobTable. */
/*                                                              */
/* Rescheduled jobs are not accomplished with a SQL update - instead they */
/* are reinserted as a new job and then the old one is deleted. */
/*                                                              */
/****************************************************************/
MRESULT EXPENTRY DayTimerDlgProc(HWND hwnd, USHORT msg, MPARAM mp1, MPARAM mp2)
{
```

```
USHORT          usNotifyCode;
USHORT          i;
USHORT          usNum;
ULONG           ulData;
ULONG           ulNetConnect;
MRESULT         mresult;
SHORT           sNumChars;
CHAR            Buffer[80];
BOOL            flag;
DBCHAR          JobListName[JOBNAMELENGTH];
DBCHAR          GrpName[GROUPNAMELENGTH];
DBCHAR          UserRqst;
DBCHAR          CurrentStat;
DBCHAR          PriorityFlag;
DBTINYINT       RecurWeekday = 0;
DBSMALLINT      RecurMonthday = 0;
DBSMALLINT      RecurMonth = 0;
DBSMALLINT      RecurPrd = 0;
DBINT           JobRunID;
USHORT          start_hour;
USHORT          start_min;
DBCHAR          NextRunDate[JOBDATELENGTH];
DBCHAR          ConvertDate[JOBDATELENGTH];
PWDSTRUCT       pwdStruct;
CHAR            szText1[120];
CHAR            szText2[120];
BOOL            bresult;
CHAR            DisplayTime[4];
static HPOINTER hpointerIcon;
static DBCHAR   old_UserRequest;
static DBCHAR   OldJobListName[JOBNAMELENGTH];
static PSZ      pszJobID;
static PSZ      qualptr;
static USHORT   AccountingPeriods=0;

switch (msg)
{
   case WM_INITDLG: /*--------------------------------------------------*/
      /*
       * This could take a while, so change pointer.
       */
      WinSetPointer(HWND_DESKTOP,
                    WinQuerySysPointer(HWND_DESKTOP, SPTR_WAIT, TRUE));

/*--------------------------------------------------------------------*/
      /* disable period controls and set the month/period radiobutton - jdb */
      /*--------------------------------------------------------------------*/
      for (i=DID_DAYTIMER_PERIOD1; i<=DID_DAYTIMER_PERIODICALLY; i++)
      {
          WinEnableWindow(WinWindowFromID(hwnd, i), FALSE);
      } /* for */
      WinSendDlgItemMsg(hwnd, RBID_MONTH, BM_SETCHECK, MPFROMSHORT(TRUE), 0);

ADSSetFormat(hwnd, DID_DAYTIMER_DATE, pUserAttr->szDateFmtCode);

/*-----------------------------------------------------------*/
      /* Find out how many accounting periods there are, and store */
      /*-----------------------------------------------------------*/
      dbcmd(dbproc,
            " SELECT"
            "    count(*)"
            " FROM ActgPrd"
            " WHERE TypeCode='ACTG'"
            "   AND FiscalYr = datepart(year, GetDate())");
      dbsqlexec(dbproc);
      dbresults(dbproc);
```

```
dbbind(dbproc, 1, SMALLBIND, 2, (BYTE*)&AccountingPeriods);
while (dbnextrow(dbproc)!=NO_MORE_ROWS);

/*
 * If a JobID is found in mp2, this is a reschedule.
 */
pszJobID = (PSZ) mp2;

/*
 * Set entryfield text limits...
 */
WinSendDlgItemMsg(hwnd, DID_DAYTIMER_STARTHOUR, EM_SETTEXTLIMIT,
                  MPFROMSHORT(2), 0L);
WinSendDlgItemMsg(hwnd, DID_DAYTIMER_STARTMIN, EM_SETTEXTLIMIT,
                  MPFROMSHORT(2), 0L);
WinSendDlgItemMsg(hwnd, DID_DAYTIMER_DATE, EM_SETTEXTLIMIT,
                  MPFROMSHORT(JOBDATELENGTH - 1), 0L);
WinSendDlgItemMsg(hwnd, DID_DAYTIMER_OTHERENT, EM_SETTEXTLIMIT,
                  MPFROMSHORT(2), 0L);
WinSendDlgItemMsg(hwnd, DID_DAYTIMER_DATE,
                  EM_QUERYCHANGED, 0L, 0L);

/*
 * Load the Job Name and Group combo boxes...
 */
LoadListBox(hwnd, DID_DAYTIMER_JOBCOMBO, (PSZ) NULL, (PSZ)NULL, 0);
LoadListBox(hwnd, DID_DAYTIMER_GRPCOMBO, (PSZ) NULL, (PSZ)NULL, 0);

/*
 * If this is a reschedule, fill in the fields and buttons as needed...
 */
if (pszJobID)
{
    /*
     * Get the scheduling password from the user if is required...
     */
    pwdStruct.usPwdType = PWD_SCHED;
    pwdStruct.pszJobData = (PSZ) pszJobID;
    pwdStruct.usDataType = PWD_DATA_JOBID;

/*
     * Does the user know the password?
     */
    if (!(WinDlgBox(HWND_DESKTOP, hwnd, (PFNWP)EnterPasswordDlgProc,
                (HMODULE)NULL, IDD_PWDENTER, (PVOID) &pwdStruct)))
    {
        /* Nope */
        DosBeep( 300, 300 );
        /* Restore the pointer to the default and go home */
        WinSetPointer(HWND_DESKTOP,
                      WinQuerySysPointer(HWND_DESKTOP, SPTR_ARROW, TRUE));
        WinDismissDlg(hwnd, TRUE);
        return(0);
    } /* if */

/*
     * Fetch the handle of the icon in the top corner of dlgbox. We
     * save this handle because we will restore this icon before
     * exiting so that the dlgproc will destroy the correct icon.
     */
    hpointerIcon = (HPOINTER) WinSendDlgItemMsg(hwnd, DID_DAYTIMER_ICON,
                                SM_QUERYHANDLE, (MPARAM)0L, (MPARAM) 0L);

/*
     * Set corner icon to the reschedule picture.
     */
```

```
WinSendDlgItemMsg(hwnd, DID_DAYTIMER_ICON, SM_SETHANDLE,
      (MPARAM)hpointerArray[IDI_RESCHED - IDI_BITBASE], (MPARAM) 0L);

/*
 * Set the window title to make it look like we are rescheduling.
 */
WinLoadString(hab, (HMODULE)NULL, IDS_RESCHEDULE,
              sizeof(Buffer), Buffer);
sprintf(Buffer, "%s - Job %s", Buffer, pszJobID);
WinSetWindowText(hwnd, Buffer);

/*
 * Select all of the important stuff for this job.  Note that this
 * select uses a 'for browse' clause, preventing its migration to
 * a stored procedure.
 */
safe_dbfcmd(dbproc,
      "  SELECT"
      "     JobRunID,"
      "     JobListName,"
      "     UserRqst,"
      "     CurrentStat,"
      "     GrpName,"
      "     PriorityFlag,"
      "     datepart(hour, NxtRunDateTime),"
      "     datepart(minute, NxtRunDateTime),"
      "     convert(char(%d), NxtRunDateTime, 1),"
      "     RecurWeekday,"
      "     RecurMonthday,"
      "     RecurMonth,"
      "     RecurPrd"
      "  FROM SSPendingJobTable"
      "  WHERE JobRunID = %ld"
      "  FOR browse",
      JOBDATELENGTH, atol(pszJobID));

dbsqlexec(dbproc);
dbresults(dbproc);
dbbind(dbproc, 1, INTBIND, (DBINT) 0, (BYTE *) &JobRunID);
dbbind(dbproc, 2, NTBSTRINGBIND, (LONG)sizeof(JobListName), JobListName);
dbbind(dbproc, 3, CHARBIND, (DBINT) 1, &UserRqst);
dbbind(dbproc, 4, CHARBIND, (DBINT) 1, &CurrentStat);
dbbind(dbproc, 5, NTBSTRINGBIND, (LONG)sizeof(GrpName), GrpName);
dbbind(dbproc, 6, CHARBIND, (DBINT) 1, (BYTE *) &PriorityFlag);
dbbind(dbproc, 7, SMALLBIND, (DBINT) 0, (BYTE *) &start_hour);
dbbind(dbproc, 8, SMALLBIND, (DBINT) 0, (BYTE *) &start_min);
dbbind(dbproc, 9, NTBSTRINGBIND, (LONG)sizeof(NextRunDate), NextRunDate);
dbbind(dbproc, 10, TINYBIND, (DBINT) 0, (BYTE *) &RecurWeekday);
dbbind(dbproc, 11, SMALLBIND, (DBINT) 0, (BYTE *) &RecurMonthday);
dbbind(dbproc, 12, SMALLBIND, (DBINT) 0, (BYTE *) &RecurMonth);
dbbind(dbproc, 13, SMALLBIND, (DBINT) 0, (BYTE *) &RecurPrd);

if (dbnextrow(dbproc) != NO_MORE_ROWS)
{
   /*
    * HEY! Job is running - can't deal with that.
    */
   if (CurrentStat == 'R')
   {
      DosBeep( 400, 50 );
      WinLoadString(hab, (HMODULE)NULL, IDS_CANT_RESCHED,
                    sizeof(szText1), szText1);
      WinLoadString(hab, (HMODULE)NULL, IDS_WARNING,
                    sizeof(szText2), szText2);
      WinMessageBox(HWND_DESKTOP, hwnd, szText1, szText2,
                    0, MB_OK | MB_WARNING | MB_MOVEABLE);
```

-132-

```
    while (dbnextrow(dbproc) != NO_MORE_ROWS);

WinSetPointer(HWND_DESKTOP,
                  WinQuerySysPointer(HWND_DESKTOP, SPTR_ARROW, TRUE));
    WinDismissDlg(hwnd, FALSE);
    return(0);
} /* if */

/*
 * Qualptr is a buffer containing the timestamp (thanks to the
 * select for browse) built into a where clause, which we
 * will use later.
 */
qualptr = dbqual(dbproc, -1, "SSPendingJobTable");

/* Set defaults for the two combo boxes */
WinSetDlgItemText(hwnd, DID_DAYTIMER_JOBCOMBO, JobListName);
WinSetDlgItemText(hwnd, DID_DAYTIMER_GRPCOMBO, GrpName);

/*
 * Save the current JobListName so that we won't requery
 * the user for the password if the JobListName is not changed.
 */
strcpy(OldJobListName, JobListName);

/*
 * The user will not be allowed to change the UserRqst flag
 * from the reschedule screen.  Hide the HOLD check box and save
 * the original UserRqst so that it can be restored on the
 * new job.
 */
if (sCurrentView == IDM_VIEWDEFAULT)
{
    WinEnableWindowUpdate(WinWindowFromID(hwnd, DID_DAYTIMER_HOLD),
            FALSE );
    old_UserRequest = UserRqst;
} /* if */

/*
 * If the jobs was an ASAP (PriorityFlag = '2'), set ASAP checkbox...
 */
if ((SHORT)PriorityFlag == '2')
    WinSendDlgItemMsg(hwnd, DID_DAYTIMER_ASAP, BM_CLICK,
                      MPFROMSHORT(TRUE), MPFROMSHORT(0));
/*
 * Else set the time and date of the first execution and then
 * select the checkboxes for month and day if the job will
 * automatically be rescheduled after the first run.
 */
else
{
    WinSetDlgItemShort(hwnd,DID_DAYTIMER_STARTHOUR,start_hour,FALSE);
    sprintf(DisplayTime, "%02d", start_min);
    WinSetDlgItemText(hwnd, DID_DAYTIMER_STARTMIN, DisplayTime);
    ADSConvertDateFromMDY(pUserAttr->szDateFmtCode, ConvertDate,
            NextRunDate);
    WinSetDlgItemText(hwnd, DID_DAYTIMER_DATE, ConvertDate);

/*
     * Note: Weekdays are 'backwards' in RecurWeekday: SFTWTMS
     */
    usNum = (USHORT) RecurWeekday;
    for (i = 0; i < 7; i++)
    {
        if (usNum & ((USHORT) 1 << i))
            WinSendDlgItemMsg(hwnd, DID_DAYTIMER_SUN + i, BM_CLICK,
```

```
                                 MPFROMSHORT(1), MPFROMSHORT(0));
       } /* for */ if (RecurMonthday)
       {
           /*
            * If a monthday was given, clear and disable these buttons...
            */
           ToggleButtonRange(hwnd, DID_DAYTIMER_SUN,
                             DID_DAYTIMER_DAILY, FALSE, TRUE);
           ToggleButtonRange(hwnd, DID_DAYTIMER_1ST,
                             DID_DAYTIMER_LAST, FALSE, TRUE);

if (RecurMonthday == 255)
              WinSendDlgItemMsg(hwnd, DID_DAYTIMER_LAST, BM_CLICK,
                    MPFROMSHORT(1), 0);
           else if (RecurMonthday == 1)
              WinSendDlgItemMsg(hwnd, DID_DAYTIMER_1ST, BM_CLICK,
                    MPFROMSHORT(1), 0);
           else
              WinSetDlgItemShort(hwnd, DID_DAYTIMER_OTHERENT,
                    RecurMonthday, FALSE);

} /* if */

/*
        * Well, might as well put the months in backwards too:
        *              DNOSAJJMAMFJ
        */
       usNum = (USHORT) RecurMonth;
       for (i = 0; i < 12; i++)
       {
           if (usNum & ((USHORT) 1 << i))
              WinSendDlgItemMsg(hwnd, DID_DAYTIMER_JAN + i, BM_CLICK,
                                MPFROMSHORT(1), MPFROMSHORT(0));
       } /* for */

/*----------------------------------------*/
       /* Fill in the Period Checkboxes if need be */
       /*----------------------------------------*/
       if(RecurPrd)
       {
           WinSendDlgItemMsg(hwnd, RBID_PERIOD, BM_CLICK,
                 MPFROMSHORT(TRUE), 0);
           usNum = (USHORT) RecurPrd;
           for (i = 0; i < 13; i++)
           {
              if (usNum & ((USHORT) 1 << i))
                 WinSendDlgItemMsg(hwnd, DID_DAYTIMER_PERIOD1 + i,
                       BM_CLICK, MPFROMSHORT(1), MPFROMSHORT(0));
           } /* for */
       } /* if */
     } /* End ELSE ! ASAP */
   } /* End If Row Found */ dbcanquery(dbproc);
   while (dbresults(dbproc) != NO_MORE_RESULTS)
       dbcanquery(dbproc);
} /* End Set Defaults */

/*
 * ELSE this not a reschedule, so we don't have any defaults to set.
 */
else
{
   WinSetWindowText(hwnd, "Schedule a Batch");
```

-134-

```
        } /* else */

/*
         * HEY! Wake that user up.
         */
        WinSetPointer(HWND_DESKTOP,
                    WinQuerySysPointer(HWND_DESKTOP, SPTR_ARROW, TRUE));
        return(0);

case WM_CONTROL: /*----------------------------------------------------*/
        usNotifyCode = (USHORT)SHORT2FROMMP(mp1);
        ulData = (ULONG)LONGFROMMP(mp2);

/*
         * Watch the user for clues that allow us to avoid input errors.
         */
        switch ((USHORT)SHORT1FROMMP(mp1))
        {   /* On control ID */
            case DID_DAYTIMER_STARTHOUR: /*----------------------------------*/
                bresult = WinQueryDlgItemShort(hwnd, DID_DAYTIMER_STARTHOUR,
                                            &start_hour, FALSE);
                if ((usNotifyCode == EN_CHANGE))
                    /*
                     * If the hour looks like 24hr format, disable the am/pm buttons.
                     */
                    if (!bresult || start_hour > 12)
                    {
                        WinEnableWindow(WinWindowFromID(hwnd, DID_DAYTIMER_PM), FALSE);
                        WinEnableWindow(WinWindowFromID(hwnd, DID_DAYTIMER_AM), FALSE);
                    } /* if */
                    else
                    {
                        WinEnableWindow(WinWindowFromID(hwnd, DID_DAYTIMER_PM), TRUE);
                        WinEnableWindow(WinWindowFromID(hwnd, DID_DAYTIMER_AM), TRUE);
                    } /* else */
                break;

if 0
jdb - remove gorpy rewording of checkbox
            case DID_DAYTIMER_HOLD: /*------------------------------------*/
                if (usNotifyCode == BN_CLICKED || usNotifyCode == BN_DBLCLICKED)
                /* Nothing real important */
                if (SHORT1FROMMR(WinSendDlgItemMsg(hwnd, DID_DAYTIMER_HOLD,
                                            BM_QUERYCHECK, 0L, 0L )))
                    WinSetDlgItemText(hwnd, DID_DAYTIMER_HOLD, "Held  ");
                else
                    WinSetDlgItemText(hwnd, DID_DAYTIMER_HOLD, "Hold?");
                break;
endif case DID_DAYTIMER_ASAP: /*--------------------------------------*/
                /*
                 * If ASAP is selected, disable most everything else
                 * because this job can not be rescheduled.  If ASAP
                 * is being cleared, reverse the process.
                 */
                mresult = WinSendDlgItemMsg( hwnd, DID_DAYTIMER_ASAP,
                                        BM_QUERYCHECK, 0L, 0L );

flag = !(BOOL)SHORT1FROMMR(mresult);

ToggleEntryField(hwnd, DID_DAYTIMER_STARTTEXT,
                            DID_DAYTIMER_STARTHOUR, flag);
                ToggleEntryField(hwnd, DID_DAYTIMER_STARTCOLON,
                            DID_DAYTIMER_STARTMIN, flag);
                WinEnableWindow(WinWindowFromID(hwnd, DID_DAYTIMER_PM), flag);
```

```
WinEnableWindow(WinWindowFromID(hwnd, DID_DAYTIMER_AM), flag);
ToggleEntryField(hwnd, DID_DAYTIMER_DATETEXT,
            DID_DAYTIMER_DATE, flag);
ToggleEntryField(hwnd, DID_DAYTIMER_OTHERTEXT,
            DID_DAYTIMER_OTHERENT, flag);

WinEnableWindow(WinWindowFromID(hwnd, RBID_MONTH), flag);
WinEnableWindow(WinWindowFromID(hwnd, RBID_PERIOD), flag);
WinEnableWindow(WinWindowFromID(hwnd, PBID_NOW), flag);

if (WinSendDlgItemMsg(hwnd, RBID_MONTH, BM_QUERYCHECK, 0, 0)
        || !flag)
{
    ToggleButtonRange(hwnd, DID_DAYTIMER_JAN, DID_DAYTIMER_ALL,
            FALSE, flag);
    ToggleButtonRange(hwnd, DID_DAYTIMER_SUN, DID_DAYTIMER_DAILY,
            FALSE, flag);
} /* if */ if (WinSendDlgItemMsg(hwnd, RBID_PERIOD, BM_QUERYCHECK, 0, 0)
        || !flag)
{
    ToggleButtonRange(hwnd, DID_DAYTIMER_PERIOD1,
            DID_DAYTIMER_PERIOD1+AccountingPeriods-1, FALSE, flag);
    WinEnableWindow(WinWindowFromID(hwnd, DID_DAYTIMER_PERIODICALLY),
            flag);
} /* if */

ToggleButtonRange(hwnd, DID_DAYTIMER_1ST, DID_DAYTIMER_LAST,
        FALSE, flag);
break;

case RBID_PERIOD: /*-----------------------------------------------*/
    if(AccountingPeriods > 0)
    {
        ToggleButtonRange(hwnd, DID_DAYTIMER_SUN,
                DID_DAYTIMER_DAILY, FALSE, FALSE);
        ToggleButtonRange(hwnd, DID_DAYTIMER_JAN, DID_DAYTIMER_ALL,
                FALSE, FALSE);
        ToggleButtonRange(hwnd, DID_DAYTIMER_PERIOD1,
                DID_DAYTIMER_PERIOD1 + AccountingPeriods-1, FALSE, TRUE);
        WinEnableWindow(WinWindowFromID(hwnd,
                DID_DAYTIMER_PERIODICALLY), TRUE);
        WinSetDlgItemText(hwnd, STID_DAY_OFFSET, "... of the Period");
    } /* if */
    else
        WinSendDlgItemMsg(hwnd, RBID_MONTH, BM_SETCHECK,
                MPFROMSHORT(TRUE), 0);
    break;

case RBID_MONTH: /*-----------------------------------------------*/
    ToggleButtonRange(hwnd, DID_DAYTIMER_SUN,
            DID_DAYTIMER_DAILY, FALSE, TRUE);
    ToggleButtonRange(hwnd, DID_DAYTIMER_JAN, DID_DAYTIMER_ALL,
            FALSE, TRUE);
    ToggleButtonRange(hwnd, DID_DAYTIMER_PERIOD1,
            DID_DAYTIMER_PERIOD1 + AccountingPeriods-1, FALSE, FALSE);
    WinEnableWindow(WinWindowFromID(hwnd,
            DID_DAYTIMER_PERIODICALLY), FALSE);
    WinSetDlgItemText(hwnd, STID_DAY_OFFSET, "... of the Month");
    break;

case DID_DAYTIMER_OTHERENT: /*-----------------------------------------------*/
    /*
     * Some activity at the month day entry field...
     */
```

```
            sNumChars = WinQueryWindowText(WinWindowFromID(hwnd,
                 DID_DAYTIMER_OTHERENT), sizeof(Buffer), Buffer);

if (usNotifyCode == EN_CHANGE)
            {
               if(sNumChars >= 1)
               {
                  if (WinSendDlgItemMsg(hwnd, RBID_MONTH, BM_QUERYCHECK, 0, 0))
                     ToggleButtonRange( hwnd, DID_DAYTIMER_SUN,
                         DID_DAYTIMER_DAILY, FALSE, TRUE );
                  ToggleButtonRange( hwnd, DID_DAYTIMER_1ST,
                         DID_DAYTIMER_LAST, FALSE, TRUE );
               } /* if */
            } /* if */
            break;

case DID_DAYTIMER_DAILY: /*----------------------------------------*/
            /* If Daily button has been selected, select all days */
            ToggleButtonRange( hwnd, DID_DAYTIMER_SUN,
                DID_DAYTIMER_SAT, TRUE, TRUE );
            ToggleButtonRange( hwnd, DID_DAYTIMER_1ST,
                DID_DAYTIMER_LAST, FALSE, TRUE );
            break;

case DID_DAYTIMER_1ST: /*------------------------------------------*/
            if (usNotifyCode == BM_CLICKED)
            {
               mresult = WinSendDlgItemMsg( hwnd, DID_DAYTIMER_1ST,
                   BM_QUERYCHECK, 0L, 0L );

WinSetDlgItemText(hwnd, DID_DAYTIMER_OTHERENT, NULL);

/* If Daily button has been selected, deselect all days */
               if (SHORT1FROMMR(mresult))
               {
                  if(WinSendDlgItemMsg(hwnd, RBID_MONTH, BM_QUERYCHECK, 0, 0))
                     ToggleButtonRange( hwnd, DID_DAYTIMER_SUN,
                         DID_DAYTIMER_DAILY, FALSE, TRUE );
                  ToggleButtonRange( hwnd, DID_DAYTIMER_LAST,
                         DID_DAYTIMER_LAST, FALSE, TRUE );
               } /* if */
            } /* if */
            break;

case DID_DAYTIMER_LAST: /*-----------------------------------------*/
            if (usNotifyCode == BM_CLICKED)
            {
               mresult = WinSendDlgItemMsg( hwnd, DID_DAYTIMER_LAST,
                   BM_QUERYCHECK, 0L, 0L );

WinSetDlgItemText(hwnd, DID_DAYTIMER_OTHERENT, NULL);

if (SHORT1FROMMR(mresult))
               {
                  if (WinSendDlgItemMsg(hwnd, RBID_MONTH, BM_QUERYCHECK, 0, 0))
                     ToggleButtonRange( hwnd, DID_DAYTIMER_SUN,
                         DID_DAYTIMER_DAILY, FALSE, TRUE );
                  ToggleButtonRange( hwnd, DID_DAYTIMER_1ST,
                         DID_DAYTIMER_1ST, FALSE, TRUE );
               } /* if */
            } /* if */
            break;

/*
             * If a day is selected disable the 1st and Last buttons.
             */
```

```
    case DID_DAYTIMER_SUN: /*----------------------------------------*/
    case DID_DAYTIMER_MON: /*----------------------------------------*/
    case DID_DAYTIMER_TUE: /*----------------------------------------*/
    case DID_DAYTIMER_WED: /*----------------------------------------*/
    case DID_DAYTIMER_THU: /*----------------------------------------*/
    case DID_DAYTIMER_FRI: /*----------------------------------------*/
    case DID_DAYTIMER_SAT: /*----------------------------------------*/
        if (usNotifyCode == BN_CLICKED)
        {
            ToggleButtonRange( hwnd, DID_DAYTIMER_1ST,
                DID_DAYTIMER_LAST, FALSE, TRUE );
            WinSetDlgItemText(hwnd, DID_DAYTIMER_OTHERENT, NULL);
        } /* if */
        break;
    } /* switch */
    break;

case WM_DESTROY: /*----------------------------------------------------*/
    /* If this was a reschedule */
    if (pszJobID)
    {
        /* Free the qualptr buffer */
        dbfreequal(qualptr);
        /* Restore the original corner icon but don't show it */
        WinShowWindow(WinWindowFromID(hwnd, DID_DAYTIMER_ICON), FALSE);
        WinSendDlgItemMsg(hwnd, DID_DAYTIMER_ICON, SM_SETHANDLE,
            (MPARAM) hpointerIcon, (MPARAM) 0L);
    } /* if */
    WinDismissDlg(hwnd, FALSE);
    break;

case WM_COMMAND: /*----------------------------------------------------*/
    switch (COMMANDMSG(&msg)->cmd)
    {
        case PBID_NOW: /*----------------------------------------------*/
        {
            CHAR date[9], time[9];

dbcmd(dbproc,
                "SELECT"
                "   convert(char(8), GetDate(), 1),"
                "   convert(char(8), GetDate(), 8)");
            dbsqlexec(dbproc);
            dbresults(dbproc);
            dbbind(dbproc, 1, NTBSTRINGBIND, 9, date);
            dbbind(dbproc, 2, NTBSTRINGBIND, 9, time);
            while(dbnextrow(dbproc)!=NO_MORE_ROWS);
            ADSConvertDateFromMDY(pUserAttr->szDateFmtCode, ConvertDate,
                date);
            WinSetDlgItemText(hwnd, DID_DAYTIMER_DATE, ConvertDate);
            time[2] = time[5] = 0;
            WinSetDlgItemText(hwnd, DID_DAYTIMER_STARTHOUR, time);
            WinSetDlgItemText(hwnd, DID_DAYTIMER_STARTMIN, time+3);
            msg = 0; /* Maintain dialog box */
            break;
        } case DID_DAYTIMER_PERIODICALLY: /*-----------------------------*/
            ToggleButtonRange(hwnd, DID_DAYTIMER_PERIOD1,
                DID_DAYTIMER_PERIOD1 + AccountingPeriods-1, TRUE, TRUE );
            msg = 0; /* Maintain dialog box */
            break;

case DID_DAYTIMER_ALL: /*--------------------------------------*/
            ToggleButtonRange(hwnd, DID_DAYTIMER_JAN,
                DID_DAYTIMER_DEC, TRUE, TRUE );
```

```
    msg = 0;  /* Maintain dialog box */
    break;

case DID_DAYTIMER_DAILY: /*----------------------------------------*/
    ToggleButtonRange(hwnd, DID_DAYTIMER_SUN,
        DID_DAYTIMER_SAT, TRUE, TRUE );
    ToggleButtonRange(hwnd, DID_DAYTIMER_1ST,
        DID_DAYTIMER_LAST, FALSE, TRUE );
    WinSetDlgItemText(hwnd, DID_DAYTIMER_OTHERENT, NULL);
    msg = 0;  /* Maintain dialog box */
    break;

case DID_CANCEL: /*----------------------------------------------*/
    break;

case DID_OK: /*--------------------------------------------------*/
    msg = 0;  /* Allow error conditions to maintain dialog box */
    WinLoadString(hab, (HMODULE)NULL, IDS_ERROR,
        sizeof(szText2), (PSZ)szText2);

/* Read the combo box entries */
    if (!WinQueryDlgItemText(hwnd, DID_DAYTIMER_JOBCOMBO,
        JOBNAMELENGTH, JobListName))
    {
        WinLoadString(hab, (HMODULE)NULL, IDS_NO_JOB_SELECTED,
            sizeof(szText1), (PSZ)szText1);
        WinMessageBox(HWND_DESKTOP, HWND_DESKTOP, szText1, szText2,
            (USHORT) NULL, MB_OK | MB_ERROR | MB_MOVEABLE);
        break;
    } /* if */ if (!WinQueryDlgItemText(hwnd, DID_DAYTIMER_GRPCOMBO,
        GROUPNAMELENGTH, GrpName))
    {
        WinLoadString(hab, (HMODULE)NULL, IDS_NO_GROUP_SELECTED,
            sizeof(szText1), (PSZ)szText1);
        WinMessageBox(HWND_DESKTOP, HWND_DESKTOP, szText1, szText2,
            (USHORT) NULL, MB_OK | MB_ERROR | MB_MOVEABLE);
        break;
    } /* if */

/*
     * If this is a reschedule and the JobListName has been changed,
     * or if this is a newly scheduled job, query for a password if
     * needed.
     */
    if ((pszJobID && strcmp(OldJobListName, JobListName) != 0) ||
        !pszJobID)
    {
        /*
         * Get password from user if needed.
         */
        pwdStruct.usPwdType = PWD_SCHED;
        pwdStruct.pszJobData = (PSZ) JobListName;
        pwdStruct.usDataType = PWD_DATA_JOBNAME;
        if (!(WinDlgBox(HWND_DESKTOP, hwnd, (PFNWP)EnterPasswordDlgProc,
            (HMODULE)NULL, IDD_PWDENTER, (PVOID) &pwdStruct)))
        {
            /*
             * Oops, the users does not know the password, so return.
             */
            DosBeep( 300, 300 );
            WinLoadString(hab, (HMODULE)NULL, IDS_WRONG_PASSWORD,
                sizeof(szText1), (PSZ)szText1);
            WinMessageBox(HWND_DESKTOP, HWND_DESKTOP, szText1, szText2,
                (USHORT) NULL, MB_OK | MB_ERROR | MB_MOVEABLE);
```

```
        WinDismissDlg(hwnd, TRUE);
        break;
     } /* if */
  } /* if */

WinSetPointer(HWND_DESKTOP,
        WinQuerySysPointer(HWND_DESKTOP, SPTR_WAIT, TRUE));

/*
   * If this is a reschedule, replace the original UserRqst.
   * Else, check the HOLD checkbox state and set UserRqst
   * accordingly.
   */
  if (pszJobID && sCurrentView == IDM_VIEWDEFAULT)
     UserRqst = old_UserRequest;
  else
  {
     if (WinSendDlgItemMsg(hwnd, DID_DAYTIMER_HOLD,
           BM_QUERYCHECK, OL, OL) == (MRESULT)1)
        UserRqst = 'H';
     else
        UserRqst = ' ';
  } /* else */

/*
   * If the ASAP button is selected, use the current date/time.
   */
  if (WinSendDlgItemMsg(hwnd, DID_DAYTIMER_ASAP,
        BM_QUERYCHECK, OL, OL) == (MRESULT)1)
  {
     safe_dbfcmd(dbproc,
           " InsSSPendingJobTable "
           " \"%s\", \"%c\", \"%s\", '2', ' ',"
           " %d, %d, %d, %d, '''",
           JobListName, UserRqst, GrpName,
           RecurWeekday, RecurMonthday, RecurMonth,
           RecurPrd);
  } /* if */
  /*
   * ELSE we get to build a job that can reschedule.
   */
  else
  {
     /* Get the starting date */
     if (!WinQueryDlgItemText(hwnd, DID_DAYTIMER_DATE,
           sizeof(Buffer), Buffer))
     {
        WinLoadString(hab, (HMODULE)NULL, IDS_NO_DATE,
              sizeof(szText1), (PSZ)szText1);
        WinMessageBox(HWND_DESKTOP, HWND_DESKTOP, szText1, szText2,
              (USHORT) NULL, MB_OK | MB_ERROR | MB_MOVEABLE);
        break;
     } /* if */
     else
     {
        ADSConvertDateToMDY(pUserAttr->szDateFmtCode, Buffer,
              ConvertDate);
        sprintf(NextRunDate, "'%s ", ConvertDate);
     }

/* Get the starting hour */
     bresult = WinQueryDlgItemShort(hwnd, DID_DAYTIMER_STARTHOUR,
                 &start_hour, FALSE);
     if (!bresult || start_hour > 23)
     {
        WinLoadString(hab, (HMODULE)NULL, IDS_TIME_INCORRECT,
```

-139-

-140-

```
        sizeof(szText1), (PSZ)szText1);
   WinMessageBox(HWND_DESKTOP, HWND_DESKTOP, szText1, szText2,
        (USHORT) NULL, MB_OK | MB_ERROR | MB_MOVEABLE);
   break;
} /* if */

/* Get the starting minute */
bresult = WinQueryDlgItemShort(hwnd, DID_DAYTIMER_STARTMIN,
                &start_min, FALSE);
if (!bresult || start_min > 59)
{
   WinLoadString(hab, (HMODULE)NULL, IDS_TIME_INCORRECT,
        sizeof(szText1), (PSZ)szText1);
   WinMessageBox(HWND_DESKTOP, HWND_DESKTOP, szText1, szText2,
        (USHORT) NULL, MB_OK | MB_ERROR | MB_MOVEABLE);
   break;
} /* if */ sprintf(NextRunDate, "%s %d:%d",
                NextRunDate, start_hour, start_min);

/* Is this am or pm? */
if (WinSendDlgItemMsg(hwnd, DID_DAYTIMER_AM,
      BM_QUERYCHECK, 0L, 0L) == (MRESULT)1)
   sprintf(NextRunDate, "%sAM '", NextRunDate);
else
   if (WinSendDlgItemMsg(hwnd, DID_DAYTIMER_PM,
         BM_QUERYCHECK, 0L, 0L) == (MRESULT)1)
      sprintf(NextRunDate, "%sPM '", NextRunDate);
   else
      sprintf(NextRunDate, "%s '", NextRunDate);

/*
 * Day of the Week - build it backwards
 */
for (i = 0; i < 7; i++)
   if (WinSendDlgItemMsg(hwnd, DID_DAYTIMER_SUN + i,
         BM_QUERYCHECK, 0L, 0L) == (MRESULT)1)
      RecurWeekday |= (1 << i);

/*
 * Day of the Month
 */
if (!WinQueryDlgItemShort(hwnd, DID_DAYTIMER_OTHERENT,
      &RecurMonthday, FALSE))
{
   if (WinSendDlgItemMsg(hwnd, DID_DAYTIMER_1ST,
         BM_QUERYCHECK, 0L, 0L) == (MRESULT)1)
   {
      RecurMonthday = 1;
   } /* if */
   else
   {
      if (WinSendDlgItemMsg(hwnd, DID_DAYTIMER_LAST,
            BM_QUERYCHECK, 0L, 0L) == (MRESULT)1)
      {
         RecurMonthday = 255;
      } /* if */
      else
         RecurMonthday = 0;
   } /* else */
} /* End of Day of the Month */

/*
 * Month - build it backwards
```

```
    */
    for (i = 0; i < 12; i++)
       if (WinSendDlgItemMsg(hwnd, DID_DAYTIMER_JAN + i,
             BM_QUERYCHECK, 0L, 0L) == (MRESULT)1)
          RecurMonth |= ((USHORT)1 << i);

/*
     * Period - build it backwards
     */
    for (i = 0; i < 13; i++)
       if (WinSendDlgItemMsg(hwnd, DID_DAYTIMER_PERIOD1 + i,
             BM_QUERYCHECK, 0L, 0L) == (MRESULT)1)
          RecurPrd |= ((USHORT)1 << i);

/*
     * If the user wants this to reschedule, we need
     * (weekday || monthday) && (month info || period info).
     */
    if ((RecurWeekday || RecurMonthday)
          && !(RecurMonth || RecurPrd))
    {
       WinLoadString(hab, (HMODULE)NULL,
             WinSendDlgItemMsg(hwnd, RBID_MONTH,
             BM_QUERYCHECK, 0, 0) ? IDS_NEED_MONTH :
             IDS_NEED_PERIOD, sizeof(szText1), (PSZ)szText1);
       WinMessageBox(HWND_DESKTOP, HWND_DESKTOP, szText1, szText2,
             (USHORT) NULL, MB_OK | MB_ERROR | MB_MOVEABLE);
       break;
    } /* if */ if ((RecurMonth || RecurPrd)
          && !(RecurWeekday || RecurMonthday))
    {
       WinLoadString(hab, (HMODULE)NULL, IDS_NEED_DAY,
             sizeof(szText1), (PSZ)szText1);
       WinMessageBox(HWND_DESKTOP, HWND_DESKTOP, szText1, szText2,
             (USHORT) NULL, MB_OK | MB_ERROR | MB_MOVEABLE);
       break;
    } /* if */

/* Build the command buffer for the insert */
    safe_dbfcmd(dbproc,
          " InsSSPendingJobTable "
          " \"%s\", \"%c\", \"%s\", \"3\", %s,"
          " %d, %d, %d, %d, \"\"",
          JobListName, UserRqst,
          GrpName, NextRunDate, RecurWeekday,
          RecurMonthday, RecurMonth, RecurPrd);

} /* End of Dialog Box data extraction */

/* Schedule that job! */
 if (!(dbsqlexec(dbproc)))
 {
    WinLoadString(hab, (HMODULE)NULL, IDS_SQL_REJECTED,
          sizeof(szText1), (PSZ)szText1);
    WinMessageBox(HWND_DESKTOP, HWND_DESKTOP, szText1, szText2,
          (USHORT) NULL, MB_OK | MB_ERROR | MB_MOVEABLE);
    break;
 } /* if */ dbcanquery(dbproc);
 while (dbresults(dbproc) != NO_MORE_RESULTS)
    dbcanquery(dbproc);
```

```
            /*
             * Not done yet. If this is a reschedule we need to try and
             * delete the original job.
             */
            if (pszJobID)
            {
                /*
                 * Restore the original corner icon but don't display the
                 * change.
                 */
                WinEnableWindowUpdate(WinWindowFromID(hwnd,
                        DID_DAYTIMER_ICON), FALSE);
                WinSendDlgItemMsg(hwnd, DID_DAYTIMER_ICON, SM_SETHANDLE,
                        (MPARAM) hpointerIcon, (MPARAM) 0L);

/*
                 * Try the SQL delete using the timestamp obtained earlier.
                 */
                safe_dbfcmd(dbproc,
                        " DELETE SSPendingJobTable %s",
                        qualptr);

dbfreequal(qualptr);
                if ((dbsqlexec(dbproc) == FAIL) || (dbresults(dbproc) == FAIL))
                {
                    DosBeep(400, 50);
                    WinLoadString(hab, (HMODULE)NULL, IDS_JOB_NOT_REMOVED,
                            sizeof(Buffer), Buffer);
                    WinLoadString(hab, (HMODULE)NULL, IDS_WARNING,
                            sizeof(szText1), szText1);
                    WinMessageBox( HWND_DESKTOP, hwnd, szText1, Buffer,
                            0, MB_OK | MB_WARNING | MB_MOVEABLE);
                } /* if */
                dbcanquery(dbproc);
                while (dbresults(dbproc) != NO_MORE_RESULTS)
                    dbcanquery(dbproc);
            } /* if(pszJobID */

/* Goose the scheduler to get it to examine the runnables. */
            if (!ADSNetConnect(&ulNetConnect, szServerName, BATCHD_SERVICE))
                ADSNetDisconnect(ulNetConnect);

WinDismissDlg(hwnd, TRUE);
            return(0);
        } /* switch WM_COMMAND */
        break;
    } /* switch */
    return WinDefDlgProc(hwnd, msg, mp1, mp2);
} /* DayTimerDlgProc */

/*************************************************************************/
/*                                                                       */
/* ToggleButtonRange                                                     */
/*                                                                       */
/* Disable/Enable and deselect/select all of the buttons between         */
/* two ids.                                                              */
/*                                                                       */
/* Note: We don't allow for selected disabled buttons                    */
/*************************************************************************/
VOID ToggleButtonRange(HWND hwnd, USHORT usButtonStart,
                       USHORT usButtonEnd, BOOL fSelect, BOOL fEnable)
{
    USHORT  i;

for (i = usButtonStart; i <= usButtonEnd; i++)
```

-143-

```c
   {
      if (fEnable)
      {
         WinEnableWindow(WinWindowFromID(hwnd, i), fEnable);
         WinSendDlgItemMsg(hwnd, i, BM_SETCHECK, MPFROMSHORT(fSelect),
              MPFROMSHORT(0));
      } /* if */
      else
      {
         WinSendDlgItemMsg(hwnd, i, BM_SETCHECK, MPFROMSHORT(fSelect),
              MPFROMSHORT(0));
         WinEnableWindow(WinWindowFromID(hwnd, i), fEnable);
      } /* else */
   } /* for */
} /* ToggleButtonRange */

/****************************************************************************/
/*                                                                          */
/* ToggleEntryField                                                         */
/*                                                                          */
/* Enable/Disables an entry field and its description.                      */
/*                                                                          */
/****************************************************************************/
VOID ToggleEntryField(HWND hwnd, USHORT idText, USHORT idEntry, BOOL fEnable)
{
   if (fEnable)
   {
      WinEnableWindow(WinWindowFromID(hwnd, idText), TRUE);
      WinEnableWindow(WinWindowFromID(hwnd, idEntry), TRUE);
   } /* if */
   else
   {
      WinSetWindowText(WinWindowFromID( hwnd, idEntry), "");
      WinEnableWindow(WinWindowFromID(hwnd, idEntry), FALSE);
      WinEnableWindow(WinWindowFromID(hwnd, idText), FALSE);
   } /* else */
} /* ToggleEntryField */

/*--------------------------------------------------------------------------*/
/* safe_dbfcmd - turns " into ' for purposes of the database               */
/*--------------------------------------------------------------------------*/
VOID safe_dbfcmd(DBPROCESS *dbproc, char *fstring, ...)
{
   char buffer[3000];
   int i;
   va_list marker;

for(i=0; fstring[i]; i++)
      if (fstring[i] == '\"')
         fstring[i] = 1;

va_start(marker, fstring);
   vsprintf(buffer, fstring, marker);
   va_end(marker);

for(i=0; buffer[i]; i++)
      if (buffer[i] == '\"')
         buffer[i] = '\'';
   for(i=0; buffer[i]; i++)
      if (buffer[i] == 1)
         buffer[i] = '\"';

dbcmd(dbproc, buffer);
} /* safe_dbfcmd */
```

-144-

```
char szRevision[] = "$Revision:   2.1 $ batchd.c";

/************************************************************************
*
* Copyright (c) 1990, 1991, 1992, 1993 American Airlines
*
* File:        BATCHD.C
*
* System:      Batch Scheduler
*
* Description: This module control the execution of batch jobs.
*
* History:     David M. Wilson  08/01/90
*              Glenn Grundstrom
*
* This program is the CONFIDENTIAL and PROPRIETARY property
* of American Airlines.  Any unauthorized use, reproduction
* or transfer of this program is strictly prohibited.
*
* This is an unpublished work, and is subject to limited distribution
* and restricted disclosure only.  ALL RIGHTS RESERVED.
*
************************************************************************/

//#define TBASE_LOGIN define INCL_DOS
define INCL_WIN
define INCL_DOSERRORS
include <os2.h> define DBMSOS2
include <sybfront.h>
include <sybdb.h> include <stdio.h>
include <string.h>
include <process.h>
include <stddef.h>
include <malloc.h> ifdef TBASE_LOGIN
    #define EXTERN
    #include "adslen.h"
    #include "ads.h"
endif include "adsnet.h"
include "adsdnet.h"
include "batchdef.h"

define STACKSIZE       8192
define MAX_MACHINES    300
define THREAD          VOID(*)(PVOID)

typedef struct {
        LONG    lJobID;
        CHAR    szJobListName[JOBNAMELENGTH];
        CHAR    szGroupName[GROUPNAMELENGTH];
        CHAR    szMachineName[MACHINENAMELENGTH];
        CHAR    szSchedBy[JOBEDITBYLENGTH];
} JOBINFO, *PJOBINFO;

VOID    Scheduler(DBPROCESS *dbprocScheduler);
VOID    TalkToClient(ULONG ulADSNet);
VOID    Execute(LONG lJobID);
```

-145-

```
VOID      GetMachine(PULONG ulADSNet, PJOBINFO pJobInfo);
BOOL      VerifyBatch(ULONG ulADSNet, PJOBINFO pJobInfo);

DBPROCESS    *dbprocJob;
ULONG        hsemSQL;           /* Control access to dbprocJob         */
                                /* Execute, GetMachine, and            */
                                /* VerifyBatch will REQUEST hsemSQL    */
ULONG        hsemExit;          /* Cleared when TalkToClient is done   */
ULONG        hsemScheduler;     /* Schedule-thread run-state control   */
                                /* Scheduler thread will wait on       */
                                /* hsemScheduler                       */
ULONG        hsemNewJobs;       /* Control job-accept state            */
                                /* Scheduler and TalkToClient will     */
                                /* wait on hsemNewJobs                 */
ULONG        hsemJobCount;      /* Controls access to global:usJobCount*/
                                /* TalkToClient, and Execute will      */
                                /* Request hsemJobCount                */

USHORT       usJobCount = 0;

/*==================================================================*/
/* Entry point.                                                     */
/*==================================================================*/
VOID      main(int argc, char *argv[]) {
          DBPROCESS    *dbprocScheduler;
          ULONG        ulADSNet;
          CHAR         szServerName[30];

ifdef TBASE_LOGIN
          USERATTR     *pUserAttr;
          DBPROCESS    *dbprocTBase;
          HAB          hab;
          HMQ          hmq;
else
          LOGINREC     *login;
endif /*-------------------------------------------------------*/
          /* If we didn't get the correct number of arguments, exit. */
          /*-------------------------------------------------------*/
          if (argc != 2){
              puts("Usage: batchd SQLServer");
              exit(0);
          } /* if */ ifdef TBASE_LOGIN
          hab = WinInitialize(0);
          hmq = WinCreateMsgQueue(hab, 0);

ADSRegisterClass(hab);
          pUserAttr = ADSLogin(&dbprocTBase, NULL, NULL);

//        WinDestroyMsgQueue(hmq);
//        WinTerminate(hab);
else
          /*-------------------------------------------------------*/
          /* Create a SQL Server login structure.                  */
          /*-------------------------------------------------------*/
          login = dblogin();
          DBSETLUSER(login, "ProcAdm");
          DBSETLPWD(login, "ProcAdm");
          DBSETLAPP(login, "Batch Daemon");
endif
          /*-------------------------------------------------------*/
```

```
        /* Open two connections to SQL Server.                        */
        /*-------------------------------------------------------------*/
ifdef TBASE_LOGIN
        if ((dbprocScheduler = dbopen(pUserAttr->login, argv[1])) == NULL){
            ADSExitProgram(0);
            exit(0);
        } /* if */ if ((dbprocJob = dbopen(pUserAttr->login, argv[1])) == NULL){
            ADSExitProgram(0);
            exit(0);
        } /* if */ dbuse(dbprocScheduler, pUserAttr->szDefaultDB);
        dbuse(dbprocJob, pUserAttr->szDefaultDB);
else
        if ((dbprocScheduler = dbopen(login, argv[1])) == NULL)
                exit(0);

if ((dbprocJob = dbopen(login, argv[1])) == NULL)
                exit(0);

//      dbuse(dbprocScheduler, "tbase");
//      dbuse(dbprocJob, "tbase");
endif /*-------------------------------------------------------------*/
        /* Has the service already been registered?                    */
        /*-------------------------------------------------------------*/
        dbfcmd(dbprocScheduler,
           " SELECT ComputerName"
           " FROM SSRegisteredSvc"
           " WHERE SvcName = \"%s\"",
             BATCHD_SERVICE);

dbsqlexec(dbprocScheduler);
        dbresults(dbprocScheduler);

dbbind(dbprocScheduler, 1, NTBSTRINGBIND, sizeof(szServerName),
             szServerName);

szServerName[0] = '\0';

while (dbnextrow(dbprocScheduler) != NO_MORE_ROWS) ;

/*-------------------------------------------------------------*/
        /* If there is a server registered, try to connect to it.  If  */
        /* it's not running, delete the row.  If it is running, exit.  */
        /*-------------------------------------------------------------*/
        if (szServerName[0]) {
                if(ADSNetConnect(&ulADSNet, szServerName, BATCHD_SERVICE)){
                        dbfcmd(dbprocScheduler,
                           " DELETE SSRegisteredSvc"
                           " WHERE SvcName = \"%s\"",
                             BATCHD_SERVICE);
                        dbsqlexec(dbprocScheduler);
                        dbresults(dbprocScheduler);
                } /* if */
                else {
                        ADSNetDisconnect(ulADSNet);
ifdef TBASE_LOGIN
                        ADSExitProgram(0);
endif
                        exit(0);
                } /* else */
        } /* if */
```

```
/*----------------------------------------------------------*/
/* Create service for clients and register it.              */
/*----------------------------------------------------------*/
    if (ADSNetServerOpen(&ulADSNet, BATCHD_SERVICE)){
        puts("ADSNetServerOpen failed (line 130)");

ifdef TBASE_LOGIN
        ADSExitProgram(0);
endif
        exit(0);
    } /* if */

ADSGetComputerName(szServerName);
    dbfcmd(dbprocScheduler,
        " INSERT SSRegisteredSvc"
        " VALUES (\"%s\",\"%s\")",            /* jbeard */
        BATCHD_SERVICE, szServerName );

dbsqlexec(dbprocScheduler);
    dbresults(dbprocScheduler);

/*----------------------------------------------------------*/
/* The job counts in the machine table should be zero.      */
/*----------------------------------------------------------*/
    dbcmd(dbprocScheduler,
        " UPDATE SSMachineTable"
        " SET JobCnt = 0");
    dbsqlexec(dbprocScheduler);
    dbresults(dbprocScheduler);

/*----------------------------------------------------------*/
/* There should be no "running" jobs in the pending job table. */
/* If there are, reset their status to "waiting" and decrement */
/* the job step number since we're not sure whether the step   */
/* finished successfully.                                      */
/*----------------------------------------------------------*/
    dbcmd(dbprocScheduler,
        " UPDATE SSPendingJobTable"
        " SET"
        "    CurrentStat = \"W\","
        "    StepNum = StepNum - 1,"
        "    MachineName = \"\""
        " WHERE CurrentStat IN (\"R\", \"T\")"  );
    dbsqlexec(dbprocScheduler);
    dbresults(dbprocScheduler);

/*----------------------------------------------------------*/
/* Initialize semaphores.                                   */
/*----------------------------------------------------------*/
    DosSemClear(&hsemSQL);
    DosSemClear(&hsemNewJobs);

/*----------------------------------------------------------*/
/* Start the scheduler thread.                              */
/*----------------------------------------------------------*/
    _beginthread(Scheduler, NULL, STACKSIZE, dbprocScheduler);

/*----------------------------------------------------------*/
/* Start the thread to talk to the clients.                 */
/*----------------------------------------------------------*/
    _beginthread((THREAD) TalkToClient, NULL, STACKSIZE, (PVOID) ulADSNet);

/*----------------------------------------------------------*/
/* Suspend this thread.                                     */
/*----------------------------------------------------------*/
    DosSemSetWait(&hsemExit, SEM_INDEFINITE_WAIT);
```

```
        /*-----------------------------------------------------------*/
        /* De-register the service and close it.                    */
        /*-----------------------------------------------------------*/
        dbfcmd(dbprocScheduler,
          " DELETE SSRegisteredSvc"
          " WHERE SvcName = \"%s\"",
            BATCHD_SERVICE);
        dbsqlexec(dbprocScheduler);
        dbresults(dbprocScheduler);

ADSNetServerClose(ulADSNet);
        dbclose(dbprocScheduler);
        dbclose(dbprocJob);
ifdef TBASE_LOGIN
        ADSExitProgram(0);
endif
        exit(0);
} /* main */

/*===========================================================*/
/* This thread will wake up approximately every five minutes to read   */
/* the pending job table. It will then start an execute thread for     */
/* each job ready to be executed.                                      */
/*===========================================================*/
VOID    Scheduler(DBPROCESS *dbprocScheduler){

LONG    lJobID;

for (;;) {
                /*-----------------------------------------------------*/
                /* Wait for the new jobs semaphore to be clear.  It   */
                /* will be set if we're refusing new jobs.            */
                /*-----------------------------------------------------*/
                DosSemWait(&hsemNewJobs, SEM_INDEFINITE_WAIT);

/*-----------------------------------------------------*/
                /* Set the scheduler wake-up semaphore.               */
                /*-----------------------------------------------------*/
                DosSemSet(&hsemScheduler);

/*-----------------------------------------------------*/
                /* Get a list of jobs to be executed.                 */
                /*-----------------------------------------------------*/
                dbcmd(dbprocScheduler,
                  " SELECT JobRunID"
                  " FROM SSPendingJobTable"
                  " WHERE CurrentStat IN (\"W\", \"G\")"
                  "   AND (NxtRunDateTime <= getdate()"
                  "    OR PriorityFlag BETWEEN \"1\" AND \"2\")"
                  "   AND UserRqst IN (\" \", \"S\")"
                  " ORDER BY PriorityFlag asc, NxtRunDateTime asc");

dbsqlexec(dbprocScheduler);
                dbresults(dbprocScheduler);
                dbbind(dbprocScheduler, 1, INTBIND, sizeof(lJobID),
                    (PBYTE) &lJobID);

/*-----------------------------------------------------*/
                /* Loop through the list of jobs.                     */
                /*-----------------------------------------------------*/
                while (dbnextrow(dbprocScheduler) != NO_MORE_ROWS) {
                        /*---------------------------------------------*/
                        /* Start an execute thread for this job.  If  */
                        /* the thread creation fails (OS/2 1.2 will   */
                        /* only support about 54 threads per process),*/
                        /* cancel the results and we'll try to process*/
```

-149-

```
                        /* the jobs during the next cycle.          */
                        /*---------------------------------------------*/
                        if ((_beginthread((THREAD) Execute,
                            NULL, STACKSIZE, (PVOID)lJobID)) == -1) {
                                dbcanquery(dbprocScheduler);
                                break;
                        } /* if */
                } /* while */

/*---------------------------------------------*/
                /* Sleep for approximately five minutes.       */
                /*---------------------------------------------*/
                DosSemWait(&hsemScheduler, 300000L);
        } /* for(;;) */
} /* Scheduler */

/*=============================================================*/
/* This thread services requests from the user interface such as accept */
/* new jobs, refuse new jobs, query new job state, and stop.            */
/*=============================================================*/
VOID    TalkToClient(ULONG ulADSNet) {

ULONG   ulADSConnect;
        USHORT  usRequest;
        USHORT  cbBytesRead;
        BOOL    fExit = FALSE;

do {
                /*---------------------------------------------*/
                /* Accept a connection from a client.          */
                /*---------------------------------------------*/
                ADSNetConnectionAccept(ulADSNet, &ulADSConnect);

/*---------------------------------------------*/
                /* Get the request code from the client.       */
                /*---------------------------------------------*/
                ADSNetRead(ulADSConnect, &usRequest, sizeof(usRequest),
                    &cbBytesRead);

/*---------------------------------------------*/
                /* If the client just disconnected, wake up the */
                /* scheduler thread.                            */
                /*---------------------------------------------*/
                if (cbBytesRead == 0)
                        DosSemClear(&hsemScheduler);
                else {
                        switch (usRequest) {
                                /*---------------------------------------------*/
                                /* Clear the new job semaphore so the          */
                                /* scheduler thread can run.                   */
                                /*---------------------------------------------*/
                                case BATCHD_ACCEPT_NEWJOBS:
                                        DosSemClear(&hsemNewJobs);
                                        DosSemClear(&hsemScheduler);
                                        break;

/*---------------------------------------------*/
                                /* Set the new job semaphore to pause          */
                                /* the scheduler thread.                       */
                                /*---------------------------------------------*/
                                case BATCHD_REFUSE_NEWJOBS:
                                        DosSemSet(&hsemNewJobs);
                                        break;

/*---------------------------------------------*/
                                /* Return the current new job state.           */
```

-150-

```
                                /*------------------------------------*/
                                case BATCHD_QUERY_NEWJOBS:
                                        if (DosSemWait(&hsemNewJobs,
                                                SEM_IMMEDIATE_RETURN)
                                                == ERROR_SEM_TIMEOUT)
                                                        usRequest = TRUE;
                                        else
                                                        usRequest = FALSE;

ADSNetWrite(ulADSConnect, &usRequest,
                                                sizeof(usRequest));
                                        break;
                                /*------------------------------------*/
                                /* Stop the scheduler.              */
                                /*------------------------------------*/
                                case BATCHD_STOP:
                                        DosSemRequest(&hsemJobCount,
                                                SEM_INDEFINITE_WAIT);
                                        if (usJobCount) {
                                                usRequest = TRUE;
                                                ADSNetWrite(ulADSConnect,
                                                        &usRequest, sizeof(usRequest));
                                                DosSemClear(&hsemJobCount);
                                        } /* if */
                                        else {
                                                usRequest = FALSE;
                                                ADSNetWrite(ulADSConnect,
                                                        &usRequest, sizeof(usRequest));
                                                fExit = TRUE;
                                        } /* else */ break;
                                } /* switch */
                } /* else */
                /*--------------------------------------------------*/
                /* Break the client connection.                   */
                /*--------------------------------------------------*/
                ADSNetConnectionClose(ulADSConnect);

} while (! fExit);

DosSemClear(&hsemExit);

_endthread();
} /* TalkToClient */

/*==================================================================*/
/* This thread controls the execution of a job.                   */
/*==================================================================*/
VOID    Execute(LONG lJobID) {

SHORT           sStepNum;
        ULONG           ulADSNet = 0;
        CHAR            chUserRequest;
        CHAR            szFileName[EXECUTEFILELENGTH];
        CHAR            szArgList1[STEPARGSLENGTH];
        CHAR            szArgList2[STEPARGSLENGTH];
        EXEC_PKT        ExecPkt;
        REXEC_PKT       RetExecPkt;
        USHORT          cbBytesRead;
        BOOL            fSingleStep = FALSE;
        JOBINFO         JobInfo;

/*----------------------------------------------------------*/
        /* Get exclusive use of the dbproc.                        */
        /*----------------------------------------------------------*/
```

```
DosSemRequest(&hsemSQL, SEM_INDEFINITE_WAIT);

/*------------------------------------------------------------*/
/* Update the internal job count.                           */
/*------------------------------------------------------------*/
DosSemRequest(&hsemJobCount, SEM_INDEFINITE_WAIT);
usJobCount++;
DosSemClear(&hsemJobCount);

/*------------------------------------------------------------*/
/* Get some detail about the job to be executed.            */
/*------------------------------------------------------------*/
JobInfo.lJobID = lJobID;

dbfcmd(dbprocJob,
  " SELECT"
  "     JobListName,"
  "     StepNum,"
  "     GrpName,"
  "     MachineName,"
  "     SchedBy"
  " from SSPendingJobTable"
  " where JobRunID = %ld",
    lJobID);

dbsqlexec(dbprocJob);
dbresults(dbprocJob);
dbbind(dbprocJob, 1, NTBSTRINGBIND, sizeof(JobInfo.szJobListName),
    JobInfo.szJobListName);
dbbind(dbprocJob, 2, SMALLBIND, sizeof(sStepNum), (PBYTE) &sStepNum);
dbbind(dbprocJob, 3, NTBSTRINGBIND, sizeof(JobInfo.szGroupName),
    JobInfo.szGroupName);
dbbind(dbprocJob, 4, NTBSTRINGBIND, sizeof(JobInfo.szMachineName),
    JobInfo.szMachineName);
dbbind(dbprocJob, 5, NTBSTRINGBIND, sizeof(JobInfo.szSchedBy),
    JobInfo.szSchedBy);

while (dbnextrow(dbprocJob) != NO_MORE_ROWS) ;

/*------------------------------------------------------------*/
/* Update the job status to "trying".                       */
/*------------------------------------------------------------*/
dbfcmd(dbprocJob,
  " UPDATE SSPendingJobTable"
  " SET CurrentStat = \"T\""
  " WHERE JobRunID = %ld",
    lJobID);

dbsqlexec(dbprocJob);
dbresults(dbprocJob);

/*------------------------------------------------------------*/
/* Let another thread have the dbproc.                      */
/*------------------------------------------------------------*/
DosSemClear(&hsemSQL);

/*------------------------------------------------------------*/
/* Find a machine to execute the batchd job.                */
/*------------------------------------------------------------*/
GetMachine(&ulADSNet, &JobInfo);

/*------------------------------------------------------------*/
/* Get exclusive use of the dbproc.                         */
/*------------------------------------------------------------*/
DosSemRequest(&hsemSQL, SEM_INDEFINITE_WAIT);
```

-152-

```
/*------------------------------------------------------------*/
/* If we couldn't find a machine, change the status to        */
/* "group busy" and we'll try again during the next cycle.    */
/*------------------------------------------------------------*/
if (ulADSNet == 0) {
        dbfcmd(dbprocJob,
           " UPDATE SSPendingJobTable"
           " SET CurrentStat = \"G\""
           " WHERE JobRunID = %ld",
            lJobID);

dbsqlexec(dbprocJob);
        dbresults(dbprocJob);

DosSemClear(&hsemSQL);

DosSemRequest(&hsemJobCount, SEM_INDEFINITE_WAIT);
        usJobCount--;
        DosSemClear(&hsemJobCount);

_endthread();
} /* if */

/*------------------------------------------------------------*/
/* A machine was found, so update it's job count.             */
/*------------------------------------------------------------*/
dbfcmd(dbprocJob,
   " UPDATE SSMachineTable"
   " SET JobCnt = JobCnt + 1"
   " WHERE MachineName = \"%s\"",
    JobInfo.szMachineName);

dbsqlexec(dbprocJob);
dbresults(dbprocJob);

/*------------------------------------------------------------*/
/* Update the job status to "running".                        */
/*------------------------------------------------------------*/
dbfcmd(dbprocJob,
   " UPDATE SSPendingJobTable"
   " SET"
   "     CurrentStat = \"R\","
   "     StartDateTime = getdate(),"
   "     MachineName = \"%s\""
   " WHERE JobRunID = %ld",
    JobInfo.szMachineName,
    lJobID);

dbsqlexec(dbprocJob);
dbresults(dbprocJob);

/*------------------------------------------------------------*/
/* Let another thread have the dbproc.                        */
/*------------------------------------------------------------*/
DosSemClear(&hsemSQL);

/*------------------------------------------------------------*/
/* Loop here executing each of the job steps.                 */
/*------------------------------------------------------------*/
for (;;) {
        /*----------------------------------------------------*/
        /* Get exclusive use of the dbproc.                   */
        /*----------------------------------------------------*/
        DosSemRequest(&hsemSQL, SEM_INDEFINITE_WAIT);

/*----------------------------------------------------*/
```

-153-

```c
/* Get the next job step to execute.                    */
/*------------------------------------------------------*/
dbcmd(dbprocJob, "SET rowcount 1");
dbsqlexec(dbprocJob);
dbresults(dbprocJob);

dbfcmd(dbprocJob,
    " SELECT"
    "     JobStepNum,"
    "     AvailProgramFileName,"
    "     ArgumentList1,"
    "     ArgumentList2"
    " FROM SSPendingJobTable p, SSJobStepTable s,"
    " SSAvailProgramTable a"
    " WHERE p.JobListName = s.JobListName"
    "   AND s.ProgramName = a.ProgramName"
    "   AND p.JobRunID    = %ld"
    "   AND JobStepNum    > StepNum"
    " ORDER BY JobStepNum",
    lJobID);

dbsqlexec(dbprocJob);
dbresults(dbprocJob);
dbbind(dbprocJob, 1, SMALLBIND, sizeof(sStepNum),
    (PBYTE) &sStepNum);
dbbind(dbprocJob, 2, NTBSTRINGBIND, sizeof(szFileName),
    szFileName);
dbbind(dbprocJob, 3, NTBSTRINGBIND, sizeof(szArgList1),
    szArgList1);
dbbind(dbprocJob, 4, NTBSTRINGBIND, sizeof(szArgList2),
    szArgList2);

/*------------------------------------------------------*/
/* If there are no more job steps, reset the row count, */
/* decrement the job count for the machine, and update  */
/* the status to "successful".                          */
/*------------------------------------------------------*/
if (dbnextrow(dbprocJob) == NO_MORE_ROWS) {
        dbcmd(dbprocJob, "set rowcount 0");
        dbsqlexec(dbprocJob);
        dbresults(dbprocJob);

dbfcmd(dbprocJob,
            " UPDATE SSMachineTable"
            " SET JobCnt = JobCnt - 1"
            " WHERE MachineName = \"%s\"",
            JobInfo.szMachineName);

dbsqlexec(dbprocJob);
        dbresults(dbprocJob);

dbfcmd(dbprocJob,
            " UPDATE SSPendingJobTable"
            " SET"
            "     CurrentStat = \"S\","
            "     EndDateTime = getdate()"
            " WHERE JobRunID = %ld",
            lJobID);

dbsqlexec(dbprocJob);
        dbresults(dbprocJob);
        DosSemClear(&hsemSQL);
        break;
} /* if */
while (dbnextrow(dbprocJob) != NO_MORE_ROWS) ;
```

-154-

```
/*-----------------------------------------------------*/
/* Reset the row count.                                */
/*-----------------------------------------------------*/
dbcmd(dbprocJob, "set rowcount 0");
dbsqlexec(dbprocJob);
dbresults(dbprocJob);

/*-----------------------------------------------------*/
/* Get the user request column from the pending job    */
/* table.                                              */
/*-----------------------------------------------------*/
dbfcmd(dbprocJob,
   " SELECT UserRqst"
   " FROM SSPendingJobTable"
   " WHERE JobRunID = %ld",
     lJobID);

dbsqlexec(dbprocJob);
dbresults(dbprocJob);
dbbind(dbprocJob, 1, CHARBIND, sizeof(chUserRequest),
     &chUserRequest);
while (dbnextrow(dbprocJob) != NO_MORE_ROWS) ;

/*-----------------------------------------------------*/
/* If there is a user request other than single step,  */
/* set status to "waiting" and decrement the job count.*/
/*-----------------------------------------------------*/
if (chUserRequest != ' ' && chUserRequest != 'S') {
        dbfcmd(dbprocJob,
           " UPDATE SSPendingJobTable"
           " SET CurrentStat = \"W\""
           " WHERE JobRunID = %ld",
             lJobID);

dbsqlexec(dbprocJob);
        dbresults(dbprocJob);

dbfcmd(dbprocJob,
           " UPDATE SSMachineTable"
           " SET JobCnt = JobCnt - 1"
           " WHERE MachineName = \"%s\"",
             JobInfo.szMachineName);

dbsqlexec(dbprocJob);
        dbresults(dbprocJob);

DosSemClear(&hsemSQL);
        break;
} /* if */

/*-----------------------------------------------------*/
/* If the user request is "single step", set a flag.   */
/*-----------------------------------------------------*/
if (chUserRequest == 'S')
        fSingleStep = TRUE;

/*-----------------------------------------------------*/
/* Update the pending job table with the current step. */
/*-----------------------------------------------------*/
dbfcmd(dbprocJob,
   " UPDATE SSPendingJobTable"
   " SET StepNum = %d"
   " WHERE JobRunID = %ld",
     sStepNum, lJobID);

dbsqlexec(dbprocJob);
```

-155-

```
dbresults(dbprocJob);

/*-----------------------------------------------------*/
/* Release the dbproc.                                 */
/*-----------------------------------------------------*/
DosSemClear(&hsemSQL);

/*-----------------------------------------------------*/
/* Execute the program.                                */
/*-----------------------------------------------------*/
ExecPkt.usRequest = ADSNET_EXEC;
strcpy(ExecPkt.szProgram, szFileName);
strcpy(ExecPkt.szEncryptedArgs, szArgList2);
strcpy(ExecPkt.szArgs, szArgList1);

if (ADSNetWrite(ulADSNet, &ExecPkt, sizeof(ExecPkt))) {
    dbfcmd(dbprocJob,
      " UPDATE SSPendingJobTable"
      " SET"
      "     CurrentStat = \"W\","
      "     StepNum = StepNum - 1"
      " WHERE JobRunID = %ld",
       lJobID);

dbsqlexec(dbprocJob);
    dbresults(dbprocJob);

dbfcmd(dbprocJob,
      " UPDATE SSMachineTable"
      " SET JobCnt = JobCnt - 1"
      " WHERE MachineName = \"%s\"",
       JobInfo.szMachineName);

dbsqlexec(dbprocJob);
    dbresults(dbprocJob);
    break;
} /* if */ if (ADSNetRead(ulADSNet, &RetExecPkt, sizeof(RetExecPkt),
&cbBytesRead)) {
    dbfcmd(dbprocJob,
      " UPDATE SSPendingJobTable"
      " SET"
      "     CurrentStat = \"W\","
      "     StepNum = StepNum - 1"
      " WHERE JobRunID = %ld",
       lJobID);

dbsqlexec(dbprocJob);
    dbresults(dbprocJob);

dbfcmd(dbprocJob,
      " UPDATE SSMachineTable"
      " SET JobCnt = JobCnt - 1"
      " WHERE MachineName = \"%s\"",
       JobInfo.szMachineName);

dbsqlexec(dbprocJob);
    dbresults(dbprocJob);
    break;
} /* if */

/*-----------------------------------------------------*/
/* Get exclusive use of the dbproc.                    */
/*-----------------------------------------------------*/
DosSemRequest(&hsemSQL, SEM_INDEFINITE_WAIT);
```

```
/*-------------------------------------------------------*/
/* Update the job step result.                           */
/*-------------------------------------------------------*/
dbfcmd(dbprocJob,
  " UPDATE SSPendingJobTable"
  " SET StepResult = %d"
  " WHERE JobRunID = %ld",
    RetExecPkt.sRetCode, lJobID);
dbsqlexec(dbprocJob);
dbresults(dbprocJob);

/*-------------------------------------------------------*/
/* If error occurred on job step, update status.         */
/*-------------------------------------------------------*/
if (RetExecPkt.sRetCode != 0) {
    dbfcmd(dbprocJob,
      " UPDATE SSPendingJobTable"
      " SET"
      "    CurrentStat = \"E\","
      "    EndDateTime = getdate()"
      " WHERE JobRunID = %ld",
        lJobID);

dbsqlexec(dbprocJob);
    dbresults(dbprocJob);

dbfcmd(dbprocJob,
      " UPDATE SSMachineTable"
      " SET JobCnt = JobCnt - 1"
      " WHERE MachineName = \"%s\"",
        JobInfo.szMachineName);

dbsqlexec(dbprocJob);
    dbresults(dbprocJob);

DosSemClear(&hsemSQL);
    break;
} /* if */

/*-------------------------------------------------------*/
/* Get the user request column from the pending job      */
/* table.                                                */
/*-------------------------------------------------------*/
dbfcmd(dbprocJob,
  " SELECT UserRqst"
  " FROM SSPendingJobTable"
  " WHERE JobRunID = %ld",
    lJobID);

dbsqlexec(dbprocJob);
dbresults(dbprocJob);
dbbind(dbprocJob, 1, CHARBIND, sizeof(chUserRequest),
    &chUserRequest);
while (dbnextrow(dbprocJob) != NO_MORE_ROWS) ;

/*-------------------------------------------------------*/
/* If the user request is set to "single step", but it   */
/* was not set at the start of the step, pause at the    */
/* end of the next step. If "single step" was set at     */
/* the start of the step, but is now clear, just         */
/* continue.                                             */
/*-------------------------------------------------------*/
if (fSingleStep) {
    if (chUserRequest == 'S') {
        dbfcmd(dbprocJob,
          " UPDATE SSPendingJobTable"
```

```
                        " SET"
                        "    CurrentStat = \"W\","
                        "    UserRqst = \"H\""
                        " WHERE JobRunID = %ld",
                          lJobID);

dbsqlexec(dbprocJob);
                    dbresults(dbprocJob);

dbfcmd(dbprocJob,
                        " UPDATE SSMachineTable"
                        " SET JobCnt = JobCnt - 1"
                        " WHERE MachineName = \"%s\"",
                          JobInfo.szMachineName);
                    dbsqlexec(dbprocJob);
                    dbresults(dbprocJob);

DosSemClear(&hsemSQL);
                    break;
                } /* if */
                else fSingleStep = FALSE;
            } /* if */

/*----------------------------------------------------*/
            /* Release the dbproc.                                */
            /*----------------------------------------------------*/
            DosSemClear(&hsemSQL);
        } /* for(;;) */

/*--------------------------------------------------------*/
        /* Break the connection.                                  */
        /*--------------------------------------------------------*/
        ADSNetDisconnect(ulADSNet);

/*--------------------------------------------------------*/
        /* Update the internal job count.                         */
        /*--------------------------------------------------------*/
        DosSemRequest(&hsemJobCount, SEM_INDEFINITE_WAIT);
        usJobCount--;
        DosSemClear(&hsemJobCount);

/*--------------------------------------------------------*/
        /* End this thread.                                       */
        /*--------------------------------------------------------*/
        _endthread();
} /* Execute */

/*============================================================*/
/* Find a machine to execute the batch job.                   */
/*============================================================*/
VOID    GetMachine(PULONG pulADSNet, PJOBINFO pJobInfo) {

USHORT  i;
        USHORT  usMachineCount = 0;
        CHAR    (*paszMachineNames)[MAX_MACHINES][MACHINENAMELENGTH];

/*--------------------------------------------------------*/
        /* If the job already has a machine name, use it. This would */
        /* happen if a job was held during execution and then released. */
        /*--------------------------------------------------------*/
        if (pJobInfo->szMachineName[0]) {
            if (ADSNetConnect(pulADSNet, pJobInfo->szMachineName,
                ADSD_SERVICE) == 0) {
                if (! VerifyBatch(*pulADSNet, pJobInfo)) {
                    ADSNetDisconnect(*pulADSNet);
                    *pulADSNet = 0;
```

-158-

```
            ) /* if */
        ) /* if */
        return;
    } /* if */

/*------------------------------------------------------------*/
    /* Allocate a buffer for the machine names.                   */
    /*------------------------------------------------------------*/
    if ((paszMachineNames = malloc(sizeof(*paszMachineNames))) == NULL)
        return;

/*------------------------------------------------------------*/
    /* Get exclusive use of the dbproc.                           */
    /*------------------------------------------------------------*/
    DosSemRequest(&hsemSQL, SEM_INDEFINITE_WAIT);

/*------------------------------------------------------------*/
    /* Get a list of machines for the specified group. Order the  */
    /* machines by the number of available jobs.                  */
    /*------------------------------------------------------------*/
    dbfcmd(dbprocJob,
        " SELECT m.MachineName"
        " FROM SSMachineTable m, SSGrpMachineTable g"
        " WHERE m.MachineName = g.MachineName"
        "   AND g.GrpName = \"%s\"  and  m.JobCnt != m.MaxJobs"
        " ORDER BY (m.MaxJobs - m.JobCnt) desc",
        pJobInfo->szGroupName);

dbsqlexec(dbprocJob);
    dbresults(dbprocJob);
    dbbind(dbprocJob, 1, NTBSTRINGBIND, MACHINENAMELENGTH,
        (*paszMachineNames)[0]);

while (dbnextrow(dbprocJob) != NO_MORE_ROWS) {
        dbbind(dbprocJob, 1, NTBSTRINGBIND, MACHINENAMELENGTH,
            (*paszMachineNames)[++usMachineCount]);
    } /* while */

/*------------------------------------------------------------*/
    /* Let another thread have the dbproc.                        */
    /*------------------------------------------------------------*/
    DosSemClear(&hsemSQL);

/*------------------------------------------------------------*/
    /* Try to find a machine to execute to job.                   */
    /*------------------------------------------------------------*/
    for (i = 0; i < usMachineCount; i++) {
        if (ADSNetConnect(pulADSNet, (*paszMachineNames)[i],
            ADSD_SERVICE) == 0) {
            if (VerifyBatch(*pulADSNet, pJobInfo)) {
                strcpy(pJobInfo->szMachineName,
                    (*paszMachineNames)[i]);
                break;
            } /* if */
            else {
                ADSNetDisconnect(*pulADSNet);
                *pulADSNet = 0;
            } /* else */
        } /* if */
    } /* for */ free(paszMachineNames);

return;
} /* GetMachine */
```

-159-

```
/*========================================================================*/
/* Ask the user if it's OK to execute on their machine.                   */
/*========================================================================*/
BOOL    VerifyBatch(ULONG ulADSNet, PJOBINFO pJobInfo) {

VERIFY_PKT      VerifyPkt;
        RVERIFY_PKT     RetVerifyPkt;
        USHORT          cbBytesRead;
        CHAR            szJobStep[EXECUTEFILELENGTH + STEPARGSLENGTH];
        CHAR            szArgList1[STEPARGSLENGTH];

/*--------------------------------------------------------------*/
        /* Get exclusive use of the dbproc.                             */
        /*--------------------------------------------------------------*/
        DosSemRequest(&hsemSQL, SEM_INDEFINITE_WAIT);

/*--------------------------------------------------------------*/
        /* Set up the verify packet.                                    */
        /*--------------------------------------------------------------*/
        VerifyPkt.usRequest = ADSNET_VERIFY;
        VerifyPkt.ulJobID = pJobInfo->lJobID;
        strcpy(VerifyPkt.szJobName, pJobInfo->szJobListName);
        strcpy(VerifyPkt.szScheduledBy, pJobInfo->szSchedBy);

/*--------------------------------------------------------------*/
        /* Send the verify packet.                                      */
        /*--------------------------------------------------------------*/
        ADSNetWrite(ulADSNet, &VerifyPkt, sizeof(VerifyPkt));

/*--------------------------------------------------------------*/
        /* Send the job steps.                                          */
        /*--------------------------------------------------------------*/
        dbfcmd(dbprocJob,
           " SELECT"
           "     AvailProgramFileName,"
           "     ArgumentList1"
           " FROM SSPendingJobTable p, SSJobStepTable s, SSAvailProgramTable a"
           " WHERE p.JobListName = s.JobListName"
           "   and s.ProgramName = a.ProgramName"
           "   and p.JobRunID    = %ld"
           " ORDER BY JobStepNum",
             pJobInfo->lJobID);

dbsqlexec(dbprocJob);
        dbresults(dbprocJob);
        dbbind(dbprocJob, 1, NTBSTRINGBIND, sizeof(szJobStep), szJobStep);
        dbbind(dbprocJob, 2, NTBSTRINGBIND, sizeof(szArgList1), szArgList1);

while (dbnextrow(dbprocJob) != NO_MORE_ROWS) {
                strcat(szJobStep, " ");
                strcat(szJobStep, szArgList1);
                ADSNetWrite(ulADSNet, szJobStep, strlen(szJobStep) + 1);
        } /* while */

/*--------------------------------------------------------------*/
        /* Signal end of job steps.                                     */
        /*--------------------------------------------------------------*/
        szJobStep[0] = 0;
        ADSNetWrite(ulADSNet, szJobStep, 1);

/*--------------------------------------------------------------*/
        /* Let another thread have the dbproc.                          */
        /*--------------------------------------------------------------*/
        DosSemClear(&hsemSQL);

/*--------------------------------------------------------------*/
```

```
    /* Read the return packet.                                       */
    /*--------------------------------------------------------------*/
    ADSNetRead(ulADSNet, &RetVerifyPkt, sizeof(RetVerifyPkt),
        &cbBytesRead);

/*--------------------------------------------------------------*/
    /* Return with the result code.                                  */
    /*--------------------------------------------------------------*/
    return (RetVerifyPkt.sRetCode);
} /* VerifyBatch */
```

```
;****************************************************************
;
; Copyright (c) 1990, 1991, 1992, 1993 American Airlines
;
; File:      BATCHD.DEF
;
; System:    Batch Scheduler
;
; Description:
;
; History:   David M. Wilson  08/01/90
;            Glenn Grundstrom
;
;
; This program is the CONFIDENTIAL and PROPRIETARY property
; of American Airlines.  Any unauthorized use, reproduction
; or transfer of this program is strictly prohibited.
;
; This is an unpublished work, and is subject to limited distribution
; and restricted disclosure only.  ALL RIGHTS RESERVED.
;
;****************************************************************

NAME         BATCHD    WINDOWCOMPAT
EXETYPE      OS2
STACKSIZE    16384
```

```
****************************************************************

Copyright (c) 1990, 1991, 1992, 1993 American Airlines

File:      BATCHD.PMK

System:    Batch Scheduler

Description: Batch Scheduler Polymake file.

History:   David M. Wilson  08/01/90
Glenn Grundstrom

This program is the CONFIDENTIAL and PROPRIETARY property
# of American Airlines.  Any unauthorized use, reproduction
or transfer of this program is strictly prohibited.

This is an unpublished work, and is subject to limited distribution
and restricted disclosure only.  ALL RIGHTS RESERVED.

****************************************************************

CFLAGS+=     -MT

OBJS=        batchd.obj

LIBS=        adsnet.lib ads.lib
```

```
HEADERS=    batchdef.h

ALL:        batchd.exe batchd.obj:   [$(HEADERS)]

batchd.exe:   $(OBJS) [batchd.def]
              %do linkexe
/*********************************************************************
*
* Copyright (c) 1990, 1991, 1992, 1993 American Airlines
*
* File:      BATCHDEF.H
*
* System:    Batch Administration
*
* Description:
*
* History:   David M. Wilson  08/01/90
*            Glenn Grundstrom
*
*
* This program is the CONFIDENTIAL and PROPRIETARY property
* of American Airlines. Any unauthorized use, reproduction
* or transfer of this program is strictly prohibited.
*
* This is an unpublished work, and is subject to limited distribution
* and restricted disclosure only. ALL RIGHTS RESERVED.
*
*********************************************************************/ define BATCHD_SERVICE          "batchd"

define BATCHD_ACCEPT_NEWJOBS   1
define BATCHD_REFUSE_NEWJOBS   2
define BATCHD_QUERY_NEWJOBS    3
define BATCHD_STOP             4 define RECURLENGTH             12
define DATELENGTH              11
define TIMELENGTH              9 define EXECUTENAMELENGTH       26
define EXECUTEFILELENGTH       251
define EXECUTENUMBUTTONS       4 define MACHINENAMELENGTH       16
define MACHINEDESCLENGTH       81
define MACHINEJOBSLENGTH       7
define MACHINENUMBUTTONS       5 define GROUPNAMELENGTH         26
define GROUPDESCLENGTH         81
define GROUPNUMBUTTONS         7 define JOBNAMELENGTH           26
define JOBDESCLENGTH           81
define JOBEDITBYLENGTH         16
define STEPNUMLENGTH           7
define STEPPRGLENGTH           26
define STEPARGSLENGTH          251
define JOBLISTNUMBUTTONS       6
define JOBSTEPNUMBUTTONS       6
define JOBIDLENGTH             12
define JOBDATELENGTH           31
```

-162-

```
define PASSWORDLENGTH    16

/***********************************************************************
*
* Copyright (c) 1990, 1991, 1992, 1993 American Airlines
*
* File:       BATCHDLG.H
*
* System:     Batch Administration
*
* Description:
*
* History:    David M. Wilson  08/01/90
*             Glenn Grundstrom
*
*
* This program is the CONFIDENTIAL and PROPRIETARY property
* of American Airlines.  Any unauthorized use, reproduction
* or transfer of this program is strictly prohibited.
*
* This is an unpublished work, and is subject to limited distribution
* and restricted disclosure only.  ALL RIGHTS RESERVED.
*
***********************************************************************/

/* STRING IDS */
define IDS_BATCHBASE           32 define IDS_ADMINTITLE          IDS_BATCHBASE + 0
define IDS_ANY                 IDS_BATCHBASE + 1
define IDS_ASAP                IDS_BATCHBASE + 2
define IDS_ATTEMPTING          IDS_BATCHBASE + 3
define IDS_BLANK               IDS_BATCHBASE + 4
define IDS_CANCEL              IDS_BATCHBASE + 5
define IDS_CANT_LOGON          IDS_BATCHBASE + 6
define IDS_CANT_RESCHED        IDS_BATCHBASE + 7
define IDS_CANT_START          IDS_BATCHBASE + 8
define IDS_CANT_STOP           IDS_BATCHBASE + 9
define IDS_CLIENT_LIST1_BOT    IDS_BATCHBASE + 10
define IDS_CLIENT_LIST1_TOP    IDS_BATCHBASE + 11
define IDS_ERASE               IDS_BATCHBASE + 12
define IDS_ERASE_JOB           IDS_BATCHBASE + 13
define IDS_ERASE_RUN           IDS_BATCHBASE + 14
define IDS_ERROR               IDS_BATCHBASE + 15
define IDS_EXECUTE_LIST1_BOT   IDS_BATCHBASE + 16
define IDS_EXECUTE_LIST1_TOP   IDS_BATCHBASE + 17
define IDS_GROUP_BUSY          IDS_BATCHBASE + 18
define IDS_GROUP_LIST1_BOT     IDS_BATCHBASE + 19
define IDS_GROUP_LIST1_TOP     IDS_BATCHBASE + 20
define IDS_GROUP_LIST2_BOT     IDS_BATCHBASE + 21
define IDS_GROUP_LIST2_TOP     IDS_BATCHBASE + 22
define IDS_GROUP_LIST3_BOT     IDS_BATCHBASE + 23
define IDS_GROUP_LIST3_TOP     IDS_BATCHBASE + 24
define IDS_HOLD                IDS_BATCHBASE + 25
define IDS_ITEM_BUSY           IDS_BATCHBASE + 26
define IDS_JOB                 IDS_BATCHBASE + 27
define IDS_JOBLIST_LIST1_BOT   IDS_BATCHBASE + 28
define IDS_JOBLIST_LIST1_TOP   IDS_BATCHBASE + 29
define IDS_JOBSTEP_LIST1_BOT   IDS_BATCHBASE + 30
define IDS_JOBSTEP_LIST1_TOP   IDS_BATCHBASE + 31
define IDS_JOB_ID              IDS_BATCHBASE + 32
define IDS_JOB_NAME            IDS_BATCHBASE + 33
define IDS_JOB_NOT_REMOVED     IDS_BATCHBASE + 34
define IDS_JOB_STEPS           IDS_BATCHBASE + 35
define IDS_MACHINES_LIST1_BOT  IDS_BATCHBASE + 36
define IDS_MACHINES_LIST1_TOP  IDS_BATCHBASE + 37
```

-163-

```
define IDS_NODPWD_SHORT            IDS_BATCHBASE + 38
define IDS_NOD_NOVERIFY            IDS_BATCHBASE + 39
define IDS_NEED_DAY                IDS_BATCHBASE + 40
define IDS_NEED_MONTH              IDS_BATCHBASE + 41
define IDS_NO_DATE                 IDS_BATCHBASE + 42
define IDS_NO_GROUP                IDS_BATCHBASE + 43
define IDS_NO_GROUP_SELECTED       IDS_BATCHBASE + 44
define IDS_NO_HELP                 IDS_BATCHBASE + 45
define IDS_NO_JOB                  IDS_BATCHBASE + 46
define IDS_NO_JOB_SELECTED         IDS_BATCHBASE + 47
define IDS_PICKSERV_LIST1_BOT      IDS_BATCHBASE + 48
define IDS_PICKSERV_LIST1_TOP      IDS_BATCHBASE + 49
define IDS_RESCHEDULE              IDS_BATCHBASE + 50
define IDS_RESUME_LIST1_BOT        IDS_BATCHBASE + 51
define IDS_RESUME_LIST1_TOP        IDS_BATCHBASE + 52
define IDS_RUNNING                 IDS_BATCHBASE + 53
define IDS_RUSH                    IDS_BATCHBASE + 54
define IDS_SCHEDULE                IDS_BATCHBASE + 55
define IDS_SCHPWD_SHORT            IDS_BATCHBASE + 56
define IDS_SCH_NOVERIFY            IDS_BATCHBASE + 57
define IDS_SQL_REJECTED            IDS_BATCHBASE + 58
define IDS_STEP                    IDS_BATCHBASE + 59
define IDS_SUCCESS                 IDS_BATCHBASE + 60
define IDS_TIME_INCORRECT          IDS_BATCHBASE + 61
define IDS_TOO_LONG                IDS_BATCHBASE + 62
define IDS_USERTITLE               IDS_BATCHBASE + 63
define IDS_WAITING                 IDS_BATCHBASE + 64
define IDS_WARNING                 IDS_BATCHBASE + 65
define IDS_WORKSTATION             IDS_BATCHBASE + 66
define IDS_WRONG_PASSWORD          IDS_BATCHBASE + 67
define IDS_MACHINE_UNAVAIL         IDS_BATCHBASE + 68
define IDS_NEED_PERIOD             IDS_BATCHBASE + 69 include "bamenu.h"

define ID_CLIENT_HEADING           80
define ID_CLIENT_ADSLIST           81

/* HELP TABLES and SUBTABLES */
define ID_HELPTABLE                82
define ID_BA_MAIN_HELP             83
define ID_BA_EXECUTE_HELP          84
define ID_BA_MACHINES_HELP         85
define ID_BA_GROUPS_HELP           86
define ID_BA_JOBLIST_HELP          87
define ID_BA_JOBSTEP_HELP          88
define ID_BA_ZOOM_HELP             89
define ID_BA_FILTER_HELP           90
define ID_BA_RESUME_HELP           91
define ID_BA_DAYTIMER_HELP         92
define ID_BA_PWDENTER_HELP         93
define ID_BA_PWDSET_HELP           94

/* HELP PANELS */
define IDH_BA_MAIN_EXTENDED         1
define IDH_BA_EXECUTE_EXTENDED      2
define IDH_BA_MACHINES_EXTENDED     3
define IDH_BA_GROUPS_EXTENDED       4
define IDH_BA_JOBLIST_EXTENDED      5
define IDH_BA_JOBSTEP_EXTENDED      6
define IDH_BA_ZOOM_EXTENDED         7
define IDH_BA_FILTER_EXTENDED       8
define IDH_BA_RESUME_EXTENDED       9
define IDH_BA_DAYTIMER_EXTENDED    10
define IDH_BA_PWDENTER_EXTENDED    11
```

-164-

```
define IDH_BA_PWDSET_EXTENDED        12
define IDH_BA_HELP                   13
define IDH_BA_HEL_HFH                14
define IDH_BA_HEL_SC_HELPEXTENDED    15
define IDH_BA_HEL_SC_HELPKEYS        16
define IDH_BA_HEL_SC_HELPINDEX       17
define IDH_BA_HEL_ABOUT              18

/* CLIENT WND PROC BUTTONS */ define USRBTN_BASE         200 define ID_CLIENT_MGLASS     USRBTN_BASE + 0
define ID_CLIENT_SCHED      USRBTN_BASE + 1
define ID_CLIENT_GOLIGHT    USRBTN_BASE + 2
define ID_CLIENT_STOPLIGHT  USRBTN_BASE + 3
define ID_CLIENT_RESCHED    USRBTN_BASE + 4
define ID_CLIENT_RUSH       USRBTN_BASE + 5
define ID_CLIENT_ERASER     USRBTN_BASE + 6

/************************************************************
*
* Copyright (c) 1990, 1991, 1992, 1993 American Airlines
*
* File:      BATCHSTR.H
*
* System:    Batch Administration
*
* Description:
*
* History:   David M. Wilson  08/01/90
*            Glenn Grundstrom
*
*
* This program is the CONFIDENTIAL and PROPRIETARY property
* of American Airlines.  Any unauthorized use, reproduction
* or transfer of this program is strictly prohibited.
*
* This is an unpublished work, and is subject to limited distribution
* and restricted disclosure only.  ALL RIGHTS RESERVED.
*
************************************************************/

STRINGTABLE
BEGIN
    IDS_ADMINTITLE        "Batch Administration"
    IDS_ANY               "ANY"
    IDS_ASAP              "ASAP"
    IDS_ATTEMPTING        "Attempting"
    IDS_BLANK             " "
    IDS_CANCEL            "Cancel"
    IDS_CANT_LOGON        "LOGON Record not obtained!"
    IDS_CANT_RESCHED      "Can't reschedule a RUNNING batch!"
    IDS_CANT_START        "The Scheduler is running and must be stopped first!"
    IDS_CANT_STOP         "The Schedule Server can not be shutdown while batches
are running."
        IDS_CLIENT_LIST1_BOT
"ID\011Name\011Request\011Status\011Scheduled\011Group\011By"
        IDS_CLIENT_LIST1_TOP
"Batch\011Batch\011User\011Current\011Run\011Target\011Scheduled"
    IDS_ERASE             "ERASE?"
    IDS_ERASE_JOB         "Erase batch #"
    IDS_ERASE_RUN         "is currently running.\n TERMINATE and ERASE the batch?"
    IDS_ERROR             "ERROR"
    IDS_EXECUTE_LIST1_BOT "Name\011Name"
```

```
IDS_EXECUTE_LIST1_TOP       "Program\011File"
IDS_GROUP_BUSY              "Group Busy"
IDS_GROUP_LIST1_BOT         "Name\011Description"
IDS_GROUP_LIST1_TOP         "Group\011Group"
IDS_GROUP_LIST2_BOT         "Name\011Description"
IDS_GROUP_LIST2_TOP         "Workstation\011Workstation"
IDS_GROUP_LIST3_BOT         "Name\011Description"
IDS_GROUP_LIST3_TOP         "Workstation\011Workstation"
IDS_HOLD                    "Hold"
IDS_ITEM_BUSY               "The item you selected was busy.  Try again."
IDS_JOB                     "Batch"
IDS_JOBLIST_LIST1_BOT       "Name\011Description\011By\011Modified"
IDS_JOBLIST_LIST1_TOP       "Batch\011Batch\011Edited\011Date"
IDS_JOBSTEP_LIST1_BOT       "Num\011Name\011List"
IDS_JOBSTEP_LIST1_TOP       "Job\011Program\011Parameter"
IDS_JOB_ID                  "Batch Id"
IDS_JOB_NAME                "Batch Name"
IDS_JOB_NOT_REMOVED         "Your original batch was not removed!"
IDS_JOB_STEPS               "Batch Jobs in"
IDS_MACHINES_LIST1_BOT      "Name\011Batch\011Description"
IDS_MACHINES_LIST1_TOP      "Workstation\011Max\011Workstation"
IDS_MODPWD_SHORT            "The modify password must be at least 6 characters long."
IDS_MOD_NOVERIFY            "The modify password can not be verified."
IDS_NEED_DAY                    "Please indicate what DAY this batch should be
rescheduled for!"
IDS_NEED_MONTH              "At least one MONTH must be chosen to reschedule this
batch!"
IDS_NEED_PERIOD             "At least one PERIOD must be chosen to reschedule this
batch!"
IDS_NO_DATE                 "Please enter the RUN DATE!"
IDS_NO_GROUP                "Group not selected"
IDS_NO_GROUP_SELECTED       "Please identify the GROUP that you would like this batch
to execute on!"
IDS_NO_HELP                 "The Help file was not found."
IDS_NO_JOB                  "Batch not selected"
IDS_NO_JOB_SELECTED             "Please identify the BATCH that you would like to
schedule!"
IDS_PICKSERV_LIST1_BOT      "Name\011Description"
IDS_PICKSERV_LIST1_TOP      "Workstation\011Workstation"
IDS_RESCHEDULE              "Edit Selected Schedule"
IDS_RESUME_LIST1_BOT        "Num\011Name\011List"
IDS_RESUME_LIST1_TOP        "Job\011Program\011Parameter"
IDS_RUNNING                 "Running"
IDS_RUSH                    "RUSH"
IDS_SCHEDULE                "Schedule Batch Execution"
IDS_SCHPWD_SHORT            "The scheduling password must be at least 6 characters
long."
IDS_SCH_NOVERIFY            "The schedule password can not be verified."
IDS_SQL_REJECTED            "This batch has been rejected by the database.  Please
verify the time and dates given!"
IDS_STEP                    "Job"
IDS_SUCCESS                 "Success"
IDS_TIME_INCORRECT          "Please enter a valid TIME!"
IDS_TOO_LONG                "The combined parameter lists are too long. Try again."
IDS_USERTITLE               "Batch"
IDS_WAITING                 "Waiting"
IDS_WARNING                 "WARNING!"
IDS_WORKSTATION             "Workstations in"
IDS_WRONG_PASSWORD          "The PASSWORD that you entered was incorrect!"
IDS_MACHINE_UNAVAIL         "The selected machine is not available!"
END
/**************************************************************
*
* Copyright (c) 1990, 1991, 1992, 1993 American Airlines
*
```

```
* File:      DIALOG.H
*
* System:    Batch Administration
*
* Description:
*
* History:   David M. Wilson  08/01/90
*            Glenn Grundstrom
*
*
* This program is the CONFIDENTIAL and PROPRIETARY property
* of American Airlines.  Any unauthorized use, reproduction
* or transfer of this program is strictly prohibited.
*
* This is an unpublished work, and is subject to limited distribution
* and restricted disclosure only.  ALL RIGHTS RESERVED.
*
***********************************************************************/ define ID1_SCHED1                        3 define IDD_WS_DETAILS                    200
define DID_WSDETAIL_MACHINENAME          202
define DID_WSDETAIL_DESCRIPTION          204
define DID_WSDETAIL_MAXJOBS              206
define DID_WSDETAIL_GROUPLIST            208
define DID_WSDETAIL_COMMIT               209
define DID_WSDETAIL_CANCEL               210
define DID_WSDETAIL_HELP                 211
define DID_WSDETAIL_GROUPLISTHEADER      212 define IDD_GRP_DETAILS                   400
define DID_GRPDETAIL_GROUPNAME           401
define DID_GRPDETAIL_DESCRIPTION         402
define DID_GRPDETAIL_MACHINELIST         403
define DID_GRPDETAIL_COMMIT              404
define DID_GRPDETAIL_CANCEL              405
define DID_GRPDETAIL_HELP                406
define DID_GRPDETAIL_MACHINELISTHEADER   407 define IDD_DAYTIMER                      1100
define DID_DAYTIMER_ICON                 1101
define DID_DAYTIMER_JOBCOMBO             1102
define DID_DAYTIMER_GRPCOMBO             1103
define DID_DAYTIMER_HOLD                 1104
define DID_DAYTIMER_ASAP                 1105
define DID_DAYTIMER_STARTTEXT            1106
define DID_DAYTIMER_STARTHOUR            1107
define DID_DAYTIMER_STARTCOLON           1108
define DID_DAYTIMER_STARTMIN             1109
define DID_DAYTIMER_AM                   1110
define DID_DAYTIMER_PM                   1111
define DID_DAYTIMER_DATETEXT             1112
define DID_DAYTIMER_DATE                 1113
define DID_DAYTIMER_SUN                  1114
define DID_DAYTIMER_MON                  1115
define DID_DAYTIMER_TUE                  1116
define DID_DAYTIMER_WED                  1117
define DID_DAYTIMER_THU                  1118
define DID_DAYTIMER_FRI                  1119
define DID_DAYTIMER_SAT                  1120
define DID_DAYTIMER_DAILY                1121
define DID_DAYTIMER_1ST                  1122
define DID_DAYTIMER_LAST                 1123
define DID_DAYTIMER_OTHERTEXT            1124
define DID_DAYTIMER_OTHERENT             1125
```

-167-

```
define DID_DAYTIMER_JAN            1126
define DID_DAYTIMER_FEB            1127
define DID_DAYTIMER_MAR            1128
define DID_DAYTIMER_APR            1129
define DID_DAYTIMER_MAY            1130
define DID_DAYTIMER_JUN            1131
define DID_DAYTIMER_JUL            1132
define DID_DAYTIMER_AUG            1133
define DID_DAYTIMER_SEP            1134
define DID_DAYTIMER_OCT            1135
define DID_DAYTIMER_NOV            1136
define DID_DAYTIMER_DEC            1137
define DID_DAYTIMER_ALL            1138
define DID_DAYTIMER_PERIOD1        1140
define DID_DAYTIMER_PERIOD2        1141
define DID_DAYTIMER_PERIOD3        1142
define DID_DAYTIMER_PERIOD4        1143
define DID_DAYTIMER_PERIOD5        1144
define DID_DAYTIMER_PERIOD6        1145
define DID_DAYTIMER_PERIOD7        1146
define DID_DAYTIMER_PERIOD8        1147
define DID_DAYTIMER_PERIOD9        1148
define DID_DAYTIMER_PERIOD10       1149
define DID_DAYTIMER_PERIOD11       1150
define DID_DAYTIMER_PERIOD12       1151
define DID_DAYTIMER_PERIOD13       1152
define DID_DAYTIMER_PERIODICALLY   1153
define RBID_MONTH                  1154
define RBID_PERIOD                 1155
define STID_DAY_OFFSET             1156
define PBID_NOW                    1157 define IDD_EXECUTE                 1200
define DID_EXECUTE_HEADING         1201
define DID_EXECUTE_ADSLIST         1202
define DID_EXECUTE_PROGFILE        1203
define DID_EXECUTE_PROGNAME        1204
define DID_EXECUTE_CLEAR           1205
define DID_EXECUTE_INSERT          1206
define DID_EXECUTE_UPDATE          1207
define DID_EXECUTE_DELETE          1208 define IDD_FILTER                  1300
define DID_FILTER_JOBCOMBO         1301
define DID_FILTER_JOBCLEAR         1302
define DID_FILTER_BYCOMBO          1303
define DID_FILTER_BYCLEAR          1304
define DID_FILTER_GROUPCOMBO       1305
define DID_FILTER_GROUPCLEAR       1306
define DID_FILTER_START            1307
define DID_FILTER_END              1308 define IDD_GROUPS                  1400
define IDD_GROUPS_LIST             1401
define IDD_GROUPS_MODIFY           1402
define IDD_GROUPS_DELETE           1403
define IDD_GROUPS_CANCEL           1404
define IDD_GROUPS_HELP             1405
define IDD_GROUPS_LISTHEADER       1406 define IDD_JOBLIST                 1500
define DID_JOBLIST_HEADING         1501
define DID_JOBLIST_ADSLIST         1502
define DID_JOBLIST_JOBNAME         1503
define DID_JOBLIST_JOBDESC         1504
define DID_JOBLIST_CLEAR           1505
```

-168-

```
define DID_JOBLIST_INSERT          1506
define DID_JOBLIST_CLONE           1507
define DID_JOBLIST_DELETE          1508
define DID_JOBLIST_MODIFY          1509 define IDD_JOBSTEP                 1600
define DID_JOBSTEP_HEADING         1601
define DID_JOBSTEP_ADSLIST         1602
define DID_JOBSTEP_COMBO           1603
define DID_JOBSTEP_ARGS1           1604
define DID_JOBSTEP_ARGS2           1605
define DID_JOBSTEP_RESTRICT1       1606
define DID_JOBSTEP_RESTRICT2       1607
define DID_JOBSTEP_CLEAR           1608
define DID_JOBSTEP_APPEND          1609
define DID_JOBSTEP_INSERT          1610
define DID_JOBSTEP_UPDATE          1611
define DID_JOBSTEP_DELETE          1612
define DID_JOBSTEP_PASSWORDS       1613 define IDD_MACHINES                1700
define IDD_MACHINES_LIST           1701
define IDD_MACHINES_MODIFY         1702
define IDD_MACHINES_DELETE         1703
define IDD_MACHINES_CANCEL         1704
define IDD_MACHINES_HELP           1705
define IDD_MACHINES_LISTHEADER     1706 define IDI_SERVER                  17
define IDD_PICKSERV                1800
define DID_PICKSERV_HEADING        1801
define DID_PICKSERV_ADSLIST        1802 define IDD_PWDENTER                1900
define DID_PWDENTER_ENT1           1901 define IDD_PWDSET                  2000
define DID_PWDSET_ENT1             2001
define DID_PWDSET_ENT2             2002
define DID_PWDSET_ENT3             2003
define DID_PWDSET_ENT4             2004 define IDI_GOLIGHT                 4
define IDD_RESUME                  2100
define DID_RESUME_STEPOUT          2101
define DID_RESUME_RETURNCODE       2102
define DID_RESUME_NEXTSTEP         2103
define DID_RESUME_MACHINE          2104
define DID_RESUME_ANYINGROUP       2105
define DID_RESUME_HEADING          2106
define DID_RESUME_ADSLIST          2107
define DID_RESUME_STEP             2108 define IDI_MGLASS1                 2
define IDD_ZOOM                    2200
define DID_ZOOM_USERREQ            2201
define DID_ZOOM_STATUS             2202
define DID_ZOOM_STEPNUM            2203
define DID_ZOOM_STEPRESULT         2204
define DID_ZOOM_GRPNAME            2205
define DID_ZOOM_MACHINENAME        2206
define DID_ZOOM_STARTTIME          2207
define DID_ZOOM_ENDTIME            2208
define DID_ZOOM_NEXTRUN            2209
define DID_ZOOM_SUN                2210
define DID_ZOOM_MON                2211
```

```
define DID_ZOOM_TUE            2212
define DID_ZOOM_WED            2213
define DID_ZOOM_THU            2214
define DID_ZOOM_FRI            2215
define DID_ZOOM_SAT            2216
define DID_ZOOM_MONTHDAY       2217
define DID_ZOOM_JAN            2218
define DID_ZOOM_FEB            2219
define DID_ZOOM_MAR            2220
define DID_ZOOM_APR            2221
define DID_ZOOM_MAY            2222
define DID_ZOOM_JUN            2223
define DID_ZOOM_JUL            2224
define DID_ZOOM_AUG            2225
define DID_ZOOM_SEP            2226
define DID_ZOOM_OCT            2227
define DID_ZOOM_NOV            2228
define DID_ZOOM_DEC            2229
define DID_ZOOM_SCHEDBY        2230
define DID_ZOOM_1              2232
define DID_ZOOM_2              2233
define DID_ZOOM_3              2234
define DID_ZOOM_4              2235
define DID_ZOOM_5              2236
define DID_ZOOM_6              2237
define DID_ZOOM_7              2238
define DID_ZOOM_8              2239
define DID_ZOOM_9              2240
define DID_ZOOM_10             2241
define DID_ZOOM_11             2242
define DID_ZOOM_12             2243
define DID_ZOOM_13             2244
define DID_ZOOM_PMOFFSET       2245
```

Figure 4:
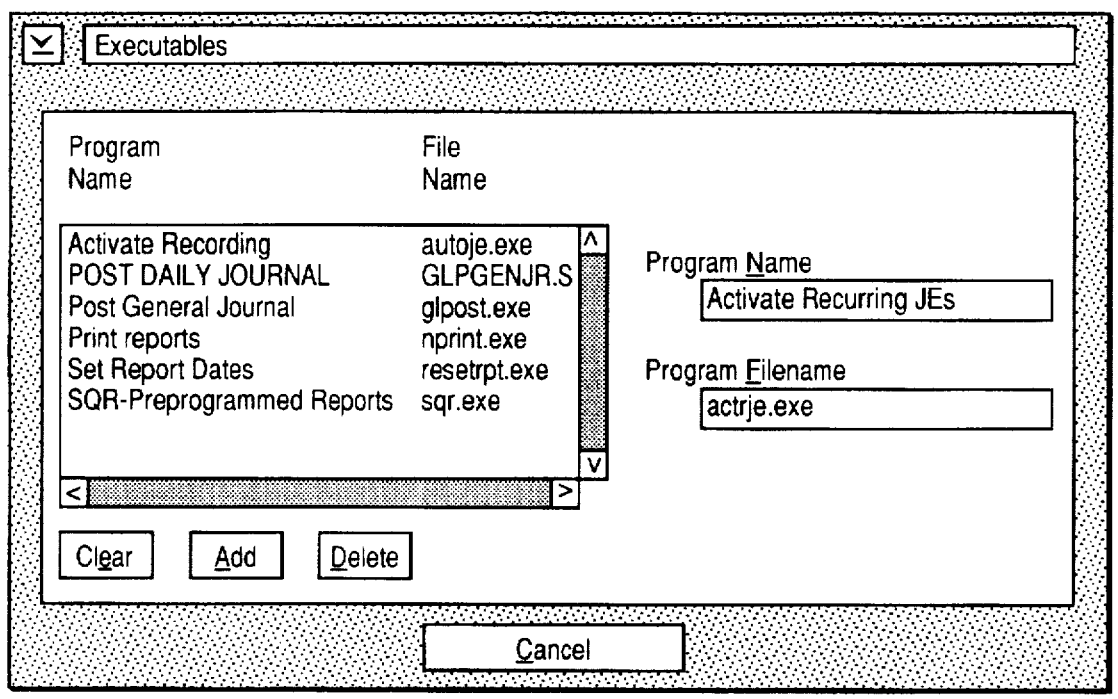
FIG. 4 is a representative screen showing executable functions of the batch scheduling system.

Batch scheduling system 160 provides means for generating a variety of customized reports automatically at end-user predetermined times and intervals. Batch scheduling system 160 allows each batch executable filename or program filename to be assigned a program name as further illustrated by the screen shown in FIG. 4. Another feature of batch scheduling system 160 is the ability to edit batches 232 to add, modify, delete or copy jobs within a batch.

Figure 5:
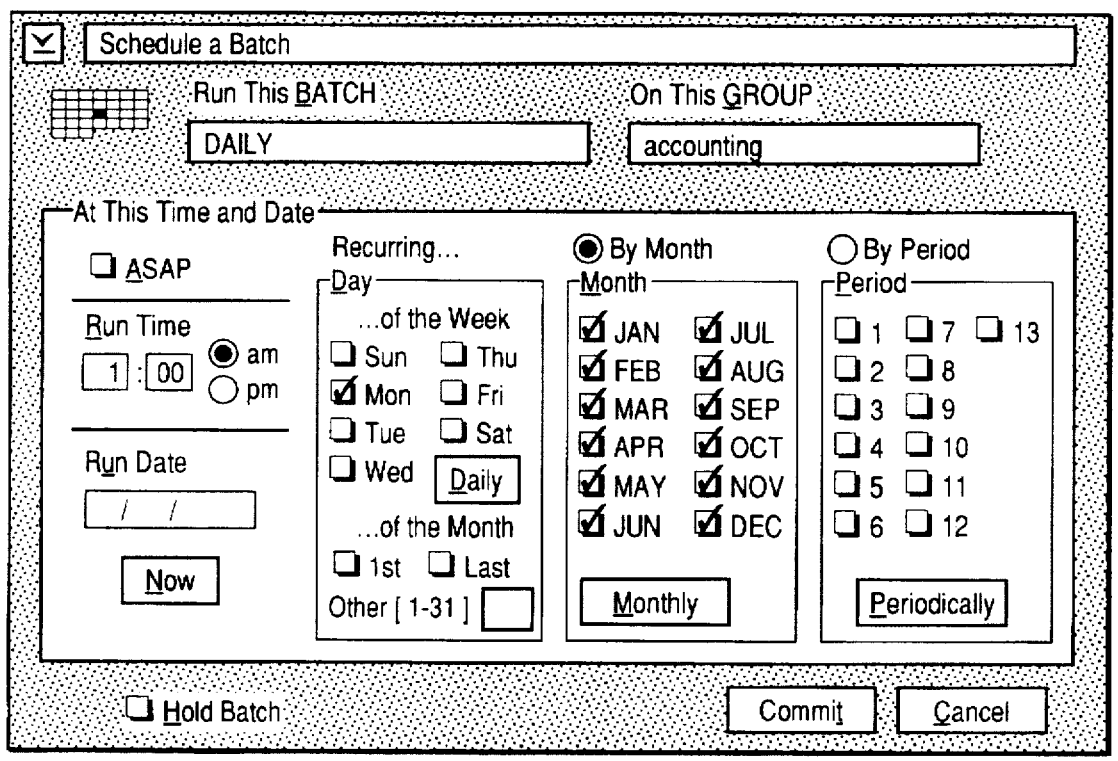
FIG. 5 is a representative screen showing the scheduling of batch tasks by time, date, and period.

Additionally, batch scheduling system 160 gives the user the ability to define executable programs 234 that may be batch processed, i.e. to give the end user the ability to customize reports and decide what parameters should be used and when and where the batches should be processed. An example of this is illustrated in the screen of FIG. 5.

Figure 6:
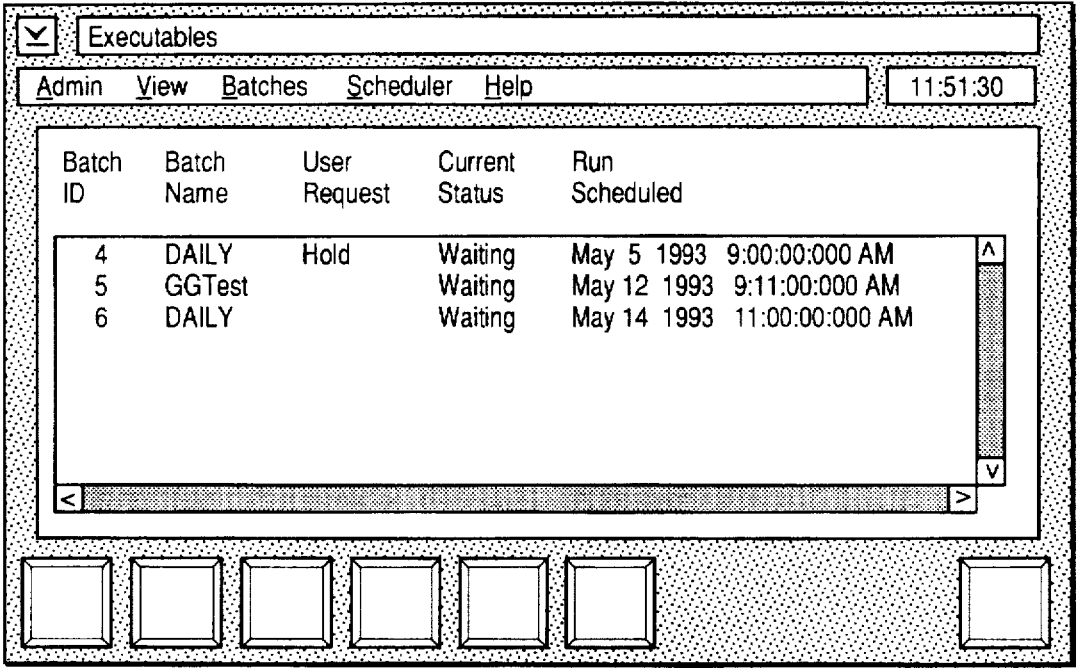
FIG. 6 is a representative screen showing the status of scheduled batch tasks.

Batch scheduling system 160 provides the end user with the ability to view current batch detail, batch status, and batch history 240 as needed. Feature 240 illustrated in the screen shown in FIG. 6.

Figure 7:
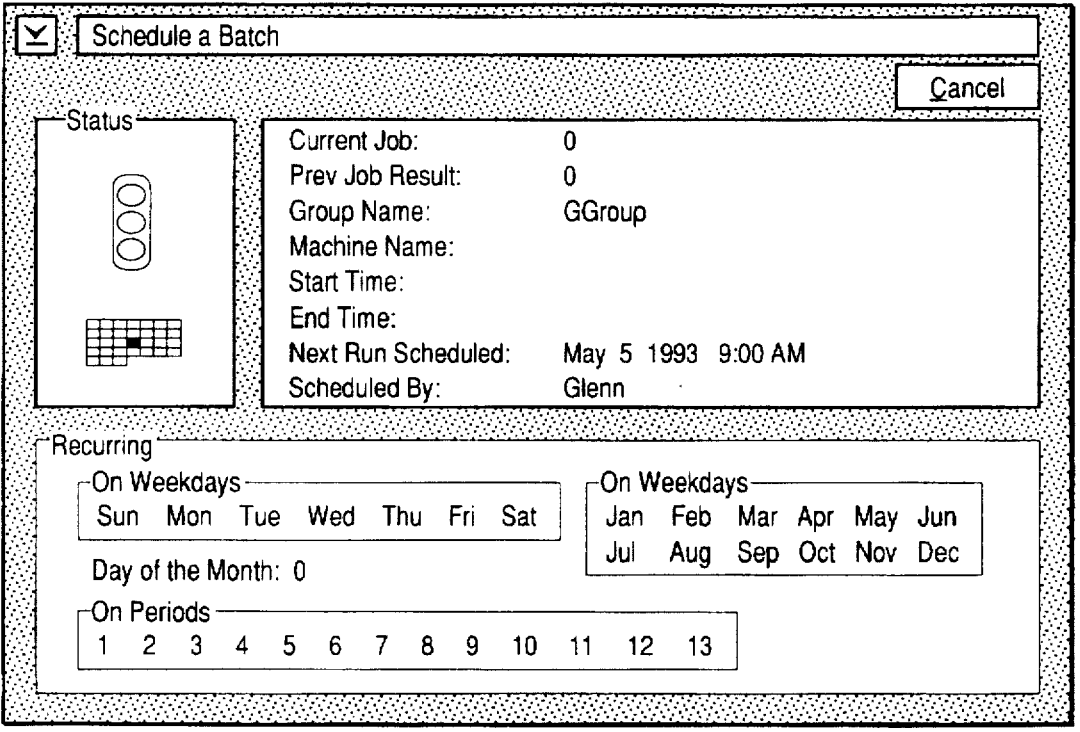
FIG. 7 is a representative screen showing the scheduling of a single batch task.

Batch scheduling system 160 gives the user the ability to assign available resources to resource groups 238 (used during the batch processing). This allows the end user to decide, if, when and how many of the resources within the enduser facility shall be used for customized report generation and when those resources are going to be occupied. Batch scheduling system 160 also has the ability to add resources 236 to those that are available for batch processing. This gives flexibility to the end-user to either increase or decrease the number of resources utilized in report generation and customization. Features 236 and 238 are also illustrated in the screen of FIGS. 7 and FIG. 8, respectively.

Operation of the batch scheduling system 160 is illustrated at 250, 260, 270, 280 of FIG. 3 with the start of the batch scheduler on either LAN 50 or a single platform attached to LAN 50. Batch scheduling system 160 may execute tasks 260 on the preassigned resources 238 which have been added to the list of resources 236 using the available processing power of LAN 50 to start the scheduled batch process 250. After a job is completed, batch scheduling system 160 then transmits the data along communication line 262 to database server 80. Batch job information is communicated along the line 264 from the accounting and reporting database 150 to the start batch scheduler 250. Two other functions 270 and 280 allow the batch scheduling system 160 to refuse or accept new jobs while the scheduler is running or to stop and start the batch scheduler as necessary. One embodiment of features 270 and 280 is illustrated in the screen of FIG. 7.

Although the invention has been described and illustrated in detail it is clearly understood that the same is by way of illustration and example only. It is not to be taken by way of limitation. The scope of the present invention is to be limited only by the terms of the appending claims.

We claim:

1. A system for batch processing of travel-related reservation data comprising:

a centralized reservation system;

a plurality of processing resources communicably linked to the centralized reservation system and configured to perform a plurality of back-office functions;

a batch task scheduling function interfaced to the plurality of processing resources for scheduling batch tasks; and a batch task distribution function coupled to the batch task scheduling function and interfaced to the plurality of processing resources for partitioning the batch tasks among said plurality of processing resources.

2. The system recited in claim 1 further comprising a client server platform communicably linked to the centralized reservation system and providing a communication link between the centralized reservation system and a plurality of end users.

3. A system for scheduling batch tasks which control the processing of travel transactions, comprising:

a client server platform;

a local area network coupled to the client server platform;

a plurality of processing resources coupled to the local area network and providing a plurality of back-office system transactions applications;

a batch task scheduling function controllably interfaced to the plurality of processing resources for scheduling the generation of reports; and a batch task distribution function coupled to the batch task scheduling function and controllably interfaced to the plurality of processing resources for partitioning the batch tasks among said plurality of processing resources.

4. A method of scheduling the batch processing of travel-related reservations with back office applications of the travel providers local processing resources, comprising:

initiating a communications link with a central reservation system having a mass data base containing a plurality of travelrelated reservation data;

requesting travel-related reservation data from the central reservation system via the communications link;

using the local processing resources to process the data received from the central reservation system;

scheduling a batch task to process the data; and distributing the batch task among the local processing resources for processing at a predetermined time.

5. A system for processing travel reservation transactions on a batch driven basis comprising:

a centralized reservation system containing airline reservation information; and a plurality of processing resources communicably linked to the centralized reservation system and containing a plurality of back-office applications wherein at least one of the back office application comprises:

a batch scheduling function interfaced to the plurality of processing resources for scheduling periodic processing of reservation transaction data; and a batch task distribution function coupled to said batch scheduling function and interfaced to the plurality of processing resources for partitioning the periodic processing of said reservation transaction data among said plurality of processing resources.

6. The system recited in claim 1 further comprising a printing means coupled to at least one of the plurality of processing resources for generating reports.

7. A system for scheduling batch tasks that control the processing of travel-related transactions comprising:

a client server platform;

a local area network coupled to the client server platform;

a plurality of processing resources coupled to said local area network and providing a plurality of back-office transaction applications;

a batch scheduling function interfaced to said plurality of processing resources for scheduling the processing of the travel-related transactions using batch tasks; and a batch task distribution function coupled to said batch scheduling function and interfaced to said plurality of processing resources for partitioning said batch tasks among said plurality of processing resources, said batch tasks causing the processing of said travel-related transactions at some predetermined time.

8. The system according to claim 3 further comprising a printing means coupled to at least one of said plurality of processing resources for generating reports.

9. The method according to claim 4 further comprising the step of printing reports from the processed travel-related reservation data.

* * * * *